(12) United States Patent
Henry et al.

(10) Patent No.: US 9,653,770 B2
(45) Date of Patent: May 16, 2017

(54) GUIDED WAVE COUPLER, COUPLING MODULE AND METHODS FOR USE THEREWITH

(71) Applicant: AT&T Intellectual Property I, LP, Atlanta, GA (US)

(72) Inventors: Paul Shala Henry, Holmdel, NJ (US); Robert Bennett, Southhold, NY (US); Irwin Gerszberg, Kendall Park, NJ (US); Farhad Barzegar, Branchburg, NJ (US); Donald J Barnickel, Flemington, NJ (US); Thomas M. Willis, III, Tinton Falls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/519,529

(22) Filed: Oct. 21, 2014

(65) Prior Publication Data

US 2016/0112115 A1    Apr. 21, 2016

(51) Int. Cl.
*H04B 3/36* (2006.01)
*H01P 5/12* (2006.01)
(Continued)

(52) U.S. Cl.
CPC ................. *H01P 5/12* (2013.01); *H01P 3/16* (2013.01); *H04B 3/36* (2013.01); *H04B 3/52* (2013.01);
(Continued)

(58) Field of Classification Search
CPC ........ H04B 7/15557; H04B 3/36; H04B 3/52; H01P 3/16; H04W 16/26
See application file for complete search history.

(56) References Cited

U.S. PATENT DOCUMENTS

| 529,290 A | 11/1894 | Harry et al. |
| 1,721,785 A | 7/1929 | Meyer |

(Continued)

FOREIGN PATENT DOCUMENTS

| AU | 565039 B2 | 9/1987 |
| AU | 7261000 A | 4/2001 |

(Continued)

OTHER PUBLICATIONS

Ponchak et al., A New Model of Broadband Waveguide to Microstrip Transition Design, Dec. 1986, NASA Technical Memorandum 88905.*

(Continued)

*Primary Examiner* — Mohammed Rachedine
(74) *Attorney, Agent, or Firm* — Guntin & Gust. PLC; Ed Guntin

(57) ABSTRACT

Aspects of the subject disclosure may include, for example, a coupler including a receiving portion that receives a first electromagnetic wave conveying first data from a transmitting device. A guiding portion guides the first electromagnetic wave to a junction for coupling the first electromagnetic wave to a transmission medium. The first electromagnetic wave propagates via at least one first guided wave mode. The coupling of the first electromagnetic wave to the transmission medium forms a second electromagnetic wave that is guided to propagate along the outer surface of the transmission medium via at least one second guided wave mode that differs from the at least one first guided wave mode. Other embodiments are disclosed.

21 Claims, 30 Drawing Sheets

(51) Int. Cl.
  *H04B 7/155*   (2006.01)
  *H04B 3/52*    (2006.01)
  *H04W 16/26*   (2009.01)
  *H04B 3/56*    (2006.01)
  *H01P 3/16*    (2006.01)

(52) U.S. Cl.
  CPC ........... *H04B 3/56* (2013.01); *H04B 7/15557* (2013.01); *H04W 16/26* (2013.01)

(56) References Cited

U.S. PATENT DOCUMENTS

| | | | |
|---|---|---|---|
| 1,860,123 A | 5/1932 | Yagi |
| 2,129,711 A | 9/1938 | Southworth |
| 2,147,717 A | 2/1939 | Schelkunoff |
| 2,187,908 A | 1/1940 | McCreary |
| 2,199,083 A | 4/1940 | Schelkunoff |
| 2,232,179 A | 2/1941 | King |
| 2,283,935 A | 5/1942 | King |
| 2,398,095 A | 4/1946 | Katzin |
| 2,402,622 A | 6/1946 | Hansen |
| 2,407,068 A | 9/1946 | Fiske et al. |
| 2,407,069 A | 9/1946 | Fiske |
| 2,411,338 A | 11/1946 | Roberts |
| 2,415,089 A | 2/1947 | Feldman et al. |
| 2,415,807 A | 2/1947 | Barrow et al. |
| 2,420,007 A | 5/1947 | Olden |
| 2,422,058 A | 6/1947 | Whinnery |
| 2,432,134 A | 12/1947 | Bagnall |
| 2,461,005 A | 2/1949 | Southworth |
| 2,471,021 A | 5/1949 | Bradley |
| 2,488,400 A | 11/1949 | Harder |
| 2,513,205 A | 6/1950 | Roberts et al. |
| 2,514,679 A | 7/1950 | Southworth |
| 2,519,603 A | 8/1950 | Reber |
| 2,540,839 A | 2/1951 | Southworth |
| 2,542,980 A | 2/1951 | Barrow |
| 2,557,110 A | 6/1951 | Jaynes |
| 2,562,281 A | 7/1951 | Mumford |
| 2,596,190 A | 5/1952 | Wiley |
| 2,599,864 A | 6/1952 | Robertson-Shersby-Ha et al. |
| 2,677,055 A | 4/1954 | Allen |
| 2,685,068 A | 7/1954 | Goubau |
| 2,688,732 A | 9/1954 | Kock |
| 2,691,766 A | 10/1954 | Clapp |
| 2,706,279 A | 4/1955 | Aron |
| 2,711,514 A | 6/1955 | Rines |
| 2,723,378 A | 11/1955 | Clavier et al. |
| 2,727,232 A | 12/1955 | Pryga |
| 2,740,826 A | 4/1956 | Bondon |
| 2,745,101 A | 5/1956 | Marie |
| 2,748,350 A | 5/1956 | Miller et al. |
| 2,749,545 A | 6/1956 | Kostriza |
| 2,754,513 A | 7/1956 | Goubau |
| 2,761,137 A | 8/1956 | Atta et al. |
| 2,769,147 A | 10/1956 | Black et al. |
| 2,794,959 A | 6/1957 | Fox |
| 2,805,415 A | 9/1957 | Berkowitz |
| 2,806,972 A | 9/1957 | Sensiper |
| 2,810,111 A | 10/1957 | Cohn |
| 2,819,451 A | 1/1958 | Sims et al. |
| 2,820,083 A | 1/1958 | Hendrix |
| 2,835,871 A | 5/1958 | Raabe |
| 2,867,776 A | 1/1959 | Wilkinson, Jr. |
| 2,912,695 A | 11/1959 | Cutler |
| 2,914,741 A | 11/1959 | Unger |
| 2,921,277 A | 1/1960 | Goubau |
| 2,925,458 A | 2/1960 | Lester et al. |
| 2,949,589 A | 8/1960 | Hafner |
| 2,960,670 A | 11/1960 | Marcatili et al. |
| 2,972,148 A | 2/1961 | Rupp et al. |
| 2,974,297 A | 3/1961 | Ros |
| 2,993,205 A | 7/1961 | Cooper et al. |
| 3,040,278 A | 6/1962 | Griemsmann et al. |
| 3,072,870 A | 1/1963 | Walker |
| 3,101,472 A | 8/1963 | Goubau |
| 3,109,175 A | 10/1963 | Lloyd |
| 3,129,356 A | 4/1964 | Phillips |
| 3,134,951 A | 5/1964 | Huber et al. |
| 3,146,297 A | 8/1964 | Hahne |
| 3,146,453 A | 8/1964 | Hagaman |
| 3,201,724 A | 8/1965 | Hafner |
| 3,218,384 A | 11/1965 | Shaw |
| 3,234,559 A | 2/1966 | Bartholoma et al. |
| 3,255,454 A | 6/1966 | Walter et al. |
| 3,296,364 A | 1/1967 | Jefferson et al. |
| 3,296,685 A | 1/1967 | Menahem et al. |
| 3,316,344 A | 4/1967 | Toms et al. |
| 3,316,345 A | 4/1967 | Toms et al. |
| 3,321,763 A | 5/1967 | Ikrath et al. |
| 3,329,958 A | 7/1967 | Anderson et al. |
| 3,389,394 A | 6/1968 | Lewis et al. |
| 3,392,388 A | 7/1968 | Tsuneo et al. |
| 3,392,395 A | 7/1968 | Hannan |
| 3,411,112 A | 11/1968 | Honig et al. |
| 3,413,642 A | 11/1968 | Cook |
| 3,414,903 A | 12/1968 | Bartlett et al. |
| 3,420,596 A | 1/1969 | Osterberg |
| 3,427,573 A | 2/1969 | White et al. |
| 3,448,455 A | 6/1969 | Alfandari et al. |
| 3,459,873 A | 8/1969 | Harris et al. |
| 3,487,158 A | 12/1969 | Killian |
| 3,500,422 A | 3/1970 | Grady et al. |
| 3,509,463 A | 4/1970 | Woodward et al. |
| 3,522,560 A | 8/1970 | Hayany |
| 3,524,192 A | 8/1970 | Sakiotis et al. |
| 3,529,205 A | 9/1970 | Miller |
| 3,530,481 A | 9/1970 | Tanaka et al. |
| 3,531,803 A | 9/1970 | Hudspeth et al. |
| 3,555,553 A | 1/1971 | Boyns |
| 3,557,341 A | 1/1971 | Sochilin et al. |
| 3,588,754 A | 6/1971 | Hafner |
| 3,589,121 A | 6/1971 | Mulvey |
| 3,603,904 A | 9/1971 | Hafner |
| 3,609,247 A | 9/1971 | Halstead |
| 3,623,114 A | 11/1971 | Seaton |
| 3,668,459 A | 6/1972 | Symons et al. |
| 3,668,574 A | 6/1972 | Barlow |
| 3,672,202 A | 6/1972 | Barber et al. |
| 3,686,596 A | 8/1972 | Albee |
| 3,699,574 A | 10/1972 | Plunk et al. |
| 3,725,937 A | 4/1973 | Schreiber |
| 3,772,528 A | 11/1973 | Anderson et al. |
| 3,806,931 A | 4/1974 | Wright |
| 3,833,909 A | 9/1974 | Schaufelberger |
| 3,835,407 A | 9/1974 | Yariv et al. |
| 3,845,426 A | 10/1974 | Barlow |
| 3,896,380 A | 7/1975 | Martin |
| 3,935,577 A | 1/1976 | Hansen et al. |
| 3,936,838 A | 2/1976 | Foldes et al. |
| 3,959,794 A | 5/1976 | Chrepta et al. |
| 4,010,799 A | 3/1977 | Kern et al. |
| 4,020,431 A | 4/1977 | Saunders et al. |
| 4,026,632 A | 5/1977 | Hill et al. |
| 4,030,048 A | 6/1977 | Foldes et al. |
| 4,035,054 A | 7/1977 | Lattanzi et al. |
| 4,047,180 A | 9/1977 | Kuo et al. |
| 4,080,600 A | 3/1978 | Toman et al. |
| 4,123,759 A | 10/1978 | Hines et al. |
| 4,125,768 A | 11/1978 | Jackson et al. |
| 4,149,170 A | 4/1979 | Campbell et al. |
| 4,156,241 A | 5/1979 | Mobley et al. |
| 4,175,257 A | 11/1979 | Smith et al. |
| 4,188,595 A | 2/1980 | Cronson et al. |
| 4,190,137 A | 2/1980 | Shimada et al. |
| 4,195,302 A | 3/1980 | Leupelt et al. |
| 4,210,357 A | 7/1980 | Adachi et al. |
| 4,216,449 A | 8/1980 | Kach |
| 4,234,753 A | 11/1980 | Clutter |
| 4,238,974 A | 12/1980 | Fawcett et al. |
| 4,246,584 A | 1/1981 | Noerpel et al. |
| 4,274,097 A | 6/1981 | Krall et al. |
| 4,278,955 A | 7/1981 | Lunden et al. |
| 4,293,833 A | 10/1981 | Popa et al. |

(56) References Cited

U.S. PATENT DOCUMENTS

| | | |
|---|---|---|
| 4,307,938 A | 12/1981 | Dyott et al. |
| 4,316,646 A | 2/1982 | Siebens et al. |
| 4,319,074 A | 3/1982 | Yaste et al. |
| 4,329,690 A | 5/1982 | Parker et al. |
| 4,333,082 A | 6/1982 | Susman et al. |
| 4,336,719 A | 6/1982 | Lynnworth |
| 4,345,256 A | 8/1982 | Rainwater et al. |
| 4,366,565 A | 12/1982 | Herskowitz |
| 4,367,446 A | 1/1983 | Hall et al. |
| 4,378,143 A | 3/1983 | Winzer et al. |
| 4,384,289 A | 5/1983 | Roosevelt et al. |
| 4,398,058 A | 8/1983 | Gerth et al. |
| 4,398,121 A | 8/1983 | Chodorow et al. |
| 4,447,811 A | 5/1984 | Hamid et al. |
| 4,463,329 A | 7/1984 | Suzuki et al. |
| 4,482,899 A | 11/1984 | Dragone et al. |
| 4,488,156 A | 12/1984 | DuFort et al. |
| 4,491,386 A | 1/1985 | Negishi et al. |
| 4,525,432 A | 6/1985 | Saito et al. |
| 4,533,875 A | 8/1985 | Lau et al. |
| 4,541,303 A | 9/1985 | Kuzunishi et al. |
| 4,550,271 A | 10/1985 | Lau et al. |
| 4,553,112 A | 11/1985 | Saad et al. |
| 4,556,271 A | 12/1985 | Hubbard |
| 4,558,325 A | 12/1985 | Stroem et al. |
| 4,566,012 A | 1/1986 | Choung et al. |
| 4,567,401 A | 1/1986 | Barnett et al. |
| 4,573,215 A | 2/1986 | Oates et al. |
| 4,598,262 A | 7/1986 | Chen et al. |
| 4,604,627 A | 8/1986 | Saad et al. |
| 4,636,753 A | 1/1987 | Geller et al. |
| 4,641,916 A | 2/1987 | Oestreich et al. |
| 4,660,050 A | 4/1987 | Phillips et al. |
| 4,665,660 A | 5/1987 | Krall et al. |
| 4,680,558 A | 7/1987 | Ghosh et al. |
| 4,694,599 A | 9/1987 | Hart et al. |
| 4,704,611 A | 11/1987 | Edwards et al. |
| 4,715,695 A | 12/1987 | Nishimura et al. |
| 4,717,974 A | 1/1988 | Baumeister et al. |
| 4,730,172 A | 3/1988 | Bengeult |
| 4,730,888 A | 3/1988 | Darcie et al. |
| 4,731,810 A | 3/1988 | Watkins |
| 4,735,097 A | 4/1988 | Lynnworth et al. |
| 4,743,916 A | 5/1988 | Bengeult |
| 4,745,377 A | 5/1988 | Stern et al. |
| 4,746,241 A | 5/1988 | Burbank, III |
| 4,749,244 A | 6/1988 | Luh |
| 4,758,962 A | 7/1988 | Fernandes |
| 4,764,738 A | 8/1988 | Fried et al. |
| 4,772,891 A | 9/1988 | Svy |
| 4,777,457 A | 10/1988 | Ghosh et al. |
| 4,786,913 A | 11/1988 | Barendregt et al. |
| 4,788,553 A | 11/1988 | Phillips et al. |
| 4,792,771 A | 12/1988 | Siu et al. |
| 4,792,812 A | 12/1988 | Rinehart et al. |
| 4,799,031 A | 1/1989 | Lang et al. |
| 4,801,937 A | 1/1989 | Fernandes |
| 4,818,963 A | 4/1989 | Green et al. |
| 4,818,990 A | 4/1989 | Fernandes |
| 4,829,310 A | 5/1989 | Losee et al. |
| 4,829,314 A | 5/1989 | Barbier et al. |
| 4,831,346 A | 5/1989 | Brooker et al. |
| 4,832,148 A | 5/1989 | Becker et al. |
| 4,835,517 A | 5/1989 | Van Der et al. |
| 4,845,508 A | 7/1989 | Krall et al. |
| 4,849,611 A | 7/1989 | Whitney et al. |
| 4,851,788 A | 7/1989 | Ives et al. |
| 4,873,534 A | 10/1989 | Wohlleben et al. |
| 4,879,544 A | 11/1989 | Maki et al. |
| 4,881,028 A | 11/1989 | Bright et al. |
| 4,886,980 A | 12/1989 | Fernandes et al. |
| 4,897,663 A | 1/1990 | Kusano et al. |
| 4,904,996 A | 2/1990 | Fernandes |
| 4,915,468 A | 4/1990 | Kim et al. |
| 4,929,962 A | 5/1990 | Begout et al. |
| 4,931,808 A | 6/1990 | Munson et al. |
| 4,946,202 A | 8/1990 | Perricone et al. |
| 4,977,618 A | 12/1990 | Allen |
| 5,006,846 A | 4/1991 | Granville et al. |
| 5,015,914 A | 5/1991 | Ives et al. |
| 5,017,936 A | 5/1991 | Massey et al. |
| 5,017,937 A | 5/1991 | Newham et al. |
| 5,019,832 A | 5/1991 | Ekdahl et al. |
| 5,042,903 A | 8/1991 | Jakubowski et al. |
| 5,043,538 A | 8/1991 | Hughey et al. |
| 5,043,629 A | 8/1991 | Doane et al. |
| 5,044,722 A | 9/1991 | Voser et al. |
| 5,045,820 A | 9/1991 | Oehlerking et al. |
| 5,072,228 A | 12/1991 | Kuwahara et al. |
| 5,082,349 A | 1/1992 | Cordova-Plaza et al. |
| 5,086,467 A | 2/1992 | Malek |
| 5,107,231 A | 4/1992 | Knox et al. |
| 5,109,232 A | 4/1992 | Monte et al. |
| 5,117,237 A | 5/1992 | Legg |
| 5,126,750 A | 6/1992 | Wang et al. |
| 5,132,968 A | 7/1992 | Cephus |
| 5,134,251 A | 7/1992 | Martin et al. |
| 5,134,965 A | 8/1992 | Tokuda et al. |
| 5,142,767 A | 9/1992 | Adams et al. |
| 5,148,509 A | 9/1992 | Kannabiran et al. |
| 5,153,676 A | 10/1992 | Bergh et al. |
| 5,166,698 A | 11/1992 | Ashbaugh et al. |
| 5,174,164 A | 12/1992 | Wilheim et al. |
| 5,182,427 A | 1/1993 | McGaffigan et al. |
| 5,187,409 A | 2/1993 | Ito et al. |
| 5,198,823 A | 3/1993 | Litchford et al. |
| 5,212,755 A | 5/1993 | Holmberg et al. |
| 5,214,394 A | 5/1993 | Wong et al. |
| 5,235,662 A | 8/1993 | Prince et al. |
| 5,248,876 A | 9/1993 | Kerstens et al. |
| 5,254,809 A | 10/1993 | Martin |
| 5,265,266 A | 11/1993 | Trinh |
| 5,266,961 A | 11/1993 | Milroy et al. |
| 5,276,455 A | 1/1994 | Fitzsimmons et al. |
| 5,278,687 A | 1/1994 | Jannson et al. |
| 5,291,211 A | 3/1994 | Tropper et al. |
| 5,304,999 A | 4/1994 | Roberts et al. |
| 5,311,596 A | 5/1994 | Scott et al. |
| 5,329,285 A | 7/1994 | McCandless et al. |
| 5,341,088 A | 8/1994 | David |
| 5,345,522 A | 9/1994 | Vali et al. |
| 5,371,623 A | 12/1994 | Eastmond et al. |
| 5,380,224 A | 1/1995 | DiCicco |
| 5,389,442 A | 2/1995 | Kathiresan et al. |
| 5,410,318 A | 4/1995 | Wong et al. |
| 5,412,654 A | 5/1995 | Perkins |
| 5,428,818 A | 6/1995 | Meidan et al. |
| 5,434,575 A | 7/1995 | Jelinek et al. |
| 5,440,660 A | 8/1995 | Dombrowski et al. |
| 5,479,176 A | 12/1995 | Zavrel et al. |
| 5,481,268 A | 1/1996 | Higgins |
| 5,482,525 A | 1/1996 | Kajioka et al. |
| 5,486,839 A | 1/1996 | Rodeffer et al. |
| 5,488,380 A | 1/1996 | Harvey et al. |
| 5,495,546 A | 2/1996 | Bottoms et al. |
| 5,499,308 A | 3/1996 | Arai et al. |
| 5,499,311 A | 3/1996 | DeCusatis et al. |
| 5,512,906 A | 4/1996 | Speciale et al. |
| 5,513,176 A | 4/1996 | Dean et al. |
| 5,515,059 A | 5/1996 | How et al. |
| 5,528,208 A | 6/1996 | Kobayashi et al. |
| 5,543,000 A | 8/1996 | Lique |
| 5,559,359 A | 9/1996 | Reyes |
| 5,566,022 A | 10/1996 | Segev |
| 5,566,196 A | 10/1996 | Scifres |
| 5,592,183 A | 1/1997 | Henf |
| 5,603,089 A | 2/1997 | Searle et al. |
| 5,619,015 A | 4/1997 | Kirma |
| 5,630,223 A * | 5/1997 | Bahu .................. H01Q 3/2611 455/24 |
| 5,637,521 A | 6/1997 | Rhodes et al. |
| 5,640,168 A | 6/1997 | Heger et al. |
| 5,650,788 A | 7/1997 | Jha |
| 5,652,554 A | 7/1997 | Krieg et al. |

(56) References Cited

U.S. PATENT DOCUMENTS

| | | |
|---|---|---|
| 5,671,304 A | 9/1997 | Duguay |
| 5,677,909 A | 10/1997 | Heide |
| 5,684,495 A | 11/1997 | Dyott et al. |
| 5,724,168 A | 3/1998 | Oschmann et al. |
| 5,757,323 A | 5/1998 | Spencer et al. |
| 5,784,033 A | 7/1998 | Boldissar, Jr. et al. |
| 5,784,683 A | 7/1998 | Sistanizadeh et al. |
| 5,793,334 A | 8/1998 | Harrison et al. |
| 5,805,983 A | 9/1998 | Naidu et al. |
| 5,818,396 A | 10/1998 | Harrison et al. |
| 5,818,512 A | 10/1998 | Fuller |
| 5,850,199 A | 12/1998 | Wan et al. |
| 5,854,608 A | 12/1998 | Leisten |
| 5,861,843 A | 1/1999 | Sorace et al. |
| 5,867,763 A | 2/1999 | Dean et al. |
| 5,870,060 A | 2/1999 | Chen et al. |
| 5,873,324 A | 2/1999 | Kaddas et al. |
| 5,890,055 A | 3/1999 | Chu et al. |
| 5,898,133 A | 4/1999 | Bleich et al. |
| 5,898,830 A | 4/1999 | Wesinger, Jr. et al. |
| 5,900,847 A | 5/1999 | Ishikawa et al. |
| 5,903,373 A | 5/1999 | Welch et al. |
| 5,905,949 A | 5/1999 | Hawkes et al. |
| 5,917,977 A | 6/1999 | Barrett et al. |
| 5,926,128 A | 7/1999 | Brash et al. |
| 5,936,589 A | 8/1999 | Kawahata |
| 5,948,044 A | 9/1999 | Varley et al. |
| 5,952,964 A | 9/1999 | Chan et al. |
| 5,952,972 A | 9/1999 | Ittipiboon et al. |
| 5,952,984 A | 9/1999 | Kuramoto et al. |
| 5,977,650 A | 11/1999 | Rickard et al. |
| 5,982,276 A | 11/1999 | Stewart |
| 5,986,331 A | 11/1999 | Letavic et al. |
| 5,994,984 A | 11/1999 | Stancil et al. |
| 5,994,998 A | 11/1999 | Fisher et al. |
| 6,005,758 A | 12/1999 | Spencer et al. |
| 6,011,520 A | 1/2000 | Howell et al. |
| 6,011,524 A | 1/2000 | Jervis et al. |
| 6,014,110 A | 1/2000 | Bridges et al. |
| 6,023,619 A | 2/2000 | Kaminsky |
| 6,026,208 A | 2/2000 | Will et al. |
| 6,026,331 A | 2/2000 | Feldberg et al. |
| 6,037,894 A | 3/2000 | Pfizenmaier et al. |
| 6,038,425 A | 3/2000 | Jeffrey et al. |
| 6,049,647 A | 4/2000 | Register et al. |
| 6,063,234 A | 5/2000 | Chen et al. |
| 6,078,297 A | 6/2000 | Kormanyos et al. |
| 6,088,001 A | 7/2000 | Burger et al. |
| 6,100,846 A | 8/2000 | Li et al. |
| 6,103,031 A | 8/2000 | Aeschbacher et al. |
| 6,107,897 A | 8/2000 | Hewett et al. |
| 6,114,998 A | 9/2000 | Schefte et al. |
| 6,140,911 A | 10/2000 | Fisher et al. |
| 6,140,976 A | 10/2000 | Locke et al. |
| 6,146,330 A | 11/2000 | Tujino et al. |
| 6,150,612 A | 11/2000 | Grandy et al. |
| 6,151,145 A | 11/2000 | Srivastava et al. |
| 6,154,488 A | 11/2000 | Hunt |
| 6,158,383 A | 12/2000 | Watanabe et al. |
| 6,166,694 A | 12/2000 | Ying et al. |
| 6,167,055 A | 12/2000 | Ganek et al. |
| 6,184,828 B1 | 2/2001 | Shoki et al. |
| 6,195,058 B1 | 2/2001 | Nakamura et al. |
| 6,195,395 B1 | 2/2001 | Frodsham et al. |
| 6,208,161 B1 | 3/2001 | Suda et al. |
| 6,211,836 B1 | 4/2001 | Manasson et al. |
| 6,211,837 B1 | 4/2001 | Crouch et al. |
| 6,222,503 B1 | 4/2001 | Gietema et al. |
| 6,225,960 B1 | 5/2001 | Collins et al. |
| 6,229,327 B1 | 5/2001 | Boll et al. |
| 6,239,377 B1 | 5/2001 | Nishikawa |
| 6,239,379 B1 | 5/2001 | Cotter et al. |
| 6,246,821 B1 | 6/2001 | Hemken et al. |
| 6,259,337 B1 | 7/2001 | Wen et al. |
| 6,266,016 B1 * | 7/2001 | Bergstedt .............. H01P 3/084 343/700 MS |
| 6,266,025 B1 | 7/2001 | Popa et al. |
| 6,271,790 B2 | 8/2001 | Smith et al. |
| 6,271,952 B1 | 8/2001 | Epworth et al. |
| 6,278,357 B1 | 8/2001 | Croushore et al. |
| 6,281,855 B1 | 8/2001 | Aoki et al. |
| 6,282,354 B1 | 8/2001 | Jones et al. |
| 6,292,139 B1 | 9/2001 | Yamamoto et al. |
| 6,292,143 B1 | 9/2001 | Romanofsky et al. |
| 6,301,420 B1 | 10/2001 | Greenaway et al. |
| 6,323,819 B1 | 11/2001 | Ergene et al. |
| 6,329,959 B1 | 12/2001 | Varadan et al. |
| 6,348,683 B1 | 2/2002 | Verghese et al. |
| 6,351,247 B1 | 2/2002 | Linstrom et al. |
| 6,362,789 B1 | 3/2002 | Trumbull et al. |
| 6,366,238 B1 | 4/2002 | DeMore et al. |
| 6,396,440 B1 | 5/2002 | Chen et al. |
| 6,404,773 B1 | 6/2002 | Williams et al. |
| 6,421,021 B1 | 7/2002 | Rupp et al. |
| 6,433,736 B1 | 8/2002 | Timothy et al. |
| 6,433,741 B2 * | 8/2002 | Tanizaki ....................... 333/161 |
| 6,436,536 B2 | 8/2002 | Peruzzotti et al. |
| 6,445,774 B1 | 9/2002 | Kidder et al. |
| 6,452,467 B1 | 9/2002 | McEwan |
| 6,452,923 B1 | 9/2002 | Gerszberg et al. |
| 6,455,769 B1 | 9/2002 | Belli et al. |
| 6,456,251 B1 | 9/2002 | Rao et al. |
| 6,462,700 B1 | 10/2002 | Schmidt et al. |
| 6,463,295 B1 | 10/2002 | Yun et al. |
| 6,469,676 B1 | 10/2002 | Fehrenbach et al. |
| 6,483,470 B1 | 11/2002 | Hohnstein et al. |
| 6,489,928 B2 | 12/2002 | Sakurada |
| 6,501,433 B2 | 12/2002 | Popa et al. |
| 6,510,152 B1 | 1/2003 | Gerszberg et al. |
| 6,515,635 B2 | 2/2003 | Chiang et al. |
| 6,522,305 B2 | 2/2003 | Sharman et al. |
| 6,531,991 B2 | 3/2003 | Adachi et al. |
| 6,542,739 B1 | 4/2003 | Garner |
| 6,549,106 B2 | 4/2003 | Martin et al. |
| 6,549,173 B1 | 4/2003 | King et al. |
| 6,552,693 B1 | 4/2003 | Leisten et al. |
| 6,563,981 B2 | 5/2003 | Weisberg et al. |
| 6,567,573 B1 | 5/2003 | Domash et al. |
| 6,573,813 B1 | 6/2003 | Joannopoulos et al. |
| 6,580,295 B2 | 6/2003 | Takekuma et al. |
| 6,584,084 B1 | 6/2003 | Barany et al. |
| 6,584,252 B1 | 6/2003 | Schier et al. |
| 6,587,077 B2 | 7/2003 | Vail et al. |
| 6,596,944 B1 | 7/2003 | Clark et al. |
| 6,606,066 B1 | 8/2003 | Fawcett et al. |
| 6,606,077 B2 | 8/2003 | Ebling et al. |
| 6,631,229 B1 | 10/2003 | Norris et al. |
| 6,639,566 B2 | 10/2003 | Knop et al. |
| 6,650,296 B2 | 11/2003 | Wong et al. |
| 6,653,598 B2 | 11/2003 | Sullivan et al. |
| 6,659,655 B2 | 12/2003 | Dair et al. |
| 6,671,824 B1 | 12/2003 | Hyland et al. |
| 6,677,899 B1 | 1/2004 | Lee et al. |
| 6,683,580 B2 | 1/2004 | Kuramoto |
| 6,686,832 B2 | 2/2004 | Abraham et al. |
| 6,686,873 B2 | 2/2004 | Patel et al. |
| 6,686,875 B1 | 2/2004 | Wolfson et al. |
| 6,697,030 B2 | 2/2004 | Gleener |
| 6,703,981 B2 | 3/2004 | Meitzler et al. |
| 6,714,165 B2 | 3/2004 | Verstraeten |
| 6,725,035 B2 | 4/2004 | Jochim et al. |
| 6,727,470 B2 | 4/2004 | Reichle et al. |
| 6,731,649 B1 | 5/2004 | Silverman |
| 6,741,705 B1 | 5/2004 | Nelson et al. |
| 6,750,827 B2 | 6/2004 | Manasson et al. |
| 6,756,538 B1 | 6/2004 | Murga-Gonzalez et al. |
| 6,765,479 B2 | 7/2004 | Stewart et al. |
| 6,768,456 B1 | 7/2004 | Lalezari et al. |
| 6,768,471 B2 | 7/2004 | Bostwick et al. |
| 6,768,474 B2 | 7/2004 | Hunt et al. |
| 6,771,216 B2 | 8/2004 | Patel et al. |
| 6,771,225 B2 | 8/2004 | Tits et al. |
| 6,771,739 B1 | 8/2004 | Beamon et al. |

(56) References Cited

U.S. PATENT DOCUMENTS

| | | |
|---|---|---|
| 6,788,865 B2 | 9/2004 | Kawanishi et al. |
| 6,788,951 B2 | 9/2004 | Aoki et al. |
| 6,789,119 B1 | 9/2004 | Zhu et al. |
| 6,812,895 B2 | 11/2004 | Anderson et al. |
| 6,822,615 B2 | 11/2004 | Quan et al. |
| 6,839,846 B2 | 1/2005 | Mangold et al. |
| 6,842,157 B2 | 1/2005 | Phelan et al. |
| 6,842,430 B1 | 1/2005 | Melnik et al. |
| 6,850,128 B2 | 2/2005 | Park |
| 6,859,185 B2 | 2/2005 | Royalty et al. |
| 6,859,187 B2 | 2/2005 | Ohlsson et al. |
| 6,859,590 B1 | 2/2005 | Zaccone |
| 6,867,744 B2 | 3/2005 | Toncich et al. |
| 6,868,258 B2 | 3/2005 | Hayata et al. |
| 6,870,465 B1 | 3/2005 | Song et al. |
| 6,885,674 B2 | 4/2005 | Hunt et al. |
| 6,886,065 B2 | 4/2005 | Sides et al. |
| 6,888,623 B2 | 5/2005 | Clements |
| 6,901,064 B2 | 5/2005 | Billhartz et al. |
| 6,904,218 B2 | 6/2005 | Sun et al. |
| 6,906,676 B2 | 6/2005 | Killen et al. |
| 6,906,681 B2 | 6/2005 | Hoppenstein et al. |
| 6,909,893 B2 | 6/2005 | Aoki et al. |
| 6,917,974 B1 | 7/2005 | Stytz et al. |
| 6,920,289 B2 | 7/2005 | Zimmerman et al. |
| 6,922,135 B2 | 7/2005 | Abraham et al. |
| 6,934,655 B2 | 8/2005 | Jones et al. |
| 6,937,595 B2 | 8/2005 | Barzegar et al. |
| 6,944,555 B2 | 9/2005 | Blackett et al. |
| 6,947,635 B2 | 9/2005 | Kohns et al. |
| 6,950,567 B2 | 9/2005 | Kline et al. |
| 6,958,729 B1 | 10/2005 | Metz et al. |
| 6,965,302 B2 | 11/2005 | Mollenkopf et al. |
| 6,965,355 B1 | 11/2005 | Durham et al. |
| 6,970,502 B2 | 11/2005 | Kim et al. |
| 6,972,729 B2 | 12/2005 | Wang et al. |
| 6,980,091 B2 | 12/2005 | White, II et al. |
| 6,982,611 B2 | 1/2006 | Cope et al. |
| 6,982,679 B2 | 1/2006 | Kralovec et al. |
| 6,983,174 B2 | 1/2006 | Hoppenstein et al. |
| 6,985,118 B2 | 1/2006 | Killen et al. |
| 6,992,639 B1 | 1/2006 | Lier et al. |
| 6,999,667 B2 | 2/2006 | Jang et al. |
| 7,008,120 B2 | 3/2006 | Zaborsky et al. |
| 7,009,471 B2 | 3/2006 | Elmore |
| 7,012,489 B2 | 3/2006 | Fisher et al. |
| 7,012,572 B1 | 3/2006 | Schaffner et al. |
| 7,016,585 B2 | 3/2006 | Diggle, III et al. |
| 7,019,704 B2 | 3/2006 | Weiss et al. |
| 7,023,400 B2 | 4/2006 | Hill et al. |
| 7,027,003 B2 | 4/2006 | Sasaki et al. |
| 7,032,016 B2 | 4/2006 | Cerami et al. |
| 7,039,048 B1 | 5/2006 | Monta et al. |
| 7,042,403 B2 | 5/2006 | Sievenpiper et al. |
| 7,042,416 B2 | 5/2006 | Kingsley et al. |
| 7,042,420 B2 | 5/2006 | Ebling et al. |
| 7,054,286 B2 | 5/2006 | Ertel et al. |
| 7,054,376 B1 | 5/2006 | Rubinstain et al. |
| 7,054,513 B2 | 5/2006 | Herz et al. |
| 7,055,148 B2 | 5/2006 | Marsh et al. |
| 7,061,370 B2 | 6/2006 | Cern et al. |
| 7,068,998 B2 | 6/2006 | Zavidniak et al. |
| 7,075,496 B2 | 7/2006 | Hidai et al. |
| 7,082,321 B2 | 7/2006 | Kuwahara et al. |
| 7,098,405 B2 | 8/2006 | Glew et al. |
| 7,098,773 B2 | 8/2006 | Berkman et al. |
| 7,102,581 B1 | 9/2006 | West et al. |
| 7,106,265 B2 | 9/2006 | Robertson et al. |
| 7,113,002 B2 | 9/2006 | Otsuka et al. |
| 7,113,134 B1 | 9/2006 | Berkman et al. |
| 7,119,755 B2 | 10/2006 | Harvey et al. |
| 7,120,345 B2 | 10/2006 | Naitou et al. |
| 7,123,801 B2 | 10/2006 | Fitz et al. |
| 7,126,711 B2 | 10/2006 | Fruth |
| 7,130,516 B2 | 10/2006 | Wu et al. |
| 7,132,950 B2 | 11/2006 | Stewart et al. |
| 7,133,930 B2 | 11/2006 | Munger et al. |
| 7,134,012 B2 | 11/2006 | Doyle et al. |
| 7,134,135 B2 | 11/2006 | Cerami et al. |
| 7,136,397 B2 | 11/2006 | Sharma et al. |
| 7,137,605 B1 | 11/2006 | Guertler et al. |
| 7,138,767 B2 | 11/2006 | Chen et al. |
| 7,145,440 B2 | 12/2006 | Gerszberg et al. |
| 7,151,497 B2 | 12/2006 | Crystal et al. |
| 7,161,934 B2 | 1/2007 | Buchsbaum et al. |
| 7,167,139 B2 | 1/2007 | Kim et al. |
| 7,171,087 B2 | 1/2007 | Takahashi et al. |
| 7,171,493 B2 | 1/2007 | Shu et al. |
| 7,176,589 B2 | 2/2007 | Rouquette et al. |
| 7,180,459 B2 | 2/2007 | Damini et al. |
| 7,180,467 B2 | 2/2007 | Fabrega-Sanchez |
| 7,183,991 B2 | 2/2007 | Bhattacharyya et al. |
| 7,194,528 B1 | 3/2007 | Davidow et al. |
| 7,199,680 B2 | 4/2007 | Fukunaga et al. |
| 7,200,391 B2 | 4/2007 | Chung et al. |
| 7,200,658 B2 | 4/2007 | Goeller et al. |
| 7,205,950 B2 | 4/2007 | Imai et al. |
| 7,212,163 B2 | 5/2007 | Huang et al. |
| 7,215,220 B1 | 5/2007 | Jia et al. |
| 7,215,928 B2 | 5/2007 | Gage et al. |
| 7,218,285 B2 | 5/2007 | Davis et al. |
| 7,224,170 B2 | 5/2007 | Graham et al. |
| 7,224,243 B2 | 5/2007 | Cope et al. |
| 7,224,320 B2 | 5/2007 | Cook et al. |
| 7,228,123 B2 | 6/2007 | Moursund et al. |
| 7,234,413 B2 | 6/2007 | Suzuki et al. |
| 7,234,895 B2 | 6/2007 | Richardson et al. |
| 7,239,284 B1 | 7/2007 | Staal et al. |
| 7,243,610 B2 | 7/2007 | Ishii et al. |
| 7,248,148 B2 | 7/2007 | Kline et al. |
| 7,260,424 B2 | 8/2007 | Schmidt et al. |
| 7,266,154 B2 | 9/2007 | Gundrum et al. |
| 7,266,275 B2 | 9/2007 | Hansen et al. |
| 7,272,281 B2 | 9/2007 | Stahulak et al. |
| 7,274,305 B1 | 9/2007 | Luttrell |
| 7,276,990 B2 | 10/2007 | Sievenpiper et al. |
| 7,280,033 B2 | 10/2007 | Berkman et al. |
| 7,289,704 B1 | 10/2007 | Wagman et al. |
| 7,297,869 B2 | 11/2007 | Hiller et al. |
| 7,307,596 B1 | 12/2007 | West et al. |
| 7,308,370 B2 | 12/2007 | Mason, Jr. et al. |
| 7,310,335 B1 | 12/2007 | Garcia-Luna-Aceves et al. |
| 7,311,605 B2 | 12/2007 | Moser |
| 7,312,686 B2 | 12/2007 | Bruno |
| 7,313,312 B2 | 12/2007 | Kimball et al. |
| 7,315,678 B2 | 1/2008 | Siegel |
| 7,319,717 B2 | 1/2008 | Zitting et al. |
| 7,321,291 B2 | 1/2008 | Gidge et al. |
| 7,321,707 B2 | 1/2008 | Noda et al. |
| 7,324,046 B1 | 1/2008 | Wu et al. |
| 7,329,815 B2 | 2/2008 | Johnston et al. |
| 7,333,064 B1 | 2/2008 | Timothy et al. |
| 7,333,593 B2 | 2/2008 | Beamon et al. |
| 7,339,466 B2 | 3/2008 | Mansfield et al. |
| 7,339,897 B2 | 3/2008 | Larsson et al. |
| 7,340,768 B2 | 3/2008 | Rosenberger et al. |
| 7,345,623 B2 | 3/2008 | McEwan et al. |
| 7,346,244 B2 | 3/2008 | Gowan et al. |
| 7,346,359 B2 | 3/2008 | Damarla et al. |
| 7,355,560 B2 | 4/2008 | Nagai et al. |
| 7,358,808 B2 | 4/2008 | Berkman et al. |
| 7,369,085 B1 | 5/2008 | Jacomb-Hood et al. |
| 7,380,272 B2 | 5/2008 | Sharp et al. |
| 7,381,089 B2 | 6/2008 | Hosler, Sr. |
| 7,383,577 B2 | 6/2008 | Hrastar et al. |
| 7,388,450 B2 | 6/2008 | Camiade et al. |
| 7,397,422 B2 | 7/2008 | Tekawy et al. |
| 7,398,946 B1 | 7/2008 | Marshall |
| 7,406,337 B2 | 7/2008 | Kim et al. |
| 7,408,426 B2 | 8/2008 | Broyde et al. |
| 7,408,923 B1 | 8/2008 | Khan et al. |
| 7,417,587 B2 | 8/2008 | Iskander et al. |
| 7,418,178 B2 | 8/2008 | Kudou et al. |
| 7,420,474 B1 | 9/2008 | Elks et al. |

(56) References Cited

U.S. PATENT DOCUMENTS

| | | |
|---|---|---|
| 7,426,554 B2 | 9/2008 | Kennedy et al. |
| 7,430,257 B1 | 9/2008 | Shattil et al. |
| 7,430,932 B2 | 10/2008 | Mekhanoshin et al. |
| 7,443,334 B2 | 10/2008 | Rees et al. |
| 7,444,404 B2 | 10/2008 | Wetherall et al. |
| 7,446,567 B2 | 11/2008 | Otsuka et al. |
| 7,450,001 B2 | 11/2008 | Berkman |
| 7,453,352 B2 | 11/2008 | Kline et al. |
| 7,453,393 B2 | 11/2008 | Duivenvoorden et al. |
| 7,456,650 B2 | 11/2008 | Lee et al. |
| 7,459,834 B2 | 12/2008 | Knowles et al. |
| 7,463,877 B2 | 12/2008 | Iwamura |
| 7,465,879 B2 | 12/2008 | Glew et al. |
| 7,466,225 B2 | 12/2008 | White, II et al. |
| 7,468,657 B2 | 12/2008 | Yaney |
| 7,479,841 B2 | 1/2009 | Stenger et al. |
| 7,492,317 B2 | 2/2009 | Tinsley et al. |
| 7,496,674 B2 | 2/2009 | Jorgensen et al. |
| 7,508,834 B2 | 3/2009 | Berkman et al. |
| 7,509,009 B2 | 3/2009 | Suzuki et al. |
| 7,509,675 B2 | 3/2009 | Aaron et al. |
| 7,512,090 B2 | 3/2009 | Benitez Pelaez et al. |
| 7,516,487 B1 | 4/2009 | Szeto et al. |
| 7,518,529 B2 | 4/2009 | O'Sullivan et al. |
| 7,518,952 B1 | 4/2009 | Padden et al. |
| 7,519,323 B2 | 4/2009 | Mohebbi et al. |
| 7,522,115 B2 | 4/2009 | Waltman et al. |
| 7,522,812 B2 | 4/2009 | Zitting |
| 7,525,501 B2 | 4/2009 | Black et al. |
| 7,531,803 B2 | 5/2009 | Mittleman et al. |
| 7,532,792 B2 | 5/2009 | Skovgaard et al. |
| 7,539,381 B2 | 5/2009 | Li et al. |
| 7,545,818 B2 | 6/2009 | Chen et al. |
| 7,546,214 B2 | 6/2009 | Rivers, Jr. et al. |
| 7,554,998 B2 | 6/2009 | Simonsson et al. |
| 7,555,182 B2 | 6/2009 | Martin et al. |
| 7,555,186 B2 | 6/2009 | De Montmorillon et al. |
| 7,555,187 B2 | 6/2009 | Bickham et al. |
| 7,557,563 B2 | 7/2009 | Cowan et al. |
| 7,561,025 B2 | 7/2009 | Gerszberg et al. |
| 7,567,154 B2 | 7/2009 | Elmore |
| 7,567,740 B2 | 7/2009 | Bayindir et al. |
| 7,570,137 B2 | 8/2009 | Kintis et al. |
| 7,570,470 B2 | 8/2009 | Holley |
| 7,580,643 B2 | 8/2009 | Moore et al. |
| 7,581,702 B2 | 9/2009 | Wheeler et al. |
| 7,583,074 B1 | 9/2009 | Lynch et al. |
| 7,584,470 B2 | 9/2009 | Barker et al. |
| 7,589,686 B2 | 9/2009 | Balzovsky et al. |
| 7,590,404 B1 | 9/2009 | Johnson |
| 7,591,020 B2 | 9/2009 | Kammer et al. |
| 7,596,222 B2 | 9/2009 | Jonas et al. |
| 7,598,844 B2 | 10/2009 | Corcoran et al. |
| 7,602,333 B2 | 10/2009 | Hiramatsu et al. |
| 7,602,815 B2 | 10/2009 | Houghton et al. |
| 7,620,370 B2 | 11/2009 | Barak et al. |
| 7,625,131 B2 | 12/2009 | Zienkewicz et al. |
| 7,626,489 B2 | 12/2009 | Berkman et al. |
| 7,626,542 B2 | 12/2009 | Kober et al. |
| 7,634,250 B1 | 12/2009 | Prasad et al. |
| 7,640,562 B2 | 12/2009 | Bouilloux-Lafont et al. |
| 7,640,581 B1 | 12/2009 | Brenton et al. |
| 7,653,363 B2 | 1/2010 | Karr et al. |
| RE41,147 E | 2/2010 | Pang et al. |
| 7,656,167 B1 | 2/2010 | McLean et al. |
| 7,660,252 B1 | 2/2010 | Huang et al. |
| 7,660,328 B1 | 2/2010 | Oz et al. |
| 7,664,117 B2 | 2/2010 | Lou et al. |
| 7,669,049 B2 | 2/2010 | Wang et al. |
| 7,671,701 B2 | 3/2010 | Radtke |
| 7,671,820 B2 | 3/2010 | Tokoro et al. |
| 7,676,679 B2 | 3/2010 | Weis et al. |
| 7,680,478 B2 | 3/2010 | Willars et al. |
| 7,680,516 B2 | 3/2010 | Lovberg et al. |
| 7,680,561 B2 | 3/2010 | Rodgers et al. |
| 7,683,848 B2 | 3/2010 | Musch et al. |
| 7,684,383 B1 | 3/2010 | Thompson et al. |
| 7,693,079 B2 | 4/2010 | Cerami et al. |
| 7,693,162 B2 | 4/2010 | McKenna et al. |
| 7,693,939 B2 | 4/2010 | Wu et al. |
| 7,701,931 B2 | 4/2010 | Kajiwara |
| 7,705,747 B2 | 4/2010 | Twitchell, Jr. |
| 7,715,672 B2 | 5/2010 | Dong et al. |
| 7,716,660 B2 | 5/2010 | Mackay et al. |
| 7,724,782 B2 | 5/2010 | Wang et al. |
| 7,728,772 B2 | 6/2010 | Mortazawi et al. |
| 7,733,094 B2 | 6/2010 | Bright et al. |
| 7,734,717 B2 | 6/2010 | Saarimäki et al. |
| 7,743,403 B2 | 6/2010 | McCarty et al. |
| 7,747,356 B2 | 6/2010 | Andarawis et al. |
| 7,747,774 B2 | 6/2010 | Aaron et al. |
| 7,750,244 B1 | 7/2010 | Melding et al. |
| 7,750,763 B2 | 7/2010 | Praßmayer et al. |
| 7,760,978 B2 | 7/2010 | Fishteyn et al. |
| 7,761,079 B2 | 7/2010 | Mollenkopf et al. |
| 7,764,943 B2 | 7/2010 | Radtke et al. |
| 7,773,664 B2 | 8/2010 | Myers et al. |
| 7,782,156 B2 | 8/2010 | Woods et al. |
| 7,783,195 B2 | 8/2010 | Riggsby et al. |
| 7,786,894 B2 | 8/2010 | Polk et al. |
| 7,786,945 B2 | 8/2010 | Baldauf et al. |
| 7,786,946 B2 | 8/2010 | Diaz et al. |
| 7,791,549 B2 | 9/2010 | Clymer et al. |
| 7,795,877 B2 | 9/2010 | Radtke et al. |
| 7,795,994 B2 | 9/2010 | Radtke et al. |
| 7,796,025 B2 | 9/2010 | Berkman et al. |
| 7,796,890 B1 | 9/2010 | Johnson |
| 7,805,029 B2 | 9/2010 | Bayindir et al. |
| 7,808,441 B2 | 10/2010 | Parsche et al. |
| 7,809,223 B2 | 10/2010 | Miyabe et al. |
| 7,812,686 B2 | 10/2010 | Woods et al. |
| 7,812,778 B2 | 10/2010 | Hasegawa et al. |
| 7,813,344 B2 | 10/2010 | Cheswick |
| 7,825,793 B1 | 11/2010 | Spillman et al. |
| 7,826,602 B1 | 11/2010 | Hunyady et al. |
| 7,827,610 B2 | 11/2010 | Wang et al. |
| 7,830,228 B2 | 11/2010 | Evans et al. |
| 7,835,128 B2 | 11/2010 | Divan et al. |
| 7,835,600 B1 | 11/2010 | Yap et al. |
| 7,843,375 B1 | 11/2010 | Rennie et al. |
| 7,848,517 B2 | 12/2010 | Britz et al. |
| 7,852,837 B1 | 12/2010 | Au et al. |
| 7,855,612 B2 | 12/2010 | Zienkewicz et al. |
| 7,856,007 B2 | 12/2010 | Corcoran et al. |
| 7,869,391 B2 | 1/2011 | Lee et al. |
| 7,872,610 B2 | 1/2011 | Motzer et al. |
| 7,873,249 B2 | 1/2011 | Kachmar et al. |
| 7,876,174 B2 | 1/2011 | Radtke et al. |
| 7,884,285 B2 | 2/2011 | Spencer |
| 7,884,648 B2 | 2/2011 | Broyde et al. |
| 7,885,542 B2 | 2/2011 | Riggsby et al. |
| 7,889,148 B2 | 2/2011 | Diaz et al. |
| 7,889,149 B2 | 2/2011 | Peebles et al. |
| 7,890,053 B2 | 2/2011 | Washiro |
| 7,893,789 B2 | 2/2011 | Paynter et al. |
| 7,894,770 B2 | 2/2011 | Washiro et al. |
| 7,903,918 B1 | 3/2011 | Bickham et al. |
| 7,903,972 B2 | 3/2011 | Riggsby et al. |
| 7,929,940 B1 | 4/2011 | Dianda et al. |
| 7,930,750 B1 | 4/2011 | Gauvin et al. |
| 7,937,699 B2 | 5/2011 | Schneider et al. |
| 7,940,207 B1 | 5/2011 | Kienzle et al. |
| 7,956,818 B1 | 6/2011 | Hsu et al. |
| 7,958,120 B2 | 6/2011 | Muntz et al. |
| 7,962,957 B2 | 6/2011 | Keohane et al. |
| 7,965,842 B2 | 6/2011 | Whelan et al. |
| 7,970,937 B2 | 6/2011 | Shuster et al. |
| 7,971,053 B2 | 6/2011 | Gibson, Sr. et al. |
| 7,974,387 B2 | 7/2011 | Lutz et al. |
| 7,983,740 B2 | 7/2011 | Culver et al. |
| 7,986,711 B2 | 7/2011 | Horvath et al. |
| 7,990,329 B2 | 8/2011 | Deng et al. |
| 7,991,877 B2 | 8/2011 | Keohane et al. |
| 7,992,014 B2 | 8/2011 | Langgood et al. |

(56) References Cited

U.S. PATENT DOCUMENTS

| | | |
|---|---|---|
| 8,013,694 B2 | 9/2011 | Sagala et al. |
| 8,019,288 B2 | 9/2011 | Yu et al. |
| 8,022,885 B2 | 9/2011 | Smoyer et al. |
| 8,022,887 B1 | 9/2011 | Zarnaghi et al. |
| 8,027,391 B2 | 9/2011 | Matsubara et al. |
| 8,036,207 B2 | 10/2011 | Chen et al. |
| 8,049,576 B2 | 11/2011 | Broyde et al. |
| 8,064,944 B2 | 11/2011 | Yun et al. |
| 8,065,099 B2 | 11/2011 | Gibala et al. |
| 8,069,483 B1 | 11/2011 | Matlock et al. |
| 8,072,323 B2 | 12/2011 | Kodama et al. |
| 8,072,386 B2 | 12/2011 | Lier et al. |
| 8,073,810 B2 | 12/2011 | Maes |
| 8,077,049 B2 | 12/2011 | Yaney et al. |
| 8,081,854 B2 | 12/2011 | Yoon et al. |
| 8,089,404 B2 | 1/2012 | Nichols et al. |
| 8,089,952 B2 | 1/2012 | Spade et al. |
| 8,090,379 B2 | 1/2012 | Lambert et al. |
| 8,094,081 B1 | 1/2012 | Boone et al. |
| 8,094,985 B2 | 1/2012 | Imamura et al. |
| 8,095,093 B2 | 1/2012 | Takinami et al. |
| 8,098,198 B2 | 1/2012 | Thiesen et al. |
| 8,102,779 B2 | 1/2012 | Kim et al. |
| RE43,163 E | 2/2012 | Anderson |
| 8,111,148 B2 | 2/2012 | Parker et al. |
| 8,120,488 B2 | 2/2012 | Bloy et al. |
| 8,121,624 B2 | 2/2012 | Cai et al. |
| 8,126,393 B2 | 2/2012 | Wu et al. |
| 8,129,817 B2 | 3/2012 | Jou et al. |
| 8,131,125 B2 | 3/2012 | Molin et al. |
| 8,131,266 B2 | 3/2012 | Cai et al. |
| 8,132,239 B2 | 3/2012 | Wahl |
| 8,134,424 B2 | 3/2012 | Kato et al. |
| 8,134,458 B2 | 3/2012 | Lund |
| 8,140,113 B2 | 3/2012 | Rofougaran et al. |
| 8,150,311 B2 | 4/2012 | Hart et al. |
| 8,151,306 B2 | 4/2012 | Rakib |
| 8,156,520 B2 | 4/2012 | Casagrande et al. |
| 8,159,316 B2 | 4/2012 | Miyazato et al. |
| 8,159,385 B2 | 4/2012 | Farneth et al. |
| 8,159,394 B2 | 4/2012 | Hayes et al. |
| 8,159,742 B2 | 4/2012 | McKay et al. |
| 8,159,933 B2 | 4/2012 | Henry |
| 8,160,064 B2 | 4/2012 | Kokernak et al. |
| 8,160,530 B2 | 4/2012 | Corman et al. |
| 8,160,825 B1 | 4/2012 | Roe, Jr. et al. |
| 8,164,531 B2 | 4/2012 | Lier et al. |
| 8,171,146 B2 | 5/2012 | Chen et al. |
| 8,173,943 B2 | 5/2012 | Ristola et al. |
| 8,175,649 B2 | 5/2012 | Saban et al. |
| 8,180,917 B1 | 5/2012 | Yan et al. |
| 8,184,015 B2 | 5/2012 | Lilien et al. |
| 8,184,059 B2 | 5/2012 | Bunch et al. |
| 8,184,311 B2 | 5/2012 | Sakai et al. |
| 8,188,855 B2 | 5/2012 | Sharma et al. |
| 8,199,762 B2 | 6/2012 | Michelson et al. |
| 8,203,501 B2 | 6/2012 | Kim et al. |
| 8,212,635 B2 | 7/2012 | Miller, II et al. |
| 8,213,758 B2 | 7/2012 | Dong et al. |
| 8,218,929 B2 | 7/2012 | Bickham et al. |
| 8,222,919 B2 | 7/2012 | Broyde et al. |
| 8,222,977 B2 | 7/2012 | Oyama et al. |
| 8,225,379 B2 | 7/2012 | van de et al. |
| 8,237,617 B1 | 8/2012 | Johnson |
| 8,238,824 B2 | 8/2012 | Washiro |
| 8,242,358 B2 | 8/2012 | Park et al. |
| 8,243,603 B2 | 8/2012 | Gossain et al. |
| 8,249,028 B2 | 8/2012 | Porras et al. |
| 8,253,516 B2 | 8/2012 | Miller, II et al. |
| 8,255,952 B2 | 8/2012 | Boylan, III et al. |
| 8,258,743 B2 | 9/2012 | Tyler et al. |
| 8,264,417 B2 | 9/2012 | Snow et al. |
| 8,269,583 B2 | 9/2012 | Miller, II et al. |
| 8,295,301 B2 | 10/2012 | Yonge, III et al. |
| 8,300,538 B2 | 10/2012 | Kim et al. |
| 8,300,640 B2 | 10/2012 | Al-Banna et al. |
| 8,316,228 B2 | 11/2012 | Winslow et al. |
| 8,316,364 B2 | 11/2012 | Stein et al. |
| 8,324,990 B2 | 12/2012 | Vouloumanos |
| 8,325,693 B2 | 12/2012 | Hazani et al. |
| 8,343,145 B2 | 1/2013 | Brannan et al. |
| 8,344,829 B2 | 1/2013 | Miller, II et al. |
| 8,363,313 B2 | 1/2013 | Nakaguma et al. |
| 8,369,667 B2 | 2/2013 | Rose et al. |
| 8,373,095 B2 | 2/2013 | Huynh et al. |
| 8,374,821 B2 | 2/2013 | Rousselle et al. |
| 8,384,600 B2 | 2/2013 | Huang et al. |
| 8,385,978 B2 | 2/2013 | Leung et al. |
| 8,386,198 B2 | 2/2013 | Lancaster |
| 8,390,402 B2 | 3/2013 | Kunes et al. |
| 8,406,239 B2 | 3/2013 | Hurwitz et al. |
| 8,406,593 B2 | 3/2013 | Molin et al. |
| 8,407,687 B2 | 3/2013 | Moshir et al. |
| 8,412,130 B2 | 4/2013 | Suematsu et al. |
| 8,414,326 B2 | 4/2013 | Bowman |
| 8,415,884 B2 | 4/2013 | Chen et al. |
| 8,428,033 B2 | 4/2013 | Hettstedt et al. |
| 8,433,168 B2 | 4/2013 | Filippov et al. |
| 8,434,103 B2 | 4/2013 | Tsuchida et al. |
| 8,437,383 B2 | 5/2013 | Wiwel et al. |
| 8,457,027 B2 | 6/2013 | Dougherty et al. |
| 8,458,453 B1 | 6/2013 | Mahalingaiah et al. |
| 8,462,063 B2 | 6/2013 | Gummalla et al. |
| 8,467,363 B2 | 6/2013 | Lea et al. |
| 8,468,244 B2 | 6/2013 | Redlich et al. |
| 8,484,511 B2 | 7/2013 | Tidwell et al. |
| 8,495,718 B2 | 7/2013 | Han et al. |
| 8,497,749 B2 | 7/2013 | Elmore |
| 8,503,845 B2 | 8/2013 | Winzer et al. |
| 8,505,057 B2 | 8/2013 | Rogers |
| 8,509,114 B1 | 8/2013 | Szajdecki |
| 8,514,980 B2 | 8/2013 | Kuhtz |
| 8,515,383 B2 | 8/2013 | Prince et al. |
| 8,516,470 B1 | 8/2013 | Joshi et al. |
| 8,516,474 B2 | 8/2013 | Lamba et al. |
| 8,519,892 B2 | 8/2013 | Ding et al. |
| 8,520,636 B2 | 8/2013 | Xu |
| 8,528,059 B1 | 9/2013 | Saluzzo et al. |
| 8,532,023 B2 | 9/2013 | Buddhikot et al. |
| 8,532,046 B2 | 9/2013 | Hu et al. |
| 8,532,492 B2 | 9/2013 | Sadowski et al. |
| 8,536,857 B2 | 9/2013 | Nero, Jr. et al. |
| 8,537,068 B2 | 9/2013 | Call et al. |
| 8,537,705 B2 | 9/2013 | Afkhamie et al. |
| 8,539,540 B2 | 9/2013 | Zenoni |
| 8,539,569 B2 | 9/2013 | Mansour |
| 8,542,968 B2 | 9/2013 | Dong et al. |
| 8,548,294 B2 | 10/2013 | Toge et al. |
| 8,553,646 B2 | 10/2013 | Kumar |
| 8,561,104 B1 | 10/2013 | Dow et al. |
| 8,561,181 B1 | 10/2013 | Sobel et al. |
| 8,565,568 B2 | 10/2013 | Bigot-Astruc et al. |
| 8,572,247 B2 | 10/2013 | Larson et al. |
| 8,572,639 B2 | 10/2013 | Ficco |
| 8,572,661 B2 | 10/2013 | Strong et al. |
| 8,578,076 B2 | 11/2013 | van der Linden et al. |
| 8,578,486 B2 | 11/2013 | Lifliand et al. |
| 8,582,502 B2 | 11/2013 | Conte et al. |
| 8,584,195 B2 | 11/2013 | Sherlock et al. |
| 8,587,490 B2 | 11/2013 | Niver et al. |
| 8,587,492 B2 | 11/2013 | Runyon et al. |
| 8,588,567 B2 | 11/2013 | Kamps et al. |
| 8,588,840 B2 | 11/2013 | Truong et al. |
| 8,588,991 B1 | 11/2013 | Forbes, Jr. |
| 8,593,238 B2 | 11/2013 | Miller, II et al. |
| 8,594,956 B2 | 11/2013 | McBee et al. |
| 8,600,602 B1 | 12/2013 | Watson et al. |
| 8,604,982 B2 | 12/2013 | Gummalla et al. |
| 8,604,999 B2 | 12/2013 | Abumrad et al. |
| 8,605,579 B2 | 12/2013 | Abraham et al. |
| 8,612,550 B2 | 12/2013 | Yoo et al. |
| 8,613,020 B2 | 12/2013 | Knudson et al. |
| 8,615,190 B2 | 12/2013 | Lu |
| 8,625,547 B1 | 1/2014 | Miller et al. |

(56) References Cited

U.S. PATENT DOCUMENTS

| | | |
|---|---|---|
| 8,629,811 B2 | 1/2014 | Gaynor et al. |
| 8,639,934 B2 | 1/2014 | Kruglick |
| 8,653,906 B2 | 2/2014 | Mahon et al. |
| 8,655,396 B2 | 2/2014 | Malladi et al. |
| 8,656,458 B2 | 2/2014 | Heffez et al. |
| 8,660,526 B1 | 2/2014 | Heiderscheit et al. |
| 8,660,698 B2 | 2/2014 | Phillips et al. |
| 8,665,102 B2 | 3/2014 | Salewske et al. |
| 8,666,553 B2 | 3/2014 | Phillips et al. |
| 8,674,630 B1 | 3/2014 | Cornelius et al. |
| 8,681,463 B2 | 3/2014 | Franks et al. |
| 8,687,650 B2 | 4/2014 | King |
| 8,688,153 B2 | 4/2014 | Komori et al. |
| 8,699,454 B2 | 4/2014 | Hapsari et al. |
| 8,699,461 B2 | 4/2014 | Qian et al. |
| 8,705,925 B2 | 4/2014 | Terada et al. |
| 8,706,026 B2 | 4/2014 | Truong et al. |
| 8,707,432 B1 | 4/2014 | Rathi et al. |
| 8,711,732 B2 | 4/2014 | Johnson et al. |
| 8,711,806 B2 | 4/2014 | Lim et al. |
| 8,711,857 B2 | 4/2014 | Jackson et al. |
| 8,712,200 B1 | 4/2014 | Abernathy et al. |
| 8,719,938 B2 | 5/2014 | Demeter et al. |
| 8,723,730 B2 | 5/2014 | Lu et al. |
| 8,731,358 B2 | 5/2014 | Pare et al. |
| 8,732,476 B1 | 5/2014 | Van et al. |
| 8,737,793 B2 | 5/2014 | Imamura et al. |
| 8,738,318 B2 | 5/2014 | Spillane |
| 8,743,004 B2 | 6/2014 | Haziza |
| 8,749,449 B2 | 6/2014 | Caldwell et al. |
| 8,750,664 B2 | 6/2014 | Huang et al. |
| 8,755,659 B2 | 6/2014 | Imamura et al. |
| 8,760,354 B2 | 6/2014 | Flannery et al. |
| 8,761,792 B2 | 6/2014 | Sennett et al. |
| 8,763,097 B2 | 6/2014 | Bhatnagar et al. |
| 8,767,071 B1 | 7/2014 | Marshall |
| 8,769,622 B2 | 7/2014 | Chang et al. |
| 8,780,012 B2 | 7/2014 | Llombart Juan et al. |
| 8,782,195 B2 | 7/2014 | Foti |
| 8,786,284 B2 | 7/2014 | Sirigiri et al. |
| 8,786,514 B2 | 7/2014 | Dickie et al. |
| 8,789,091 B2 | 7/2014 | Eldering et al. |
| 8,792,760 B2 | 7/2014 | Choi et al. |
| 8,792,933 B2 | 7/2014 | Chen et al. |
| 8,793,363 B2 | 7/2014 | Sater et al. |
| 8,793,742 B2 | 7/2014 | Macrae et al. |
| 8,797,207 B2 | 8/2014 | Kienzle et al. |
| 8,804,667 B2 | 8/2014 | Wang |
| 8,806,202 B2 | 8/2014 | Shoemake et al. |
| 8,810,404 B2 | 8/2014 | Bertoncini et al. |
| 8,810,421 B2 | 8/2014 | Deaver, Sr. et al. |
| 8,811,278 B2 | 8/2014 | Hori et al. |
| 8,812,154 B2 | 8/2014 | Vian et al. |
| 8,817,741 B2 | 8/2014 | Shaheen |
| 8,825,239 B2 | 9/2014 | Cooper et al. |
| 8,830,112 B1 | 9/2014 | Buehler et al. |
| 8,836,607 B2 | 9/2014 | Cook et al. |
| 8,839,350 B1 | 9/2014 | Shapcott et al. |
| 8,847,840 B2 | 9/2014 | Diaz et al. |
| 8,847,846 B1 | 9/2014 | Diaz et al. |
| 8,856,239 B1 | 10/2014 | Oliver et al. |
| 8,856,530 B2 | 10/2014 | Lamberg et al. |
| 8,863,245 B1 | 10/2014 | Abhyanker |
| 8,867,226 B2 | 10/2014 | Colomb et al. |
| 8,872,032 B2 | 10/2014 | Su et al. |
| 8,875,224 B2 | 10/2014 | Gross et al. |
| 8,878,740 B2 | 11/2014 | Coupland et al. |
| 8,881,588 B2 | 11/2014 | Baer et al. |
| 8,885,689 B2 | 11/2014 | Blasco et al. |
| 8,887,212 B2 | 11/2014 | Dua |
| 8,890,759 B2 | 11/2014 | Pantea et al. |
| 8,893,246 B2 | 11/2014 | El-Moussa et al. |
| 8,897,215 B2 | 11/2014 | Hazani et al. |
| 8,897,697 B1 | 11/2014 | Willis, III et al. |
| 8,901,916 B2 | 12/2014 | Rodriguez et al. |
| 8,903,214 B2 | 12/2014 | Alkeskjold |
| 8,907,222 B2 | 12/2014 | Stransky |
| 8,907,845 B2 | 12/2014 | Jones |
| 8,908,573 B1 | 12/2014 | Wang et al. |
| 8,913,862 B1 | 12/2014 | Emmerich et al. |
| 8,917,215 B2 | 12/2014 | Pohl |
| 8,917,964 B2 | 12/2014 | Blew et al. |
| 8,918,108 B2 | 12/2014 | van Heeswyk et al. |
| 8,918,135 B2 | 12/2014 | Kang et al. |
| 8,925,079 B2 | 12/2014 | Miyake et al. |
| 8,934,747 B2 | 1/2015 | Smith et al. |
| 8,937,577 B2 | 1/2015 | Gerini et al. |
| 8,938,144 B2 | 1/2015 | Hennink et al. |
| 8,938,255 B2 | 1/2015 | Dallas Torre et al. |
| 8,941,912 B2 | 1/2015 | Ichii et al. |
| 8,952,678 B2 | 2/2015 | Giboney et al. |
| 8,954,113 B2 | 2/2015 | Li et al. |
| 8,955,051 B2 | 2/2015 | Marzii |
| 8,955,075 B2 | 2/2015 | Smith et al. |
| 8,957,818 B2 | 2/2015 | Chen et al. |
| 8,958,665 B2 | 2/2015 | Ziari et al. |
| 8,963,790 B2 | 2/2015 | Brown et al. |
| 8,964,433 B2 | 2/2015 | Hai-Maharsi |
| 8,966,609 B2 | 2/2015 | Lee et al. |
| 8,970,438 B2 | 3/2015 | Hager et al. |
| 8,989,788 B2 | 3/2015 | Kim et al. |
| 8,994,474 B2 | 3/2015 | Mahon et al. |
| 8,996,188 B2 | 3/2015 | Frader-thompson et al. |
| 8,996,728 B2 | 3/2015 | Cochinwala et al. |
| 9,000,353 B2 | 4/2015 | Seo et al. |
| 9,001,689 B1 | 4/2015 | Ponnampalam et al. |
| 9,001,717 B2 | 4/2015 | Chun et al. |
| 9,003,492 B2 | 4/2015 | Katar |
| 9,008,208 B2 | 4/2015 | Khandani |
| 9,008,513 B2 | 4/2015 | Kim et al. |
| 9,009,460 B2 | 4/2015 | Chen |
| 9,014,621 B2 | 4/2015 | Mohebbi |
| 9,015,467 B2 | 4/2015 | Buer |
| 9,019,595 B2 | 4/2015 | Jain et al. |
| 9,019,892 B2 | 4/2015 | Zhou et al. |
| 9,020,555 B2 | 4/2015 | Sheikh et al. |
| 9,021,251 B2 | 4/2015 | Chawla |
| 9,021,575 B2 | 4/2015 | Martini |
| 9,037,516 B2 | 5/2015 | Abhyanker |
| 9,042,812 B1 | 5/2015 | Bennett et al. |
| 9,070,962 B2 | 6/2015 | Kobayashi |
| 9,082,307 B2 | 7/2015 | Sharawi |
| 9,094,407 B1 | 7/2015 | Matthieu |
| 9,098,325 B2 | 8/2015 | Reddin |
| 9,099,787 B2 | 8/2015 | Blech |
| 9,103,864 B2 | 8/2015 | Ali |
| 9,106,617 B2 | 8/2015 | Kshirsagar et al. |
| 9,113,347 B2 | 8/2015 | Henry |
| 9,119,127 B1 | 8/2015 | Henry |
| 9,128,941 B2 | 9/2015 | Shulman |
| 9,130,641 B2 | 9/2015 | Mohebbi |
| 9,134,945 B2 | 9/2015 | Husain |
| 9,137,485 B2 | 9/2015 | Bar-Niv et al. |
| 9,142,334 B2 | 9/2015 | Muto et al. |
| 9,143,084 B2 | 9/2015 | Siles Perez et al. |
| 9,167,535 B2 | 10/2015 | Christoffersson et al. |
| 9,204,418 B2 | 12/2015 | Siomina et al. |
| 9,209,902 B2 | 12/2015 | Willis, III et al. |
| 9,219,594 B2 | 12/2015 | Khlat |
| 9,260,244 B1 | 2/2016 | Cohn |
| 9,264,204 B2 | 2/2016 | Seo et al. |
| 9,265,078 B2 | 2/2016 | Lim et al. |
| 9,271,185 B2 | 2/2016 | Abdelmonem et al. |
| 9,276,303 B2 | 3/2016 | Chang et al. |
| 9,276,304 B2 | 3/2016 | Behan |
| 9,282,144 B2 | 3/2016 | Tebay et al. |
| 9,287,605 B2 | 3/2016 | Daughenbaugh et al. |
| 9,293,801 B2 | 3/2016 | Courtney et al. |
| 9,306,682 B2 | 4/2016 | Singh |
| 9,312,929 B2 | 4/2016 | Forenza et al. |
| 9,334,052 B2 | 5/2016 | Ubhi et al. |
| 9,338,823 B2 | 5/2016 | Saban et al. |
| 9,351,182 B2 | 5/2016 | Elliott et al. |
| 9,363,690 B1 | 6/2016 | Suthar et al. |

(56) References Cited

U.S. PATENT DOCUMENTS

| | | |
|---|---|---|
| 9,363,761 B2 | 6/2016 | Venkatraman |
| 9,368,275 B2 | 6/2016 | McBee et al. |
| 9,379,556 B2 | 6/2016 | Haensgen et al. |
| 9,380,857 B2 | 7/2016 | Davis |
| 9,397,380 B2 | 7/2016 | Kudela et al. |
| 9,421,869 B1 | 8/2016 | Ananthanarayanan et al. |
| 9,439,092 B1 | 9/2016 | Chukka et al. |
| 2001/0030789 A1 | 10/2001 | Jiang et al. |
| 2002/0002040 A1 | 1/2002 | Kline et al. |
| 2002/0008672 A1 | 1/2002 | Gothard et al. |
| 2002/0021716 A1 | 2/2002 | Terk et al. |
| 2002/0024424 A1 | 2/2002 | Burns et al. |
| 2002/0040439 A1 | 4/2002 | Kellum et al. |
| 2002/0057223 A1 | 5/2002 | Hook |
| 2002/0069417 A1 | 6/2002 | Kliger et al. |
| 2002/0083194 A1 | 6/2002 | Bak et al. |
| 2002/0099949 A1 | 7/2002 | Fries et al. |
| 2002/0101852 A1 | 8/2002 | Say et al. |
| 2002/0111997 A1 | 8/2002 | Herlihy et al. |
| 2002/0156917 A1 | 10/2002 | Nye et al. |
| 2002/0186694 A1 | 12/2002 | Mahajan et al. |
| 2003/0002476 A1 | 1/2003 | Chung et al. |
| 2003/0010528 A1 | 1/2003 | Niles |
| 2003/0038753 A1 | 2/2003 | Mahon et al. |
| 2003/0049003 A1 | 3/2003 | Ahmad et al. |
| 2003/0054793 A1 | 3/2003 | Manis et al. |
| 2003/0095208 A1 | 5/2003 | Chouraqui et al. |
| 2003/0137464 A1 | 7/2003 | Foti et al. |
| 2003/0152331 A1 | 8/2003 | Dair et al. |
| 2003/0164794 A1 | 9/2003 | Haynes et al. |
| 2003/0188308 A1 | 10/2003 | Kizuka |
| 2003/0190110 A1 | 10/2003 | Kline et al. |
| 2003/0202756 A1 | 10/2003 | Hurley et al. |
| 2003/0210197 A1 | 11/2003 | Cencich et al. |
| 2004/0015725 A1 | 1/2004 | Boneh et al. |
| 2004/0023640 A1 | 2/2004 | Ballai et al. |
| 2004/0048596 A1 | 3/2004 | Wyrzykowska et al. |
| 2004/0054425 A1 | 3/2004 | Elmore |
| 2004/0085153 A1 | 5/2004 | Fukunaga et al. |
| 2004/0091032 A1 | 5/2004 | Duchi et al. |
| 2004/0100343 A1 | 5/2004 | Tsu et al. |
| 2004/0104410 A1 | 6/2004 | Gilbert et al. |
| 2004/0113757 A1 | 6/2004 | White, II et al. |
| 2004/0119564 A1 | 6/2004 | Itoh et al. |
| 2004/0131310 A1 | 7/2004 | Walker et al. |
| 2004/0163135 A1 | 8/2004 | Giaccherini et al. |
| 2004/0165669 A1 | 8/2004 | Otsuka et al. |
| 2004/0169572 A1 | 9/2004 | Elmore et al. |
| 2004/0196784 A1 | 10/2004 | Larsson et al. |
| 2004/0198228 A1 | 10/2004 | Raghothaman et al. |
| 2004/0212481 A1 | 10/2004 | Abraham et al. |
| 2004/0213147 A1 | 10/2004 | Wiese et al. |
| 2004/0213189 A1 | 10/2004 | Alspaugh et al. |
| 2004/0213294 A1 | 10/2004 | Hughes et al. |
| 2004/0250069 A1 | 12/2004 | Kosamo et al. |
| 2005/0005854 A1 | 1/2005 | Suzuki et al. |
| 2005/0017825 A1 | 1/2005 | Hansen |
| 2005/0063422 A1 | 3/2005 | Lazar et al. |
| 2005/0068223 A1 | 3/2005 | Vavik et al. |
| 2005/0069321 A1 | 3/2005 | Sullivan et al. |
| 2005/0074208 A1 | 4/2005 | Badcock et al. |
| 2005/0097396 A1 | 5/2005 | Wood |
| 2005/0102185 A1 | 5/2005 | Barker et al. |
| 2005/0111533 A1 | 5/2005 | Berkman |
| 2005/0143868 A1 | 6/2005 | Whelan et al. |
| 2005/0151659 A1 | 7/2005 | Donovan et al. |
| 2005/0164666 A1 | 7/2005 | Lang et al. |
| 2005/0168326 A1 | 8/2005 | White et al. |
| 2005/0169056 A1 | 8/2005 | Berkman et al. |
| 2005/0169401 A1 | 8/2005 | Abraham et al. |
| 2005/0177463 A1 | 8/2005 | Crutchfield et al. |
| 2005/0190101 A1 | 9/2005 | Hiramatsu et al. |
| 2005/0212626 A1 | 9/2005 | Takamatsu et al. |
| 2005/0219135 A1 | 10/2005 | Lee et al. |
| 2005/0226353 A1 | 10/2005 | Gebara et al. |
| 2005/0258920 A1 | 11/2005 | Elmore |
| 2006/0034724 A1 | 2/2006 | Hamano et al. |
| 2006/0053486 A1 | 3/2006 | Wesinger et al. |
| 2006/0082516 A1 | 4/2006 | Strickland et al. |
| 2006/0111047 A1 | 5/2006 | Louberg et al. |
| 2006/0114925 A1 | 6/2006 | Gerszberg et al. |
| 2006/0119528 A1 | 6/2006 | Bhattacharyya et al. |
| 2006/0120399 A1 | 6/2006 | Claret et al. |
| 2006/0128322 A1 | 6/2006 | Igarashi et al. |
| 2006/0153878 A1 | 7/2006 | Savarino et al. |
| 2006/0172781 A1 | 8/2006 | Mohebbi et al. |
| 2006/0181394 A1 | 8/2006 | Clarke et al. |
| 2006/0187023 A1 | 8/2006 | Iwamura et al. |
| 2006/0192672 A1 | 8/2006 | Gidge et al. |
| 2006/0220833 A1 | 10/2006 | Berkman et al. |
| 2006/0239501 A1 | 10/2006 | Petrovic et al. |
| 2006/0249622 A1 | 11/2006 | Steele et al. |
| 2006/0255930 A1 | 11/2006 | Berkman et al. |
| 2006/0286927 A1 | 12/2006 | Berkman et al. |
| 2007/0002771 A1 | 1/2007 | Berkman et al. |
| 2007/0022475 A1 | 1/2007 | Rossi et al. |
| 2007/0025265 A1 | 2/2007 | Marcotullio et al. |
| 2007/0025386 A1 | 2/2007 | Riedel et al. |
| 2007/0041464 A1 | 2/2007 | Kim et al. |
| 2007/0041554 A1 | 2/2007 | Newman |
| 2007/0054622 A1 | 3/2007 | Berkman |
| 2007/0063914 A1 | 3/2007 | Becker et al. |
| 2007/0090185 A1 | 4/2007 | Lewkowitz et al. |
| 2007/0105508 A1 | 5/2007 | Tong et al. |
| 2007/0135044 A1 | 6/2007 | Rhodes et al. |
| 2007/0144779 A1 | 6/2007 | Vicente et al. |
| 2007/0189182 A1 | 8/2007 | Berkman et al. |
| 2007/0211689 A1 | 9/2007 | Campero et al. |
| 2007/0211786 A1 | 9/2007 | Shattil et al. |
| 2007/0252998 A1 | 11/2007 | Berthold et al. |
| 2007/0257858 A1 | 11/2007 | Liu et al. |
| 2007/0268124 A1 | 11/2007 | Berkman et al. |
| 2007/0268846 A1 | 11/2007 | Proctor et al. |
| 2007/0300280 A1 | 12/2007 | Turner et al. |
| 2008/0002652 A1 | 1/2008 | Gupta et al. |
| 2008/0003872 A1 | 1/2008 | Chen et al. |
| 2008/0007416 A1 | 1/2008 | Cern et al. |
| 2008/0043655 A1 | 2/2008 | Lee et al. |
| 2008/0055149 A1 | 3/2008 | Rees et al. |
| 2008/0060832 A1 | 3/2008 | Razavi et al. |
| 2008/0064331 A1 | 3/2008 | Washiro et al. |
| 2008/0077336 A1 | 3/2008 | Fernandes et al. |
| 2008/0080389 A1 | 4/2008 | Hart et al. |
| 2008/0084937 A1 | 4/2008 | Barthold et al. |
| 2008/0120667 A1 | 5/2008 | Zaltsman |
| 2008/0122723 A1 | 5/2008 | Rofougaran et al. |
| 2008/0130639 A1 | 6/2008 | Costa-Requena et al. |
| 2008/0143491 A1 | 6/2008 | Deaver et al. |
| 2008/0150790 A1 | 6/2008 | Voigtlaender et al. |
| 2008/0153416 A1 | 6/2008 | Washiro et al. |
| 2008/0191851 A1 | 8/2008 | Koga et al. |
| 2008/0211727 A1 | 9/2008 | Elmore et al. |
| 2008/0247716 A1 | 10/2008 | Thomas et al. |
| 2008/0252522 A1 | 10/2008 | Asbridge et al. |
| 2008/0253723 A1 | 10/2008 | Stokes et al. |
| 2008/0255782 A1 | 10/2008 | Bilac et al. |
| 2008/0266060 A1 | 10/2008 | Takei et al. |
| 2008/0267076 A1 | 10/2008 | Laperi et al. |
| 2008/0279199 A1 | 11/2008 | Park et al. |
| 2008/0313691 A1 | 12/2008 | Cholas |
| 2009/0002137 A1 | 1/2009 | Radtke et al. |
| 2009/0007189 A1 | 1/2009 | Gutknecht |
| 2009/0007190 A1 | 1/2009 | Weber et al. |
| 2009/0007194 A1 | 1/2009 | Brady, Jr. et al. |
| 2009/0015239 A1 | 1/2009 | Georgiou et al. |
| 2009/0054737 A1 | 2/2009 | Magar et al. |
| 2009/0061940 A1 | 3/2009 | Scheinert et al. |
| 2009/0067441 A1 | 3/2009 | Ansari et al. |
| 2009/0079660 A1 | 3/2009 | Elmore |
| 2009/0085726 A1 | 4/2009 | Radtke et al. |
| 2009/0093267 A1 | 4/2009 | Ariyur et al. |
| 2009/0109981 A1 | 4/2009 | Keselman |
| 2009/0129301 A1 | 5/2009 | Belimpasakis et al. |
| 2009/0138931 A1 | 5/2009 | Lin et al. |

(56) References Cited

U.S. PATENT DOCUMENTS

| | | |
|---|---|---|
| 2009/0140852 A1 | 6/2009 | Stolarczyk et al. |
| 2009/0144417 A1 | 6/2009 | Kisel et al. |
| 2009/0171780 A1 | 7/2009 | Aldrey et al. |
| 2009/0201133 A1 | 8/2009 | Bruns et al. |
| 2009/0202020 A1 | 8/2009 | Hafeez et al. |
| 2009/0210901 A1 | 8/2009 | Hawkins et al. |
| 2009/0250449 A1 | 10/2009 | Petrenko et al. |
| 2009/0254971 A1 | 10/2009 | Herz et al. |
| 2009/0258652 A1 | 10/2009 | Lambert et al. |
| 2009/0284435 A1 | 11/2009 | Elmore et al. |
| 2009/0286482 A1 | 11/2009 | Gorokhov et al. |
| 2009/0311960 A1 | 12/2009 | Farahani et al. |
| 2009/0315668 A1 | 12/2009 | Leete, III et al. |
| 2009/0325479 A1 | 12/2009 | Chakrabarti et al. |
| 2009/0325628 A1 | 12/2009 | Becker et al. |
| 2010/0002618 A1 | 1/2010 | Eichinger et al. |
| 2010/0002731 A1 | 1/2010 | Kimura et al. |
| 2010/0026607 A1 | 2/2010 | Imai et al. |
| 2010/0039339 A1 | 2/2010 | Kuroda et al. |
| 2010/0045447 A1 | 2/2010 | Mollenkopf et al. |
| 2010/0052799 A1 | 3/2010 | Watanabe et al. |
| 2010/0053019 A1 | 3/2010 | Ikawa et al. |
| 2010/0057894 A1 | 3/2010 | Glasser |
| 2010/0080203 A1 | 4/2010 | Reynolds et al. |
| 2010/0085036 A1 | 4/2010 | Banting et al. |
| 2010/0090887 A1 | 4/2010 | Cooper et al. |
| 2010/0100918 A1 | 4/2010 | Egan, Jr. et al. |
| 2010/0111521 A1 | 5/2010 | Kim et al. |
| 2010/0119234 A1 | 5/2010 | Suematsu et al. |
| 2010/0121945 A1 | 5/2010 | Gerber et al. |
| 2010/0150215 A1 | 6/2010 | Black et al. |
| 2010/0153990 A1 | 6/2010 | Ress et al. |
| 2010/0169937 A1 | 7/2010 | Atwal et al. |
| 2010/0175080 A1 | 7/2010 | Yuen et al. |
| 2010/0176894 A1 | 7/2010 | Tahara et al. |
| 2010/0177894 A1 | 7/2010 | Yasuma et al. |
| 2010/0185614 A1 | 7/2010 | O'Brien et al. |
| 2010/0201313 A1 | 8/2010 | Vorenkamp et al. |
| 2010/0214183 A1 | 8/2010 | Stoneback et al. |
| 2010/0214185 A1 | 8/2010 | Sammoura et al. |
| 2010/0224732 A1 | 9/2010 | Olson et al. |
| 2010/0225426 A1 | 9/2010 | Unger et al. |
| 2010/0232539 A1 | 9/2010 | Han et al. |
| 2010/0243633 A1 | 9/2010 | Huynh et al. |
| 2010/0253450 A1 | 10/2010 | Kim et al. |
| 2010/0265877 A1 | 10/2010 | Foxworthy et al. |
| 2010/0266063 A1 | 10/2010 | Harel et al. |
| 2010/0283693 A1 | 11/2010 | Xie et al. |
| 2010/0284446 A1 | 11/2010 | Mu et al. |
| 2010/0319068 A1 | 12/2010 | Abbadessa et al. |
| 2010/0327880 A1 | 12/2010 | Stein et al. |
| 2011/0018704 A1 | 1/2011 | Burrows et al. |
| 2011/0040861 A1 | 2/2011 | Van der Merwe et al. |
| 2011/0042120 A1 | 2/2011 | Otsuka et al. |
| 2011/0043051 A1 | 2/2011 | Meskens et al. |
| 2011/0053498 A1 | 3/2011 | Nogueira-Nine |
| 2011/0068893 A1 | 3/2011 | Lahiri et al. |
| 2011/0068988 A1 | 3/2011 | Monte et al. |
| 2011/0107364 A1 | 5/2011 | Lajoie et al. |
| 2011/0109936 A1 | 5/2011 | Coffee et al. |
| 2011/0110404 A1 | 5/2011 | Washiro |
| 2011/0118888 A1 | 5/2011 | White et al. |
| 2011/0132658 A1 | 6/2011 | Miller, II et al. |
| 2011/0133865 A1 | 6/2011 | Miller, II et al. |
| 2011/0133867 A1 | 6/2011 | Miller, II et al. |
| 2011/0136432 A1 | 6/2011 | Miller, II et al. |
| 2011/0140911 A1 | 6/2011 | Pant et al. |
| 2011/0141555 A1 | 6/2011 | Fermann et al. |
| 2011/0148578 A1 | 6/2011 | Aloi et al. |
| 2011/0164514 A1 | 7/2011 | Afkhamie et al. |
| 2011/0165847 A1 | 7/2011 | Kawasaki et al. |
| 2011/0169336 A1 | 7/2011 | Yerazunis et al. |
| 2011/0172000 A1 | 7/2011 | Quigley et al. |
| 2011/0187578 A1 | 8/2011 | Farneth et al. |
| 2011/0208450 A1 | 8/2011 | Salka et al. |
| 2011/0214176 A1 | 9/2011 | Burch et al. |
| 2011/0219402 A1 | 9/2011 | Candelore et al. |
| 2011/0225046 A1 | 9/2011 | Eldering et al. |
| 2011/0228814 A1 | 9/2011 | Washiro et al. |
| 2011/0268085 A1 | 11/2011 | Barany et al. |
| 2011/0274396 A1 | 11/2011 | Nakajima et al. |
| 2011/0294509 A1 | 12/2011 | Kim et al. |
| 2012/0015654 A1 | 1/2012 | Palanki et al. |
| 2012/0039366 A1 | 2/2012 | Wood et al. |
| 2012/0046891 A1 | 2/2012 | Yaney et al. |
| 2012/0068903 A1 | 3/2012 | Thevenard et al. |
| 2012/0077485 A1 | 3/2012 | Shin et al. |
| 2012/0078452 A1 | 3/2012 | Daum et al. |
| 2012/0084807 A1 | 4/2012 | Thompson et al. |
| 2012/0091820 A1 | 4/2012 | Campanella et al. |
| 2012/0092161 A1 | 4/2012 | West et al. |
| 2012/0093078 A1 | 4/2012 | Perlman et al. |
| 2012/0102568 A1 | 4/2012 | Tarbotton et al. |
| 2012/0105246 A1 | 5/2012 | Sexton et al. |
| 2012/0117584 A1 | 5/2012 | Gordon |
| 2012/0129566 A1 | 5/2012 | Lee et al. |
| 2012/0133373 A1 | 5/2012 | Ali et al. |
| 2012/0144420 A1 | 6/2012 | Del Sordo et al. |
| 2012/0154239 A1 | 6/2012 | Bar-Sade et al. |
| 2012/0161543 A1 | 6/2012 | Reuven et al. |
| 2012/0181258 A1 | 7/2012 | Shan et al. |
| 2012/0197558 A1 | 8/2012 | Henig et al. |
| 2012/0214538 A1 | 8/2012 | Kim et al. |
| 2012/0224807 A1 | 9/2012 | Winzer et al. |
| 2012/0238564 A1 | 9/2012 | Lu et al. |
| 2012/0250534 A1 | 10/2012 | Langer et al. |
| 2012/0250752 A1 | 10/2012 | Mchann et al. |
| 2012/0263152 A1 | 10/2012 | Fischer et al. |
| 2012/0268340 A1 | 10/2012 | Capozzoli et al. |
| 2012/0272741 A1 | 11/2012 | Xiao et al. |
| 2012/0274528 A1 | 11/2012 | McMahon et al. |
| 2012/0287922 A1 | 11/2012 | Heck et al. |
| 2012/0299671 A1 | 11/2012 | Ikeda et al. |
| 2012/0304294 A1 | 11/2012 | Fujiwara et al. |
| 2012/0306587 A1 | 12/2012 | Strid et al. |
| 2012/0306708 A1 | 12/2012 | Henderson et al. |
| 2012/0322492 A1 | 12/2012 | Koo et al. |
| 2012/0324018 A1 | 12/2012 | Metcalf et al. |
| 2012/0327908 A1 | 12/2012 | Gupta et al. |
| 2012/0329523 A1 | 12/2012 | Stewart et al. |
| 2012/0330756 A1 | 12/2012 | Morris et al. |
| 2013/0002409 A1 | 1/2013 | Molina et al. |
| 2013/0003876 A1 | 1/2013 | Bennett |
| 2013/0010679 A1 | 1/2013 | Ma et al. |
| 2013/0016022 A1 | 1/2013 | Heiks et al. |
| 2013/0039624 A1 | 2/2013 | Scherer et al. |
| 2013/0064178 A1 | 3/2013 | Cs et al. |
| 2013/0064311 A1 | 3/2013 | Turner et al. |
| 2013/0070621 A1 | 3/2013 | Marzetta et al. |
| 2013/0077664 A1 | 3/2013 | Lee et al. |
| 2013/0080290 A1 | 3/2013 | Kamm |
| 2013/0086639 A1 | 4/2013 | Sondhi et al. |
| 2013/0093638 A1 | 4/2013 | Shoemaker et al. |
| 2013/0095875 A1 | 4/2013 | Reuven et al. |
| 2013/0108206 A1 | 5/2013 | Sasaoka et al. |
| 2013/0109317 A1 | 5/2013 | Kikuchi et al. |
| 2013/0117852 A1 | 5/2013 | Stute et al. |
| 2013/0122828 A1 | 5/2013 | Choi et al. |
| 2013/0124365 A1 | 5/2013 | Pradeep |
| 2013/0127678 A1 | 5/2013 | Chandler et al. |
| 2013/0136410 A1 | 5/2013 | Sasaoka et al. |
| 2013/0144750 A1 | 6/2013 | Brown |
| 2013/0159856 A1 | 6/2013 | Ferren |
| 2013/0160122 A1 | 6/2013 | Choi et al. |
| 2013/0162490 A1 | 6/2013 | Blech et al. |
| 2013/0166690 A1 | 6/2013 | Shatzkamer et al. |
| 2013/0169499 A1 | 7/2013 | Lin et al. |
| 2013/0173807 A1 | 7/2013 | De et al. |
| 2013/0182804 A1 | 7/2013 | Yutaka et al. |
| 2013/0187636 A1 | 7/2013 | Kast et al. |
| 2013/0201904 A1 | 8/2013 | Toskala et al. |
| 2013/0207859 A1 | 8/2013 | Legay et al. |
| 2013/0234904 A1 | 9/2013 | Blech et al. |
| 2013/0235845 A1 | 9/2013 | Kovvali et al. |

(56) References Cited

U.S. PATENT DOCUMENTS

| | | |
|---|---|---|
| 2013/0235871 A1 | 9/2013 | Brzozowski et al. |
| 2013/0262656 A1 | 10/2013 | Cao et al. |
| 2013/0262857 A1 | 10/2013 | Neuman et al. |
| 2013/0263263 A1 | 10/2013 | Narkolayev et al. |
| 2013/0265732 A1 | 10/2013 | Herbsommer et al. |
| 2013/0279523 A1 | 10/2013 | Denney et al. |
| 2013/0279561 A1 | 10/2013 | Jin et al. |
| 2013/0279868 A1 | 10/2013 | Zhang et al. |
| 2013/0305369 A1 | 11/2013 | Karta et al. |
| 2013/0306351 A1 | 11/2013 | Lambert et al. |
| 2013/0311661 A1 | 11/2013 | McPhee |
| 2013/0314182 A1 | 11/2013 | Takeda et al. |
| 2013/0321225 A1 | 12/2013 | Pettus et al. |
| 2013/0326063 A1 | 12/2013 | Burch et al. |
| 2013/0326494 A1 | 12/2013 | Nunez et al. |
| 2013/0330050 A1 | 12/2013 | Yang et al. |
| 2013/0335165 A1 | 12/2013 | Arnold et al. |
| 2013/0341094 A1 | 12/2013 | Taherian et al. |
| 2013/0343213 A1 | 12/2013 | Reynolds et al. |
| 2013/0343351 A1 | 12/2013 | Sambhwani et al. |
| 2014/0003394 A1 | 1/2014 | Rubin et al. |
| 2014/0003775 A1 | 1/2014 | Ko et al. |
| 2014/0007076 A1 | 1/2014 | Kim et al. |
| 2014/0009270 A1 | 1/2014 | Yamazaki et al. |
| 2014/0009822 A1 | 1/2014 | Dong et al. |
| 2014/0015705 A1 | 1/2014 | Ebihara et al. |
| 2014/0019576 A1 | 1/2014 | Lobo et al. |
| 2014/0026170 A1 | 1/2014 | Francisco et al. |
| 2014/0028184 A1 | 1/2014 | Voronin et al. |
| 2014/0028190 A1 | 1/2014 | Voronin et al. |
| 2014/0028532 A1 | 1/2014 | Ehrenberg et al. |
| 2014/0032005 A1 | 1/2014 | Iwamura |
| 2014/0041925 A1 | 2/2014 | Siripurapu et al. |
| 2014/0043189 A1 | 2/2014 | Lee et al. |
| 2014/0043977 A1 | 2/2014 | Wiley et al. |
| 2014/0044139 A1 | 2/2014 | Dong et al. |
| 2014/0052810 A1 | 2/2014 | Osorio et al. |
| 2014/0071818 A1 | 3/2014 | Wang et al. |
| 2014/0072299 A1 | 3/2014 | Stapleton et al. |
| 2014/0077995 A1 | 3/2014 | Artemenko et al. |
| 2014/0086080 A1 | 3/2014 | Hui et al. |
| 2014/0086152 A1 | 3/2014 | Bontu et al. |
| 2014/0124236 A1 | 5/2014 | Vu et al. |
| 2014/0126914 A1 | 5/2014 | Berlin et al. |
| 2014/0130111 A1 | 5/2014 | Nulty et al. |
| 2014/0132728 A1 | 5/2014 | Verano et al. |
| 2014/0139375 A1 | 5/2014 | Faragher et al. |
| 2014/0143055 A1 | 5/2014 | Johnson |
| 2014/0155054 A1 | 6/2014 | Willis, III et al. |
| 2014/0165145 A1 | 6/2014 | Baentsch et al. |
| 2014/0169186 A1 | 6/2014 | Zhu et al. |
| 2014/0179302 A1 | 6/2014 | Polehn et al. |
| 2014/0189677 A1 | 7/2014 | Curzi et al. |
| 2014/0189732 A1 | 7/2014 | Shkedi et al. |
| 2014/0204754 A1 | 7/2014 | Jeong et al. |
| 2014/0207844 A1 | 7/2014 | Mayo et al. |
| 2014/0208272 A1 | 7/2014 | Vats et al. |
| 2014/0222997 A1 | 8/2014 | Mermoud et al. |
| 2014/0223527 A1 | 8/2014 | Bortz et al. |
| 2014/0225129 A1 | 8/2014 | Inoue et al. |
| 2014/0227905 A1 | 8/2014 | Knott et al. |
| 2014/0227966 A1 | 8/2014 | Artemenko et al. |
| 2014/0233900 A1 | 8/2014 | Hugonnot et al. |
| 2014/0241718 A1 | 8/2014 | Jiang et al. |
| 2014/0254516 A1 | 9/2014 | Lee et al. |
| 2014/0254896 A1 | 9/2014 | Zhou et al. |
| 2014/0254979 A1 | 9/2014 | Zhang et al. |
| 2014/0266946 A1 | 9/2014 | Stevenson et al. |
| 2014/0269260 A1 | 9/2014 | Xue et al. |
| 2014/0269972 A1 | 9/2014 | Rada et al. |
| 2014/0285277 A1 | 9/2014 | Herbsommer et al. |
| 2014/0285293 A1 | 9/2014 | Schuppener et al. |
| 2014/0285389 A1 | 9/2014 | Fakharzadeh et al. |
| 2014/0286189 A1 | 9/2014 | Kang et al. |
| 2014/0287702 A1 | 9/2014 | Schuppener et al. |
| 2014/0299349 A1 | 10/2014 | Yamaguchi et al. |
| 2014/0304498 A1 | 10/2014 | Gonuguntla et al. |
| 2014/0317229 A1 | 10/2014 | Hughes et al. |
| 2014/0320364 A1 | 10/2014 | Gu et al. |
| 2014/0334773 A1 | 11/2014 | Mathai et al. |
| 2014/0334789 A1 | 11/2014 | Matsuo et al. |
| 2014/0351571 A1 | 11/2014 | Jacobs |
| 2014/0355525 A1 | 12/2014 | Barzegar et al. |
| 2014/0355989 A1 | 12/2014 | Finkelstein |
| 2014/0359275 A1 | 12/2014 | Murugesan et al. |
| 2014/0362374 A1 | 12/2014 | Santori |
| 2014/0362694 A1 | 12/2014 | Rodriques |
| 2014/0369430 A1 | 12/2014 | Parnell |
| 2014/0373053 A1 | 12/2014 | Leley et al. |
| 2014/0376655 A1 | 12/2014 | Ruan et al. |
| 2015/0008996 A1 | 1/2015 | Jessup et al. |
| 2015/0009089 A1 | 1/2015 | Pesa |
| 2015/0017473 A1 | 1/2015 | Verhoeven et al. |
| 2015/0022399 A1 | 1/2015 | Clymer et al. |
| 2015/0026460 A1 | 1/2015 | Walton |
| 2015/0029065 A1 | 1/2015 | Cheng |
| 2015/0036610 A1 | 2/2015 | Kim et al. |
| 2015/0042526 A1 | 2/2015 | Zeine |
| 2015/0048238 A1 | 2/2015 | Kawai |
| 2015/0061859 A1 | 3/2015 | Matsuoka et al. |
| 2015/0065166 A1 | 3/2015 | Ward et al. |
| 2015/0071594 A1 | 3/2015 | Register |
| 2015/0077740 A1 | 3/2015 | Fuse |
| 2015/0084703 A1 | 3/2015 | Sanduleanu et al. |
| 2015/0084814 A1 | 3/2015 | Rojanski et al. |
| 2015/0091650 A1 | 4/2015 | Nobbe |
| 2015/0099555 A1 | 4/2015 | Krishnaswamy et al. |
| 2015/0102972 A1 | 4/2015 | Scire-Scappuzzo et al. |
| 2015/0104005 A1 | 4/2015 | Holman |
| 2015/0109178 A1 | 4/2015 | Hyde et al. |
| 2015/0116154 A1 | 4/2015 | Artemenko |
| 2015/0122886 A1 | 5/2015 | Koch |
| 2015/0126107 A1 | 5/2015 | Bennett et al. |
| 2015/0130675 A1 | 5/2015 | Parsche |
| 2015/0138022 A1 | 5/2015 | Takahashi |
| 2015/0153248 A1 | 6/2015 | Hayward et al. |
| 2015/0156266 A1 | 6/2015 | Gupta |
| 2015/0162988 A1 | 6/2015 | Henry et al. |
| 2015/0172036 A1 | 6/2015 | Katar et al. |
| 2015/0181449 A1 | 6/2015 | Didenko et al. |
| 2015/0195349 A1 | 7/2015 | Cardamore |
| 2015/0195719 A1 | 7/2015 | Rahman |
| 2015/0201228 A1 | 7/2015 | Hasek |
| 2015/0207527 A1 | 7/2015 | Eliaz et al. |
| 2015/0215268 A1 | 7/2015 | Dinha |
| 2015/0223078 A1 | 8/2015 | Bennett et al. |
| 2015/0236778 A1 | 8/2015 | Jalali |
| 2015/0236779 A1 | 8/2015 | Jalali |
| 2015/0249965 A1 | 9/2015 | Dussmann et al. |
| 2015/0271830 A1 | 9/2015 | Shin et al. |
| 2015/0276577 A1 | 10/2015 | Ruege et al. |
| 2015/0304045 A1 | 10/2015 | Henry et al. |
| 2015/0304869 A1 | 10/2015 | Johnson et al. |
| 2015/0312774 A1 | 10/2015 | Lau |
| 2015/0318610 A1 | 11/2015 | Lee et al. |
| 2015/0326274 A1 | 11/2015 | Flood et al. |
| 2015/0333804 A1 | 11/2015 | Yang et al. |
| 2015/0339912 A1 | 11/2015 | Farrand et al. |
| 2015/0356482 A1 | 12/2015 | Whipple et al. |
| 2015/0373557 A1 | 12/2015 | Bennett et al. |
| 2016/0006129 A1 | 1/2016 | Haziza |
| 2016/0014749 A1 | 1/2016 | Kang et al. |
| 2016/0038074 A1 | 2/2016 | Brown et al. |
| 2016/0050028 A1 | 2/2016 | Henry et al. |
| 2016/0063642 A1 | 3/2016 | Luciani et al. |
| 2016/0064794 A1 | 3/2016 | Henry et al. |
| 2016/0065252 A1 | 3/2016 | Preschutti |
| 2016/0065335 A1 | 3/2016 | Koo et al. |
| 2016/0068265 A1 | 3/2016 | Hoareau et al. |
| 2016/0068277 A1 | 3/2016 | Manitta |
| 2016/0069934 A1 | 3/2016 | Saxby et al. |
| 2016/0069935 A1 | 3/2016 | Kreikebaum et al. |
| 2016/0070265 A1 | 3/2016 | Liu et al. |
| 2016/0079769 A1 | 3/2016 | Corum et al. |

(56) References Cited

U.S. PATENT DOCUMENTS

| | | | |
|---|---|---|---|
| 2016/0079809 A1 | 3/2016 | Corum et al. |
| 2016/0080035 A1 | 3/2016 | Fuchs et al. |
| 2016/0080839 A1 | 3/2016 | Fuchs et al. |
| 2016/0088498 A1 | 3/2016 | Sharawi |
| 2016/0094879 A1 | 3/2016 | Gerszberg et al. |
| 2016/0099749 A1 | 4/2016 | Bennett |
| 2016/0100324 A1 | 4/2016 | Henry et al. |
| 2016/0105218 A1 | 4/2016 | Henry |
| 2016/0105233 A1 | 4/2016 | Jalali |
| 2016/0105239 A1 | 4/2016 | Henry et al. |
| 2016/0105255 A1 | 4/2016 | Henry et al. |
| 2016/0112092 A1 | 4/2016 | Henry |
| 2016/0112093 A1 | 4/2016 | Barzegar |
| 2016/0112094 A1 | 4/2016 | Stuckman et al. |
| 2016/0112132 A1 | 4/2016 | Henry |
| 2016/0112133 A1 | 4/2016 | Henry et al. |
| 2016/0112135 A1 | 4/2016 | Henry et al. |
| 2016/0112263 A1 | 4/2016 | Henry et al. |
| 2016/0116914 A1 | 4/2016 | Mucci |
| 2016/0149312 A1 | 5/2016 | Henry et al. |
| 2016/0149614 A1 | 5/2016 | Barzegar |
| 2016/0149636 A1 | 5/2016 | Gerszberg et al. |
| 2016/0149665 A1 | 5/2016 | Henry et al. |
| 2016/0149731 A1 | 5/2016 | Henry et al. |
| 2016/0149753 A1 | 5/2016 | Gerszberg et al. |
| 2016/0150427 A1 | 5/2016 | Ramanath |
| 2016/0164571 A1 | 6/2016 | Bennett et al. |
| 2016/0164573 A1 | 6/2016 | Birk et al. |
| 2016/0181701 A1 | 6/2016 | Sangaran et al. |
| 2016/0182161 A1 | 6/2016 | Barzegar |
| 2016/0182981 A1 | 6/2016 | Minarik et al. |
| 2016/0189101 A1 | 6/2016 | Kantor et al. |
| 2016/0197392 A1 | 7/2016 | Henry et al. |
| 2016/0197409 A1 | 7/2016 | Henry et al. |
| 2016/0197630 A1 | 7/2016 | Kawasaki |
| 2016/0197642 A1 | 7/2016 | Henry et al. |
| 2016/0214717 A1 | 7/2016 | De Silva |
| 2016/0218407 A1 | 7/2016 | Henry et al. |
| 2016/0221039 A1 | 8/2016 | Fuchs et al. |
| 2016/0226681 A1 | 8/2016 | Henry et al. |
| 2016/0248165 A1 | 8/2016 | Henry |
| 2016/0248509 A1 | 8/2016 | Henry |
| 2016/0261309 A1 | 9/2016 | Henry |
| 2016/0261310 A1 | 9/2016 | Fuchs et al. |
| 2016/0261312 A1 | 9/2016 | Fuchs et al. |
| 2016/0269156 A1 | 9/2016 | Barzegar et al. |
| 2016/0276725 A1 | 9/2016 | Barnickel et al. |

FOREIGN PATENT DOCUMENTS

| | | |
|---|---|---|
| AU | 2010101079 A4 | 11/2010 |
| AU | 201400748 | 3/2014 |
| AU | 2014200748 A1 | 3/2014 |
| CA | 1136267 A1 | 11/1982 |
| CA | 2449596 A1 | 6/2005 |
| CA | 2515560 A1 | 2/2007 |
| CA | 2467988 C | 11/2010 |
| CA | 2777147 A1 | 4/2011 |
| CA | 2787580 A1 | 2/2013 |
| CN | 1833397 A | 9/2006 |
| CN | 1885736 A | 12/2006 |
| CN | 201146495 Y | 11/2008 |
| CN | 100502181 C | 6/2009 |
| CN | 201282193 Y | 7/2009 |
| CN | 101834011 U | 4/2010 |
| CN | 1823275 B | 5/2010 |
| CN | 1820482 B | 12/2010 |
| CN | 102130698 A | 7/2011 |
| CN | 102136634 A | 7/2011 |
| CN | 102208716 A | 10/2011 |
| CN | 102280704 A | 12/2011 |
| CN | 202093126 U | 12/2011 |
| CN | 102351415 A | 2/2012 |
| CN | 202253536 U | 5/2012 |
| CN | 102694351 A | 9/2012 |
| CN | 101662076 B | 11/2012 |
| CN | 103117118 A | 5/2013 |
| CN | 103163881 A | 6/2013 |
| CN | 203204743 U | 9/2013 |
| CN | 103700442 | 4/2014 |
| CN | 103700442 A | 4/2014 |
| CN | 103943925 A | 7/2014 |
| CN | 104052742 A | 9/2014 |
| CN | 203813973 U | 9/2014 |
| CN | 104091987 A | 10/2014 |
| CN | 203931626 U | 11/2014 |
| CN | 203950607 U | 11/2014 |
| CN | 205265924 | 1/2016 |
| CN | 105453340 | 3/2016 |
| CN | 105594138 A1 | 5/2016 |
| DE | 3504546 A1 | 8/1986 |
| DE | 3827956 A1 | 3/1989 |
| DE | 102007049914 A1 | 4/2009 |
| DE | 102012203816 A1 | 9/2013 |
| EP | 0110478 | 6/1984 |
| EP | 0136818 | 4/1985 |
| EP | 0280379 | 8/1988 |
| EP | 0330303 | 8/1989 |
| EP | 0331248 | 9/1989 |
| EP | 0342149 | 11/1989 |
| EP | 0391719 | 4/1990 |
| EP | 425979 A2 | 5/1991 |
| EP | 0651487 | 10/1994 |
| EP | 0371660 | 4/1996 |
| EP | 0756392 | 1/1997 |
| EP | 834722 A2 | 4/1998 |
| EP | 0840464 | 5/1998 |
| EP | 0871241 B1 | 10/1998 |
| EP | 0890132 | 1/1999 |
| EP | 755092 A3 | 4/1999 |
| EP | 0896380 | 10/1999 |
| EP | 1085599 A2 | 3/2001 |
| EP | 0756786 | 6/2001 |
| EP | 1127283 A1 | 8/2001 |
| EP | 1129550 A1 | 9/2001 |
| EP | 1184930 A1 | 3/2002 |
| EP | 1195847 A2 | 4/2002 |
| EP | 1296146 A1 | 3/2003 |
| EP | 0772061 | 7/2003 |
| EP | 1346431 A1 | 9/2003 |
| EP | 1249056 B1 | 1/2004 |
| EP | 1376755 A1 | 1/2004 |
| EP | 1401048 A1 | 3/2004 |
| EP | 1237303 A2 | 9/2004 |
| EP | 1454422 A1 | 9/2004 |
| EP | 1488397 A1 | 12/2004 |
| EP | 1371108 B1 | 6/2005 |
| EP | 1341255 B8 | 8/2005 |
| EP | 1577687 A1 | 9/2005 |
| EP | 1624685 A2 | 2/2006 |
| EP | 1642468 A2 | 4/2006 |
| EP | 1550327 A2 | 7/2006 |
| EP | 1608110 B1 | 10/2006 |
| EP | 1793508 A1 | 6/2007 |
| EP | 1898532 A2 | 3/2008 |
| EP | 1930982 A1 | 6/2008 |
| EP | 2165550 A1 | 3/2010 |
| EP | 1166599 B1 | 5/2010 |
| EP | 2404347 A2 | 1/2012 |
| EP | 2472671 A1 | 7/2012 |
| EP | 2568528 A2 | 3/2013 |
| EP | 2472737 B1 | 9/2013 |
| EP | 2854361 A1 | 4/2015 |
| EP | 2870802 A1 | 5/2015 |
| FR | 2119804 A1 | 8/1972 |
| FR | 2214161 A1 | 8/1974 |
| FR | 2691602 A1 | 11/1993 |
| FR | 2849728 A1 | 7/2004 |
| GB | 175489 A | 2/1922 |
| GB | 462804 A | 3/1937 |
| GB | 529290 A | 11/1940 |
| GB | 640181 A | 7/1950 |
| GB | 663166 A | 12/1951 |
| GB | 667290 A | 2/1952 |

(56) References Cited

FOREIGN PATENT DOCUMENTS

| | | |
|---|---|---|
| GB | 682817 A | 11/1952 |
| GB | 731473 A | 6/1955 |
| GB | 746111 A | 3/1956 |
| GB | 751153 A | 6/1956 |
| GB | 835976 A | 6/1960 |
| GB | 845492 A | 8/1960 |
| GB | 993561 A | 5/1965 |
| GB | 1076772 A | 7/1967 |
| GB | 1141390 A | 1/1969 |
| GB | 1298387 A | 11/1972 |
| GB | 1383549 A | 2/1974 |
| GB | 1422956 A | 1/1976 |
| GB | 1468310 A | 3/1977 |
| GB | 1527228 A | 10/1978 |
| GB | 2010528 A | 6/1979 |
| GB | 2045055 A | 10/1980 |
| GB | 2368468 A | 5/2002 |
| GB | 2393370 A | 3/2004 |
| GB | 2414862 A | 12/2005 |
| GB | 2411554 B | 1/2006 |
| GB | 714974 | 9/2007 |
| GB | 2474037 A | 4/2011 |
| GB | 2485355 A | 5/2012 |
| GB | 2507269 A | 4/2014 |
| IN | 7352/CHENP/2015 A | 7/2016 |
| IN | 201647015348 A | 8/2016 |
| JP | S50109642 | 9/1975 |
| JP | 55124303 U | 9/1980 |
| JP | 55138902 U | 10/1980 |
| JP | 574601 | 1/1982 |
| JP | 61260702 A | 11/1986 |
| JP | 03167906 A | 7/1991 |
| JP | 0653894 | 8/1991 |
| JP | 3001844 U | 9/1994 |
| JP | 08196022 A | 7/1996 |
| JP | 08316918 A | 11/1996 |
| JP | 2639531 B2 | 8/1997 |
| JP | 01867810 A | 6/1999 |
| JP | 11239085 A | 8/1999 |
| JP | 11313022 A | 11/1999 |
| JP | 2000077889 A | 3/2000 |
| JP | 2002029247 A | 1/2002 |
| JP | 2003008336 A | 1/2003 |
| JP | 2003057464 A | 2/2003 |
| JP | 3411428 B2 | 6/2003 |
| JP | 2003324309 A | 11/2003 |
| JP | 3480153 B2 | 12/2003 |
| JP | 2004521379 A | 7/2004 |
| JP | 2004253853 A | 9/2004 |
| JP | 2004297107 A | 10/2004 |
| JP | 3734975 B2 | 1/2006 |
| JP | 2006153878 A | 6/2006 |
| JP | 2006166399 A | 6/2006 |
| JP | 2007259001 A | 10/2007 |
| JP | 2008021483 A | 1/2008 |
| JP | 4072280 B2 | 4/2008 |
| JP | 2009004986 A | 1/2009 |
| JP | 2009124229 A | 6/2009 |
| JP | 2010192992 A | 9/2010 |
| JP | 2012090242 A | 5/2012 |
| JP | 2012205104 A | 10/2012 |
| JP | 2013046412 A | 3/2013 |
| JP | 2013110503 A | 6/2013 |
| JP | 2014045237 A | 3/2014 |
| JP | 5475475 B2 | 4/2014 |
| JP | 5497348 B2 | 5/2014 |
| JP | 2015188174 | 10/2015 |
| KR | 20000074034 | 12/2000 |
| KR | 200425873 Y1 | 9/2006 |
| KR | 101060584 B1 | 8/2011 |
| KR | 101070364 B1 | 9/2011 |
| KR | 101212354 B1 | 12/2012 |
| KR | 20140104097 A | 8/2014 |
| KR | 20150087455 | 7/2015 |
| KR | 101606803 | 1/2016 |
| RU | 2129746 C1 | 4/1999 |
| RU | 2432647 C1 | 10/2011 |
| WO | 8301711 A1 | 5/1983 |
| WO | 9210014 | 6/1992 |
| WO | 9323928 | 11/1993 |
| WO | 9424467 A1 | 10/1994 |
| WO | 9529537 | 11/1995 |
| WO | 9529537 A1 | 11/1995 |
| WO | 9619089 | 6/1996 |
| WO | WO 96/41157 | 12/1996 |
| WO | 9735387 A1 | 9/1997 |
| WO | 9737445 A1 | 10/1997 |
| WO | 9829853 A1 | 7/1998 |
| WO | WO 98/57207 | 12/1998 |
| WO | 9948230 A1 | 9/1999 |
| WO | 9967903 A1 | 12/1999 |
| WO | 0070891 A1 | 11/2000 |
| WO | 00/74428 A1 | 12/2000 |
| WO | WO01/14985 A1 | 3/2001 |
| WO | 0145206 A1 | 6/2001 |
| WO | 02061467 A2 | 8/2002 |
| WO | 03026166 | 3/2003 |
| WO | 03044981 A1 | 5/2003 |
| WO | 03088418 | 10/2003 |
| WO | 03099740 A1 | 12/2003 |
| WO | 2004011995 A1 | 2/2004 |
| WO | 2004038891 A2 | 5/2004 |
| WO | 2004/051804 | 6/2004 |
| WO | 2004051804 A1 | 6/2004 |
| WO | 2004054159 A2 | 6/2004 |
| WO | 2004077746 A1 | 9/2004 |
| WO | 2006012610 A2 | 2/2006 |
| WO | 2006085804 A1 | 8/2006 |
| WO | 2006116396 A2 | 11/2006 |
| WO | 2006125279 A1 | 11/2006 |
| WO | 2006050331 A3 | 3/2007 |
| WO | 2007031435 A1 | 3/2007 |
| WO | 2007071797 A1 | 6/2007 |
| WO | 2007148097 A2 | 12/2007 |
| WO | 2008003939 A1 | 1/2008 |
| WO | 2008070957 A1 | 6/2008 |
| WO | 2008117973 A1 | 10/2008 |
| WO | 2009014704 A1 | 1/2009 |
| WO | 2007098061 A3 | 2/2009 |
| WO | 2009035285 A2 | 3/2009 |
| WO | 2009090602 A1 | 7/2009 |
| WO | 2010017549 A1 | 2/2010 |
| WO | 2010147806 A1 | 12/2010 |
| WO | 2011032605 A1 | 3/2011 |
| WO | 2011137793 A1 | 11/2011 |
| WO | 2012/007831 | 1/2012 |
| WO | 2014/018434 | 1/2012 |
| WO | 2012038816 A1 | 3/2012 |
| WO | 2012172565 A1 | 12/2012 |
| WO | 2013013162 A2 | 1/2013 |
| WO | WO 2013/017822 | 2/2013 |
| WO | 2013035110 A2 | 3/2013 |
| WO | 2013/073548 | 5/2013 |
| WO | 2013073548 A1 | 5/2013 |
| WO | 2013100912 A1 | 7/2013 |
| WO | 2013115802 A1 | 8/2013 |
| WO | 2013123445 A1 | 8/2013 |
| WO | 2013/138627 | 9/2013 |
| WO | 2014/045236 | 9/2013 |
| WO | 2013136213 A1 | 9/2013 |
| WO | 2013138627 A1 | 9/2013 |
| WO | 2013157978 A1 | 10/2013 |
| WO | 2014011438 A1 | 1/2014 |
| WO | 2014018434 A2 | 1/2014 |
| WO | 2014065952 A1 | 5/2014 |
| WO | 2014096641 A1 | 5/2014 |
| WO | 2014099340 A2 | 6/2014 |
| WO | 2013076499 A3 | 7/2014 |
| WO | 2014128253 A1 | 8/2014 |
| WO | 2014145862 A2 | 9/2014 |
| WO | 2014197926 A1 | 12/2014 |
| WO | 2015002658 A1 | 1/2015 |
| WO | 2015006636 A1 | 1/2015 |
| WO | 2015027033 A1 | 2/2015 |

(56) References Cited

FOREIGN PATENT DOCUMENTS

| WO | 2015035463 A1 | 3/2015 |
|---|---|---|
| WO | 2015/055230 | 4/2015 |
| WO | 2015052478 | 4/2015 |
| WO | 2015052480 | 4/2015 |
| WO | 2015069431 A2 | 5/2015 |
| WO | 2015077644 | 5/2015 |
| WO | 2015088650 A1 | 6/2015 |
| WO | 2015090382 | 6/2015 |
| WO | 2016003291 A1 | 1/2016 |
| WO | 2016009402 A2 | 1/2016 |
| WO | WO 2016/012889 | 1/2016 |
| WO | 2016043949 | 3/2016 |
| WO | 2016048214 A1 | 3/2016 |
| WO | 2016061021 A1 | 4/2016 |
| WO | 2016064516 A1 | 4/2016 |
| WO | WO 2016/064502 | 4/2016 |
| WO | 2016081125 | 5/2016 |
| WO | 2016081128 | 5/2016 |
| WO | 2016081134 | 5/2016 |
| WO | 2016081136 | 5/2016 |
| WO | 2016089491 | 6/2016 |
| WO | 2016089492 A1 | 6/2016 |
| WO | 2016096029 A1 | 6/2016 |
| WO | WO 2016/125161 | 8/2016 |
| WO | WO 2016/133509 | 8/2016 |
| WO | 2016145411 | 9/2016 |
| WO | WO 2016/137982 | 9/2016 |

OTHER PUBLICATIONS

"Boost: The world's first WI-FI extending led bulb," Sengled, sengled.com, http://www.sengled.com/sites/default/files/field/product/downloads/manual/a01-a60_na_user_manual.pdf, Dec. 2014.
"Examples of Cell Antennas," RF Check®, rfcheck.com, https://web.archive.org/web/20100201214318/http://www.rfcheck.com/Examplesof-Cell-Antennas.php, Feb. 1, 2010.
"Flashing Light : IR.Lamp," Beninca®, beninca.com, http://www.beninca.com/en/news/2015/02/23/lampeggiante-irlamp.html, Feb. 23, 2015.
"Integrated Radio Masts Fully camouflaged Outdoor-Wi-Fi APs in GRP-lamp poles," Brown-iposs, brown-iposs.com., Mar. 21, 2014.
"New Wi-Fi antenna enhances wireless coverage," ScienceDaily®, sciencedaily.com., Apr. 29, 2015.
"24 Volt D.C Flashing Light With Built-in Antenna 433Mhz, DEA+ Product Guide" Meteor electrical, meteorelectrical.com, Code: LUMY/24A., Jul. 28, 2010.
"A Dielectric Lens Antenna with Enhanced Aperture Efficiency for Industrial Radar Applications", Computer Simulation Technology, cst.com, May 10, 2011.
"Bi-Axial PA Horn with Gimbal Mount", Atlas Sound, MCM Electronics, mcmelectronics.com, MCM Part #555-13580., 2011.
"Broadband Negligible Loss Metamaterials", Computer Electmagnetics and Antennas Research Laboratory, cearl.ee.psu.edu., May 15, 2012.
"Cloud Management", Cisco Meraki, cisco.com., Sep. 11, 2015.
"Decryption: Identify & Control Encrypted Traffic", Palo Alto Networks, paloaltonetworks.com, Mar. 7, 2011.
"GM-12 Gimbal Mount", Newmark System, Inc, newmarksystems.com., 2015.
"HiveManager Network Management System", Aerohive® Networks, aerohive.com., Sep. 2015.
"Home", Darktrace, darktrace.com, Jul. 10, 2014.
"IEEE Standard for Information technology—Local and metropolitan area networks—Specific requirements", Part 15.4: Wireless Medium Access Control (MAC) and Physical Layer (PHY) Specifications for Low Rate Wireless Personal Area Networks (WPANs), in IEEE Std 802.15.4, (Revision of IEEE Std 802.15.4-2003), Sep. 7, 2006, 1-320.
"Installing Satellite Accessories", ACE®, acehardware.com., May 8, 2006.
"MmWave Axial Choke Horn Antenna with Lens", Feko, Sep. 24, 2013.
"Norse Appliance™: Block attacks before they target your network, and dramatically improve the ROI on your entire security infrastructure", norsecorp.com, 2015.
"Out-of-Band Mgmt", Cradle Point, cradlepoint.com., Sep. 2015.
"Out-of-Band Security Solution", Gigamon®, gigamon.com., Aug. 3, 2014.
"PRO 600 SIRIUS XM Radio Amplified Outdoor Antenna", Pixel Technologies, Oct. 3, 2014.
"Product Overview: Introducing SilentDefense", Security Matters, secmatters.com, Nov. 9, 2013.
"Quickly identify malicious traffics: Detect", Lancope®, lancope.com, Mar. 15, 2015.
"Radar at st Andrews", mmwaves.epr, st-andrews.ac.uk., Feb. 4, 2011.
"Smart Out-Of-Band Management", Open Gear, opengear.com., Sep. 2015.
Alam, MD N. et al., "Design and Application of Surface Wave Sensors for nonintrusive Power Line Fault Detection," IEEE Sensors Journal, IEEE Service Center, New York, NY, US, vol. 13, No. 1, pp. 339-347, Jan. 1, 2013.
Costantine, Joseph et al., "The analysis of a reconfigurable antenna with a rotating feed using graph models", Antennas and Wireless Propagation Letters 8: 943-946, 2009.
Dini, Gianluca et al., "Madam: A Multilevel Anomaly Detector for Android Malware", MMMACNS. vol. 12, 2012.
Dooley, Kevin "Out-of-Band Management", auvik, auvik.com., Apr. 12, 2014.
Ehyaie, Danial "Novel Approaches to the Design of Phased Array Antennas," Diss. The University of Michigan., 2011.
Friedman, M et al., "Low-loss RF transport over long distances," IEEE Transactions on Microwave Theory and Techniques, Jan. 1, 2001, pp. 341-348.
Garcia-Etxarri, Aitzol et al., "A combination of concave/convex surfaces for fieldenhancement optimization: the indented nanocone", Optics express 20.23, 2012, 2520125212.
Goldsmith, P.F. "Quasi-optical techniques", Proceedings of the IEEE., vol . 80, No. 11, Nov. 1, 1992.
Katkovnik, Vladimir et al., "High-resolution signal processing for a switch antenna array FMCW radar with a single channel receiver", Sensor Array and Multichannel Signal Processing Workshop Proceedings, IEEE., 2002.
Kumar, Sailesh "Survey of Current Network Intrusion Detection Techniques", Washington Univ. in St. Louis, Dec. 2007.
Laforte, J.L. et al., "State-of-the-art on power line de-icing", Atmospheric Research 46, 143-158, 1998.
Lucyszyn, S. et al., "Novel RF MEMS Switches", Microwave Conference, APMC, Asia-Pacific. IEEE, 2007.
Lucyszyn, Stepan et al., "RF MEMS for antenna applications", Antennas and Propagation (EuCAP), 7th European Conference on. IEEE,, 2013.
Nicholson, Basil J. "Microwave Rotary Joints for X-, C-, and S-hand", Battelle Memorial Inst Columbus OH, 1965.
Orfanidis, Sophocles J. "Electromagnetic waves and antennas," Rutgers University., 2002.
Piksa, Petr et al., "Elliptic and hyperbolic dielectric lens antennas in mmwaves", Radioengineering 20.1, 2011, 271.
Pranonsatit, S. et al., "Sectorised horn antenna array using an RF MEMS rotary switch", Asia-Pacific Microwave Conf., APMC., 2010.
Pranonsatit, Suneat et al., "Single-pole eight-throw RF MEMS rotary switch", Microelectromechanical Systems, Journal of 15.6: 1735-1744, 2006.
Scarfone, Karen et al., "Technical Guide to Information Security Testing and Assessment", National Institute of Standards and Technology, csrc.nist.gov, Special Publication, Sep. 2008, 800-115.
Shafai, Lotfollah "Dielectric Loaded Antennas", John Wiley & Sons, Inc., http://www.researchgate.net/publication/227998803_Dielectric_Loaded_Antennas, Apr. 15, 2005.

(56) References Cited

OTHER PUBLICATIONS

Sievenpiper, D.F. et al., "Two-dimensional beam steering using an electrically tunable impedance surface," in Antennas and Propagation, IEEE Transactions on vol. 51, No. 10, pp. 2713-2722., Oct. 2003.
Strahler, Olivier "Network Based VPNs", SANS Institute InfoSec Reading Room, sans.org., Aug. 2002.
Thornton, John et al., "Modern lens antennas for communications engineering", vol. 39, 2013.
Wolff, Christian "Phased Array Antenna" Radar Tutorial, web.archive.org, radartutorial.eu, Oct. 21, 2014.
Wu, Xidong et al., "Design and characterization of singleand multiplebeam mmwave circularly polarized substrate lens antennas for wireless communications", Microwave Theory and Techniques, IEEE Transactions on 49.3, 2001, 431-441.
Xi, Liu Xiao "Security services in SoftLayer", Sep. 21, 2015.
Alam, M N et al., "Novel surface wave exciters for power line fault detection and communications", Antennas and Propagation (APSURSI), 2011 IEEE International Symposium on, IEEE, Jul. 3, 2011. pp. 1139-1142.
Doelitzscher, et al., "ViteraaS: Virtual cluster as a service." Cloud Computing Technology and Science (CloudCom), 2011 IEEE Third International Conference on. IEEE, 2011.
Golrezaei, Negin et al., "FemtoCaching: Wireless Video Content Delivery through Distributed Caching Helpers", INFOCOM, 2012 Proceedings IEEE.
Gritzalis, Dimitris et al., "The Sphinx enigma in critical VoIP infrastructures: Human or botnet?." Information, Intelligence, Systems and Applications (IISA), 2013 Fourth International Conference, IEEE, 2013.
Hautakorpi, Jani et al., "Requirements from Session Initiation Protocol (SIP) Session Border Control (SBC) Deployments." RFC5853, IETF (2010).
Hawrylyshen, A. et al., "SIPPING Working Group J. Hautakorpi, Ed. Internet-Draft G. Camarillo Intended status: Informational Ericsson Expires: Dec. 18, 2008 R. Penfield Acme Packet." (2008).
Jin, Yu et al., "Nevermind, the Problem Is Already Fixed: Proactively Detecting and Troubleshooting Customer DSL Problems", ACM CoNEXT, Philadelphia, USA, Nov.-Dec. 2010, 12 pages.
Kamilaris, et al., "Exploring the Use of DNS as a Search Engine for the Web of Things." Internet of Things (WF-IoT), 2014 IEEE World Forum on. IEEE, 2014.
Mokhtarian, Kianoosh et al., "Caching in Video CDNs: Building Strong Lines of Defense", EuroSys 2014, Apr. 13-16, 2014, Amsterdam, Netherlands.
Paul, Sanjoy et al., "The Cache-and-Forward Network Architecture for Efficient Mobile Content Delivery Services in the Future Internet", Innovations in NGN: Future Network and Services, 2008. K-INGN 2008. First ITU-T Kaleidoscope Academic Conference.
"A New Approach to Outdoor DAS Network Physical Layer Using E-Line Technology", Corridor Systems, Mar. 2011, 5 pages.
"Cisco IP VSAT Satellite WAN Network Module for Cisco Integrated Services Routers", http://www.cisco.com/c/en/us/products/collateral/interfaces-modules/ip-vsatsatellite-wan-module/product_data_sheet0900aecd804bbf6f.html, Jul. 23, 2014.
"Exacter Outage-Avoidance System", http://www.epri.com/abstracts/Pages/ProductAbstract.aspx?ProductId=000000000001020393, Nov. 30, 2009.
"Ipitek All-Optical Sensors", http://www.ipitek.com/solutions-by-industry/all-optical-sensors; Jun. 2, 2014.
"RF Sensor Node Development Platform for 6LoWPAN and 2.4 GHz Applications", http://www.ti.com/tool/TIDM-RF-SENSORNODE, Jun. 2, 2014.
"Wireless powerline sensor", wikipedia.org, http://en.wikipedia.org/wiki/Wireless_powerline_sensor, 2014, 3 pages.
Bach, Christian , "Current Sensor—Power Line Monitoring for Energy Demand Control", Application Note 308, http://www.enocean.com/fileadmin/redaktion/pdf/app_notes/AN308_CURRENT_SENSOR_Jan09.pdf, Jan. 2009, 4 pages.
Chiba, Jiro , "Experimental Studies of the Losses and Radiations Due to Bends in the Goubau Line", IEEE Transactions on Microwave Theory and Techniques, Feb. 1977, 94-100.
Chiba, Jiro , "On the Equivalent Circuit for the G-Line Above Ground", International Wroclaw Symposium on Electromagnetic Compatibility, 1998, 78-82.
Elmore, Glenn , "Introduction to the Propagating Wave on a Single Conductor", www.corridor.biz, Jul. 27, 2009, 30 pages.
Friedman, M. et al., "Low-Loss RF Transport Over Long Distances", IEEE Transactions on Microwave Theory an Techniques, vol. 49, No. 2, Feb. 2001, 341-348.
Izumiyama, Hidetaka et al., "Multicast over satellite", Applications and the Internet, 2002.(SAINT 2002). Proceedings. 2002 Symposium on. IEEE, 2002.
Jawhar, Imad et al., "A hierarchical and topological classification of linear sensor networks", Wireless Telecommunications Symposium, WTS, IEEE, http://faculty.uaeu.ac.ae/Nader_M/papers/WTS2009.pdf, 2009, 8 pages.
Jee, George et al., "Demonstration of the Technical Viability of PLC Systems on Medium- and Low-Voltage Lines in the United States", Broadband is Power: Internet Access via Power Line Networks, IEEE Communication Magazine, May 2003, 5 pages.
Kuhn, Marc et al., "Power Line Enhanced Cooperative Wireless Communications", IEEE Journal on Selected Areas in Communications, vol. 24, No. 7, Jul. 2006, 10 pages.
Patel, Shwetak N. et al., "The Design and Evaluation of an End-User-Deployable, Whole House, Contactless Power Consumption Sensor", CHI 2010: Domestic Life, Apr. 2010, 10 pages.
Rappaport, Theodore S. et al., "Mobile's Millimeter-Wave Makeover", Spectrum.IEEE.Org; Sep. 2014.
Sagar, Nishant , "Powerline Communications Systems: Overview and Analysis", Thesis, May 2011, 80 pages.
Sarafi, Angeliki M. et al., "Hybrid Wireless-Broadband over Power Lines: A Promising Broadband Solution in Rural Areas", IEEE Communications Magazine, Nov. 2009, 8 pages.
Sommerfeld, A. , "On the propagation of electrodynamic waves along a wire", Annals of Physics and Chemistry New Edition, vol. 67, No. 2, 1899, 72 pages.
Yang, , "Power Line Sensor Networks for Enhancing Power Line Reliability and Utilization", Georgia Institute of Technology, https://smartech.gatech.edu/bitstream/handle/1853/41087/Yang_Yi_2011_08 phd.pdf, Apr. 26, 2011, 264 pages.
Yang, et al., "Power line sensornet—a new concept for power grid monitoring", IEEE Power Engineering Society General Meeting, 2006, pp. 8.
Zhao, et al., "Energy harvesting for a wireless-monitoring system of overhead high-voltage power lines", IET Generation, Transmission & Distribution 7, IEEE Xplore Abstract, 2013, 2 pages.
"An Improved Solid Dielectric Lens Impulse Radiating Antenna,"SBIR/STTR, DoD, sbir.gov, 2004.
"Cband & L/Sband Telemetry Horn Antennas," mWAVE, mwavellc.com, Jul. 6, 2012, http://www.mwavellc.com/custom-Band-LS--BandTelemetryHornAntennas.php.
"Dielectric Antenna," Microwave Technologies, Ind., microwavetechnologiesinc.co.in http://www.microwavetechnologiesinc.co.in/microwavecom-municationlabproducts.html#dielectricantenna, May 21, 2015.
"Horn Antennas," Steatite QPar Antennas, steatiteqparantennas.co.uk, http://www.steatiteqparantennas.co.uk/products_hornantennas.html? http://www.steatiteqparantennas.co.uk/consultancy/customhornantennas/, May 21, 2015.
"How is ELine Different?," ELine Corridor Systems, corridor.biz http://www.corridor.biz/ELine_is_different.html, Apr. 23, 2015.
"Identity Management," Tuomas Aura CSE-C3400 Information Security, Aalto University, Autumn 2014, 33 pgs.
"Power Communication," Communication Power Solutions, Inc., cpspower.biz, http://www.cpspower.biz/services/powercommunications/, Oct. 2013.
"Power Line Communications," Atmel®, atmel.com http://www.atmel.com/products/smartenergy/powerlinecommunications/default.aspx, 2015.
"Power line communications: An overview Part I." King Fahd University of Petroleum and Minerals, Dhahran, KSA, 2008.

(56) References Cited

OTHER PUBLICATIONS

"Powerline Communication," Cypress Perform, cypress.com http://www.cypress.com/?id=2330, Apr. 23, 2015.
"Products: GSM Mircro Repeater." L-TEL: Quanzhou L-TEL Communication Equipment Co., Ltd., l-tel.com, Apr. 24, 2015.
"Waveguide-fed Conical Horn," Antenna Magus, antennamagus.com, ©2015, accessed: Aug. 2015.
"Product Abstract—Program on Technology Innovation: Study on the Integration of High Temperature Superconducting DC Cables Within the Eastern and West urn North American Power Grids." EPRI—Electronic Power Research Institute, epri.com, Product ID:10203, Nov. 25, 2009.
"About Firelight Media Group", http://www.insu ra ncetechnologies.com/Products/Prod ucts_firelight_overview .s.html, Firelight®. Insurance Technologies, LLC,, Apr. 19, 2015.
"Asahi Multi-Core Fiber Cable", Industrial Fiber optics, i-fiberoptics.com http://i-fiberoptics.com/m u lti-core-fi ber-ca ble.ph p, Apr. 26, 2015.
"Denso", Winn & Coales (Denso) Ltd. UK, denso.net, http://www.denso.net/voidfiller/voidpump.htm, 2015, 1 page.
"Detecting and Preventing MAC Spoofing", Detecting and Preventing MAC Spoofing | Network Access Control Solutions, infoexpress, 2014.
"Electronic Business Fulfillment FireLight ®", Firelight Media Group LLC, firelightmedia.net http://www .firelightmedia .net/fmg/index.php/home, Apr. 19, 2015, 2 pages.
"Elliptical Polarization", "Elliptical Polarization" Wikipedia, <http://en.wikipedia.org/wiki/Elliptical_polarization>, Apr. 21, 2015, 3 pgs.
"How to Use STUF", STUF Page Link Info, crossdevices.com, http://www.crossdevices.com/cross_devices_010.htm, 2015, 1 page.
"Network technology", nbnTM, nbnco.com.au, Jun. 27, 2014.
"Powerline—Juice Up Your Network With Powerline", Netgear®, netgear.com http://www.netgear.com/home/products/networking/powerline/, Apr. 21, 2015, 3 pages.
"Resilience to Smart Meter Disconnect Attacks", ADSC Illinois at Singapore PTE, LTD., publish.illinois.edu http://publish.illinois.edu/integrativesecurityassessment/resiliencetosmartmeterdisconnectattacks/, 2015.
"Tapered waveguide", Lumerical Solutions, Inc., docs.lumerical.com, 2010.
"Tapered Waveguides Improve Fiber Light Coupling Efficiency", Tech Briefs, techbriefs.com, Jan. 1, 2006, Molex Inc., Downers Grove, Illinois and KiloLambda Technologies Ltd., Tel Aviv, Israel.
Akiba, Shigeyuki et al., "Photonic Architecture for Beam Forming of RF Phased Array Antenna", Optical Fiber Communication Conference. Optical Society of America, 2014.
Alam, M.N. et al., "Novel surface wave exciters for power line fault detection and communications." Antennas and Propagation (APSURSI), 2011 IEEE International Symposium on. IEEE, 2011.
Ali, Muhammad Q. et al., "Randomizing AMI configuration for proactive defense in smart grid", Smart Grid Communications (SmartGridComm), 2013 IEEE International Conference on. IEEE, http://ieeexplore.ieee.org/xpl/login.jsp?tp=&arnumber=6688027, 2013.
Angove, Alex , "Direct Bury Duct Assemblies, MPB 302 3+—Ribbonet Microducts", Ericsson, archive.ericsson.net, Jul. 30, 2014.
Angove, Alex , "How the NBN Differs from ADSL2+, Cable and Wireless", Whistle Out, whistleout.com.au, Jul. 30, 2014.
Arage, Alebel et al., "Measurement of wet antenna effects on millimetre wave propagation", Radar, 2006 IEEE Conference on IEEE, 2006.
Arthur, Joseph Kweku , "Improving QoS in UMTS Network in ACCRA Business District Using Tower-Less Towers", IPASJ International Journal of Electrical Engineering (IIJEE), vol. 2, Issue 11, Nov. 2014.
Asadallahi, Sina et al., "Performance comparison of CSMA/CA Advanced Infrared (AIr) and a new pointtomultipoint optical MAC protocol." Wireless Communications and Mobile Computing Conference.(IWCMC), 2012 8th International. IEEE, 2012.
Atwater, Harry A. , "The promise of plasmonics." Scientific American 296.4 (2007): 56-62.
Barron, Ashleigh L. , "Integrated Multicore Fibre Devices for Optical Trapping", Diss. Heriot-Watt University, 2014, 11-15.
Beal, J.C. et al., "Coaxial-slot surface-wave launcher", Electronics Letters 4.25 (1968): 557559.
Bhushan, Naga , "Network densification: the dominant theme for wireless evolution into 5G", Communications Magazine, IEEE 52.2 (2014): 82-89.
Bing, Benny , "Ubiquitous Broadband Access Networks with Peer-to-Peer Application Support", Evolving the Access Network (2006): 27-36.
Bock, James et al., "Optical coupling." Journal of Physics: Conference Series. vol. 155. No. 1. IOP Publishing, 2009.
Bowen, Leland H. et al., "A Solid Dielectric Lens Impulse Radiating Antenna with High Dielectric Constant Surrounded by a Cylindrical Shroud," Sensor and Simulation Note 498, Apr. 2005.
Bridges, Greg E. et al., "Plane wave coupling to multiple conductor transmission lines above a lossy earth", Compatibility, IEEE Transactions on 31.1, 1989, 21-33.
Brooke, Gary H. , Properties of surface waveguides with discontinuities and perturbations in cross-section. Diss. University of British Columbia, 1977.
Brown, J. et al., "The launching of radial cylindrical surface waves by a circumferential slot", Proceedings of the IEE Part B: Radio and Electronic Engineering 106.26 (1959): 123128.
Bruno, Joseph , "Interference Reduction in Wireless Networks", Computing Research Topics, Computing Sciences Department, Villanova University, Nov. 14, 2007, 8 pages.
Burkhart, Martin et al., "Does Topology Control Reduce Interference?", Department of Computer Science, ETH Zurich, Proceedings of the 5th ACM international symposium on Mobile ad hoc networking and computing, ACM, 2004, 11 pages.
Callis, et al., "An In-Line Power Monitor for HE11 Low Loss Transmission Lines", Proceedings of the 29th International Conference on Infrared and Millimeter Waves (IRMMW), Karlsruhe, Germany, 2004.
Carroll, John M. et al., "Developing the Blacksburg electronic village", Communications of the ACM 39.12 (1996): 69-74.
Chen, Dong et al., "A trust management model based on fuzzy reputation for internet of things", Computer Science and Information Systems 8.4 (2011): 12071228.
Chen, Yingying , "Detecting and Localizing Wireless Spoofing Attacks", Sensor, Mesh and Ad Hoc Communications and Networks, 2007, SECON'07. 4th Annual IEEE Communications Society Conference on IEEE, 2007, 10 pages.
Cimini, Carlos Alberto et al., "Temperature profile of progressive damaged overhead electrical conductors", Journal of Electrical Power & Energy Systems 49 (2013): 280-286.
Covington, Michael J. et al., "Threat implications of the internet of things", Cyber Conflict (CyCon), 2013 5th International Conference on. IEEE, 2013.
Crane, Robert K. , "Analysis of the effects of water on the ACTS propagation terminal antenna", Antennas and Propagation, IEEE Transactions on 50.7 (2002): 954965.
De Sabata, Aldo et al., "Universitatea Politehnica", din Timişoara Facultatea de Electronică şi Telecomunicaţii, 2012.
Doane, J.L. et al., "Oversized rectangular waveguides with modefree bends and twists for broadband applications", Microwave Journal 32(3), 1989, 153-160.
Dostert, Klaus , "Frequency-hopping spread-spectrum modulation for digital communications over electrical power lines." Selected Areas in Communications, IEEE Journal on 8.4 (1990): 700-710.
Dragoo, R.E. et al., "Fiber Optic Data Bus for the AN/GYQ21(V)." Harris Corp, U.S. Communications Syst. Div. Chart, Microcopy Resolution Test, 1980.
Dutton, Harry Jr. , "Understanding Optical Communications", International Technical Support Organization, SG24-5230-00, Sep. 1998.

(56) References Cited

OTHER PUBLICATIONS

Erickson, Katherine , "Conductive cylindrical surface waveguides." (2012). https://www.ideals.illinois.edu/bitstream/handle/2142/30914/Erickson_Katherine.pdf?sequence=1.

Erickson, Katherine , "Conductive cylindrical surface waveguides", 2012.

Eskelinen, Harri , "DFM (A)-aspects for a horn antenna design," Lappeenranta University of Technology, 2004.

Eskelinen, P. , "A low-cost microwave rotary joint," International Radar Conference, Oct. 13-17, 2014, p. 1-4.

Feng, Taiming et al., "Design of a survivable hybrid wireless-optical broadband-access network", Journal of Optical Communications and Networking 3.5, 2011, 458-464.

Fenye, Bao et al., "Dynamic trust management for internet of things applications", Proceedings of the 2012 international workshop on Selfaware internet of things. ACM, 2012.

Freyer, Dan , "Combating the Challenges of Ka-Band Signal Degradation", SatMagazine, satmagzine.com, Sep. 2014.

Fromm, W. et al., "A new microwave rotary joint," 1958 IRE International Convention Record, Mar. 21-25, 1966, 6:78-82.

Ghazisaidi, Navid et al., "Survivability analysis of next-generation passive optical networks and fiber-wireless access networks", Reliability, IEEE Transactions on 60.2, 2011, 479-492.

Gomes, Nathan J. et al., "Radio-over-fiber transport for the support of wireless broadband services", Journal of Optical Networking 8.2 (2009): 156-178.

Gonthier, François et al., "Mode coupling in nonuniform fibers: comparison between coupled-mode theory and finite-difference beam-propagation method simulations", JOSA B 8.2 (1991): 416421.

Han, Chong et al., "crosslayer communication module for the Internet of Things", Computer Networks 57.3 (2013): 622633.

Haroun, Ibrahim et al., "WLANs meet fiber optics-Evaluating 802.11.A WLANs over fiber optics links", RF Des. Mag (2003): 36-39.

Hassan, Karim , "Fabrication and characterization of thermoplasmonic routers for telecom applications", Diss. Univ. de Bourgogne, 2014.

Hassan, Maaly A. , "Interference reduction in mobile ad hoc and sensor networks", Journal of Engineering and Computer Innovations vol. 2(7), Sep. 2011, 138-154.

Hassani, Alireza et al., "Porous polymer fibers for low-loss Terahertz guiding." Optics express 16.9 (2008): 6340-6351.

Hoss, R.J. et al., "Manufacturing Methods and Technology Program for Ruggedized Tactical Fiber Optic Cable", No. ITT-80-03-078. ITT Electrooptical Products DIV Roanoke VA, 1980.

Ippolito, Louis J. , "Propagation effects handbook for satellite systems design. A summary of propagation impairments on 10 to 100 GHz satellite links with techniques for system design", 1989.

Jackson, Mark , "Timico CTO Hit by Slow FTTC Broadband Speeds After Copper Corrosion", ISP review, ispreview.co.uk, Mar. 5, 2013.

Jaeger, Raymond et al., "Radiation Performance of Germanium Phosphosilicate Optical Fibers." RADC-TR-81-69: Final Technical Report, Galileo Electro-Optical Corp, (May 1981).

James, J.R. et al., "Investigations and Comparisons of New Types of Millimetre-Wave Planar Arrays Using Microstrip and Dielectric Structures", Royal Military Coll of Science Shrivenham (England), 1985.

Jang, Hung-Chin , "Applications of Geometric Algorithms to Reduce Interference in Wireless Mesh Network", Journal on Applications of Graph Theory in Wireless Ad hoc Networks and Sensor Networks (JGRAPH-HOC) vol. 2, No. 1, Mar. 2010.

Jeong, et al., "Study of elliptical polarization requirement of KSTAR 84-GHz ECH system", Journal-Korean Physical Society 49, 2006.

Jin, , "Quasi-optical mode converter for a coaxial cavity gyrotron", Forschungszentrum, 2007.

Kang, , "Chapter 6: Array Antennas," IHS Engineering360, globalspec.com, http://www.globalspec.com/reference/75109/203279/chapter-6-array-antennas, Apr. 22, 2015.

Khan, , "Dual polarized dielectric resonator antennas", Chalmers University of Technology, 2010.

Kikuchi, H. et al., "Hybrid transmission mode of Goubau lines",J. Inst.Electr.Comm.Engrs., Japan,vol. 43, pp. 39-45,1960.

Kirkham, H. et al., "Power system applications of fiber optics (Jet Propulsion Lab." JPL Publication 84-28, Electric Energy Systems Division, U.S. DoE, p. 180, (1984).

Koshiba, Masanori et al., "Analytical expression of average power-coupling coefficients for estimating intercore crosstalk in multicore fibers", Photonics Journal, IEEE 4.5, 2012, 1987-1995.

Kroon, Barnard et al., "Steady state RF fingerprinting for identity verification: one class classifier versus customized ensemble." Artificial Intelligence and Cognitive Science. Springer Berlin Heidelberg, 2010. 198206.

Kroyer, Thomas , "A Waveguide High Order Mode Reflectometer for the Large Hadron Collider Beam-pipe", Diss. TU Wien, 2003.

Lappgroupusa, "Selection of Numebers of Cable Cores With Emphasis on Sizing Parameters", Industrial Cable & Connector Technology News, lappconnect.blogspot.com, http://lappconnect.blogspot.com/2014_10_01_archive.html, Oct. 30, 2014.

Leech, Jamie et al., "Experimental investigation of a low-cost, high performance focal-plane horn array." Terahertz Science and Technology, IEEE Transactions on 2.1 (2012): 61-70.

Li, Xiang-Yang et al., "Interference-Aware Topology Control for Wireless Sensor Networks", SECON. vol. 5, 2005.

Li, Xiaowei et al., "Integrated plasmonic semi-circular launcher for dielectric-loaded surface plasmonpolariton waveguide", Optics express 19.7 (2011): 65416548.

Li, Xu et al., "Smart community: an internet of things application", Communications Magazine, IEEE 49.11 (2011): 68-75.

Lier, E. et al., "Simple hybrid mode horn feed loaded with a dielectric cone," Electronics Letters 21.13 (1985): 563564.

Lim, Christina et al., "Fiber-wireless networks and subsystem technologies", Lightwave Technology, Journal of 28.4 (2010): 390-405.

Lou, Tiancheng , "Minimizing Average Interference through Topology Control", Algorithms for Sensor Systems, Springer Berlin Heidelberg, 2012, 115-129.

Luo, Qi et al., "Circularly polarized antennas", John Wiley & Sons, 2013.

Mahato, Suvranshu Sekhar , Studies on an Infrared Sensor Based Wireless Mesh Network. Diss. 2010.

Maier, Martin et al., "The audacity of fiberwireless (FiWi) networks", AccessNets. Springer Berlin Heidelberg, 2009. 16-35.

Marcatili, E.A. et al., "Hollow Metallic and Dielectric Waveguides for Long Distance Optical Transmission and Lasers", Bell System Technical Journal 43(4), 1964, 1783-1809.

McAllister, M.W. et al., "Resonant hemispherical dielectric antenna," Electronics Letters 20.16 (1984): 657659.

Meng, H. et al., "A transmission line model for high-frequency power line communication channel", Power System Technology, PowerCon 2002. International Conference on. vol. 2. IEEE, 2002. http:/ /infocom. uniroma 1.it/ ""enzobac/MengChen02. pdf, 2002.

Menon, S.S. et al., "Propagation characteristics of guided modes in a solid dielectric pyramidal horn," Proceedings of the 2012 International Conference on Communication Systems and Network Technologies. IEEE Computer Society, 2012.

Mitchell, John E. , "Integrated Wireless Backhaul Over Optical Access Networks", Journal of Lightwave Technology 32.20, 2014, 3373-3382.

Miyagi, M. , "Bending losses in hollow and dielectric tube leaky waveguides", Applied Optics 20(7), 1981, 1221-1229.

Moaveni-Nejad, Kousha et al., "Low-Interference Topology Control for Wireless Ad Hoc Networks", Department of Computer Science, Illinois Institute of Technology, Ad Hoc & Sensor Wireless Networks 1.1-2, 2005, 41-64.

Moisan, M. et al., "Plasma sources based on the propagation of electromagnetic surface waves", Journal of Physics D: Applied Physics 24.7 (1991): 1025.

(56) References Cited

OTHER PUBLICATIONS

Morse, T.F. , "Research Support for the Laboratory for Lightwave Technology." Brown Univ Providence RI Div of Engineering, 1992.
Mruk, Joseph Rene , "Wideband monolithically integrated frontend subsystems and components", Diss. University of Colorado, 2011.
Nachiketh, P. et al., "Optimizing public-key encryption for wireless clients", Proceedings of the IEEE International Conference on Communications (ICC 2002). No. 1. 2002.
Narayanan, Arvind , "Fingerprinting of RFID Tags and HighTech Stalking." 33 Bits of Entropy, 33bits.org, Oct. 4, 2011.
Nassa, Vinay Kumar , "Wireless Communications: Past, Present and Future", Dronacharya Research Journal: 50. vol. III, Issue-II, Jul.-Dec. 2011.
Nibarger, John P. , "An 84 pixel all-silicon corrugated feedhorn for CMB measurements." Journal of Low Temperature Physics 167.3-4 (2012): 522-527.
Nuvotronics, "PolyStrata—Phased Arrays & Antennas", Nuvotronics, nuvotronics.com http://www.nuvotronics.com/antennas.php, Apr. 26, 2015.
Olver, A. D. , "Microwave horns and feeds," vol. 39. IET, 1994.
Olver, A.D. et al., "Dielectric cone loaded horn antennas," Microwaves, Antennas and Propagation, IEE Proceedings H. vol. 135. No. 3. IET, 1988.
Pahlavan, Kaveh et al., "Wireless data communications", Proceedings of the IEEE 82.9 (1994): 1398-1430.
Perkons, Alfred R. et al., "TM surface-wave power combining by a planar active-lens amplifier", Microwave Theory and Techniques, IEEE Transactions on 46.6 (1998): 775783.
Péter, Zsolt et al., "Assessment of the current intensity for preventing ice accretion on overhead conductors", Power Delivery, IEEE Transactions on 22.1 (2007): 565-574.
Petrovsky, Oleg , "The Internet of Things: A Security Overview", w.druva.com, Mar. 31, 2015.
Pham, Tien-Thang et al., "A WDM-PON-compatible system for simultaneous distribution of gigabit baseband and wireless ultrawideband services with flexible bandwidth allocation", Photonics Journal, IEEE 3.1, 2011, 13-19.
Plagemann, Thomas et al., "Infrastructures for community networks", Content Delivery Networks. Springer Berlin Heidelberg, 2008. 367-388.
Pohl, , "A dielectric lens-based antenna concept for high-precision industrial radar measurements at 24GHz," Radar Conference (EuRAD), 2012 9th European, IEEE, 2012.
Prashant, R.R. et al., "Detecting and Identifying the Location of Multiple Spoofing Adversaries in Wireless Network", International Journal of Computer Science and Mobile Applications, vol. 2 Issue. 5, May 2014, 1-6.
Rahim, S. K. A. et al., "Measurement of wet antenna losses on 26 GHz terrestrial microwave link in Malaysia", Wireless Personal Communications 64.2 (2012): 225231.
Rambabu, K. et al., "Compact single-channel rotary joint using ridged waveguide sections for phase adjustment," IEEE Transactions on Microwave Theory and Techniques (Aug. 2003) 51(8):1982-1986.
Raychaudhuri, Dipankar et al., "Emerging Wireless Technologies and the Future Mobile Internet", Cambridge University Press, Mar. 2011.
Raychem, "Wire and Cable", Dimensions 2 (1996): 1.
Reynet, Olivier et al., "Effect of the magnetic properties of the inclusions on the high-frequency dielectric response of diluted composites." Physical Review B66.9 (2002): 094412.
Rouse, Margaret , "Transport Layer Security (TLS)", TechTarget, searchsecurity.techtarget.com, Jul. 2006.
Roze, Mathieu et al., "Suspended core subwavelength fibers: towards practical designs for low-loss terahertz guidance." Optics express 19.10 (2011): 9127-9138.
Sagues, Mikel et al., "Multi-tap complex-coefficient incoherent microwave photonic filters based on optical single-sideband modulation and narrow band optical filtering." Optics express 16.1 (2008): 295-303.
Saied, Yosra Ben et al., "Trust management system design for the internet of things: a contextaware and multiservice approach", Computers & Security 39 (2013): 351365.
Salema, Carlos et al., "Solid dielectric horn antennas," Artech House Publishers, 1998, Amazon.
Sarafi, A. et al., "Hybrid wireless-broadband over power lines: A promising broadband solution in rural areas." Communications Magazine, IEEE 47.11 (2009): 140-147.
Sarnecki, Joseph et al., "Microcell design principles", Communications Magazine, IEEE 31.4 (1993): 76-82.
Saruhan, Ibrahim Halil , "Detecting and Preventing Rogue Devices on the Network", SANS Institute InfoSec Reading Room, sans.org, Aug. 8, 2007.
Shafi, Mansoor et al., "Advances in Propagation Modeling for Wireless Systems", EURASIP Journal on Wireless Communications and Networking. Hindawi Publishing Corp, 2009, p. 5.
Shimabukuko, F.I. et al., "Attenuation measurement of very low-loss dielectric waveguides by the cavity resonator method in the millimeter/submillimeter wavelength range." No. TR-0086A (2925-06)-1. Aerospace Corp El Segundo CA Electronics Research Lab, 1989.
Shindo, Shuichi et al., "Attenuation measurement of cylindrical dielectric-rod waveguide." Electronics Letters 12.5 (1976): 117-118.
Shumate, Paul W. et al., "Evolution of fiber in the residential loop plant." IEEE Communications Magazine 29.3 (1991): 68-74.
Strieby, M.E. et al., "Television transmission over wire lines." American Institute of Electrical Engineers, Transactions of the 60.12 (1941): 1090-1096.
Szabó, Csaba A. , "European Broadband Initiatives with Public Participation", Broadband Services (2005): 255.
Taboada, John M. et al., "Thermo-optically tuned cascaded polymer waveguide taps." Applied physics letters 75.2 (1999): 163-165.
Templeton, Steven J. et al., "Detecting Spoofed Packets", DARPA Information Survivability Conference and Exposition, vol. 1, IEEE, 2003.
Theoleyr, Fabrice , "Internet of Things and M2M Communications", books.google.com, ISBN13: 9788792982483, Apr. 17, 2013.
Valladares, Cindy , "20 Critical Security Controls: Control 7—Wireless Device Control", Tripwire—The State of Security, tripwire.com, Mar. 21, 2013.
Vogelgesang, Ralf et al., "Plasmonic nanostructures in aperture-less scanning near-field optical microscopy (aSNOM)", physica status solidi (b) 245.10 (2008): 22552260.
Volat, C. et al., "De-icing/anti-icing techniques for power lines: current methods and future direction", Proceedings of the 11th International Workshop on Atmospheric Icing of Structures, Montreal, Canada. 2005.
Wagter, Herman , "Fiber-to-the-X: the economics of last-mile fiber", ARS Technica, arstechnica.com,, Mar. 31, 2010.
Wake, David et al., "Radio over fiber link design for next generation wireless systems", Lightwave Technology, Journal of 28.16 (2010): 2456-2464.
Wang, Jing et al., "The influence of optical fiber bundle parameters on the transmission of laser speckle patterns", Optics express 22.8, 2014, 8908-8918.
Wilkins, George A. , "Fiber Optic Telemetry in Ocean Cable Systems", Chapter in new edition of Handbook of Oceanographic Winch, Wire and Cable Technology, Alan H. Driscoll, Ed.,(to be published by University of Rhode Island) (1986).
Xia, Cen et al., "Supermodes for optical transmission", Optics express 19.17, 2011, 16653-16664.
Yeh, C. et al., "Ceramic Waveguides." Interplanetary Network Progress Report141.26 (2000): 1.
Yu, Shui et al., "Predicted packet padding for anonymous web browsing against traffic analysis attacks", Information Forensics and Security, IEEE Transactions on 7.4, http://nsp.org.au/syu/papers/tifs12.pdf, 2012, 1381-1393.
Zelby, Leon W. , "Propagation Modes on a Dielectric Coated Wire", J. The Franklin Institute, vol. 274(2), pp. 85-97, Aug. 1962.
Zheng, Zhu et al., "Efficient coupling of propagating broadband terahertz radial beams to metal wires", Optics express 21.9 (2013):1064210650.

(56) References Cited

OTHER PUBLICATIONS

Zucker, , "Surface-wave antennas", Antenna engineering handbook 4, 2007.
International Search Report and Written Opinion in PCT/US2016/028417, mailed Jul. 5, 2016, 13 pages, Authorized officer Brigitte Bettiol.
International Search Report PCT/US2016/036292 mailed Sep. 13, 2016.
PCT/US16/027397 International Search Report & Written Opinion mailed Jun. 24, 2016.
PCT/US16/027398 International Search Report and Written Opinion mailed Jun. 24, 2016.
PCT/US16/027403 Internatioanl Search Report & Written Opinion mailed Jun. 22, 2016.
PCT/US16/028395 International Search Report and Written Opinion mailed Jun. 29, 2016.
PCT/US16/032441 International Search Report and Written Opinion mailed Jul. 29, 2016.
PCT/US16/036284 International Search Report & Written Opinion mailed Sep. 8, 2016.
PCT/US16/036388 International Search Report and Written Opinion mailed Aug. 30, 2016.
PCT/US2016/036285 International Search Report and Written Opinion mailed Aug. 23, 2016.
PCT/US2016/036288 International Search Report & Written Opinion mailed Aug. 1, 2016.
PCT/US2016/036290 International Search Report & Written Opinion mailed Aug. 11, 2016.
http://sdpm.arizona.edu/projects/project-public/upid/38a8cf3b42f35576de25delf6dcc20f3, Discloses a project to harvest energy from a power line and that a device was built that clamps onto a power line., 2016.
"Alternative Local Loop Technologies: A Review", Organisation for Economic Co-Operation and Development, Paris, OCDE/GD(96)181, https://www.oecd.org/sti/2090965.pdf, 1996.
"Broadband: Bringing Home the Bits: Chapter 4 Technology Options and.Economic Factors", The National Academies Press, nap.edu, 2002.
"Delivering broadband over existing wiring", Cabling Installation & Maintenance, cablinginstall.com, May 1, 2002.
"Fast Numerical Modeling of a Conical Horns Lens Antenna", Comsol, comsol.com, Application ID: 18695, Sep. 16, 2016.
"Harvest energy from powerline", https://www.physicsforums.com/threads/harvest-energy-from-powerline.685148/, Discussion thread about harvesting power from powerlines that includes the suggestion of clamping a device to the power line., 2013.
"International Preliminary Report on Patentability", PCT/US2014/039746, Dec. 10, 2015.
"International Preliminary Report on Patentability", PCT/US2014/060841, May 19, 2016, 8 pages.
"International Preliminary Report on Patentability & Written Opinion", PCT/US2014/061445, Jun. 23, 2016, 9 pages.
"International Search Report & Written Opinion", PCT/US2015/034827, Sep. 30, 2015.
"International Search Report & Written Opinion", PCT/US2015/056316, Jan. 21, 2016.
"International Search Report & Written Opinion", PCT/US2015/056320, Jan. 29, 2016.
"International Search Report & Written Opinion", PCT/US2015/056365, Jan. 22, 2016.
"International Search Report & Written Opinion", PCT/US2015/056368, Jan. 25, 2016.
"International Search Report & Written Opinion", PCT/US2015/056598, Jan. 28, 2016.
"International Search Report & Written Opinion", PCT/US2015/056615, Jan. 21, 2016.
"International Search Report & Written Opinion", PCT/US2015/056626, Jan. 21, 2016.
"International Search Report & Written Opinion", PCT/US2015/056632, Jan. 26, 2016.
"International Search Report & Written Opinion", PCT/US2016/013988, Apr. 8, 2016.
"International Search Report & Written Opinion", PCT/US2016/036286.
"International Search Report & Written Opinion", PCT/US2016/020001, May 23, 2016.
"International Search Report & Written Opinion", PCT/US2016/026860, Jun. 1, 2016.
"International Search Report & Written Opinion", PCT/US2016/026318, Jun. 15, 2016.
"International Search Report & Written Opinion", PCT/US2016/028412, Jun. 27, 2016.
"International Search Report & Written Opinion", PCT/US2016/028206, Jun. 29, 2016.
"International Search Report & Written Opinion", PCT/US16/033182, Jul. 12, 2016.
"International Search Report & Written Opinion", PCT/US2016/036551, Aug. 11, 2016.
"International Search Report & Written Opinion", PCT/US2016/036798, Aug. 11, 2016.
"International Search Report & Written Opinion", PCT/US2016/028205, Aug. 16, 2016.
"International Search Report & Written Opinion", PCT/US2016/032460, Aug. 17, 2016.
"International Search Report & Written Opinion", PCT/US2016/036303, Aug. 24, 2016.
"International Search Report & Written Opinion", PCT/2016/035383, Sep. 2, 2016.
"International Search Report & Written Opinion", PCT/US2014/039746, Jan. 12, 2015.
"International Search Report & Written Opinion", PCT/US2014/060841, Jan. 7, 2015.
"International Search Report & Written Opinion", PCT/US2015/039848, Oct. 20, 2015.
"International Search Report & Written Opinion", PCT/US2015/047315, Oct. 30, 2015.
"International Search Report & Written Opinion", PCT/US2015/048454, Nov. 11, 2015.
"International Search Report & Written Opinion", PCT/US2015/049928, Nov. 16, 2015.
"International Search Report & Written Opinion", PCT/US2015/049932, Nov. 16, 2015.
"International Search Report & Written Opinion", PCT/US2015/049927, Nov. 24, 2015.
"International Search Report & Written Opinion", PCT/US2015/051193, Nov. 27, 2015.
"International Search Report & Written Opinion", PCT/US2015/051146, Dec. 15, 2015.
"International Search Report & Written Opinion", PCT/US2015/051183, Dec. 15, 2015.
"International Search Report & Written Opinion", PCT/US2015/051194, Dec. 15, 2015.
"International Search Report & Written Opinion", PCT/US2015/051578, Dec. 17, 2015.
"International Search Report & Written Opinion", PCT/US2015/051583, Dec. 21, 2015.
"International Search Report & Written Opinion", PCT/US2015/048458, Dec. 23, 2015.
"International Search Report & Written Opinion", PCT/US2015/051213, Dec. 4, 2015.
"International Search Report & Written Opinion", PCT/US2015/051163, Dec. 7, 2015.
"International Search Report & Written Opinion", PCT/US2014/061445, Feb. 10, 2015.
"International Search Report & Written Opinion", PCT/US16/28207, Jun. 15, 2016.
"International Search Report & Written Opinion", PCT/US2016/015501, Apr. 29, 2016, 11 pages.
"International Search Report & Written Opinion", PCT/US2015/047225, mailed Nov. 6, 2015, Nov. 6, 2015.
"International Search Report and Written Opinion", PCT/US2016/028197, Jun. 24, 2016.

(56) References Cited

OTHER PUBLICATIONS

"International Search Report and Written Opinion", PCT/US2016/036289, Aug. 11, 2016.
"International Search Report and Written Opinion", PCT/US2016/036295, Aug. 30, 2016.
"International Search Report and Written Opinion", PCT/US2016/030964, Aug. 4, 2016.
"International Search Report and Written Opinion", mailed Aug. 30, 2016, 1-14.
"Invitation to Pay Additional Fees & Partial Search Report", PCT/US2016/028205, Jun. 22, 2016.
"Invitation to Pay Additional Fees & Partial Search Report", PCT/US2016/032430, Jun. 22, 2016.
"Invitation to Pay Additional Fees and, Where Applicable, Protest Fee", PCT/US2016/035384, Aug. 31, 2016, 7 pages.
"Lens Antennas", Altair, feko.info, Jun. 30, 2014, 2 pages.
"PCT International Search Report & Written Opinion", PCT/US2016/026193, Jun. 1, 2016.
"PCT Search Report and Written opinion", PCT/US2016/036297, Sep. 5, 2016.
"Transducer", IEEE Std 100-2000, Sep. 21, 2015, 1154.
"Troubleshooting Problems Affecting Radio Frequency Communication", cisco.com, Oct. 19, 2009.
"Waveguide Bragg Microcavity", lumerical.com, Sep. 2016.
Benevent, Evangèline "Transmission lines in MMIC technology", Università Mediterranea di Reggio Calabria, Jan. 28, 2010.
Berweger, Samuel et al., "Light on the Tip of a Needle: Plasmonic Nanofocusing for Spectroscopy on the Nanoscale", The Journal of Physical Chemistry Letters; pubs.acs.org/JPCL, 2012, 945-952.
Blattenberger, Kirt "DroneBased Field Measurement System™ (dBFMS)™," RF Cafe, rfcafe.com, Jul. 29, 2014.
Brambilla, Gilberto et al., "Ultra-low-loss optical fiber nanotapers", Optoelectronics Research Centre, University of Southampton; http://www.orc.soton.ac.uk, vol. 12, No. 10, May 7, 2004, 2258-2263.
Capece, P. et al., "FDTD Analysis of a Circular Coaxial Feeder for.Reflector Antenna", Antennas and Propagation Society International Symposium, IEEE Digest, vol. 3, 1997, pp. 1570-1573.
Chandra, Shekar "Transmission Line Fault Detection & Indication through GSM", IRD India, ISSN (Online): 2347-2812, vol. 2, Iss. 5, 2014.
Choudhury, Romit R. "Utilizing Beamforming Antennas for Wireless Mult-hop Networks", www.slideserve.com, Sep. 20, 2012,.
Chu, Eunmi et al., Self-organizing and self-healing mechanisms in cooperative small cell networks. PIMRC. 2013.
Cliff, Oliver M. et al., "Online localization of radio-tagged wildlife with an autonomous aerial robot system," Proceedings of Robotics Science and Systems Xi (2015): 1317.
Daniel, Kai et al., "Using Public Network Infrastructures for UAV Remote Sensing in Civilian Security Operations", Homeland Security Affairs, Supplement 3, Mar. 2011, 11 pages.
Doshi, D.A. et al., "Real Time Fault Failure Detection in Power Distribution Line using Power Line Communication", International Journal of Engineering Science 4834, 2016,.
Farzaneh, Masoud et al., "Systems for Prediction and Monitoring of Ice Shedding, Anti-Cicing and De-Icing for Power Line Conductors and Ground Wires", Dec. 1, 2010, 1-100.
Feng, Wei et al., Downlink power allocation for distributed antenna systems in a multi-cell environment. 2009 5th International Conference on Wireless Communications, Networking and Mobile Computing. IEEE, 2009., 2009.
Fitzgerald, William D. "A 35-GHz Beam Waveguide System for the Millimeter-Wave Radar", The Lincoln Laboratory Journal, vol. 5, No. 2, 1992, 245-272.
Ford, Steven At&T's new antenna system will boost cellular. coverage at Walt.Disney World. Orlando Sentinel, orlandosentinel.com, Mar. 9, 2014., 2014.
Friedman, M et al., "Low-Loss Rf Transport Over Long Distances", IEEE Transactions on Microwave Theory and Techniques, vol. 49, No. 2, Feb. 2001, 8 pages.
Geterud, Erik "Design and Optimization of Wideband Hat-Fed Reflector Antenna with Radome for Satellite Earth Station", http://publications.lib.chalmers.se/records/fulltext/163718.pdf, Discloses Frequency Selective Surfaces for antenna coverings for weather protection (table of materials on p. 29-30; pp. 37-46)., 2012.
Gloeckler, R "Phased Array for Millimeter Wave Frequencies", International Journal of Infrared and Millimeter Waves, Springer, vol. 11, No. 2, Feb. 1, 1990.
Hadi, Ghozali S. et al., "Autonomous UAV System Development for Payload Dropping Mission", The Journal of Instrumentation, Automation and Systems, vol. 1, No. 2, 2014, pp. 72-22.
Haider, Muhammad Kumail et al., Mobility resilience and overhead constrained adaptation in directional 60 GHz WLANs: protocol design and system implementation. Proceedings of the 17th ACM International Symposium on Mobile Ad Hoc Networking and Computing. ACM, 2016., 2016.
Howard, Courtney "UAV command, control & communications", Military & Aerospace Electronics, militaryaerospace.com, Jul. 11, 2013, 15 pages.
James, J. R. et al., "Investigations and Comparisons of New Types of Millimetre-Wave Planar Arrays Using Microstrip and Dielectric. Structures", Royal Military College of Science, Apr. 1985, 122 pages.
Jones, Jr., Howard S. "Conformal and Small Antenna Designs", U.S. Army Electronics Research and Development Command, Harry Diamond Laboratories, Apr. 1981, 32 pages.
Kima, Yi-Gon et al., "Generating and detecting torsional guided waves.using magnetostrictive sensors of crossed coils", Chonnam National University, Republic of Korea, Elsevier Ltd., 2010.
Kliros, George "Dielectric-EBG covered conical antenna for UWB applications", https://www.researchgate.net/profile/George_Kliros/publication/235322849_Dielectric-EBG_covered_conical_antenna_for_UWB_applications/links/54329e410cf225bddcc7c037.pdf, Discloses a quasi-planar wideband conical antenna coated with alternating high- and low-permittivity dielectric spherical shells (Section 2; Figure 1 on the 3rd Page)., 2010.
Kune, Denis F. et al., "Ghost Talk: Mitigating EMI Signal Injection. Attacks against Analog Sensors", 2013 IEEE Symposium on Security.And Privacy, 145-159.
Lee, Joseph C. "A Compact Q-/K-Band Dual Frequency Feed Horn", No. TR-645, Massachusetts Institute of Technology, Lincoln Laboratory, May 3, 1983, 40 pages.
Li, Xi et al., A FCM-Based peer grouping scheme for node failure recovery in wireless P2P file sharing. 2009 IEEE International Conference on Communications. IEEE, 2009., 2009.
Liu, et al., A 25 Gb/s (/km 2) urban wireless network beyond IMTadvanced. IEEE Communications Magazine 49.2 (2011): 122-129.
Matsukawa, et al., A dynamic channel assignment scheme for distributed antenna networks. Vehicular Technology Conference (VTC Spring), 2012 IEEE 75th. IEEE, 2012.
Miller, David A. "Establishing Optimal Wave Communication Channels Automatically", Journal of Lightwave Technology, vol. 31, No. 24, Dec. 15, 2013, 3987-3994.
Mushref, Muhammad "Matrix solution to electromagnetic scattering by a conducting cylinder with an eccentric metamaterial coating", http://www.sciencedirect.com/science/article/pii/S0022247X06011450/pdf?md5=4823be0348a3771b5cec9ffb7f326c2c&pid=1-s2.0-S0022247X06011450-main.pdf, Discloses controlling antenna radiation pattern with coatings, 2007.
Nakano, Hisamatsu "http://repo.lib.hosei.ac.jp/bitstream/10114/3835/1/31_TAP(Low-Profile).pdf", Discloses affecting radiation patterns with alternating high- and low-permittivity dielectric shell coatings and formulae for dterimining the results (Figures 2-5 on p. 1865)., 2000.
Nikitin, A. Y. et al., "Efficient Coupling of Light to Graphene Plasmons by Compressing Surface Polaritons with Tapered Bulk Materials", NanoLetters; pubs.acs.org/NanoLett, Apr. 28, 2014, 2896-2901.

(56) References Cited

OTHER PUBLICATIONS

Pato, et al., On building a distributed antenna system with joint signal processing for next generation wireless access networks: The FUTON approach. 7th Conference on Telecommunications, Portugal. 2008.

Pike, Kevin J. et al., "A spectrometer designed for 6.7 and 14.1 T DNP-enhanced solid-state MAS NMR using quasi-optical microwave.transmission", Journal of Magnetic Resonance, 2012, 9 pages.

Ponchak, George E. et al., "A New Model for Broadband Waveguide to Microstrip Transition Design", NASA TM-88905, Dec. 1, 1986, 18 pgs.

Rosenberg, Uwe et al., "A novel frequency-selective power combiner/divider in single-layer substrate integrated waveguide.technology", IEEE Microwave and Wireless Components Letters, vol. 23, No. 8, Aug. 2013, 406-408.

Scerri, Paul et al., "Geolocation of RF emitters by many UAVs,"AIAA Infotech@Aerospace 2007 Conference and Exhibit, 2007.

Shankland, Steven "Lowly DSL poised for gigabit speed boost", CiNet, cnet.com, Oct. 21, 2014.

Silver, Ralph U. "Local Loop Overview", National Communications System (NCS), BellSouth Network Training, newnetworks.com, Aug. 2016.

Spencer, D G. "Novel Millimeter ACC Antenna Feed", IEEE Colloquium on Antennas for Automotives, Mar. 10, 2000.

Sundqvist, Lassi "Cellular Controlled Drone Experiment: Evaluation of Network Requirements," (2015).

Szczys, Mike "Cameras Perch on Power Lines, Steal Electricity", http://hackaday.com/2010/06/28/cameras-perch-on-power-lines-steal-electricity/, Discloses cameras that clamp on to power lines and use induction as a power source., 2010.

Talbot, David "Adapting Old-Style Phone Wires for Superfast. Internet", Adapting Old-Style Phone Wires for Superfast Internet, Jul. 30, 2013.

Tantawi, Sami G. et al., "High-power multimode X-band rf pulse compression system for future linear colliders", Physical Review Special Topics-Accelerators and Beams, 1098-4402/05/8(4)/042002, 2005, 19 pages.

Wang, Wei "Optimization Design of an Inductive Energy Harvesting Device for Wireless Power Supply System Overhead High-Voltage Power Lines", https://pdfs.semanticscholar.org/3941/601af7a21d55e8b57ab0c50d5f1d9f9f6868.pdf, Discloses an induction based energy harvesting device that.takes energy from overhead powerlines (Figure 4)., 2016.

Werner, Louis B. et al., "Operation Greenhouse", Scientific Director's Report of Atomic Weapon Tests at Eniwetok, Annex 6.7 Contimation-Decontamination Studies Naval Radiological Defense Lab, 1951.

Wolfe, Victor et al., "Feasibility Study of Utilizing 4G LTE Signals in.Combination With Unmanned Aerial Vehicles for the Purpose of Search.And Rescue of Avalanche Victims (Increment 1)", University of Colorado.at Boulder, Research Report, 2014, 26 pages.

Yeh, C. et al., "Thin-Ribbon Tapered Coupler for Dielectric Waveguides", May, 15, 1994, 42-48.

Yilmaz, et al., Self-optimization of coverage and capacity in LTE using.adaptive antenna systems. Diss. Aalto University, 2010.

\* cited by examiner

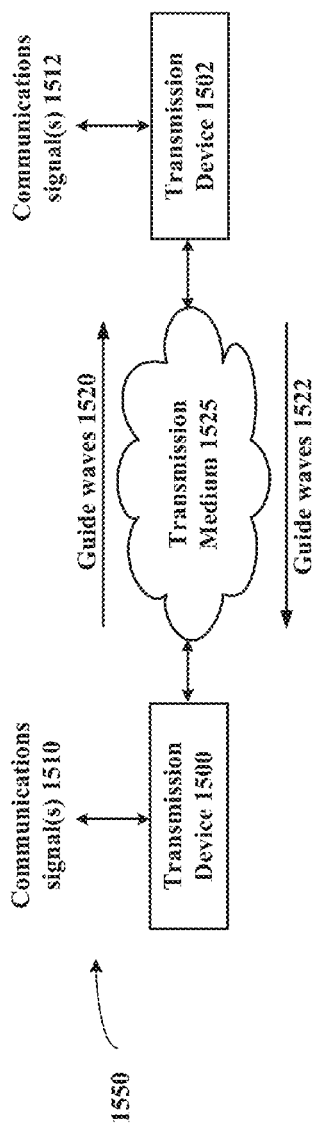
FIG. 15
FIG. 16
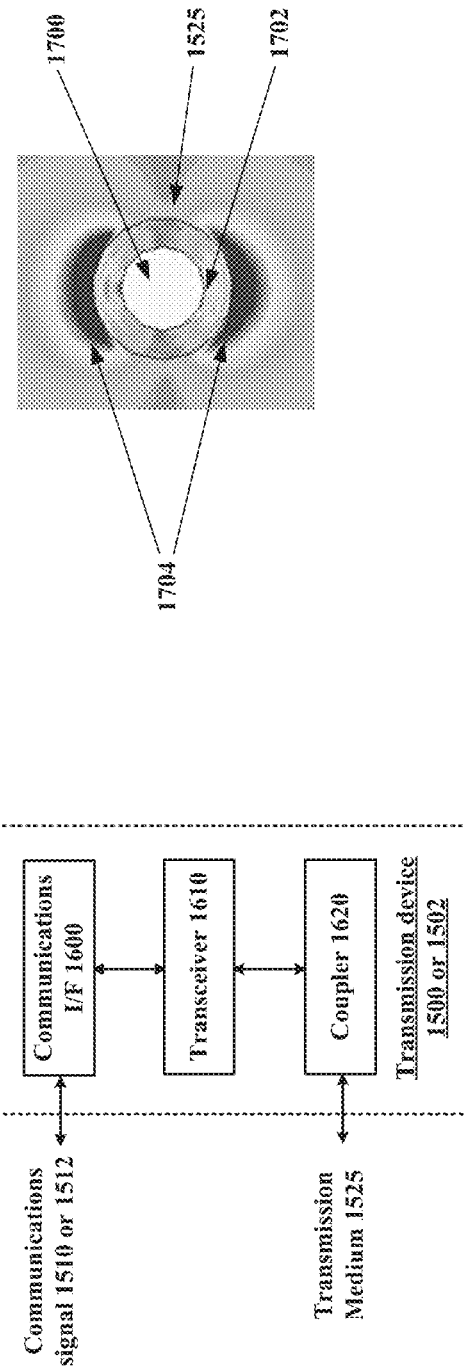
FIG. 17

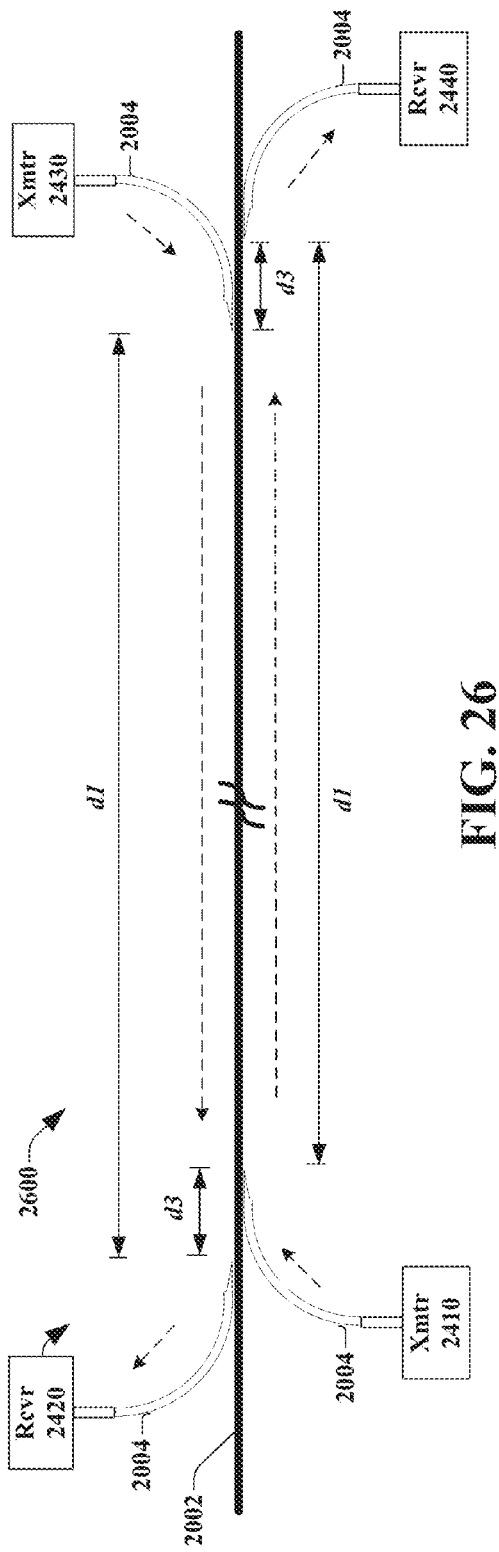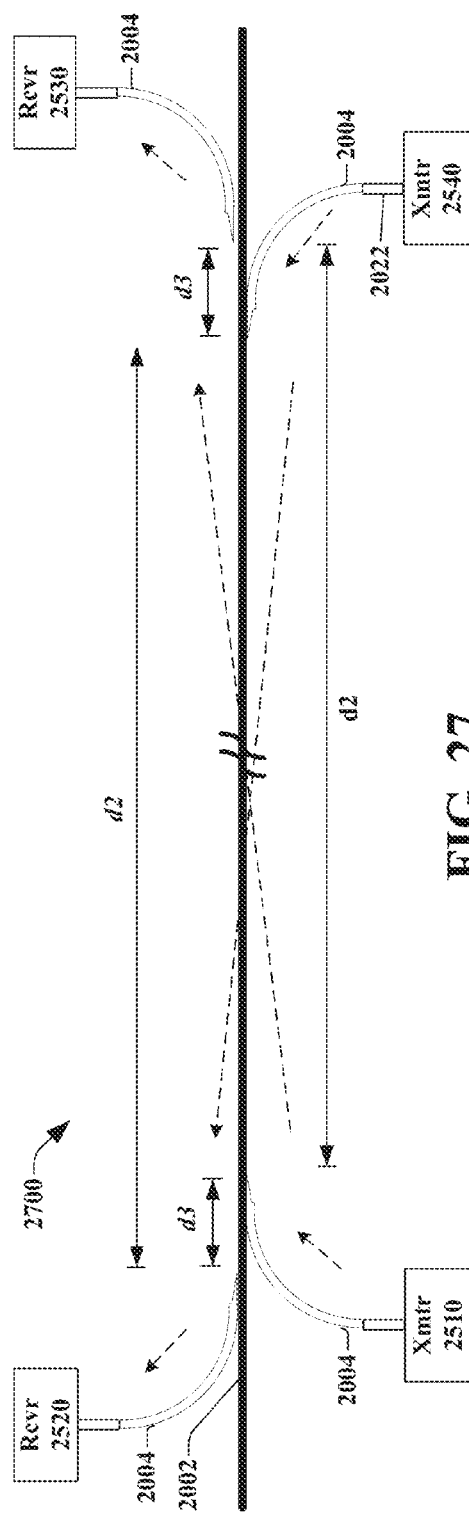

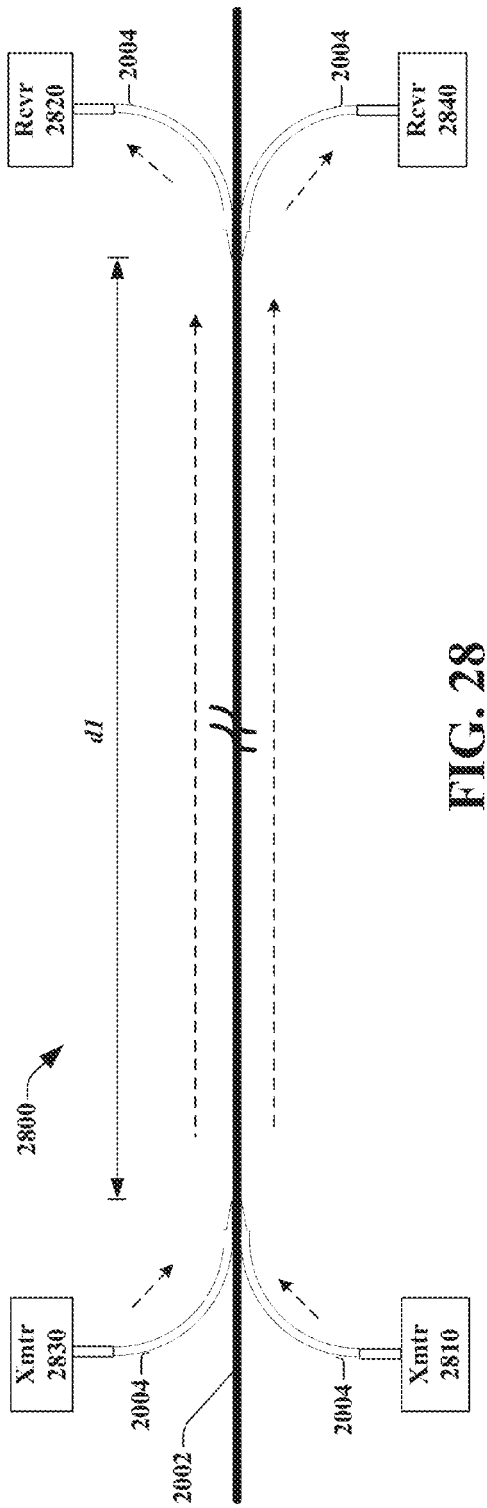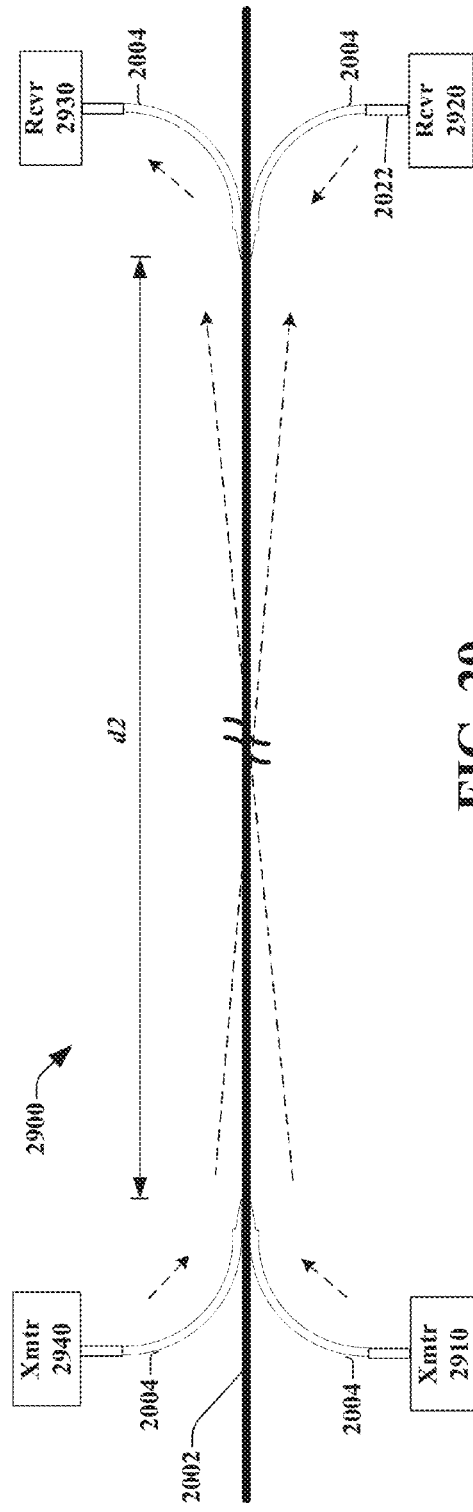

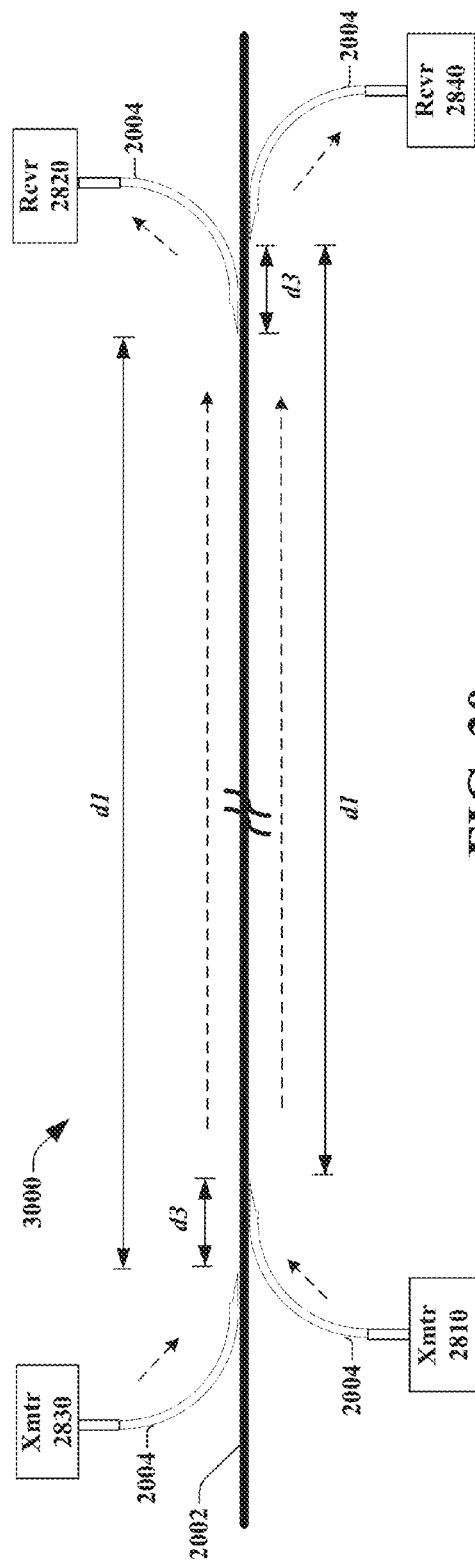
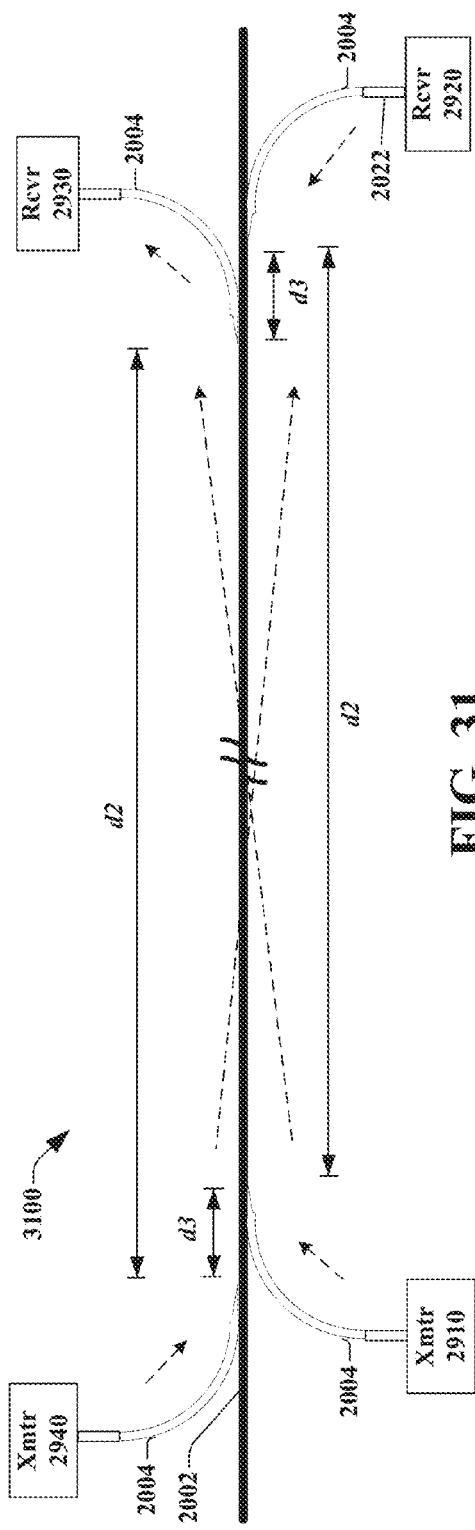

GUIDED WAVE COUPLER, COUPLING MODULE AND METHODS FOR USE THEREWITH

FIELD OF THE DISCLOSURE

The subject disclosure relates to communications via microwave transmission in a communication network.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

BRIEF DESCRIPTION OF THE DRAWINGS

FIG. 15 is a block diagram illustrating an example, non-limiting embodiment of a guided-wave communication system in accordance with various aspects described herein.

FIG. 16 is a block diagram illustrating an example, non-limiting embodiment of a transmission device in accordance with various aspects described herein.

FIG. 17 is a diagram illustrating an example, non-limiting embodiment of an electromagnetic distribution in accordance with various aspects described herein.

FIG. 26 is a block diagram of an example, non-limiting embodiment of a transmission system in accordance with various aspects described herein.

FIG. 27 is a block diagram of an example, non-limiting embodiment of a transmission system in accordance with various aspects described herein.

FIG. 28 is a block diagram of an example, non-limiting embodiment of a transmission system in accordance with various aspects described herein.

FIG. 29 is a block diagram of an example, non-limiting embodiment of a transmission system in accordance with various aspects described herein.

FIG. 30 is a block diagram of an example, non-limiting embodiment of a transmission system in accordance with various aspects described herein.

FIG. 31 is a block diagram of an example, non-limiting embodiment of a transmission system in accordance with various aspects described herein.

DETAILED DESCRIPTION

Figure 1:
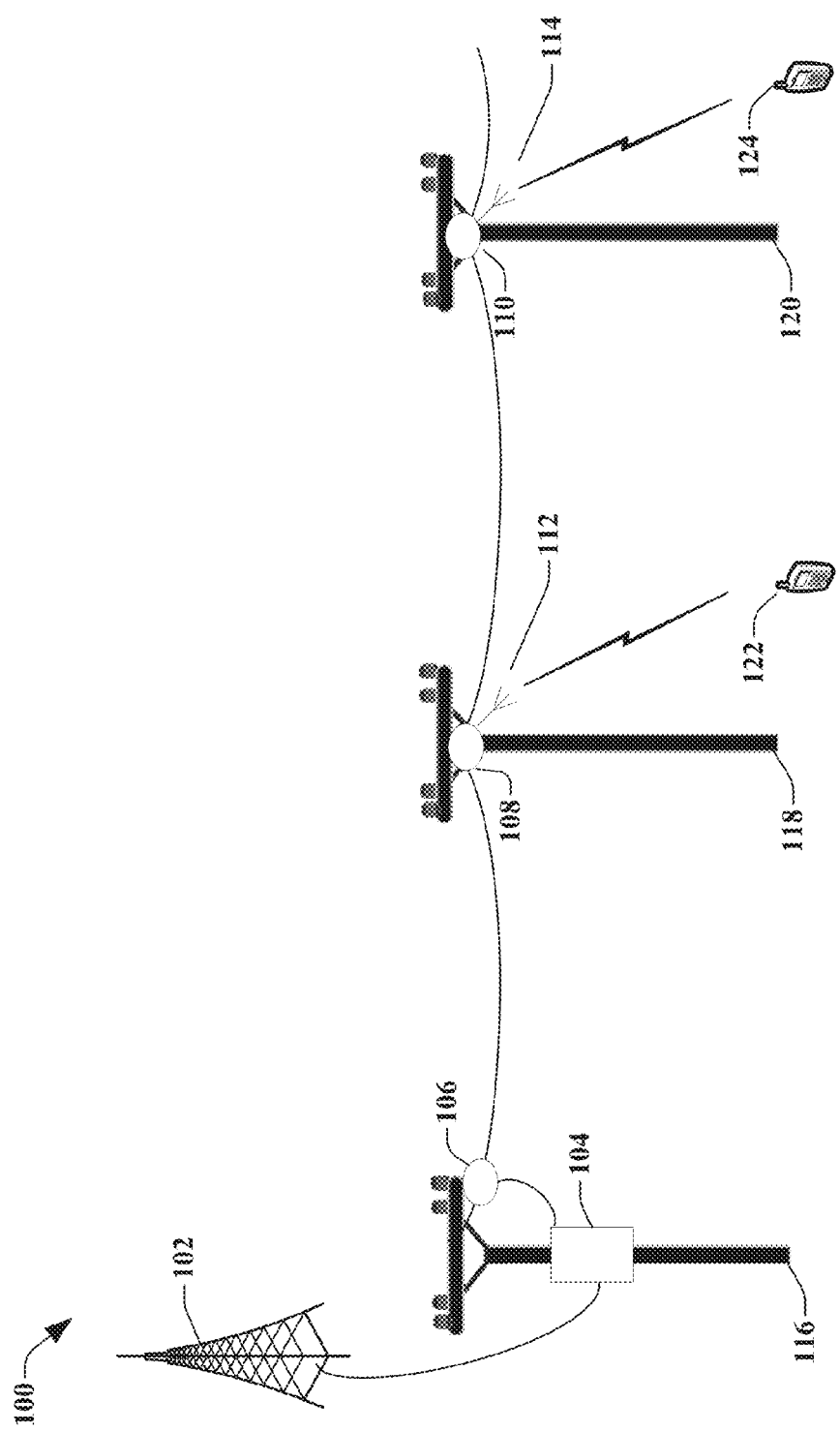
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced in different combinations and without these details (and without applying to any particular networked environment or standard).

To provide network connectivity to additional base station devices, the backhaul network that links the communication cells (e.g., microcells and macrocells) to network devices of the core network correspondingly expands. Similarly, to provide network connectivity to a distributed antenna system, an extended communication system that links base station devices and their distributed antennas is desirable. A guided-wave communication system can be provided to enable alternative, increased or additional network connectivity and a waveguide coupling system can be provided to transmit and/or receive guided-wave (e.g., surface wave) communications on a transmission medium, such as a wire or other conductor that operates as a single-wire transmission line or a dielectric material that operates as a waveguide and/or another transmission medium that otherwise operates to guide the transmission of an electromagnetic wave.

In an example embodiment, a waveguide coupler that is utilized in a waveguide coupling system can be made of a dielectric material, or other low-loss insulator (e.g., Teflon, polyethylene, etc.), or can be made of a conducting (e.g., metallic, non-metallic, etc.) material, or any combination of the foregoing materials. Reference throughout the detailed description to "dielectric waveguide" is for illustration purposes and does not limit embodiments to being constructed solely of dielectric materials. In other embodiments, other dielectric or insulating materials are possible. It will be appreciated that a variety of transmission media such as: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided-wave transmission media can be utilized with guided-wave communications without departing from example embodiments.

For these and/or other considerations, in one or more embodiments, a transmission device includes a communications interface that receives a first communication signal that includes first data. A transceiver generates a first electromagnetic wave based on the first communication signal to convey the first data, the first electromagnetic wave having at least one carrier frequency and at least one corresponding wavelength. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided-wave mode that includes an asymmetric mode, wherein the carrier frequency is within a millimeter wave frequency band and wherein the corresponding wavelength is less than the circumference of the transmission medium.

In one or more embodiments, a transmission device includes a transmitter that generates a first electromagnetic wave based on a communication signal to convey data, the first electromagnetic wave having at least one carrier frequency and at least one corresponding wavelength. A coupler couples the first electromagnetic wave to a single wire transmission medium having an outer surface and a corresponding circumference, wherein the coupling of the first electromagnetic wave to the single wire transmission medium forms a second electromagnetic wave that is guided to propagate along the outer surface of the single wire transmission medium via at least one guided-wave mode that includes an asymmetric mode, wherein the carrier frequency in within a millimeter wave frequency band and wherein the corresponding wavelength is less than the circumference of the single wire transmission medium.

In one or more embodiments, a method includes generating a first electromagnetic wave based on a communication signal to convey data, the first electromagnetic wave having at least one carrier frequency and at least one corresponding wavelength. A coupler couples the first electromagnetic wave to a single wire transmission medium having an outer dielectric surface and a corresponding circumference, wherein the coupling of the first electromagnetic wave to the single wire transmission medium forms a second electromagnetic wave that is guided to propagate along the outer dielectric surface of the single wire transmission medium via at least one guided-wave mode, wherein the carrier frequency is within a millimeter wave frequency band and wherein the corresponding wavelength is less than the circumference of the single wire transmission medium.

In one or more embodiments, a transmission device includes a communications interface that receives a first communication signal that includes first data. A transceiver generates a first electromagnetic wave based on the first communication signal to convey the first data, the first electromagnetic wave having at least one carrier frequency. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided-wave mode that includes an asymmetric mode having a lower cutoff frequency, and wherein the carrier frequency is selected to be within a limited range of the lower cutoff frequency.

In one or more embodiments, a transmission device includes a transmitter that generates a first electromagnetic wave based on a communication signal to convey data, the first electromagnetic wave having at least one carrier frequency. A coupler, coupled to the transmitter, couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

In one or more embodiments, a method includes generating a first electromagnetic wave based on a communication signal to convey data, the first electromagnetic wave having at least one carrier frequency. A coupler couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

In one or more embodiments, a method includes generating a first electromagnetic wave based on a communication signal to convey data, the first electromagnetic wave having at least one carrier frequency. The first electromagnetic wave is coupled to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

Various embodiments described herein relate to a transmission system for launching and extracting guided-wave (e.g., surface wave communications that are electromagnetic waves) transmissions from a wire. At millimeter-wave frequencies, wherein the wavelength is small compared to the size of the equipment, transmissions can propagate as waves guided by a waveguide, such as a strip or length of dielectric material or other coupler. The electromagnetic field structure of the guided-wave can be inside and/or outside of the coupler. When this coupler is brought into close proximity to a transmission medium (e.g., a wire, utility line or other transmission medium), at least a portion of the guided-wave decouples from the waveguide and couples to the transmission medium, and continues to propagate as guided-waves, such as surface waves about the surface of the wire.

In one or more embodiments, a coupler includes a receiving portion that receives a first electromagnetic wave conveying first data from a transmitting device. A guiding portion guides the first electromagnetic wave to a junction for coupling the first electromagnetic wave to a transmission medium. The first electromagnetic wave propagates via at least one first guided-wave mode. The coupling of the first electromagnetic wave to the transmission medium forms a second electromagnetic wave that is guided to propagate along the outer surface of the transmission medium via at least one second guided-wave mode that differs from the first guided-wave mode.

In one or more embodiments, a coupling module includes a plurality of receiving portions that receive a corresponding plurality of first electromagnetic waves conveying first data. A plurality of guiding portions guide the plurality of first electromagnetic waves to a corresponding plurality of junctions for coupling the plurality of first electromagnetic waves to a transmission medium. The plurality of first electromagnetic waves propagate via at least one first guided-wave mode and the coupling of the plurality of first electromagnetic waves to the transmission medium forms a plurality of second electromagnetic waves that are guided to propagate along the outer surface of the transmission medium via at least one second guided-wave mode that differs from the first guided-wave mode.

In one or more embodiments, a method includes receiving a first electromagnetic wave conveying first data from a transmitting device. The first electromagnetic wave is guided to a junction for coupling the first electromagnetic wave to a transmission medium. The first electromagnetic wave propagates via at least one first guided-wave mode and the coupling of the first electromagnetic wave to the transmission medium forms a second electromagnetic wave that is guided to propagate along the outer surface of the transmission medium via at least one second guided-wave mode that differs from the first guided-wave mode.

In one or more embodiments, a transmission device includes a first coupler that guides a first electromagnetic wave to a first junction to form a second electromagnetic wave that is guided to propagate along the outer surface of the transmission medium via one or more guided-wave modes. This mode or modes have an envelope that varies as a function of angular deviation and/or longitudinal displacement. A second coupler guides a third electromagnetic wave from a second junction coupling the third electromagnetic wave from the transmission medium. The second junction is arranged in angular deviation and/or longitudinal displacement to correspond to a local minimum of the envelope.

In one or more embodiments, a method includes generating a first electromagnetic wave conveying first data from a transmitting device. The first electromagnetic wave is guided to a first junction for coupling the first electromagnetic wave to a transmission medium at a first azimuthal angle to form a second electromagnetic wave that is guided to propagate along the outer surface of the transmission medium via at least one guided-wave mode. The second electromagnetic wave has an envelope that varies as a function of angular deviation from the first azimuthal angle and/or longitudinal displacement from the first junction. The function has a local minimum at a first angular deviation from the first azimuthal angle and/or first longitudinal displacement from the first junction. A third electromagnetic wave is guided from a second junction coupling the third electromagnetic wave from the transmission medium at the first angular deviation from the first azimuthal angle and/or the first longitudinal displacement from the first junction to form a fourth electromagnetic wave that is guided to a first receiver.

According to an example embodiment, a surface wave is a type of guided-wave that is guided by a surface of the transmission medium, which can include an exterior or outer surface of the wire, exterior or outer surface of dielectric coating or insulating jacket, or another surface of a transmission medium that is adjacent to or exposed to another type of medium having different properties (e.g., dielectric properties). Indeed, in an example embodiment, a surface of the transmission medium that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulated surface of the wire that is exposed to air or free space, or can otherwise be any material region between the insulated surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided-wave.

According to an example embodiment, guided-waves such as surface waves can be contrasted with radio transmissions over free space/air or conventional propagation of electrical power or signals through the conductor of the wire. Indeed, with surface wave or guided-wave systems described herein, conventional electrical power or signals can still propagate or be transmitted through the conductor of the wire, while guided-waves (including surface waves and other electromagnetic waves) can surround all or part of the surface of the wire and propagate along the wire with low loss, according to an example embodiment. In an example embodiment, a surface wave can have a field structure (e.g., an electromagnetic field structure) that lies primarily or substantially outside of the transmission medium that serves to guide the surface wave.

In an example embodiment, the guided-waves employed herein can be contrasted with Sommerfeld waves used as a means of propagation along a wire which are limited to waves having a wavelength greater than, not less than, the circumference of the wire. In an example embodiment, the guided-waves employed herein can be contrasted with G-Wave and E-Wave systems that operate via the propagation of the fundamental mode and not based on the propagation of at least one asymmetric mode. In an example embodiment, the guided-waves employed herein can be contrasted with surface plasmon wave propagation along single metal wire premised on the electron bunches that form in conductors at frequencies such as optical frequencies, well above, and not less than $\gamma$, the mean collision frequency of electrons of the conducting material. These prior art systems have failed to address guided-wave propagation for a transmission medium, where the guided-wave includes an asymmetric mode that propagates at low loss frequencies, such as in the microwave or millimeter-wave band, that are less than the mean collision frequency of electrons of the conducting material. These prior art systems have failed to address guided-wave propagation for a transmission medium that includes an outer dielectric, where the guided-wave includes an asymmetric mode that propagates with low loss with fields concentrated about the outer surface of the dielectric.

According to an example embodiment, the electromagnetic waves traveling along a wire are induced by other electromagnetic waves traveling along a waveguide in proximity to the wire. The inducement of the electromagnetic waves can be independent of any electrical potential, charge or current that is injected or otherwise transmitted through the wires as part of an electrical circuit. It is to be appreciated that while a small current in the wire may be formed in response to the propagation of the electromagnetic wave through the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that does not require a circuit. Also, in some embodiments, a wire is not necessary, and the electromagnetic waves can propagate along a single line transmission medium that is not a wire.

According to an example embodiment, the term "single wire transmission medium" is used in conjunction with transmission via electromagnetic waves that are guided by a wire, but do not require the wire to be part of a circuit to support such propagation. A transmission system may include multiple single wire transmission media that act to transmit such guided-waves, with different waves being guided by differing ones of the single wire transmission media.

According to an example embodiment, the term "about" a wire used in conjunction with a guided-wave (e.g., surface wave) can include fundamental wave propagation modes and other guided-waves. Assuming the wire has a circular or otherwise substantially circular cross section, the fundamental mode is a symmetric mode having a circular or substantially circular field distribution (e.g., electric field, magnetic field, electromagnetic field, etc.) at least partially around a wire. In addition, when a guided-wave propagates "about" a circular, stranded or other wire with a circular or substantially circular cross section, it propagates longitudinally along the wire via a wave propagation mode (at least one guided-wave mode) that can include not only the fundamental wave propagation modes (e.g., zero order modes), but additionally or alternatively other non-fundamental wave propagation modes such as higher-order guided-wave modes (e.g., $1^{st}$ order modes, $2^{nd}$ order modes, etc.), asymmetrical modes and/or other guided (e.g., surface) waves that have non-circular field distributions around a wire. As used herein, the term "substantially circular" means a shape that varies by less that (+/−15%) from a perfect circle. As used herein, the term "non-circular", means a shape that is not substantially circular.

For example, such non-circular field distributions can be unilateral or multi-lateral with one or more axial lobes characterized by relatively higher field strength and/or one or more nulls or null regions characterized by relatively low-field strength, zero-field strength or substantially zero field strength. Further, the field distribution can otherwise vary as a function of a longitudinal axial orientation around the wire such that one or more regions of axial orientation around the wire have an electric or magnetic field strength (or combination thereof) that is higher than one or more other regions of axial orientation, according to an example embodiment. It will be appreciated that the relative positions of the higher order modes or asymmetrical modes can vary as the guided-wave travels along the wire.

Considering other wires, conductors or dielectrics that have non-circular cross sections (i.e. not substantially circular cross sections), the terms symmetric and asymmetric modes may not apply in the same fashion. For example a fundamental mode of a rectangular waveguide may not have a circular or substantially circular field distribution. So the terms fundamental mode and non-fundamental modes can be used in this more general sense.

Referring now to FIG. 1, a block diagram illustrating an example, non-limiting embodiment of a guided-wave communication system 100 is shown. Guided-wave communication system 100 depicts an exemplary environment in which a transmission device, coupler or coupling module can be used.

Guided-wave communication system 100 can be a distributed antenna system that includes one or more base station devices (e.g., base station device 104) that are communicably coupled to a macrocell site 102 or other network connection. Base station device 104 can be connected by a wired (e.g., fiber and/or cable), or by a wireless (e.g., microwave wireless) connection to macrocell site 102. Macrocells such as macrocell site 102 can have dedicated connections to the mobile network and base station device 104 can share and/or otherwise use macrocell site 102's connection. Base station device 104 can be mounted on, or attached to, utility pole 116. In other embodiments, base station device 104 can be near transformers and/or other locations situated nearby a power line.

Base station device 104 can facilitate connectivity to a mobile network for mobile devices 122 and 124. Antennas 112 and 114, mounted on or near utility poles 118 and 120, respectively, can receive signals from base station device 104 and transmit those signals to mobile devices 122 and 124 over a much wider area than if the antennas 112 and 114 were located at or near base station device 104.

It is noted that FIG. 1 displays three utility poles, with one base station device, for purposes of simplicity. In other embodiments, utility pole 116 can have more base station devices, and one or more utility poles with distributed antennas are possible.

A transmission device, such as dielectric waveguide coupling device 106 can transmit the signal from base station device 104 to antennas 112 and 114 via utility or power line(s) that connect the utility poles 116, 118, and 120. To transmit the signal, radio source and/or coupler 106 up converts the signal (e.g., via frequency mixing) from base station device 104 or otherwise converts the signal from the base station device 104 to a microwave or millimeter-wave band signal having at least one carrier frequency in the microwave or millimeter-wave frequency band. The dielectric waveguide coupling device 106 launches a millimeter-wave band wave that propagates as a guided-wave (e.g., surface wave or other electromagnetic wave) traveling along the utility line or other wire. At utility pole 118, another transmission device, such as dielectric waveguide coupling device 108 that receives the guided-wave (and optionally can amplify it as needed or desired or operate as a digital repeater to receive it and regenerate it) and sends it forward as a guided-wave (e.g., surface wave or other electromagnetic wave) on the utility line or other wire. The dielectric waveguide coupling device 108 can also extract a signal from the millimeter-wave band guided-wave and shift it down in frequency or otherwise convert it to its original cellular band frequency (e.g., 1.9 GHz or other defined cellular frequency) or another cellular (or non-cellular) band frequency. An antenna 112 can transmit (e.g., wirelessly transmit) the downshifted signal to mobile device 122. The process can be repeated by another transmission device, such as dielectric waveguide coupling device 110, antenna 114 and mobile device 124, as necessary or desirable.

Transmissions from mobile devices 122 and 124 can also be received by antennas 112 and 114 respectively. Repeaters on dielectric waveguide coupling devices 108 and 110 can upshift or otherwise convert the cellular band signals to microwave or millimeter-wave band and transmit the signals as guided-wave (e.g., surface wave or other electromagnetic wave) transmissions over the power line(s) to base station device 104.

In an example embodiment, system 100 can employ diversity paths, where two or more utility lines or other wires are strung between the utility poles 116, 118, and 120 (e.g., for example, two or more wires between poles 116 and 120) and redundant transmissions from base station 104 are transmitted as guided-waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 100 can enable alternate routing capabilities, load balancing, increased load handling, concurrent bi-directional or synchronous communications, spread spectrum communications, etc. (See FIG. 8 for more illustrative details).

It is noted that the use of the dielectric waveguide coupling devices 106, 108, and 110 in FIG. 1 are by way of example only, and that in other embodiments, other uses are possible. For instance, dielectric waveguide coupling devices can be used in a backhaul communication system, providing network connectivity to base station devices. Dielectric waveguide coupling devices can be used in many circumstances where it is desirable to transmit guided-wave communications over a wire, whether insulated or not insulated. Dielectric waveguide coupling devices are improvements over other coupling devices due to no contact or limited physical and/or electrical contact with the wires that may carry high voltages. With dielectric waveguide coupling devices, the apparatus can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, particularly in configurations where the wires correspond to a telephone network, cable television network, broadband data service, fiber optic communications system or other network employing low voltages or having insulated transmission lines.

It is further noted, that while base station device 104 and macrocell site 102 are illustrated in an example embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, Ultra Wideband protocol, Bluetooth protocol, Zigbee protocol or other wireless protocol.

Figure 2:
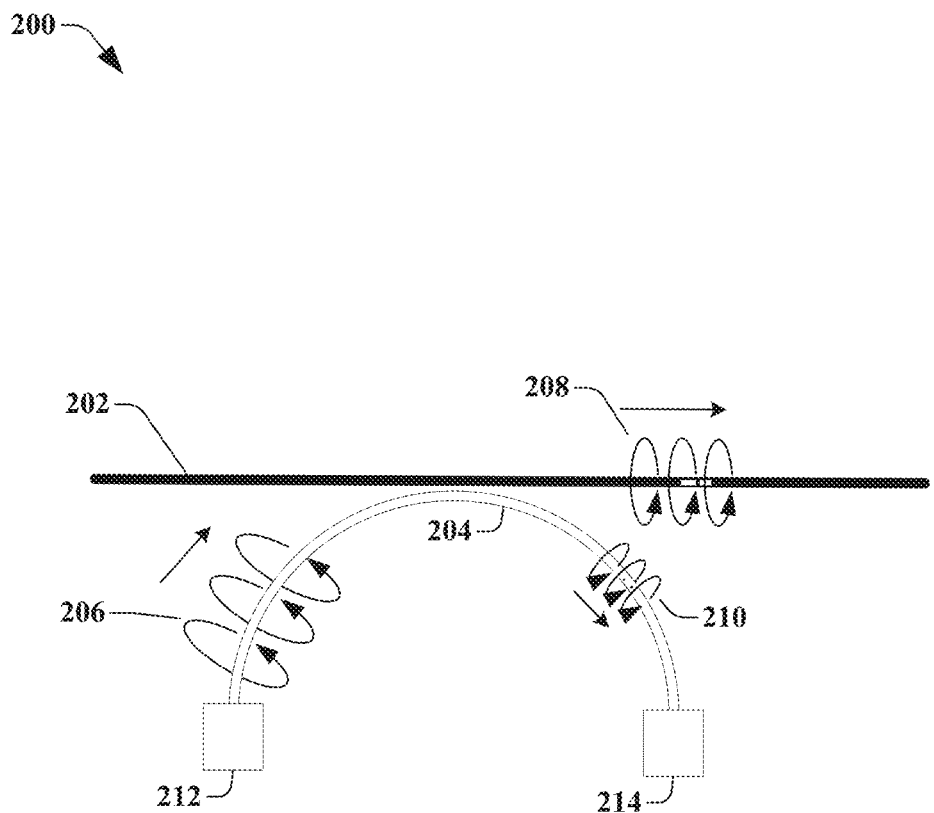
FIG. 2 is a block diagram illustrating an example, non-limiting embodiment of a dielectric waveguide coupler in accordance with various aspects described herein.

Turning now to FIG. 2, illustrated is a block diagram of an example, non-limiting embodiment of a dielectric waveguide coupling system 200 in accordance with various aspects described herein. System 200 comprises a dielectric waveguide 204 that has a wave 206 propagating as a guided-wave about a waveguide surface of the dielectric waveguide 204. In an example embodiment, the dielectric waveguide 204 is curved, and at least a portion of the waveguide 204 can be placed near a wire 202 in order to facilitate coupling between the waveguide 204 and the wire 202, as described herein. The dielectric waveguide 204 can be placed such that a portion of the curved dielectric waveguide 204 is parallel or substantially parallel to the wire 202. The portion of the dielectric waveguide 204 that is parallel to the wire can be an apex of the curve, or any point where a tangent of the curve is parallel to the wire 202. When the dielectric waveguide 204 is positioned or placed thusly, the wave 206 travelling along the dielectric waveguide 204 couples, at least in part, to the wire 202, and propagates as guided-wave 208 around or about the wire surface of the wire 202 and longitudinally along the wire 202. The guided-wave 208 can be characterized as a surface wave or other electromagnetic wave, although other types of guided-waves 208 can supported as well without departing from example embodiments. A portion of the wave 206 that does not couple to the wire 202 propagates as wave 210 along the dielectric waveguide 204. It will be appreciated that the dielectric waveguide 204 can be configured and arranged in a variety of positions in relation to the wire 202 to achieve a desired level of coupling or non-coupling of the wave 206 to the wire 202. For example, the curvature and/or length of the dielectric waveguide 204 that is parallel or substantially parallel, as well as its separation distance (which can include zero separation distance in an example embodiment), to the wire 202 can be varied without departing from example embodiments. Likewise, the arrangement of the dielectric waveguide 204 in relation to the wire 202 may be varied based upon considerations of the respective intrinsic characteristics (e.g., thickness, composition, electromagnetic properties, etc.) of the wire 202 and the dielectric waveguide 204, as well as the characteristics (e.g., frequency, energy level, etc.) of the waves 206 and 208.

The guided-wave 208 propagates in a direction parallel or substantially parallel to the wire 202, even as the wire 202 bends and flexes. Bends in the wire 202 can increase transmission losses, which are also dependent on wire diameters, frequency, and materials. If the dimensions of the dielectric waveguide 204 are chosen for efficient power transfer, most of the power in the wave 206 is transferred to the wire 202, with little power remaining in wave 210. It will be appreciated that the guided-wave 208 can still be multimodal in nature (discussed herein), including having modes that are non-fundamental or asymmetric, while traveling along a path that is parallel or substantially parallel to the wire 202, with or without a fundamental transmission mode. In an example embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an example embodiment, substantially parallel can include approximations that are within 30 degrees of true parallel in all dimensions.

In an example embodiment, the wave 206 can exhibit one or more wave propagation modes. The dielectric waveguide modes can be dependent on the shape and/or design of the waveguide 204. The one or more dielectric waveguide modes of wave 206 can generate, influence, or impact one or more wave propagation modes of the guided-wave 208 propagating along wire 202. In an example embodiment, the wave propagation modes on the wire 202 can be similar to the dielectric waveguide modes since both waves 206 and 208 propagate about the outside of the dielectric waveguide 204 and wire 202 respectively. In some embodiments, as the wave 206 couples to the wire 202, the modes can change form due to the coupling between the dielectric waveguide 204 and the wire 202. For example, differences in size, material, and/or impedances of the dielectric waveguide 204 and the wire 202 may create additional modes not present in the dielectric waveguide modes and/or suppress some of the dielectric waveguide modes. The wave propagation modes can comprise the fundamental transverse electromagnetic mode (Quasi-TEM$_{00}$), where only small electric and/or magnetic fields extend in the direction of propagation, and the electric and magnetic fields extend radially outwards while the guided-wave propagates along the wire. This guided-wave mode can be donut shaped, where few of the electromagnetic fields exist within the dielectric waveguide 204 or wire 202. Waves 206 and 208 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the dielectric waveguide 204, the dimensions and composition of the wire 202, as well as its surface characteristics, its optional insulation, the electromagnetic properties of the surrounding environment, etc. It should be noted that, depending on the frequency, the electrical and physical characteristics of the wire 202 and the particular wave propagation modes that are generated, the guided-wave 208 can travel along the conductive surface of an oxidized uninsulated wire, an unoxidized uninsulated wire, an insulated wire and/or along the insulating surface of an insulated wire.

In an example embodiment, a diameter of the dielectric waveguide 204 is smaller than the diameter of the wire 202. For the microwave or millimeter-band wavelength being used, the dielectric waveguide 204 supports a single waveguide mode that makes up wave 206. This single waveguide mode can change as it couples to the wire 202 as surface wave 208. If the dielectric waveguide 204 were larger, more than one waveguide mode can be supported, but these additional waveguide modes may not couple to the wire 202 as efficiently, and higher coupling losses can result. However, in some alternative embodiments, the diameter of the dielectric waveguide 204 can be equal to or larger than the diameter of the wire 202, for example, where higher coupling losses are desirable or when used in conjunction with other techniques to otherwise reduce coupling losses (e.g., impedance matching with tapering, etc.).

In an example embodiment, the wavelength of the waves 206 and 208 are comparable in size, or smaller than a circumference of the dielectric waveguide 204 and the wire 202. In an example, if the wire 202 has a diameter of 0.5 cm, and a corresponding circumference of around 1.5 cm, the wavelength of the transmission is around 1.5 cm or less, corresponding to a frequency of 20 GHz or greater. In another embodiment, a suitable frequency of the transmission and the carrier-wave signal is in the range of 30-100 GHz, perhaps around 30-60 GHz, and around 38 GHz in one example. In an example embodiment, when the circumference of the dielectric waveguide 204 and wire 202 is comparable in size to, or greater, than a wavelength of the transmission, the waves 206 and 208 can exhibit multiple wave propagation modes including fundamental and/or non-fundamental (symmetric and/or asymmetric) modes that propagate over sufficient distances to support various communication systems described herein. The waves 206 and 208 can therefore comprise more than one type of electric and magnetic field configuration. In an example embodiment, as the guided-wave 208 propagates down the wire 202, the electrical and magnetic field configurations will remain the same from end to end of the wire 202. In other embodiments, as the guided-wave 208 encounters interference or loses energy due to transmission losses, the electric and magnetic field configurations can change as the guided-wave 208 propagates down wire 202.

In an example embodiment, the dielectric waveguide 204 can be composed of nylon, Teflon, polyethylene, a polyamide, or other plastics. In other embodiments, other dielectric materials are possible. The wire surface of wire 202 can be metallic with either a bare metallic surface, or can be insulated using plastic, dielectric, insulator or other sheathing. In an example embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an example embodiment, an oxidation layer on the bare metallic surface of the wire 202 (e.g., resulting from exposure of the bare metallic surface to oxygen/air) can also provide insulating or dielectric properties similar to those provided by some insulators or sheathings.

It is noted that the graphical representations of waves 206, 208 and 210 are presented merely to illustrate the principles that wave 206 induces or otherwise launches a guided-wave 208 on a wire 202 that operates, for example, as a single wire transmission line. Wave 210 represents the portion of wave 206 that remains on the dielectric waveguide 204 after the generation of guided-wave 208. The actual electric and magnetic fields generated as a result of such wave propagation may vary depending on the frequencies employed, the particular wave propagation mode or modes, the design of the dielectric waveguide 204, the dimensions and composition of the wire 202, as well as its surface characteristics, its optional insulation, the electromagnetic properties of the surrounding environment, etc.

It is noted that dielectric waveguide 204 can include a termination circuit or damper 214 at the end of the dielectric waveguide 204 that can absorb leftover radiation or energy from wave 210. The termination circuit or damper 214 can prevent and/or minimize the leftover radiation from wave 210 reflecting back toward transmitter circuit 212. In an example embodiment, the termination circuit or damper 214 can include termination resistors, and/or other components that perform impedance matching to attenuate reflection. In some embodiments, if the coupling efficiencies are high enough, and/or wave 210 is sufficiently small, it may not be necessary to use a termination circuit or damper 214. For the sake of simplicity, these transmitter and termination circuits or dampers 212 and 214 are not depicted in the other figures, but in those embodiments, transmitter and termination circuits or dampers may possibly be used.

Further, while a single dielectric waveguide 204 is presented that generates a single guided-wave 208, multiple dielectric waveguides 204 placed at different points along the wire 202 and/or at different axial orientations about the wire can be employed to generate and receive multiple guided-waves 208 at the same or different frequencies, at the same or different phases, and/or at the same or different wave propagation modes. The guided-wave or waves 208 can be modulated to convey data via a modulation technique such as phase shift keying, frequency shift keying, quadrature amplitude modulation, amplitude modulation, multicarrier modulation and via multiple access techniques such as frequency division multiplexing, time division multiplexing, code division multiplexing, multiplexing via differing wave propagation modes and via other modulation and access strategies.

Figure 3:
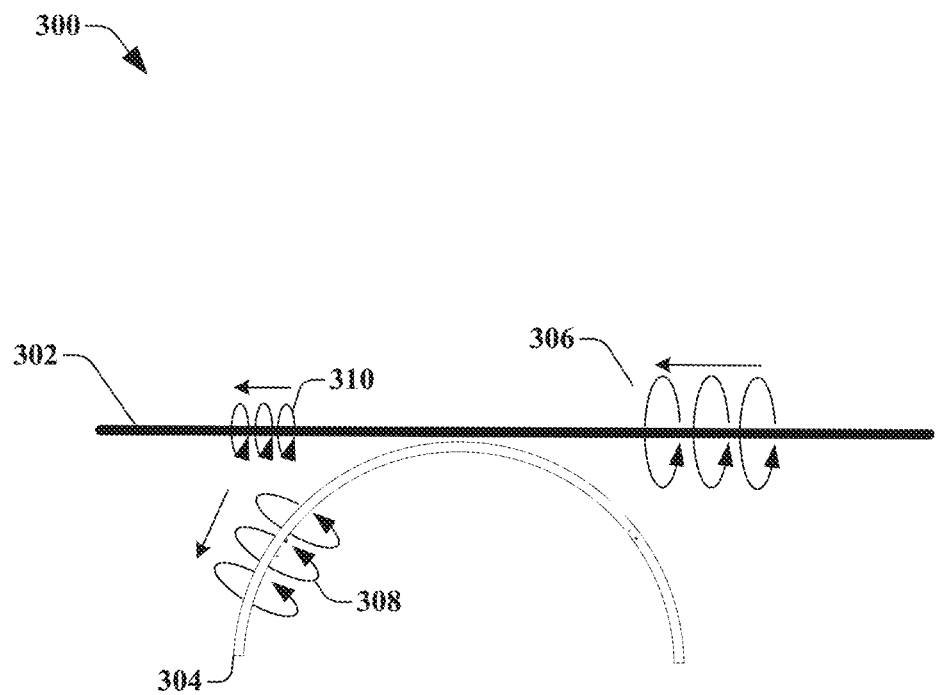
FIG. 3 is a block diagram illustrating an example, non-limiting embodiment of a dielectric waveguide coupler in accordance with various aspects described herein.

Turning now to FIG. 3, illustrated is a block diagram of an example, non-limiting embodiment of a dielectric waveguide coupling system 300 in accordance with various aspects described herein. System 300 implements a coupler that comprises a dielectric waveguide 304 and a wire 302 that has a wave 306 propagating as a guided-wave about a wire surface of the wire 302. In an example embodiment, the wave 306 can be characterized as a surface wave or other electromagnetic wave.

In an example embodiment, the dielectric waveguide 304 is curved or otherwise has a curvature, and can be placed near a wire 302 such that a portion of the curved dielectric waveguide 304 is parallel or substantially parallel to the wire 302. The portion of the dielectric waveguide 304 that is parallel to the wire can be an apex of the curve, or any point where a tangent of the curve is parallel to the wire 302. When the dielectric waveguide 304 is near the wire, the guided-wave 306 travelling along the wire 302 can couple to the dielectric waveguide 304 and propagate as guided-wave 308 about the dielectric waveguide 304. A portion of the guided-wave 306 that does not couple to the dielectric waveguide 304 propagates as guided-wave 310 (e.g., surface wave or other electromagnetic wave) along the wire 302.

The guided-waves 306 and 308 stay parallel to the wire 302 and dielectric waveguide 304, respectively, even as the wire 302 and dielectric waveguide 304 bend and flex. Bends can increase transmission losses, which are also dependent on wire diameters, frequency, and materials. If the dimensions of the dielectric waveguide 304 are chosen for efficient power transfer, most of the energy in the guided-wave 306 is coupled to the dielectric waveguide 304 and little remains in guided-wave 310.

In an example embodiment, a receiver circuit can be placed on the end of waveguide 304 in order to receive wave 308. A termination circuit can be placed on the opposite end of the waveguide 304 in order to receive guided-waves traveling in the opposite direction to guided-wave 306 that couple to the waveguide 304. The termination circuit would thus prevent and/or minimize reflections being received by the receiver circuit. If the reflections are small, the termination circuit may not be necessary.

It is noted that the dielectric waveguide 304 can be configured such that selected polarizations of the surface wave 306 are coupled to the dielectric waveguide 304 as guided-wave 308. For instance, if guided-wave 306 is made up of guided-waves or wave propagation modes with respective polarizations, dielectric waveguide 304 can be configured to receive one or more guided-waves of selected polarization(s). Guided-wave 308 that couples to the dielectric waveguide 304 is thus the set of guided-waves that correspond to one or more of the selected polarization(s), and further guided-wave 310 can comprise the guided-waves that do not match the selected polarization(s).

The dielectric waveguide 304 can be configured to receive guided-waves of a particular polarization based on an angle/rotation around the wire 302 that the dielectric waveguide 304 is placed (the axial orientation of the coupler) and the axial pattern of the field structure of the guided-waves. For instance, if the coupler is oriented to feed the guided-waves along the horizontal access and if the guided-wave 306 is polarized horizontally (i.e. the filed structure of the guided-waves are concentrated on the horizontal axis), most of the guided-wave 306 transfers to the dielectric waveguide as wave 308. In another instance, if the dielectric waveguide 304 is rotated 90 degrees around the wire 302, most of the energy from guided-wave 306 would remain coupled to the wire as guided-wave 310, and only a small portion would couple to the wire 302 as wave 308.

It is noted that waves 306, 308, and 310 are shown using three circular symbols in FIG. 3 and in other figures in the specification. These symbols are used to represent a general guided-wave, but do not imply that the waves 306, 308, and 310 are necessarily circularly polarized or otherwise circularly oriented. In fact, waves 306, 308, and 310 can comprise a fundamental TEM mode where the fields extend radially outwards, and also comprise other, non-fundamental (e.g. higher-level, etc.) modes. These modes can be asymmetric (e.g., radial, bilateral, trilateral, quadrilateral, etc) in nature as well.

It is noted also that guided-wave communications over wires can be full duplex, allowing simultaneous communications in both directions. Waves traveling one direction can pass through waves traveling in an opposite direction. Electromagnetic fields may cancel out at certain points and for short times due to the superposition principle as applied to waves. The waves traveling in opposite directions propagate as if the other waves weren't there, but the composite effect to an observer may be a stationary standing wave pattern. As the guided-waves pass through each other and are no longer in a state of superposition, the interference subsides. As a guided-wave (e.g., surface wave or other electromagnetic wave) couples to a waveguide and moves away from the wire, any interference due to other guided-waves (e.g., surface waves or other electromagnetic waves) decreases. In an example embodiment, as guided-wave 306 (e.g., surface wave or other electromagnetic wave) approaches dielectric waveguide 304, another guided-wave (e.g., surface wave or other electromagnetic wave) (not shown) traveling from left to right on the wire 302 passes by causing local interference. As guided-wave 306 couples to dielectric waveguide 304 as wave 308, and moves away from the wire 302, any interference due to the passing guided-wave subsides.

It is noted that the graphical representations of electromagnetic waves 306, 308 and 310 are presented merely to illustrate the principles that guided-wave 306 induces or otherwise launches a wave 308 on a dielectric waveguide 304. Guided-wave 310 represents the portion of guided-wave 306 that remains on the wire 302 after the generation of wave 308. The actual electric and magnetic fields generated as a result of such guided-wave propagation may vary depending on one or more of the shape and/or design of the dielectric waveguide, the relative position of the dielectric waveguide to the wire, the frequencies employed, the design of the dielectric waveguide 304, the dimensions and composition of the wire 302, as well as its surface characteristics, its optional insulation, the electromagnetic properties of the surrounding environment, etc.

Figure 4:
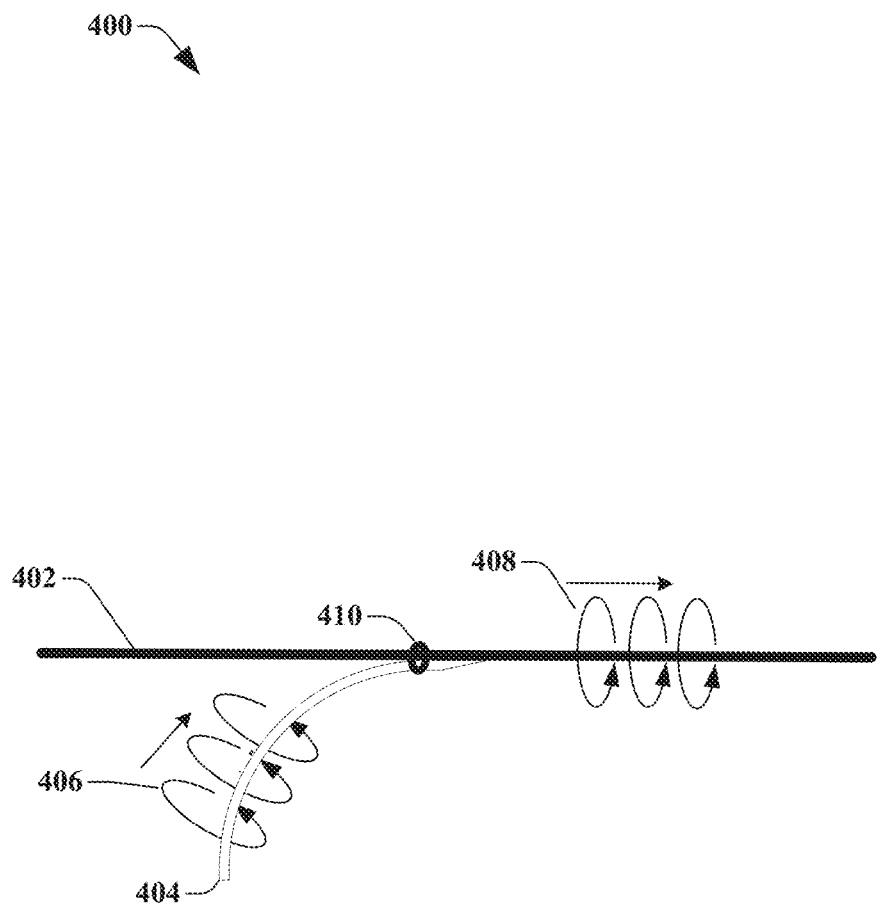
FIG. 4 is a block diagram illustrating an example, non-limiting embodiment of a dielectric waveguide coupler in accordance with various aspects described herein.

Turning now to FIG. 4, illustrated is a block diagram of an example, non-limiting embodiment of a dielectric waveguide coupling system 400 in accordance with various aspects described herein. System 400 implements a coupler that comprises a dielectric waveguide 404 that has a wave 406 propagating as a guided-wave about a waveguide surface of the dielectric waveguide 404. In an example embodiment, the dielectric waveguide 404 is curved, and an end of the dielectric waveguide 404 can be tied, fastened, or otherwise mechanically coupled to a wire 402. When the end of the dielectric waveguide 404 is fastened to the wire 402, the end of the dielectric waveguide 404 is parallel or substantially parallel to the wire 402. Alternatively, another portion of the dielectric waveguide beyond an end can be fastened or coupled to wire 402 such that the fastened or coupled portion is parallel or substantially parallel to the wire 402. The coupling device 410 can be a nylon cable tie or other type of non-conducting/dielectric material that is either separate from the dielectric waveguide 404 or constructed as an integrated component of the dielectric waveguide 404. In other embodiments, the dielectric waveguide 404 can be mechanically uncoupled from the wire 402 leaving an air gap between the coupler and the wire 402. The dielectric waveguide 404 can be adjacent to the wire 402 without surrounding the wire 402.

When the dielectric waveguide 404 is placed with the end parallel to the wire 402, the guided-wave 406 travelling along the dielectric waveguide 404 couples to the wire 402, and propagates as guided-wave 408 about the wire surface of the wire 402. In an example embodiment, the guided-wave 408 can be characterized as a surface wave or other electromagnetic wave.

It is noted that the graphical representations of waves 406 and 408 are presented merely to illustrate the principles that wave 406 induces or otherwise launches a guided-wave 408 on a wire 402 that operates, for example, as a single wire transmission line. The actual electric and magnetic fields generated as a result of such wave propagation may vary depending on one or more of the shape and/or design of the dielectric waveguide, the relative position of the dielectric waveguide to the wire, the frequencies employed, the design of the dielectric waveguide 404, the dimensions and composition of the wire 402, as well as its surface characteristics, its optional insulation, the electromagnetic properties of the surrounding environment, etc.

In an example embodiment, an end of dielectric waveguide 404 can taper towards the wire 402 in order to increase coupling efficiencies. Indeed, the tapering of the end of the dielectric waveguide 404 can provide impedance matching to the wire 402, according to an example embodiment of the subject disclosure. For example, an end of the dielectric waveguide 404 can be gradually tapered in order to obtain a desired level of coupling between waves 406 and 408 as illustrated in FIG. 4.

In an example embodiment, the coupling device 410 can be placed such that there is a short length of the dielectric waveguide 404 between the coupling device 410 and an end of the dielectric waveguide 404. Maximum coupling efficiencies are realized when the length of the end of the dielectric waveguide 404 that is beyond the coupling device 410 is at least several wavelengths long for whatever frequency is being transmitted, however shorter lengths are also possible.

Figure 5:
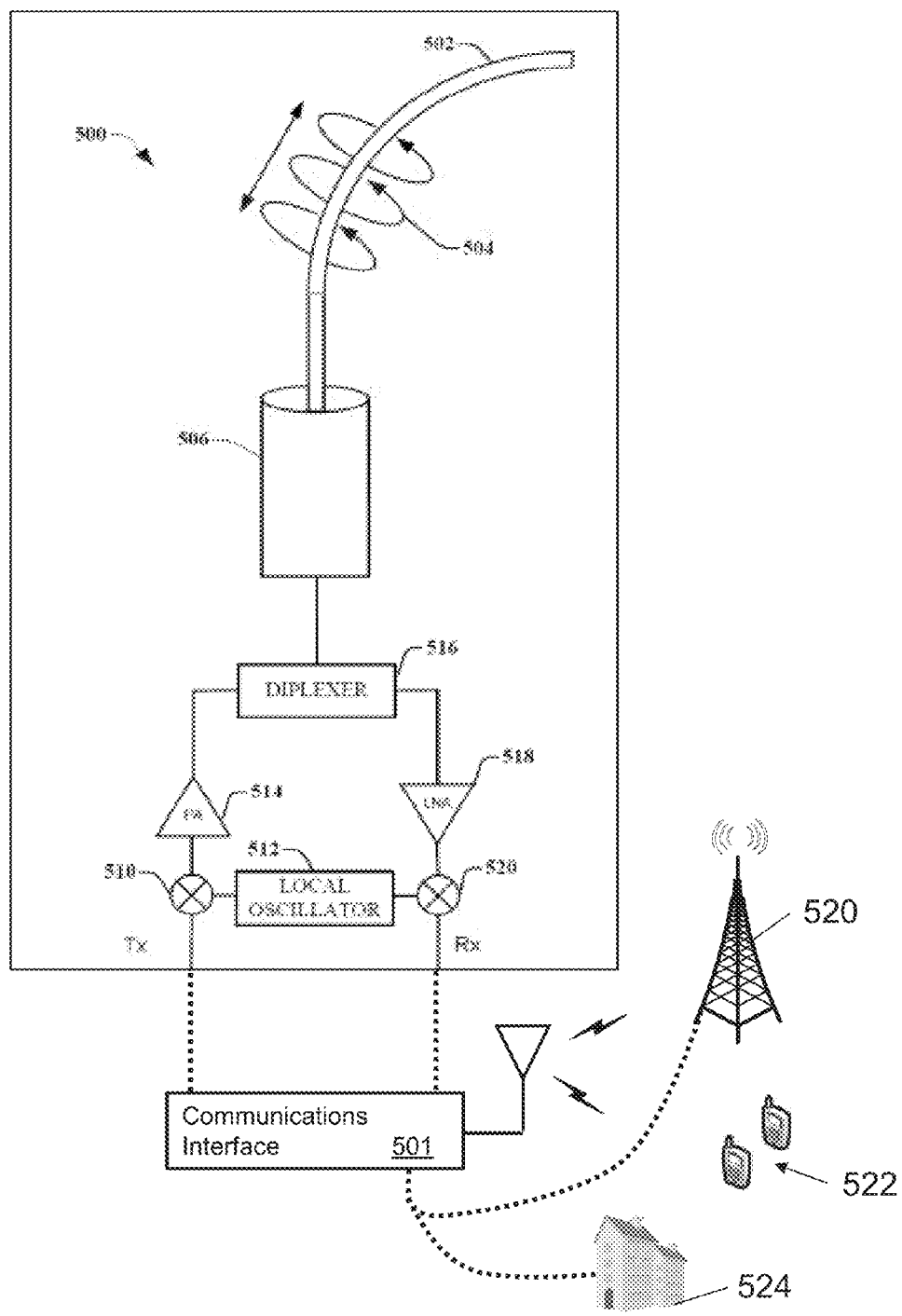
FIG. 5 is a block diagram illustrating an example, non-limiting embodiment of a dielectric waveguide coupler and transceiver in accordance with various aspects described herein.

Turning now to FIG. 5, illustrated is a block diagram of an example, non-limiting embodiment of a dielectric waveguide coupler and transceiver system 500 (referred to herein collectively as system 500) in accordance with various aspects described herein. System 500 implements a transmission device with a coupler that comprises a transmitter/receiver device 506 that launches and receives waves (e.g., guided-wave 504 onto dielectric waveguide 502). The guided-waves 504 can be used to transport signals received from and sent to a base station device 508, mobile devices 522, or a building 524 by way of a communications interface 501. The communications interface 501 can be an integral part of system 500. Alternatively, the communications interface 501 can be tethered to system 500. The communications interface 501 can comprise a wireless interface for interfacing to the base station 508, the mobile devices 522, or building 524 utilizing any of various wireless signaling protocols (e.g., LTE, WiFi, WiMAX, etc.). The communications interface 501 can also comprise a wired interface such as a fiber optic line, coaxial cable, twisted pair, or other suitable wired mediums for transmitting signals to the base station 508 or building 524. For embodiments where system 500 functions as a repeater, the communications interface 501 may not be necessary.

The output signals (e.g., Tx) of the communications interface 501 can be combined with a millimeter-wave carrier wave generated by a local oscillator 512 at frequency mixer 510. Frequency mixer 510 can use heterodyning techniques or other frequency shifting techniques to frequency shift the output signals from communications interface 501. For example, signals sent to and from the communications interface 501 can be modulated signals such as orthogonal frequency division multiplexed (OFDM) signals formatted in accordance with a Long-Term Evolution (LTE) wireless protocol or other wireless 3G, 4G, 5G or higher voice and data protocol, a Zigbee, WIMAX, Ultra Wideband or IEEE 802.11 wireless protocol or other wireless protocol. In an example embodiment, this frequency conversion can be done in the analog domain, and as a result, the frequency shifting can be done without regard to the type of communications protocol that the base station 508, mobile devices 522, or in-building devices 524 use. As new communications technologies are developed, the communications interface 501 can be upgraded or replaced and the frequency shifting and transmission apparatus can remain, simplifying upgrades. The carrier wave can then be sent to a power amplifier ("PA") 514 and can be transmitted via the transmitter receiver device 506 via the diplexer 516.

Signals received from the transmitter/receiver device 506 that are directed towards the communications interface 501 can be separated from other signals via diplexer 516. The transmission can then be sent to low noise amplifier ("LNA") 518 for amplification. A frequency mixer 520, with help from local oscillator 512 can downshift the transmission (which is in the millimeter-wave band or around 38 GHz in some embodiments) to the native frequency. The communications interface 501 can then receive the transmission at an input port (Rx).

In an embodiment, transmitter/receiver device 506 can include a cylindrical or non-cylindrical metal (which, for example, can be hollow in an embodiment, but not necessarily drawn to scale) or other conducting or non-conducting waveguide and an end of the dielectric waveguide 502 can be placed in or in proximity to the waveguide or the transmitter/receiver device 506 such that when the transmitter/receiver device 506 generates a transmission, the guided wave couples to dielectric waveguide 502 and propagates as a guided wave 504 about the waveguide surface of the dielectric waveguide 502. In some embodiments, the guided wave 504 can propagate in part on the outer surface of the dielectric waveguide 502 and in part inside the dielectric waveguide 502. In other embodiments, the guided wave 504 can propagate substantially or completely on the outer surface of the dielectric waveguide 502. In yet other embodiments, the guided wave 504 can propagate substantially or completely inside the dielectric waveguide 502. In this latter embodiment, the guide wave 504 can radiate at an end of the dielectric waveguide 502 (such as the tapered end shown in FIG. 4) for coupling to a transmission medium such as a wire 402 of FIG. 4. Similarly, if guided wave 504 is incoming (coupled to the dielectric waveguide 502 from a wire), guided wave 504 then enters the transmitter/receiver device 506 and couples to the cylindrical waveguide or conducting waveguide. While transmitter/receiver device 506 is shown to include a separate waveguide—an antenna, cavity resonator, klystron, magnetron, travelling wave tube, or other radiating element can be employed to induce a guided wave on the waveguide 502, without the separate waveguide.

In an embodiment, dielectric waveguide 502 can be wholly constructed of a dielectric material (or another suitable insulating material), without any metallic or otherwise conducting materials therein. Dielectric waveguide 502 can be composed of nylon, Teflon, polyethylene, a polyamide, other plastics, or other materials that are non-conducting and suitable for facilitating transmission of electromagnetic waves at least in part on an outer surface of such materials. In another embodiment, dielectric waveguide 502 can include a core that is conducting/metallic, and have an exterior dielectric surface. Similarly, a transmission medium that couples to the dielectric waveguide 502 for propagating electromagnetic waves induced by the dielectric waveguide 502 or for supplying electromagnetic waves to the dielectric waveguide 502 can be wholly constructed of a dielectric material (or another suitable insulating material), without any metallic or otherwise conducting materials therein.

It is noted that although FIG. 5A shows that the opening of transmitter receiver device 506 is much wider than the dielectric waveguide 502, this is not to scale, and that in other embodiments the width of the dielectric waveguide 502 is comparable or slightly smaller than the opening of the hollow waveguide. It is also not shown, but in an embodiment, an end of the waveguide 502 that is inserted into the transmitter/receiver device 506 tapers down in order to reduce reflection and increase coupling efficiencies.

The transmitter/receiver device 506 can be communicably coupled to a communications interface 501, and alternatively, transmitter/receiver device 506 can also be communicably coupled to the one or more distributed antennas 112 and 114 shown in FIG. 1. In other embodiments, transmitter receiver device 506 can comprise part of a repeater system for a backhaul network.

Before coupling to the dielectric waveguide 502, the one or more waveguide modes of the guided wave generated by the transmitter/receiver device 506 can couple to the dielectric waveguide 502 to induce one or more wave propagation modes of the guided wave 504. The wave propagation modes of the guided wave 504 can be different than the hollow metal waveguide modes due to the different characteristics of the hollow metal waveguide and the dielectric waveguide. For instance, wave propagation modes of the guide wave 504 can comprise the fundamental transverse electromagnetic mode (Quasi-TEM$_{00}$), where only small electrical and/or magnetic fields extend in the direction of propagation, and the electric and magnetic fields extend radially outwards from the dielectric waveguide 502 while the guided waves propagate along the dielectric waveguide 502. The fundamental transverse electromagnetic mode wave propagation mode may not exist inside a waveguide that is hollow. Therefore, the hollow metal waveguide modes that are used by transmitter/receiver device 506 are waveguide modes that can couple effectively and efficiently to wave propagation modes of dielectric waveguide 502.

Figure 6:
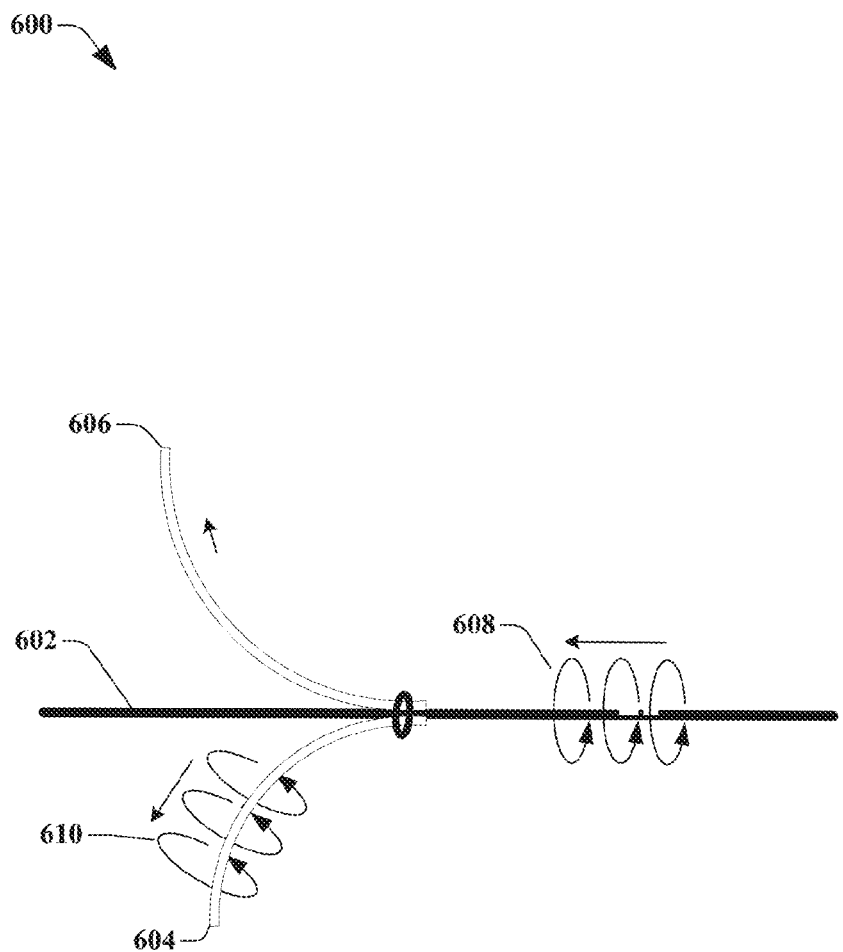
FIG. 6 is a block diagram illustrating an example, non-limiting embodiment of a dual dielectric waveguide coupler in accordance with various aspects described herein.

Turning now to FIG. 6, illustrated is a block diagram illustrating an example, non-limiting embodiment of a dual dielectric waveguide coupling system 600 in accordance with various aspects described herein. In an example embodiment, a coupling module is shown with two or more dielectric waveguides (e.g., 604 and 606) positioned around a wire 602 in order to receive guided-wave 608. In an example embodiment, the guided-wave 608 can be characterized as a surface wave or other electromagnetic wave. In an example embodiment, one dielectric waveguide is enough to receive the guided-wave 608. In that case, guided-wave 608 couples to dielectric waveguide 604 and propagates as guided-wave 610. If the field structure of the guided-wave 608 oscillates or undulates around the wire 602 due to various outside factors, then dielectric waveguide 606 can be placed such that guided-wave 608 couples to dielectric waveguide 606. In some embodiments, four or more dielectric waveguides can be placed around a portion of the wire 602, e.g., at 90 degrees or another spacing with respect to each other, in order to receive guided-waves that may oscillate or rotate around the wire 602, that have been induced at different axial orientations or that have non-fundamental or higher order modes that, for example, have lobes and/or nulls or other asymmetries that are orientation dependent. However, it will be appreciated that there may be less than or more than four dielectric waveguides placed around a portion of the wire 602 without departing from example embodiments. It will also be appreciated that while some example embodiments have presented a plurality of dielectric waveguides around at least a portion of a wire 602, this plurality of dielectric waveguides can also be considered as part of a single dielectric waveguide system having multiple dielectric waveguide subcomponents. For example, two or more dielectric waveguides can be manufactured as single system that can be installed around a wire in a single installation such that the dielectric waveguides are either pre-positioned or adjustable relative to each other (either manually or automatically) in accordance with the single system. Receivers coupled to dielectric waveguides 606 and 604 can use diversity combining to combine signals received from both dielectric waveguides 606 and 604 in order to maximize the signal quality. In other embodiments, if one or the other of a dielectric waveguide 604 and 606 receives a transmission that is above a predetermined threshold, receivers can use selection diversity when deciding which signal to use.

It is noted that the graphical representations of waves 608 and 610 are presented merely to illustrate the principles that guided-wave 608 induces or otherwise launches a wave 610 on a dielectric waveguide 604. The actual electric and magnetic fields generated as a result of such wave propagation may vary depending on the frequencies employed, the design of the dielectric waveguide 604, the dimensions and composition of the wire 602, as well as its surface characteristics, its optional insulation, the electromagnetic properties of the surrounding environment, etc.

Figure 7:
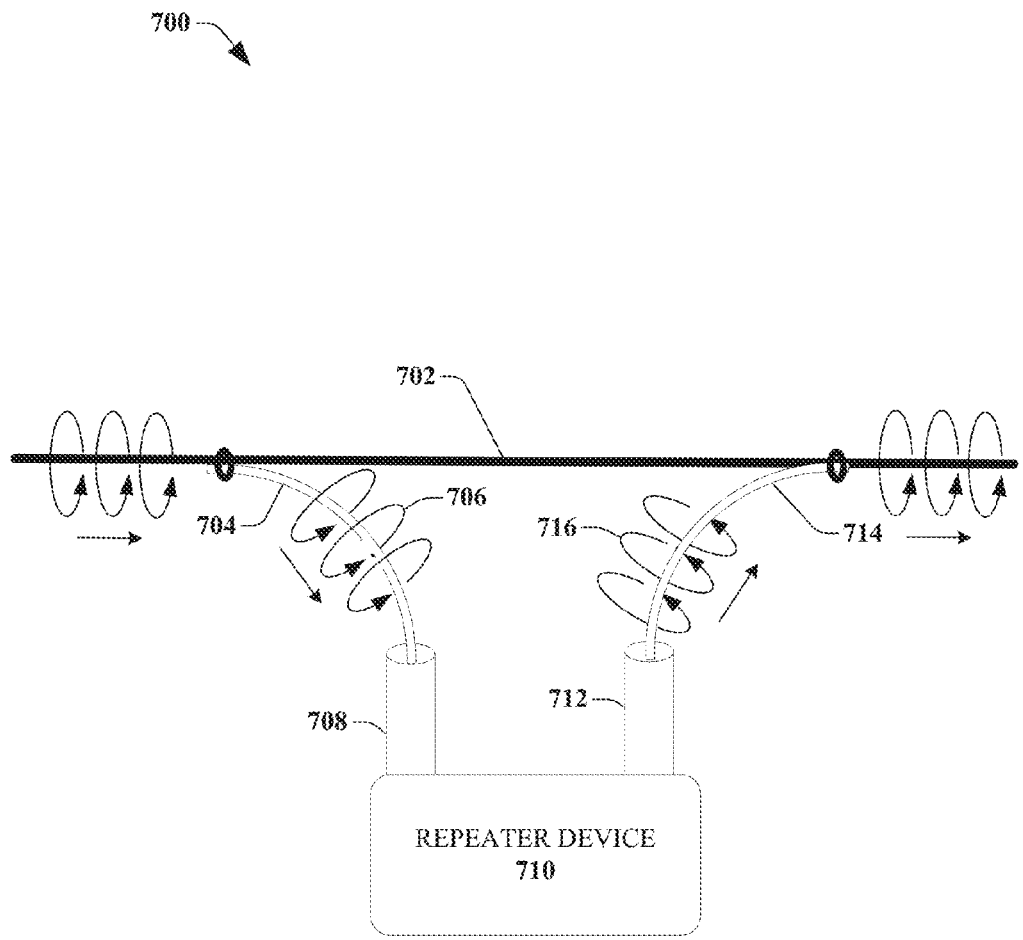
FIG. 7 is a block diagram illustrating an example, non-limiting embodiment of a bidirectional dielectric waveguide coupler in accordance with various aspects described herein.

Turning now to FIG. 7, illustrated is a block diagram of an example, non-limiting embodiment of a bidirectional dielectric waveguide coupling system 700 in accordance with various aspects described herein. Such a system 700 implements a transmission device with a coupling module that includes two dielectric waveguides 704 and 714 can be placed near a wire 702 such that guided-waves (e.g., surface waves or other electromagnetic waves) propagating along the wire 702 are coupled to dielectric waveguide 704 as wave 706, and then are boosted or repeated by repeater device 710 and launched as a guided-wave 716 onto dielectric waveguide 714. The guided-wave 716 can then couple to wire 702 and continue to propagate along the wire 702. In an example embodiment, the repeater device 710 can receive at least a portion of the power utilized for boosting or repeating through magnetic coupling with the wire 702, which can be a power line.

In some embodiments, repeater device 710 can repeat the transmission associated with wave 706, and in other embodiments, repeater device 710 can be associated with a distributed antenna system and/or base station device located near the repeater device 710. Receiver waveguide 708 can receive the wave 706 from the dielectric waveguide 704 and transmitter waveguide 712 can launch guided-wave 716 onto dielectric waveguide 714. Between receiver waveguide 708 and transmitter waveguide 712, the signal can be amplified to correct for signal loss and other inefficiencies associated with guided-wave communications or the signal can be received and processed to extract the data contained therein and regenerated for transmission. In an example embodiment, a signal can be extracted from the transmission and processed and otherwise emitted to mobile devices nearby via distributed antennas communicably coupled to the repeater device 710. Similarly, signals and/or communications received by the distributed antennas can be inserted into the transmission that is generated and launched onto dielectric waveguide 714 by transmitter waveguide 712. Accordingly, the repeater system 700 depicted in FIG. 7 can be comparable in function to the dielectric waveguide coupling device 108 and 110 in FIG. 1.

It is noted that although FIG. 7 shows guided-wave transmissions 706 and 716 entering from the left and exiting to the right respectively, this is merely a simplification and is not intended to be limiting. In other embodiments, receiver waveguide 708 and transmitter waveguide 712 can also function as transmitters and receivers respectively, allowing the repeater device 710 to be bi-directional.

In an example embodiment, repeater device 710 can be placed at locations where there are discontinuities or obstacles on the wire 702. These obstacles can include transformers, connections, utility poles, and other such power line devices. The repeater device 710 can help the guided (e.g., surface) waves jump over these obstacles on the line and boost the transmission power at the same time. In other embodiments, a dielectric waveguide can be used to jump over the obstacle without the use of a repeater device. In that embodiment, both ends of the dielectric waveguide can be tied or fastened to the wire, thus providing a path for the guided-wave to travel without being blocked by the obstacle.

Figure 8:
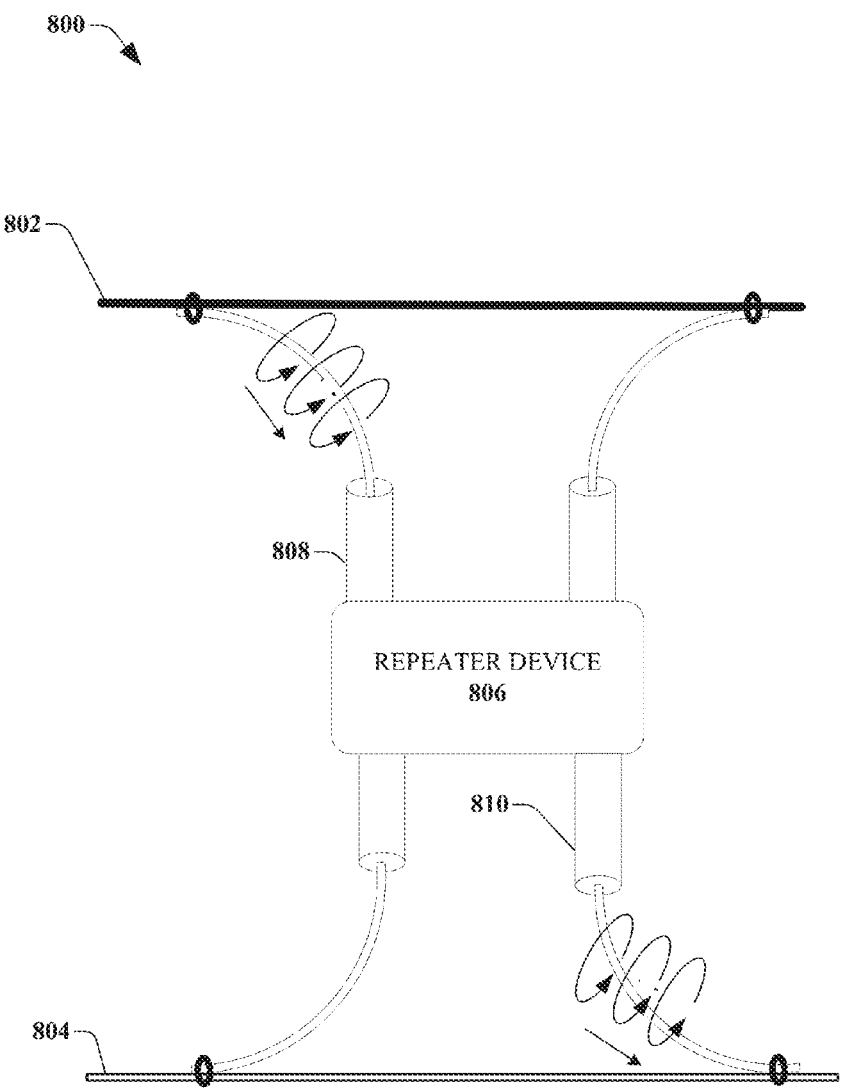
FIG. 8 illustrates a block diagram illustrating an example, non-limiting embodiment of a bidirectional dielectric waveguide coupler in accordance with various aspects described herein.

Turning now to FIG. 8, illustrated is a block diagram of an example, non-limiting embodiment of a bidirectional dielectric waveguide coupler 800 in accordance with various aspects described herein. The bidirectional dielectric waveguide coupler 800 implements a transmission device with a coupling module that can employ diversity paths in the case of when two or more wires are strung between utility poles. Since guided-wave transmissions have different transmission efficiencies and coupling efficiencies for insulated wires and un-insulated wires based on weather, precipitation and atmospheric conditions, it can be advantageous to selectively transmit on either an insulated wire or un-insulated wire at certain times.

In the embodiment shown in FIG. 8, the repeater device uses a receiver waveguide 808 to receive a guided-wave traveling along uninsulated wire 802 and repeats the transmission using transmitter waveguide 810 as a guided-wave along insulated wire 804. In other embodiments, repeater device can switch from the insulated wire 804 to the un-insulated wire 802, or can repeat the transmissions along the same paths. Repeater device 806 can include sensors, or be in communication with sensors that indicate conditions that can affect the transmission. Based on the feedback received from the sensors, the repeater device 806 can make the determination about whether to keep the transmission along the same wire, or transfer the transmission to the other wire.

Figure 9:
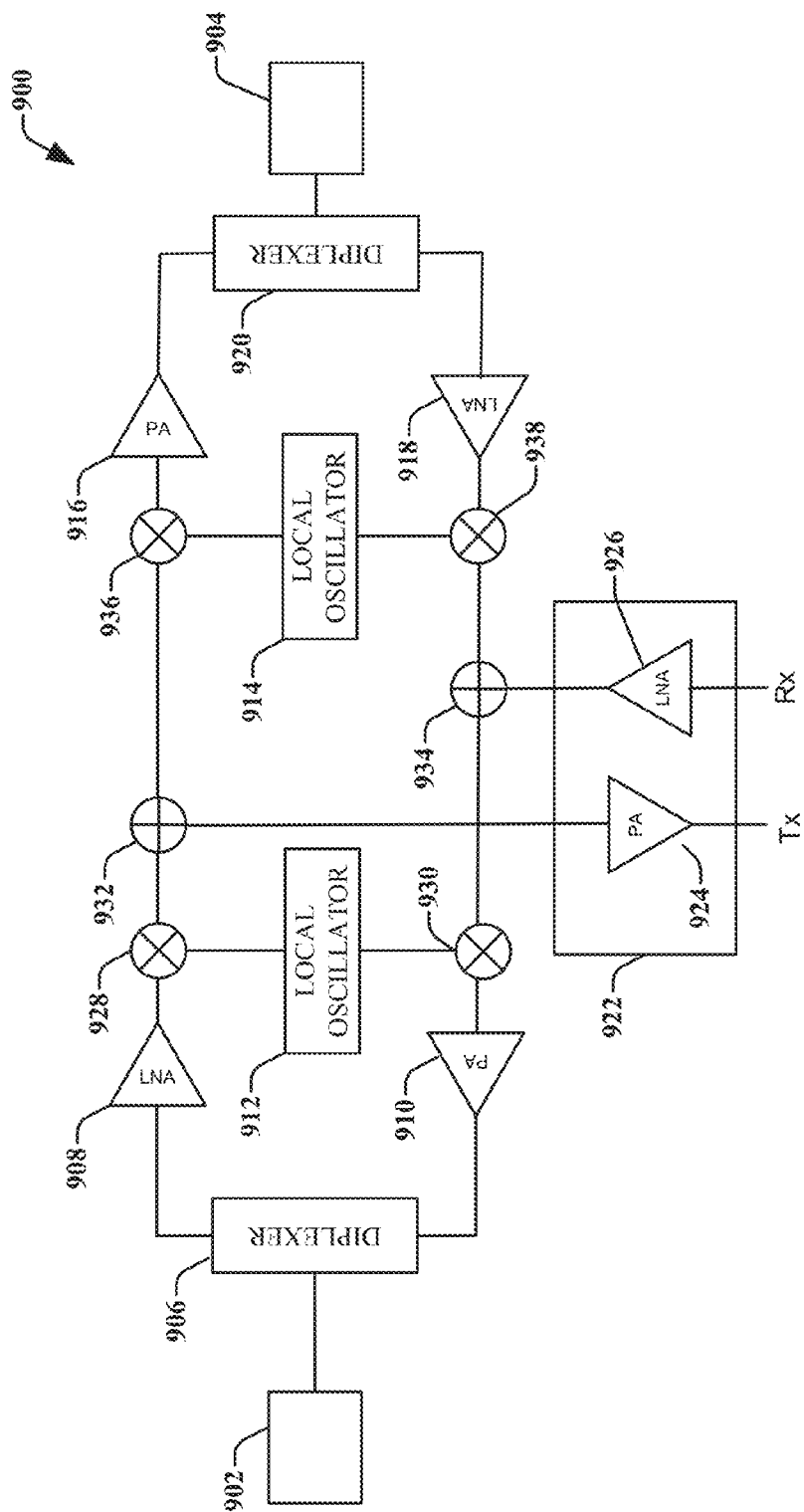
FIG. 9 illustrates a block diagram illustrating an example, non-limiting embodiment of a bidirectional repeater system in accordance with various aspects described herein.

Turning now to FIG. 9, illustrated is a block diagram illustrating an example, non-limiting embodiment of a bidirectional repeater system 900. Bidirectional repeater system 900 implements a transmission device with a coupling module that includes waveguide coupling devices 902 and 904 that receive and transmit transmissions from other coupling devices located in a distributed antenna system or backhaul system.

In various embodiments, waveguide coupling device 902 can receive a transmission from another waveguide coupling device, wherein the transmission has a plurality of subcarriers. Diplexer 906 can separate the transmission from other transmissions, for example by filtration, and direct the transmission to low-noise amplifier ("LNA") 908. A frequency mixer 928, with help from a local oscillator 912, can downshift the transmission (which is in the millimeter-wave band or around 38 GHz in some embodiments) to a lower frequency, whether it is a cellular band (~1.9 GHz) for a distributed antenna system, a native frequency, or other frequency for a backhaul system. An extractor 932 can extract the signal on the subcarrier that corresponds to the antenna or other output component 922 and direct the signal to the output component 922. For the signals that are not being extracted at this antenna location, extractor 932 can redirect them to another frequency mixer 936, where the signals are used to modulate a carrier wave generated by local oscillator 914. The carrier wave, with its subcarriers, is directed to a power amplifier ("PA") 916 and is retransmitted by waveguide coupling device 904 to another repeater system, via diplexer 920.

At the output device 922, a PA 924 can boost the signal for transmission to the mobile device. An LNA 926 can be used to amplify weak signals that are received from the mobile device and then send the signal to a multiplexer 934 which merges the signal with signals that have been received from waveguide coupling device 904. The output device 922 can be coupled to an antenna in a distributed antenna system or other antenna via, for example, a diplexer, duplexer or a transmit receive switch not specifically shown. The signals received from coupling device 904 have been split by diplexer 920, and then passed through LNA 918, and downshifted in frequency by frequency mixer 938. When the signals are combined by multiplexer 934, they are upshifted in frequency by frequency mixer 930, and then boosted by PA 910, and transmitted back to the launcher or on to another repeater by waveguide coupling device 902. In an example embodiment, the bidirectional repeater system 900 can be just a repeater without the antenna/output device 922. It will be appreciated that in some embodiments, a bidirectional repeater system 900 could also be implemented using two distinct and separate uni-directional repeaters. In an alternative embodiment, a bidirectional repeater system 900 could also be a booster or otherwise perform retransmissions without downshifting and upshifting. Indeed in example embodiment, the retransmissions can be based upon receiving a signal or guided-wave and performing some signal or guided-wave processing or reshaping, filtering, and/or amplification, prior to retransmission of the signal or guided-wave.

Figure 10:
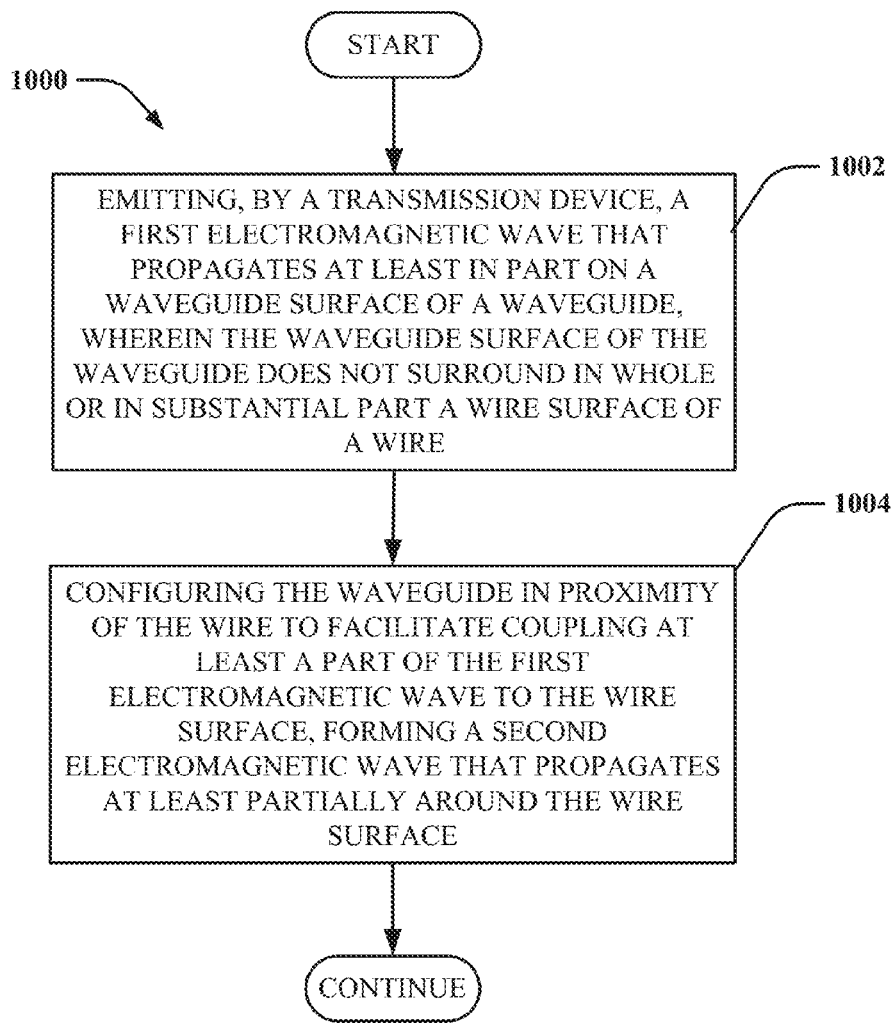
FIG. 10 illustrates a flow diagram of an example, non-limiting embodiment of a method for transmitting a transmission with a dielectric waveguide coupler as described herein.

FIG. 10 illustrates a process in connection with the aforementioned systems. The process in FIG. 10 can be implemented for example by systems 100, 200, 300, 400, 500, 600, 700, 800, and 900 illustrated in FIGS. 1-9 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 10 illustrates a flow diagram of an example, non-limiting embodiment of a method for transmitting a transmission with a dielectric waveguide coupler as described herein. Method 1000 can begin at 1002 where a first electromagnetic wave is emitted by a transmission device that propagates at least in part on a waveguide surface of a waveguide, wherein the waveguide surface of the waveguide does not surround in whole or in substantial part a wire surface of a wire. The transmission that is generated by a transmitter can be based on a signal received from a base station device, access point, network or a mobile device.

At 1004, based upon configuring the waveguide in proximity of the wire, the guided-wave then couples at least a part of the first electromagnetic wave to a wire surface, forming a second electromagnetic wave (e.g., a surface wave) that propagates at least partially around the wire surface, wherein the wire is in proximity to the waveguide. This can be done in response to positioning a portion of the dielectric waveguide (e.g., a tangent of a curve of the dielectric waveguide) near and parallel to the wire, wherein a wavelength of the electromagnetic wave is smaller than a circumference of the wire and the dielectric waveguide. The guided-wave, or surface wave, stays parallel to the wire even as the wire bends and flexes. Bends can increase transmission losses, which are also dependent on wire diameters, frequency, and materials. The coupling interface between the wire and the waveguide can also be configured to achieve the desired level of coupling, as described herein, which can include tapering an end of the waveguide to improve impedance matching between the waveguide and the wire.

The transmission that is emitted by the transmitter can exhibit one or more waveguide modes. The waveguide modes can be dependent on the shape and/or design of the waveguide. The propagation modes on the wire can be different than the waveguide modes due to the different characteristics of the waveguide and the wire. When the circumference of the wire is comparable in size to, or greater, than a wavelength of the transmission, the guided-wave exhibits multiple wave propagation modes. The guided-wave can therefore comprise more than one type of electric and magnetic field configuration. As the guided-wave (e.g., surface wave) propagates down the wire, the electrical and magnetic field configurations may remain substantially the same from end to end of the wire or vary as the transmission traverses the wave by rotation, dispersion, attenuation or other effects.

Figure 11:
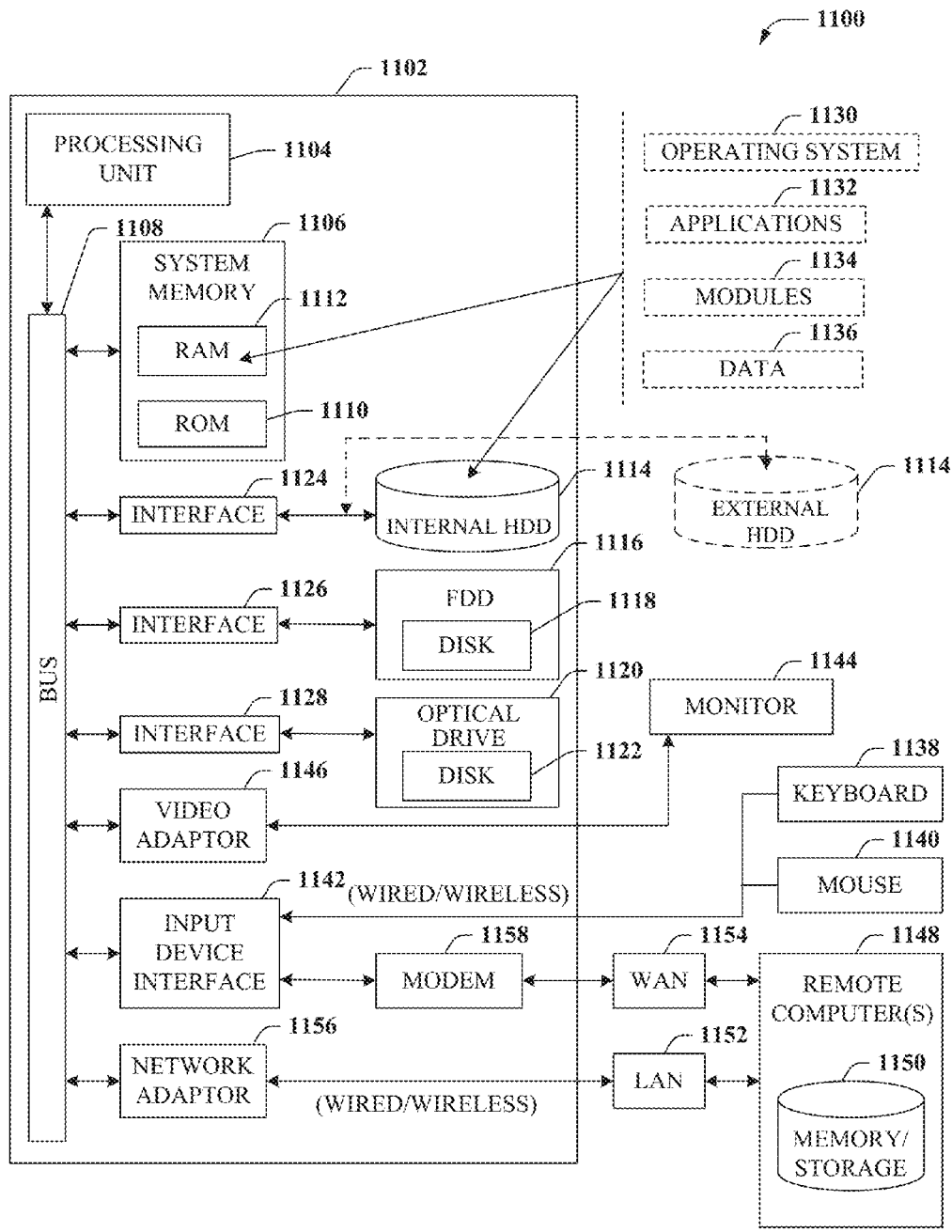
FIG. 11 is a block diagram of an example, non-limiting embodiment of a computing environment in accordance with various aspects described herein.

Referring now to FIG. 11, there is illustrated a block diagram of a computing environment in accordance with various aspects described herein. In order to provide additional context for various embodiments of the embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can be run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprise any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for transmitting and receiving signals via base station (e.g., base station devices 104 and 508) and repeater devices (e.g., repeater devices 710, 806, and 900) comprises a computer 1102, the computer 1102 comprising a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems. Examples of application programs 1132 that can be implemented and otherwise executed by processing unit 1104 include the diversity selection determining performed by repeater device 806. Base station device 508 shown in FIG. 5, also has stored on memory many applications and programs that can be executed by processing unit 1104 in this exemplary computing environment 1100.

A user can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. It will also be appreciated that in alternative embodiments, a monitor 1144 can also be any display device (e.g., another computer having a display, a smart phone, a tablet computer, etc.) for receiving display information associated with computer 1102 via any communication means, including via the Internet and cloud-based networks. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 12:
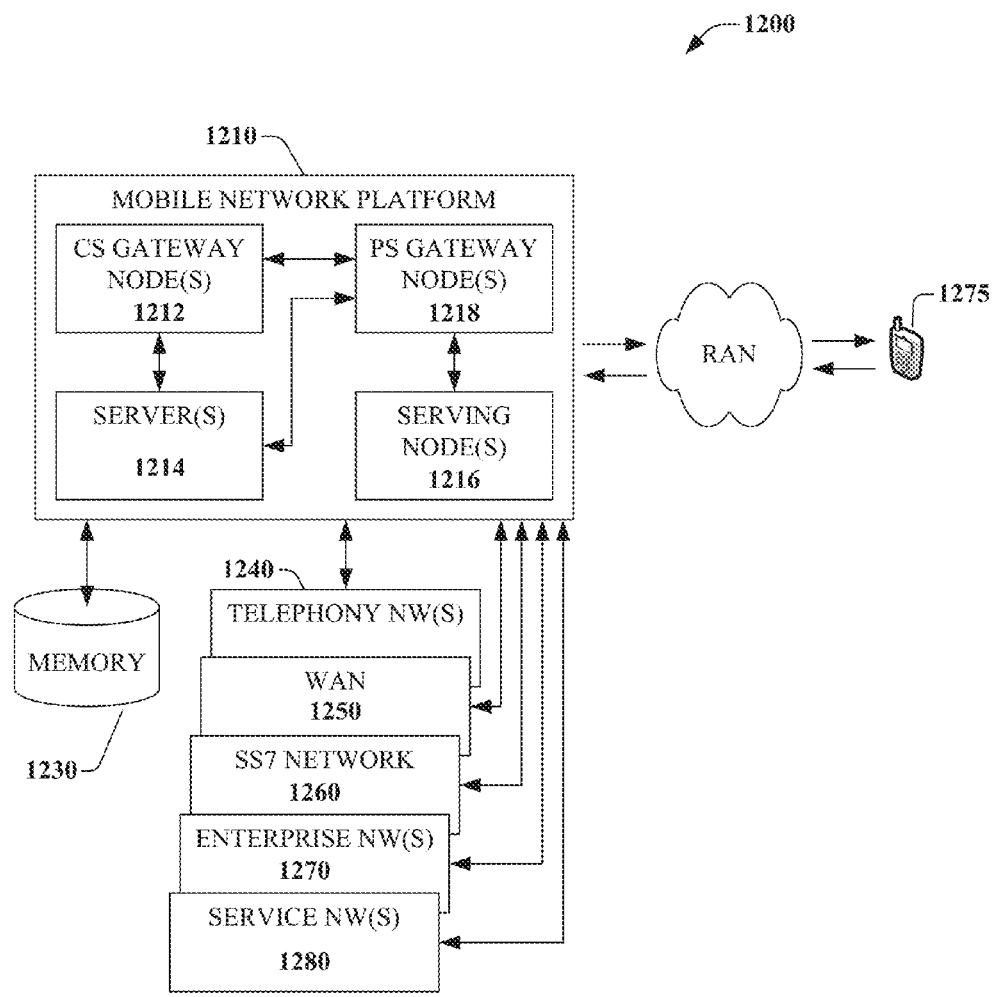
FIG. 12 is a block diagram of an example, non-limiting embodiment of a mobile network platform in accordance with various aspects described herein.

FIG. 12 presents an example embodiment 1200 of a mobile network platform 1210 that can implement and exploit one or more aspects of the disclosed subject matter described herein. In one or more embodiments, the mobile network platform 1210 can generate and receive signals transmitted and received by base stations (e.g., base station devices 104 and 508) and repeater devices (e.g., repeater devices 710, 806, and 900) associated with the disclosed subject matter. Generally, wireless network platform 1210 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 comprises CS gateway node(s) 1212 which can interface CS traffic received from legacy networks like telephony network(s) 1240, e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can comprise traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s), packet-switched gateway node(s) 1218 can generate packet data protocol contexts when a data session is established; other data structures that facilitate routing of packetized data also can be generated. To that end, in an aspect, PS gateway node(s) 1218 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also comprises serving node(s) 1216 that, based upon available radio technology layer(s) within technology resource(s), convey the various packetized flows of data streams received through PS gateway node(s) 1218. It is to be noted that for technology resource(s) that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as the distributed antennas networks shown in FIG. 1(*s*) that enhance wireless service coverage by providing more network coverage. Repeater devices such as those shown in FIGS. 7, 8, and 9 also improve network coverage in order to enhance subscriber service experience by way of UE 1275.

It is to be noted that server(s) 1214 can comprise one or more processors configured to confer at least in part the functionality of macro network platform 1210. To that end, the one or more processor can execute code instructions stored in memory 1230, for example. It is should be appreciated that server(s) 1214 can comprise a content manager, which operates in substantially the same manner as described hereinbefore.

In example embodiment 1200, memory 1230 can store information related to operation of wireless network platform 1210. Other operational information can comprise provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 13A:
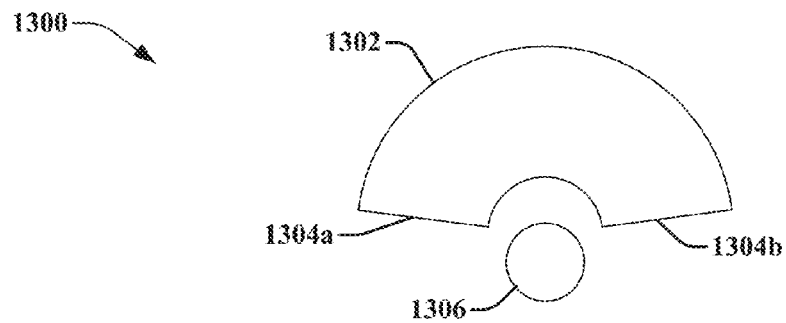
FIGS. 13a, 13b, and 13c are block diagrams illustrating example, non-limiting embodiments of a slotted waveguide coupler in accordance with various aspects described herein.
Figure 13B:
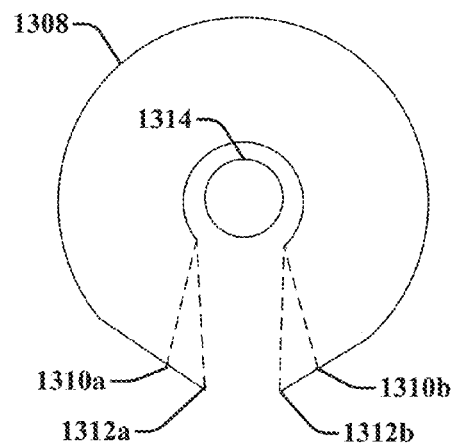
Figure 13C:
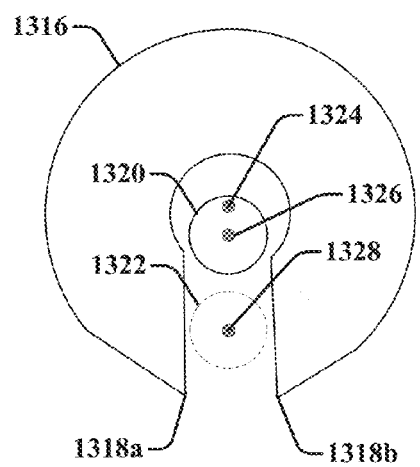

Turning now to FIGS. 13*a*, 13*b*, and 13*c*, illustrated are block diagrams of example, non-limiting embodiments of a slotted waveguide coupler system 1300 in accordance with various aspects described herein. In particular, cross sections of various waveguides are presented near the junction where the waveguide launches a guided-wave along a wire. In FIG. 13*a*, the waveguide coupler system comprises a wire 1306 that is positioned with respect to a waveguide 1302, such that the wire 1306 fits within or near a slot formed in the waveguide 1302 that runs longitudinally with respect to the wire 1306. The opposing ends 1304*a* and 1304*b* of the wire 1306, and the waveguide 1302 itself, surrounds less than 180 degrees of the wire surface of the wire 1306.

In FIG. 13*b* the waveguide coupler system comprises a wire 1314 that is positioned with respect to a waveguide 1308, such that the wire 1314 fits within or near a slot formed in the waveguide 1308 that runs longitudinally with respect to the wire 1314. The slot surfaces of the waveguide 1308 can be non-parallel, and two different exemplary embodiments are shown in FIG. 13*b*. In the first, slot surfaces 1310*a* and 1310*b* can be non-parallel and aim outwards, slightly wider than the width of the wire 1314. In the other embodiment, the slots surfaces 1312*a* and 1312*b* can still be non-parallel, but narrow to form a slot opening smaller than a width of the wire 1314. Any range of angles of the non-parallel slot surfaces are possible, of which these are two exemplary embodiments.

In FIG. 13*c*, the waveguide coupler system shows a wire 1320 that fits within a slot formed in waveguide 1316. The slot surfaces 1318*a* and 1318*b* in this exemplary embodiment can be parallel, but the axis 1326 of the wire 1320 is not aligned with the axis 1324 of the waveguide 1316. The waveguide 1316 and the wire 1320 are therefore not coaxially aligned. In another embodiment, shown, a possible position of the wire at 1322 also has an axis 1328 that is not aligned with the axis 1324 of the waveguide 1316.

It is to be appreciated that while three different embodiments showing a) waveguide surfaces that surround less than 180 degrees of the wire, b) non parallel slot surfaces, and c) coaxially unaligned wires and waveguide were shown separately in FIGS. 13*a*, 13*b*, and 13*c*, in various embodiments, diverse combinations of the listed features are possible.

Figure 14A:
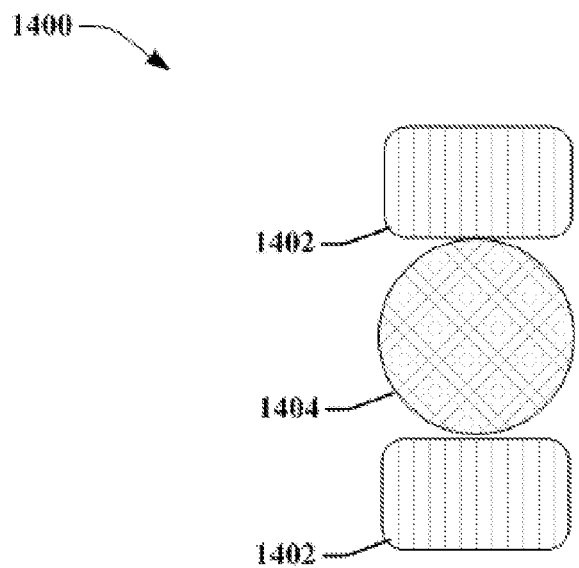
FIGS. 14a and 14b are a block diagrams illustrating an example, non-limiting embodiment of a waveguide coupling system in accordance with various aspects described herein.
Figure 14B:
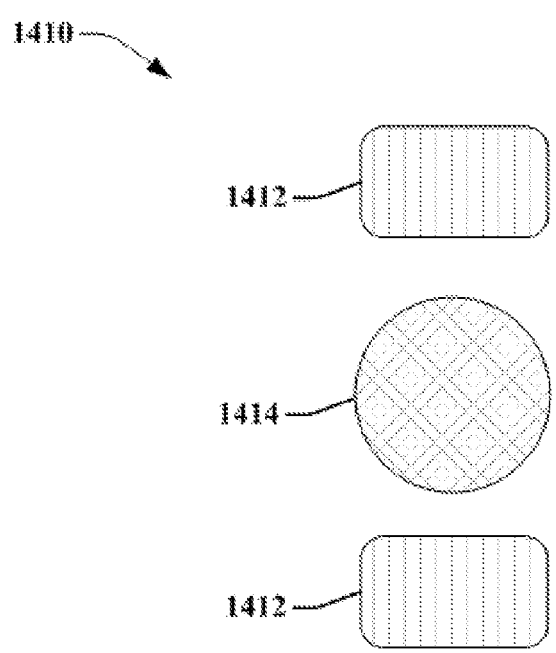

Turning now to FIG. 14, illustrated is an example, non-limiting embodiment of a waveguide coupling system 1400 in accordance with various aspects described herein. FIG. 14 depicts a cross sectional representation of the waveguide and wire embodiments shown in FIGS. 2, 3, 4, etc. As can be seen in 1400, the wire 1404 can be positioned directly next to and touching waveguide 1402. In other embodiments, as shown in waveguide coupling system 1410 in FIG. 14*b*, the wire 1414 can still be placed near, but not actually touching waveguide strip 1412. In both cases, electromagnetic waves traveling along the waveguides can induce other electromagnetic waves on to the wires and vice versa. Also, in both embodiments, the wires 1404 and 1414 are placed outside the cross-sectional area defined by the outer surfaces of waveguides 1402 and 1412.

For the purposes of this disclosure, a waveguide does not surround, in substantial part, a wire surface of a wire when the waveguide does not surround an axial region of the surface, when viewed in cross-section, of more than 180 degrees. For avoidance of doubt, a waveguide does not surround, in substantial part a surface of a wire when the waveguide surrounds an axial region of the surface, when viewed in cross-section, of 180 degrees or less.

It is to be appreciated that while FIGS. 14 and 14*b* show wires 1404 and 1414 having a circular shape and waveguides 1402 and 1412 having rectangular shapes, this is not meant to be limiting. In other embodiments, wires and waveguides can have a variety of shapes, sizes, and configurations. The shapes can include, but not be limited to: ovals or other ellipsoid shapes, octagons, quadrilaterals or other polygons with either sharp or rounded edges, or other shapes. Additionally, in some embodiments, the wires 1404 and 1414 can be stranded wires comprising smaller gauge wires, such as a helical strand, braid or other coupling of individual strands into a single wire. Any of wires and waveguides shown in the figures and described throughout this disclosure can include one or more of these embodiments.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used to determine positions around a wire that dielectric waveguides 604 and 606 should be placed in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence that can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component", "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

Turning now to FIG. 15, a block diagram is shown illustrating an example, non-limiting embodiment of a guided-wave communication system 1550. In operation, a transmission device 1500 receives one or more communication signals 1510 from a communication network or other communications device that include data and generates guided-waves 1520 to convey the data via the transmission media 1525 to the transmission device 1502. The transmission device 1502 receives the guided-waves 1520 and converts them to communication signals 1512 that include the data for transmission to a communications network or other communications device. The communication network or networks can include a wireless communication network such as a cellular voice and data network, a wireless local area network, a satellite communications network, a personal area network or other wireless network. The communication network or networks can include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway, laptop computer, tablet, smartphone, cellular telephone, or other communication device.

In an example embodiment, the guided-wave communication system 1550 can operate in a bi-directional fashion where transmission device 1500 receives one or more communication signals 1512 from a communication network or device that includes other data and generates guided-waves 1522 to convey the other data via the transmission media 1525 to the transmission device 1500. In this mode of operation, the transmission device 1502 receives the guided-waves 1522 and converts them to communication signals 1510 that include the other data for transmission to a communications network or device.

The transmission medium 1525 can include a wire or other conductor or inner portion having at least one inner portion surrounded by a dielectric material, the dielectric material having an outer surface and a corresponding circumference. In an example embodiment, the transmission medium 1525 operates as a single-wire transmission line to guide the transmission of an electromagnetic wave. When the transmission medium 1525 is implemented as a single wire transmission system, it can include a wire. The wire can be insulated or uninsulated, and single-stranded or multi-stranded. In other embodiments, the transmission medium 1525 can contain conductors of other shapes or configurations including wire bundles, cables, rods, rails, pipes. In addition, the transmission medium 1525 can include non-conductors such as dielectric pipes, rods, rails, or other dielectric members; combinations of conductors and dielectric materials or other guided-wave transmission media. It should be noted that the transmission medium 1525 can otherwise include any of the transmission media previously discussed in conjunction with FIGS. 1-14.

According to an example embodiment, the guided-waves 1520 and 1522 can be contrasted with radio transmissions over free space/air or conventional propagation of electrical power or signals through the conductor of a wire. In particular, guided-waves 1520 and 1522 are surface waves and other electromagnetic waves that surround all or part of the surface of the transmission medium and propagate with low loss along the transmission medium from transmission device 1500 to transmission device 1502, and vice versa. The guided-waves 1520 and 1522 can have a field structure (e.g., an electromagnetic field structure) that lies primarily or substantially outside of the transmission medium 1525. In addition to the propagation of guided-waves 1520 and 1522, the transmission medium 1525 may optionally contain one or more wires that propagate electrical power or other communication signals in a conventional manner as a part of one or more electrical circuits.

Turning now to FIG. 16, a block diagram is shown illustrating an example, non-limiting embodiment of a transmission device 1500 or 1502. The transmission device 1500 or 1502 includes a communications interface (I/F) 1600, a transceiver 1610 and a coupler 1620.

In an example of operation, the communications interface 1600 receives a communication signal 1510 or 1512 that includes first data. In various embodiments, the communications interface 1600 can include a wireless interface for receiving a wireless communication signal in accordance with a wireless standard protocol such as LTE or other cellular voice and data protocol, an 802.11 protocol, WIMAX protocol, Ultra Wideband protocol, Bluetooth protocol, Zigbee protocol, a direct broadcast satellite (DBS) or other satellite communication protocol or other wireless protocol. In addition or in the alternative, the communications interface 1600 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 1600 can operate in conjunction with other wired or wireless protocol. In addition, the communications interface 1600 can optionally operate in conjunction with a protocol stack that includes multiple protocol layers.

In an example of operation, the transceiver 1610 generates a first electromagnetic wave based on the communication signal 1510 or 1512 to convey the first data. The first electromagnetic wave has at least one carrier frequency and at least one corresponding wavelength. In various embodiments, the transceiver 1610 is a microwave transceiver that operates at a carrier frequency with a corresponding wavelength that is less than the circumference of the transmission medium 1525. The carrier frequency can be within a millimeter-wave frequency band of 30 GHz-300 GHz or a lower frequency band of 3 GHz-30 GHz in the microwave frequency band. In one mode of operation, the transceiver 1610 merely upconverts the communications signal or signals 1510 or 1512 for transmission of the first electromagnetic signal in the microwave or millimeter-wave band. In another mode of operation, the communications interface 1600 either converts the communication signal 1510 or 1512 to a baseband or near baseband signal or extracts the first data from the communication signal 1510 or 1512 and the transceiver 1610 modulates the first data, the baseband or near baseband signal for transmission.

In an example of operation, the coupler 1620 couples the first electromagnetic wave to the transmission medium 1525. The coupler 1620 can be implemented via a dielectric waveguide coupler or any of the couplers and coupling devices described in conjunction with FIGS. 1-14. In an example embodiment, the transmission medium 1525 includes a wire or other inner element surrounded by a dielectric material having an outer surface. The dielectric material can include an insulating jacket, a dielectric coating or other dielectric on the outer surface of the transmission medium 1525. The inner portion can include a dielectric or other insulator, a conductor, air or other gas or void, or one or more conductors.

In an example of operation, the coupling of the first electromagnetic wave to the transmission medium 1525 forms a second electromagnetic wave that is guided to propagate along the outer surface of the dielectric material of the transmission medium via at least one guided-wave mode that includes an asymmetric mode and optionally one or more other modes including a fundamental (symmetric) mode or other asymmetric (non-fundamental) mode. The outer surface of the dielectric material can be the outer surface of an insulating jacket, dielectric coating, or other dielectric. In an example embodiment, the first electromagnetic wave generated by the transceiver 1610 is guided to propagate along the coupler via at least one guided-wave mode that includes a symmetric mode and wherein a junction between the coupler and the transmission medium induces the asymmetric mode of the second electromagnetic wave and optionally a symmetric mode of the second electromagnetic wave.

In an example embodiment, the transmission medium 1525 is a single wire transmission medium having an outer surface and a corresponding circumference and the coupler 1620 couples the first electromagnetic wave to the single wire transmission medium. In particular, the coupling of the first electromagnetic wave to the single wire transmission medium forms a second electromagnetic wave that is guided to propagate along the outer surface of the single wire transmission medium via at least one guided-wave mode that includes at least one asymmetric mode and optionally a symmetric mode and other asymmetric modes, wherein the carrier frequency in within a microwave or millimeter-wave frequency band and wherein the corresponding wavelength is less than the circumference of the single wire transmission medium. In one mode of operation, the first electromagnetic wave is guided to propagate along the coupler via at least one guided-wave mode that includes a symmetric mode and a junction between the coupler and the transmission medium induces both the asymmetric mode of the second electromagnetic wave and, when present, the symmetric mode of the second electromagnetic wave.

While the prior description has focused on the operation of the transceiver 1610 as a transmitter, the transceiver 1610 can also operate to receive electromagnetic waves that convey second data from the single wire transmission medium via the coupler 1620 and to generated communications signals 1510 or 1512, via communications interface 1600 that includes the second data. Consider embodiments where a third electromagnetic wave conveys second data that also propagates along the outer surface of the dielectric material of the transmission medium 1525. The coupler 1620 also couples the third electromagnetic wave from the transmission medium 1525 to form a fourth electromagnetic wave. The transceiver 1610 receives the fourth electromagnetic wave and generates a second communication signal that includes the second data. The communication interface 1600 sends the second communication signal to a communication network or a communications device.

Turning now to FIG. 17, a diagram is shown illustrating an example, non-limiting embodiment of an electromagnetic field distribution. In this embodiment, a transmission medium 1525 in air includes an inner conductor 1700 and an insulating jacket 1702 of dielectric material, is shown in cross section. The diagram includes different gray-scales that represent differing electromagnetic field strengths generated by the propagation of the guided-wave having an asymmetric mode. The guided-wave has a field structure that lies primarily or substantially outside of the transmission medium 1525 that serves to guide the wave. The regions inside the conductor 1700 have little or no field. Likewise regions inside the insulating jacket 1702 have low field strength. The majority of the electromagnetic field strength is distributed in the lobes 1704 at the outer surface of the insulating jacket 1702 and in close proximity thereof. The presence of an asymmetric guided-wave mode is shown by the high electromagnetic field strengths at the top and bottom of the outer surface of the insulating jacket 1702—as opposed to very small field strengths on the other sides of the insulating jacket 1702.

The example shown corresponds to a 38 GHz wave guided by a wire with a diameter of 1.1 cm and a dielectric insulation of thickness of 0.36 cm. Because the electromagnetic wave is guided by the transmission medium 1525 and the majority of the field strength is concentrated in the air outside of the insulating jacket 1702 within a limited distance of the outer surface, the guided-wave can propagate longitudinally down the transmission medium 1525 with very low loss. In the example shown, this "limited distance" corresponds to a distance from the outer surface that is less than half the largest cross sectional dimension of the transmission medium 1525. In this case, the largest cross sectional dimension of the wire corresponds to the overall diameter of 1.82 cm, however other this value can vary with the size and shape of the transmission medium 1525. For example, should the transmission medium be of rectangular shape with a height of 0.3 cm and a width of 0.4 cm, the largest cross sectional dimension would be the diagonal of 0.5 cm and the corresponding limited distance would be 0.25 cm.

In an example embodiment, this particular asymmetric mode of propagation is induced on the transmission medium 1525 by an electromagnetic wave having a frequency that falls within a limited range (such as +25%) of the lower cut-off frequency of the asymmetric mode. For embodiments as shown that include an inner conductor 1700 surrounded by a insulating jacket 1702, this cutoff frequency can vary based on the dimensions and properties of the insulating jacket 1702 and potentially the dimensions and properties of the inner conductor 1700 and can be determined experimentally to have a desired mode pattern. It should be noted however, that similar effects can be found for a hollow dielectric or insulator without an inner conductor. In this case, the cutoff frequency can vary based on the dimensions and properties of the hollow dielectric or insulator.

At frequencies lower than the lower cut-off frequency, the asymmetric mode is difficult to induce in the transmission medium 1525 and fails to propagate for all but trivial distances. As the frequency increases above the limited range of frequencies about the cut-off frequency, the asymmetric mode shifts more and more inward of the insulating jacket 1702. At frequencies much larger than the cut-off frequency, the field strength is no longer concentrated outside of the insulating jacket, but primarily inside of the insulating jacket 1702. While the transmission medium 1525 provides strong guidance to the electromagnetic wave and propagation is still possible, ranges are more limited by increased losses due to propagation within the insulating jacket 1702—as opposed to the surrounding air.

Figure 18:
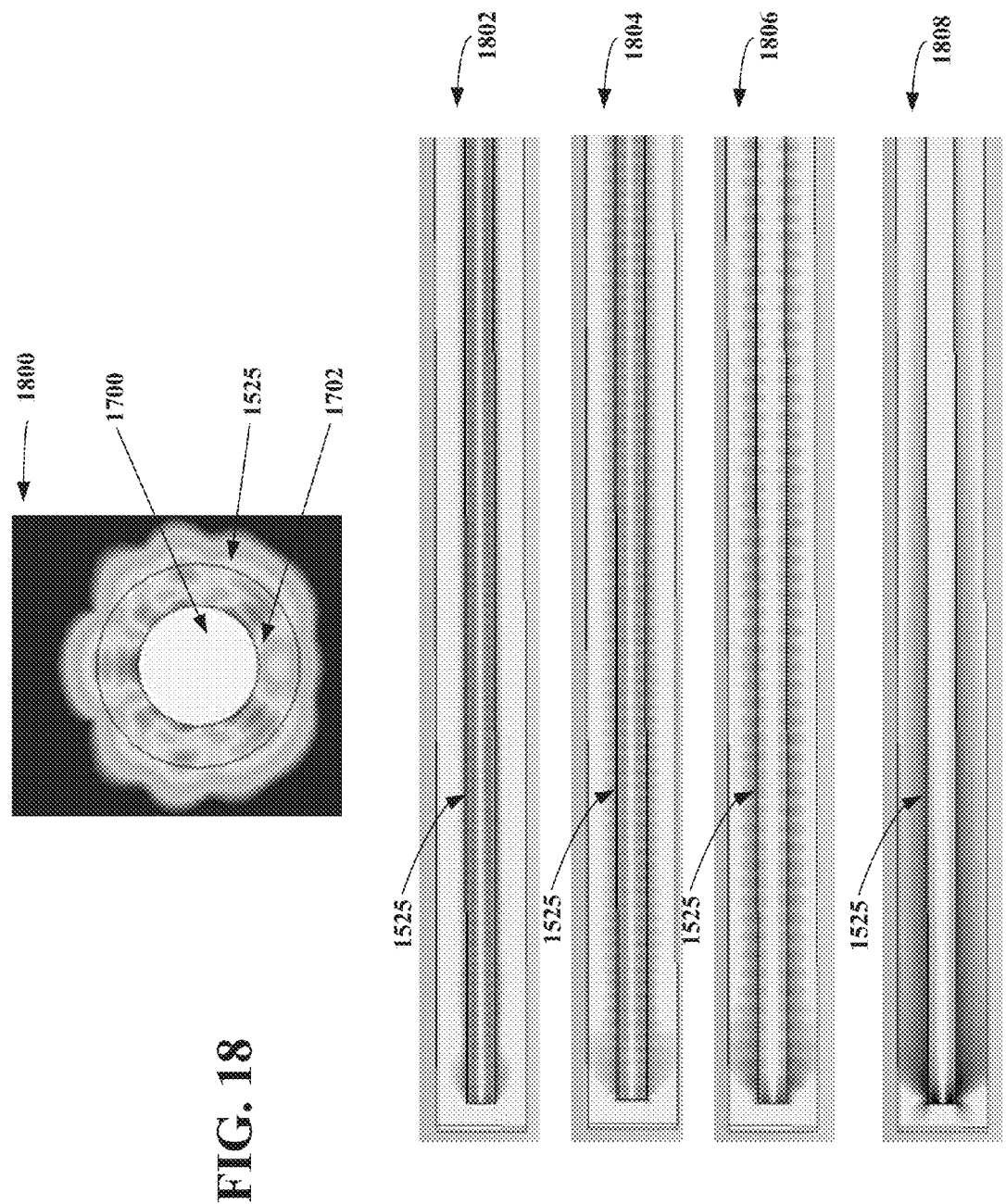
FIG. 18 is a diagram illustrating an example, non-limiting embodiment of an electromagnetic distribution in accordance with various aspects described herein.

Turning now to FIG. 18, a diagram is shown illustrating example, non-limiting embodiments of various electromagnetic field distributions. In particular, a cross section diagram 1800, similar to FIG. 17 is shown with common reference numerals used to refer to similar elements. The example shown in cross section 1800 corresponds to a 60 GHz wave guided by a wire with a diameter of 1.1 cm and a dielectric insulation of thickness of 0.36 cm. Because the frequency of the wave is above the limited range of the cut-off frequency, the asymmetric mode has shifted inward of the insulating jacket 1702. In particular, the field strength is concentrated primarily inside of the insulating jacket 1702. While the transmission medium 1525 provides strong guidance to the electromagnetic wave and propagation is still possible, ranges are more limited when compared with the embodiment of FIG. 17, by increased losses due to propagation within the insulating jacket 1702.

The diagrams 1802, 1804, 1806 and 1808 also present embodiments of a transmission medium 1525 in air that includes an inner conductor and an insulating jacket of dielectric material, shown in longitudinal cross section. These diagrams include different gray-scales that represent differing electromagnetic field strengths generated by the propagation of the guided-wave having an asymmetric mode at different frequencies. At frequencies lower than the lower cut-off frequency, represented by diagram 1808, the electric field is not tightly coupled to the surface of the transmission medium 1525. The asymmetric mode is difficult to induce in the transmission medium 1525 and fails to propagate for all but trivial distances. At frequencies within the limited range of the cutoff frequency, represented by diagram 1806, while some of the electric field strength is within the insulating jacket, the guided-wave has a field structure that lies primarily or substantially outside of the transmission medium 1525 that serves to guide the wave. As discussed in conjunction with FIG. 17, the regions inside the conductor 1700 have little or no field and propagation is supported over reasonable distance. As the frequency increases above the limited range of frequencies about the cut-off frequency, represented by diagram 1804, the asymmetric mode shifts more and more inward of the insulating jacket of transmission medium 1525 increasing propagation losses and reducing effect distances. At frequencies much larger than the cut-off frequency, represented by diagram 1802, the field strength is no longer concentrated outside of the insulating jacket, but primarily inside of the insulating jacket 1702. While the transmission medium 1525 provides strong guidance to the electromagnetic wave and propagation is still possible, ranges are more limited by increased losses due to propagation within the insulating jacket 1702—as opposed to the surrounding air.

Figure 19:
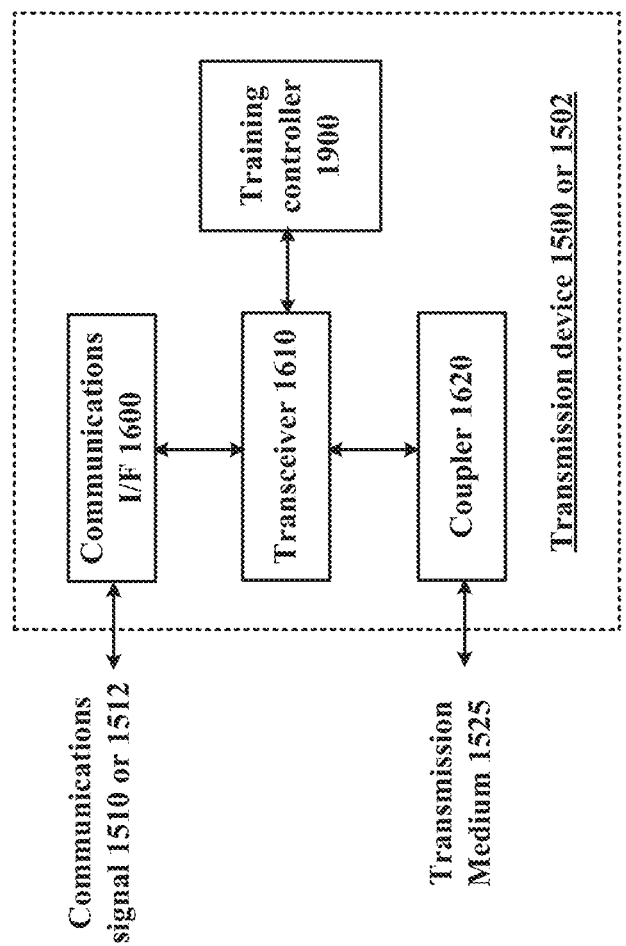
FIG. 19 is a block diagram illustrating an example, non-limiting embodiment of a transmission device in accordance with various aspects described herein.

Turning now to FIG. 19, a block diagram is shown illustrating an example, non-limiting embodiment of a transmission device. In particular, a diagram similar to FIG. 16 is presented with common reference numerals used to refer to similar elements. The transmission device 1500 or 1502 includes a communications interface 1600 that receives a communication signal 1510 or 1512 that includes data. The transceiver 1610 generates a first electromagnetic wave based on the communication signal 1510 or 1512 to convey the first data, the first electromagnetic wave having at least one carrier frequency. A coupler 1620 couples the first electromagnetic wave to the transmission medium 1525 having at least one inner portion surrounded by a dielectric material, the dielectric material having an outer surface and a corresponding circumference. The first electromagnetic wave is coupled to the transmission medium to form a second electromagnetic wave that is guided to propagate along the outer surface of the dielectric material via at least one guided-wave mode. The guided-wave mode includes an asymmetric mode having a lower cutoff frequency and the carrier frequency is selected to be within a limited range of the lower cutoff frequency.

The transmission device 1500 or 1502 includes an optional training controller 1900. In an example embodiment, the training controller 1900 is implemented by a standalone processor or a processor that is shared with one or more other components of the transmission device 1500 or 1502. The training controller 1900 selects the carrier frequency to be within the limited range of the lower cutoff frequency based on feedback data received by the transceiver 1610 from at least one remote transmission device coupled to receive the second electromagnetic wave.

In an example embodiment, a third electromagnetic wave transmitted by a remote transmission device 1500 or 1502 conveys second data that also propagates along the outer surface of the dielectric material of a transmission medium 1525. The second data can be generated to include the feedback data. In operation, the coupler 1620 also couples the third electromagnetic wave from the transmission medium 1525 to form a fourth electromagnetic wave and the transceiver receives the fourth electromagnetic wave and processes the fourth electromagnetic wave to extract the second data.

In an example embodiment, the training controller 1900 operates based on the feedback data to evaluate a plurality of candidate frequencies and to select the carrier frequency to be within the limited range of the lower cutoff frequency, as one of the plurality of candidate frequencies. For example, the candidate frequencies can be selected based on criteria such as: being in a microwave or millimeter-wave frequency band, having wavelengths greater than an outer circumference of the transmission medium 1525, being less than the mean collision frequency of electrons in a conductor that makes up a portion of the transmission medium 1525, based on experimental results that indicate the limited range of frequencies about the cutoff frequency for a particular transmission medium 1525 and a selected asymmetric mode, and/or based on experimental results or simulations.

Consider the following example: a transmission device 1500 begins operation under control of the training controller 1900 by sending a plurality of guided-waves as test signals such as ones or pilot waves at a corresponding plurality of candidate frequencies directed to a remote transmission device 1502 coupled to the transmission medium 1525. A transmission device 1500 can generate first electromagnetic waves that are coupled onto the transmission medium as second electromagnetic waves. While the guided-wave modes may differ, generally the carrier frequency or frequencies of the second electromagnetic waves are equal to the carrier frequency or frequencies of the first electromagnetic waves. In cases, however, where the coupling includes a nonlinearity due to a junction, a non-linear element of a coupler, or other non-linearity, the carrier frequencies of one or more guided-wave modes of the second electromagnetic waves can be at a harmonic frequency or frequencies, at the sum of two or more carrier frequencies, or at a difference of two or more carrier frequencies. In either case, the carrier frequency or frequencies of the electromagnetic waves launched on a transmission medium can be selected, based on knowledge of the linear or nonlinear effects of the coupling and further based on the selection of the carrier frequency or frequencies of the waves that are coupled to launch the waves on the transmission medium.

The guided-waves can include, in addition or in the alternative, test data at a corresponding plurality of candidate frequencies directed to a remote transmission device 1502 coupled to the transmission medium 1525. The test data can indicate the particular candidate frequency of the signal. In an embodiment, the training controller 1900 at the remote transmission device 1502 receives the test signals and/or test data from any of the guided-waves that were properly received and determines the best candidate frequency, a set of acceptable candidate frequencies, or a rank ordering of candidate frequencies. This candidate frequency or frequencies is generated by the training controller 1900 based on one or more optimizing criteria such as received signal strength, bit error rate, packet error rate, signal to noise ratio, a carrier frequency with reduced or lowest propagation loss, a carrier frequency that is detected, based on an analysis of any of the previous criteria, to be within a limited range of cutoff of a non-fundamental mode or other optimizing criteria can be generated by the transceiver 1610 of the remote transmission device 1502. The training controller 1900 generates feedback data that indicates the candidate frequency or frequencies and sends the feedback data to the transceiver 1610 for transmission to the transmission device 1500. The transmission device 1500 and 1502 can then communicate data with one another utilizing the indicated carrier frequency or frequencies.

In other embodiments, the electromagnetic waves that contain the test signals and/or test data are reflected back, repeated back or otherwise looped back by the remote transmission device 1502 to the transmission device 1502 for reception and analysis by the training controller 1900 of the transmission device 1502 that initiated these waves. For example, the transmission device 1502 can send a signal to the remote transmission device 1502 to initiate a test mode where a physical reflector is switched on the line, a termination impedance is changed to cause reflections, a loop back circuits is switched on to couple electromagnetic waves back to the source transmission device 1502, and/or a repeater mode is enabled to amplify and retransmit the electromagnetic waves back to the source transmission device 1502. The training controller 1900 at the source transmission device 1502 receives the test signals and/or test data from any of the guided-waves that were properly received and determines the best candidate frequency, a set of acceptable candidate frequencies, or a rank ordering of candidate frequencies. This candidate frequency or frequencies is generated by the training controller 1900 based on one or more optimizing criteria such as received signal strength, bit error rate, packet error rate, signal to noise ratio or other optimizing criteria can be generated by the transceiver 1610 of the remote transmission device 1502.

While the procedure above has been described in a start-up or initialization mode of operation, each transmission device 1500 or 1502 can send test signals or otherwise evaluate candidate frequencies at other times as well. In an example embodiment, the communication protocol between the transmission devices 1500 and 1502 can include a periodic test mode where either full testing or more limited testing of a subset of candidate frequencies are tested and evaluated. In other modes of operation, the re-entry into such a test mode can be triggered by a degradation of performance due to a disturbance, weather conditions, etc. In an example embodiment, the receiver bandwidth of the transceiver 1610 is either sufficiently wide to include all candidate frequencies or can be selectively adjusted by the training controller 1900 to a training mode where the receiver bandwidth of the transceiver 1610 is sufficiently wide to include all candidate frequencies.

While the guided-wave above has been described as propagating on the outer surface of an outer dielectric surface of the transmission medium 1525, other outer surfaces of a transmission medium 1525 including the outer surface of a bare wire could likewise be employed. Further, while the training controller 1900 has been described above as selecting a candidate frequency to be within a limited range of the lower cut-off frequency of an asymmetric mode, the training controller 1900 could be used to establish a candidate frequency that optimizes, substantially optimizes or pareto optimizes the propagation along a transmission medium 1525 based on one or more performance criteria such as throughput, packet error rate, signal strength, signal to noise ratio, signal to noise and interference ratio, channel separation in a multi-channel system, and/or other performance criteria—with or without an asymmetric mode and with or without regard to whether the candidate frequency falls within a limited range of the lower cutoff frequency of any particular mode.

Figure 20A:
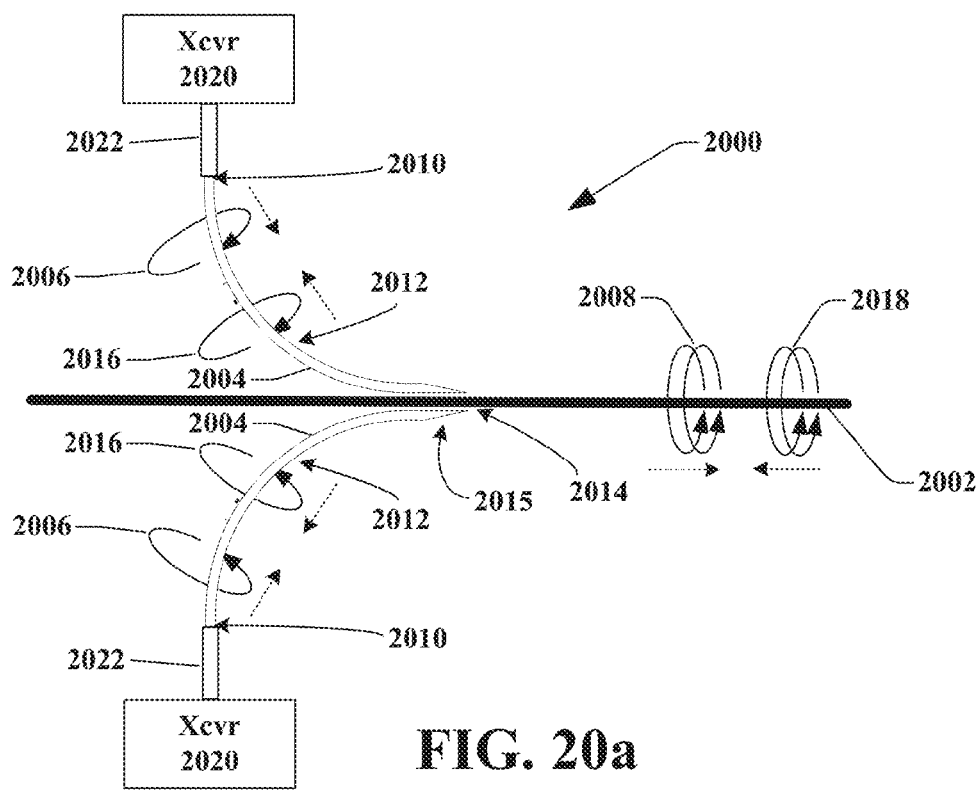
FIG. 20a is a block diagram of an example, non-limiting embodiment of a transmission device and FIG. 20b provides example, non-limiting embodiments of various coupler shapes in accordance with various aspects described herein.
Figure 20B:
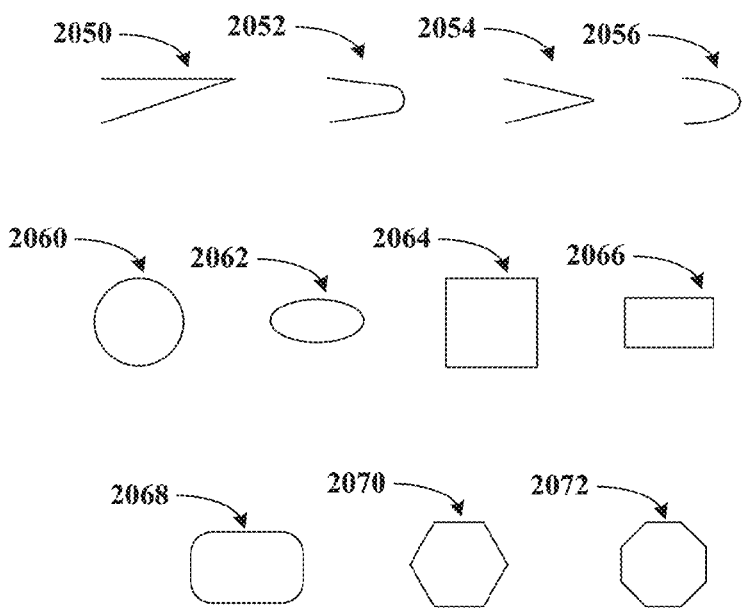

FIG. 20*a* is a block diagram of an example, non-limiting embodiment of a transmission device and FIG. 20*b* provides example, non-limiting embodiments of various coupler shapes in accordance with various aspects described herein. In particular, a transmission device 2000 is shown that includes a plurality of transceivers (Xcvr) 2020, each having a transmitting device (or transmitter) and/or a receiving device (receiver) that is coupled to a corresponding waveguide 2022 and coupler 2004. The plurality of couplers 2004 can be referred to collectively as a "coupling module". Each coupler 2004 of such a coupling module includes a receiving portion 2010 that receives an electromagnetic wave 2006 conveying first data from a transmitting device of transceiver 2020 via waveguide 2022. A guiding portion 2012 of the coupler 2004 guides a first electromagnetic wave 2006 to a junction 2014 for coupling the electromagnetic wave 2006 to a transmission medium 2002. In the embodiment shown, the junction 2014 includes an air gap for illustrative purposes, however other configurations are possible both with, and without an air gap. The guiding portion 2012 includes a coupling end 2015 that terminates at the junction 2014 that is shown with a particular tapered shape; however other shapes and configurations are likewise possible. The coupling end 2015 of the coupler 2004 can, for example, have a tapered, rounded or beveled shape (2050, 2052, 2054 or 2056) or a more complex, multidimensional shape. In particular, the number of planes that intersect the coupling device to create the taper, bevel or rounding can be two or greater, so that the resultant shape is more complex than a simple angular cut along a single plane.

In operation, tapering, rounding or beveling the coupling end 2015 can reduce or substantially eliminate reflections of electromagnetic waves back along the guiding portions, while also enhancing the coupling (e.g., a coupling efficiency) of these electromagnetic waves, to and from the transmission medium 2002. Furthermore, the receiving portion 2010 can have a receiving end that is also tapered, rounded or beveled to enhance the coupling to and from the waveguide 2022 of the transceiver 2020. This receiving end, while not specifically shown, can be recessed within the waveguide 2022. The cross section of the guiding portion 2012, the waveguide 2022, the receiving portion 2010, and the coupling end 2015 can each be any of the shapes 2060, 2062, 2064, 2066, 2068, 2070 or 2070.

Each electromagnetic wave 2006 propagates via at least one first guided-wave mode. The coupling of the electromagnetic waves 2006 to the transmission medium 2002 via one or more of the junctions 2014 forms a plurality of electromagnetic waves 2008 that are guided to propagate along the outer surface of the transmission medium 2002 via at least one second guided-wave mode that can differ from the first guided-wave mode. The transmission medium 2002 can be a single wire transmission medium or other transmission medium that supports the propagation of the electromagnetic waves 2008 along the outer surface of the transmission medium 2002 to convey the first data. It will be appreciated that the single wire transmission medium described herein can be comprised of multiple strands or wire segments that are bundled or braided together without departing from example embodiments.

In various embodiments, the electromagnetic waves 2006 propagate along a coupler 2004 via one or more first guided-wave modes that can include either exclusively or substantially exclusively a symmetrical (fundamental) mode, however other modes can optionally be included in addition or in the alternative. In accordance with these embodiments, the second guided-wave mode of the electromagnetic waves 2008 can, if supported by the characteristics of the transmission medium 2002, include at least one asymmetric (non-fundamental) mode that is not included in the guided-wave modes of the electromagnetic waves 2006 that propagate along each coupler 2004. For example, an insulated wire transmission medium can support at least one asymmetric (non-fundamental) mode in one embodiment. In operation, the junctions 2014 induce the electromagnetic waves 2008 on transmission medium 2002 to optionally include a symmetric (fundamental) mode, but also one or more asymmetric (non-fundamental) modes not included in the guided-wave modes of the electromagnetic wave 2006 that propagate along the coupler 2004.

More generally, consider the one or more first guided-wave modes to be defined by the set of modes S1 where:

$$S1=(m11, m12, m13, \ldots)$$

And where the individual modes m11, m12, m13, . . . can each be either a symmetrical (or fundamental) mode or an asymmetrical (or non-fundamental) mode that propagate more than a trivial distance, i.e. that propagate along the length of the guiding portion 2012 of a coupler 2004 from the receiving end 2010 to the other end 2015. In an embodiment, the guided-wave mode or modes of the electromagnetic wave 2006 includes a field distribution that, at the junction 2014, has a great degree of overlap with the transmission medium 2002 so as to couple a substantial portion or the most electromagnetic energy to the transmission medium. In addition to reducing reflections, the tapering, rounding and/or beveling of the coupling end 2015 can also promote such an effect (e.g., high coupling efficiency or energy transfer). As the cross sectional area of the coupler decreases along the coupling end 2105, the size of the field distribution can increase, encompassing more field strength at or around the transmission medium 2002 at the junction 2014. In one example, the field distribution induced by the coupler 2004 at the junction 2014 has a shape that approximates one or more propagation modes of the transmission medium itself, increasing the amount of electromagnetic energy that is converted to the propagating modes of the transmission medium.

Also consider the one or more second guided-wave modes to be defined by the set of modes S2 where:

$$S2=(m21, m22, m23, \ldots)$$

And, the individual modes m21, m22, m23, . . . can each be either a symmetrical (or fundamental) mode or an asymmetrical (or non-fundamental) mode that propagate along the length of the transmission medium 2002 more than a trivial distance, i.e. that propagate sufficiently to reach a remote transmission device coupled at a different location on the transmission medium 2002.

In various embodiments, that condition that at least one first guided-wave mode is different from at least one second guided-wave mode implies that S1≠S2. In particular, S1 may be a proper subset of S2, S2 may be a proper subset of S1, or the intersection between S1 and S2 may be the null set.

In addition to operating as a transmitter, the transmission device 2000 can operate as or include a receiver as well. In this mode of operation, a plurality of electromagnetic waves 2018 conveys second data that also propagates along the outer surface of the transmission medium 2002, but in the opposite direction of the electromagnetic waves 2008. Each junction 2014 couples one of the electromagnetic waves 2018 from the transmission medium 2002 to form an electromagnetic wave 2016 that is guided to a receiver of the corresponding transceiver 2020 by the guiding portion 2012.

In various embodiments, the first data conveyed by the plurality of second electromagnetic waves 2008 includes a plurality of data streams that differ from one another and wherein the each of the plurality of first electromagnetic waves 2006 conveys one of the plurality of data streams. More generally, the transceivers 2020 operate to convey either the same data stream or different data streams via time division multiplexing, or some other form of multiplexing, such as frequency division multiplexing, or mode division multiplexing. In this fashion, the transceivers 2020 can be used in conjunction with a MIMO transmission system to send and receive full duplex data via axial diversity, cyclic delay diversity, spatial coding, space time block coding, space frequency block coding, hybrid space time/frequency block coding, single stream multi-coupler spatial mapping or other transmission/reception scheme.

While the transmission device 2000 is shown with two transceivers 2020 and two couplers 2004 arranged at the top and bottom of the transmission medium 2002, other configurations can include three or more transceivers and corresponding couplers. For example, a transmission device 2000 with four transceivers 2020 and four couplers 2004 can be arranged angularly around the outer surface of a cylindrical transmission medium at equidistant orientations of 0, π/2, π, and 3π/4. Considering a further example, a transmission device 2000 with n transceivers 2020 can include n couplers 2004 arranged angularly around the outer surface of a cylindrical transmission medium at angles 2π/n apart. It should be noted however that unequal angular displacements between couplers can also be used.

Figure 21:
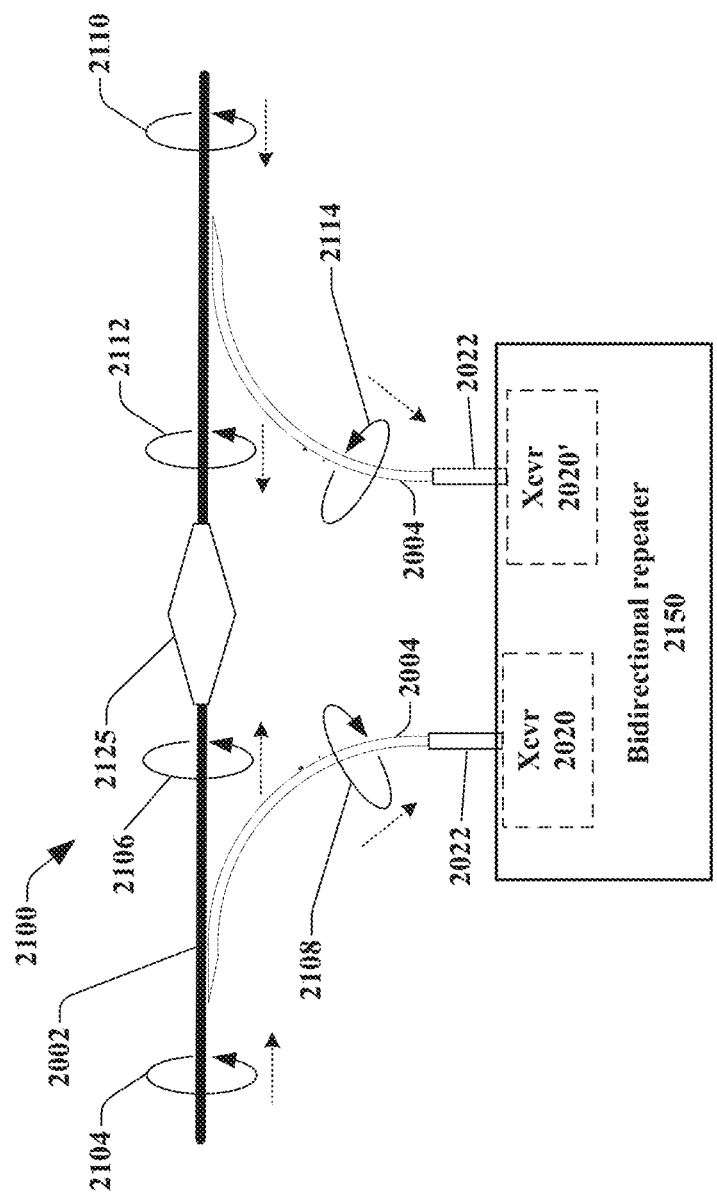
FIG. 21 is a block diagram of an example, non-limiting embodiment of a transmission device in accordance with various aspects described herein.

FIG. 21 is a block diagram of an example, non-limiting embodiment of a transmission device in accordance with various aspects described herein. In particular, a transmission device 2100 is shown that can be implemented as part of a bidirectional repeater 2150, such as all or part of repeater device 710 presented in conjunction with FIG. 7 or other repeater that includes two similar transceivers, 2020 and 2020'. Similar elements from FIG. 20 are represented by common reference numerals. In addition, the transmission device 2100 includes a shield 2125. In an embodiment, the shield 2125 (which can include a dampener in an embodiment) is constructed of absorbing or dampening material and surrounds the transmission medium 2002. In one direction of communication, when an electromagnetic wave 2104 is coupled to coupler 2004 to generate electromagnetic wave 2108, a portion may continue along transmission medium 2002 as electromagnetic wave 2106. The shield 2125 substantially or entirely absorbs the electromagnetic wave 2106 so that it will not continue to propagate, mitigating interference with the operation of the transceiver 2020' on the other side of the shield 2125. To continue on with the flow of this communication, data or signals from the electromagnetic wave 2108 as received by the transceiver 2020 are coupled to transceiver 2020' and relaunched in the same direction on the transmission medium 2002.

The shield 2125 may perform similar functions for communications in the opposite direction. When an electromagnetic wave 2110 is coupled to a coupler 2004 to generate electromagnetic wave 2114, a portion continues along transmission medium 2002 as electromagnetic wave 2112. The shield 2125 substantially or entirely absorbs the electromagnetic wave 2112 so that it will not continue to propagate, mitigating interference with the operation of the transceiver 2020 on the other side of the shield 2125, while reinforcing and enhancing the inherent directionality of the coupler 2004. As shown, the shield 2125 is tapered, rounded or beveled on both sides to minimize reflections and/or to provide impedance matching, however other designs are likewise possible.

Figure 22A:
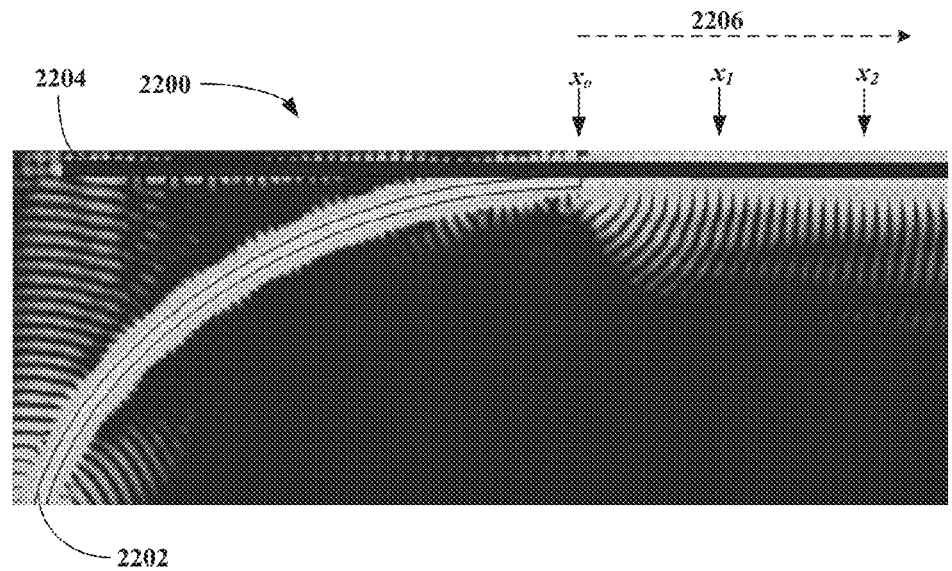
FIGS. 22a and 22b are a diagrams illustrating example, non-limiting embodiments of an electromagnetic distribution in accordance with various aspects described herein.

FIG. 22a is a diagram illustrating an example, non-limiting embodiment of an electromagnetic distribution in accordance with various aspects described herein. In particular, an electromagnetic distribution 2200 is presented in two dimensions for a transmission device that includes coupler 2202, such as any of the dielectric waveguide couplers previously described. The coupler 2202 couples an electromagnetic wave for propagation along an outer surface of a transmission medium 2204, such as a single wire transmission medium.

The coupler 2202 guides the electromagnetic wave to a junction at $x_0$ via a symmetrical guided-wave mode. As shown, the majority of the energy of the electromagnetic wave that propagates along the coupler 2202 is contained within the coupler 2202. The junction at $x_0$ couples the electromagnetic wave to a transmission medium at an azimuthal angle corresponding to the bottom of the transmission medium 2204. This coupling induces an electromagnetic wave that is guided to propagate along the outer surface of the transmission medium via at least one guided-wave mode. The majority of the energy of the electromagnetic wave that propagates along the transmission medium 2204 is outside, but in close proximity to the outer surface of the transmission medium 2204. In the example shown, the junction at $x_0$ forms an electromagnetic wave that propagates via both a symmetrical mode and at least one asymmetrical surface mode, such as the first order mode presented in conjunction with FIG. 17, that skims the surface of the transmission medium 2204.

The combination of symmetrical and asymmetrical propagation mode(s) of the electromagnetic wave that propagates along the surface of the transmission medium 2204 forms an envelope that varies as a function of angular deviation from the azimuthal angle that defines the orientation of the coupler 2202 to the transmission medium 2204 as well as a function of the longitudinal displacement from the junction at $x_0$. Consider the electromagnetic wave to be represented by the function $W(\Delta\theta, \Delta x, t)$, where $\Delta\theta$ represents the angular deviation from the azimuthal angle that defines the orientation of the coupler 2202 to the transmission medium 2204, $\Delta x$ represents function of the longitudinal displacement from the junction at $x_0$, and t represents time. The envelope of the electromagnetic wave W can be represented by $A(\Delta\theta, \Delta x)$, where, for $0 \leq t \leq \infty$, $$A(\Delta\theta,\Delta x)=\mathrm{Max}(W(\Delta\theta,\Delta x,t))$$

Therefore, while the electromagnetic wave W varies as a function of time as a wave propagates along the length ($\Delta x$) of the transmission medium, the envelope A is the maximum amplitude of the electromagnetic wave for any time (t). Like a standing wave, the envelope A is a relatively time-stationary function of the longitudinal displacement along a transmission medium. While the envelope may vary based on slowly changing parameters of the transmission medium such as temperature or other environmental conditions, the envelope generally does not otherwise vary as a function of time. Unlike a standing wave however, the wavelength of the envelope function is not the same as the wavelength of the electromagnetic wave. In particular, the wavelength of the envelope function is much greater than the wavelength of the underlying electromagnetic wave. In the example shown, the wavelength of the underlying electromagnetic wave $\lambda_c \approx 0.8$ cm while the envelope function of the envelope function is more than 10 times greater. Further, unlike a traditional standing wave the envelope A also varies as a function of $\Delta\theta$, the angular deviation from the azimuthal angle that defines the orientation of the coupler 2202 to the transmission medium 2204.

In the example shown, the coupler 2202 induces an electromagnetic wave on the transmission medium 2204—at a first surface (the bottom) of the transmission medium 2204. At the junction at $x_0$, the electromagnetic wave is concentrated at the bottom of the transmission medium with a much smaller level of radiation on a second surface opposite the first side (the top) of the transmission medium 2004. The envelope of the electromagnetic wave at the first surface (bottom) of the transmission medium 2204 decreases along the transmission medium in the direction of propagation 2206, until it reaches a minimum at $x_1$. Considering instead, the second surface (top) of the transmission medium 2204, the envelope of the electromagnetic wave increases along the transmission medium in the direction of propagation 2206, until it reaches a maximum at $x_1$. In this fashion, the envelope roughly follows a serpentine pattern, oscillating between minima and maxima and concentration along the first surface (top) and second surface (bottom) of the transmission medium 2204, as the electromagnetic wave propagates along the direction of propagation 2206. It will be appreciated that the first and second surfaces could be swapped in another embodiment based upon a positioning of the coupler 2202 with respect to the transmission medium 2204. For example, in an embodiment, the first surface can be on a same surface where the coupler 2202 meets the transmission medium.

The value $\Delta\theta=0$ corresponds to no angular deviation from the azimuthal angle that defines the orientation of the coupler 2202 to the transmission medium 2204,—i.e. the first surface (bottom) of the transmission medium 2204. The opposite surface, at the top of the transmission medium 2204, corresponds to $\Delta\theta=\pi$, an angular deviation of r radians. In the embodiment shown, for $\Delta\theta=0$ the envelope has local maxima at $x_0$ and $x_2$ and a local minimum at $x_1$. Conversely, for $\Delta\theta=\pi$, the envelope has local minima at $x_0$ and $x_2$ and a local maximum at $x_1$.

Figure 22B:
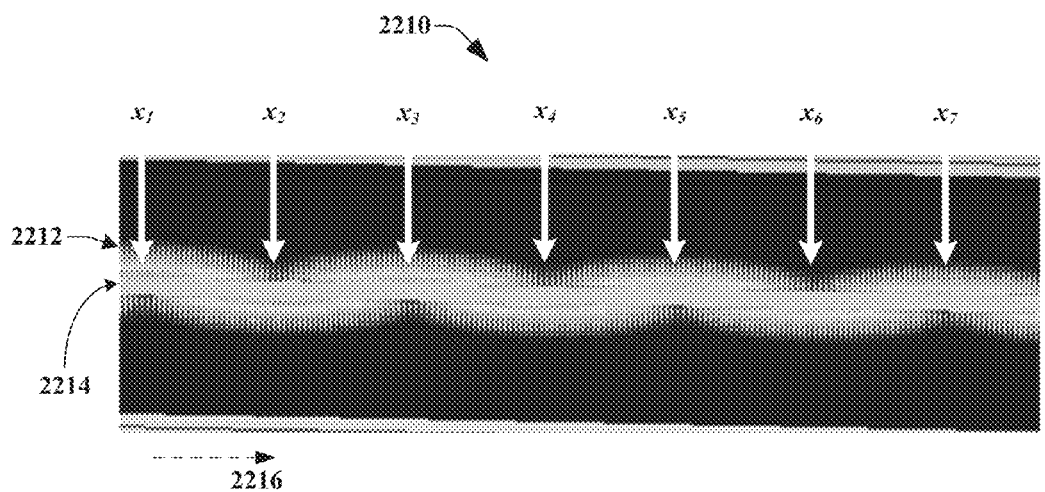

FIG. 22b is a diagram illustrating an example, non-limiting embodiment of an electromagnetic distribution in accordance with various aspects described herein. In particular, an electromagnetic distribution 2210 is presented in two dimensions for a transmission device that includes any of the couplers previously described. The electromagnetic wave 2212 propagates along an outer surface of a transmission medium 2214, such as a single wire transmission medium or other transmission medium previously discussed.

The majority of the energy of the electromagnetic wave 2212 that propagates along the transmission medium 2214 is outside of, but in close proximity to the outer surface of the transmission medium 2214. The combination of symmetrical and asymmetrical propagation mode(s) of the electromagnetic wave 2214 forms an envelope that varies as a function of axial orientation as well as a function of the longitudinal displacement along the transmission medium 2214. The envelope of the electromagnetic wave 2212 roughly follows a serpentine pattern, oscillating between minima and maxima and concentration along the top and bottom of the transmission medium 2214, as the electromagnetic wave 2212 propagates along the direction of propagation 2216.

Consider an azimuthal orientation $\theta=0$ that corresponds to the bottom of the transmission medium 2214. The opposite surface, at the top of the transmission medium 2904, corresponds to $\theta=\pi$, an azimuthal orientation of r radians. In the embodiment shown, for $\theta=0$ the envelope has local maxima at ($x_1$, $x_3$, $x_5$, $x_7$) and a local minima at ($x_2$, $x_4$, $x_6$). Conversely, for $\theta=\pi$, the envelope has local minima at ($x_1$, $x_3$, $x_5$, $x_7$) and a local maxima at ($x_2$, $x_4$, $x_6$).

Figure 23:
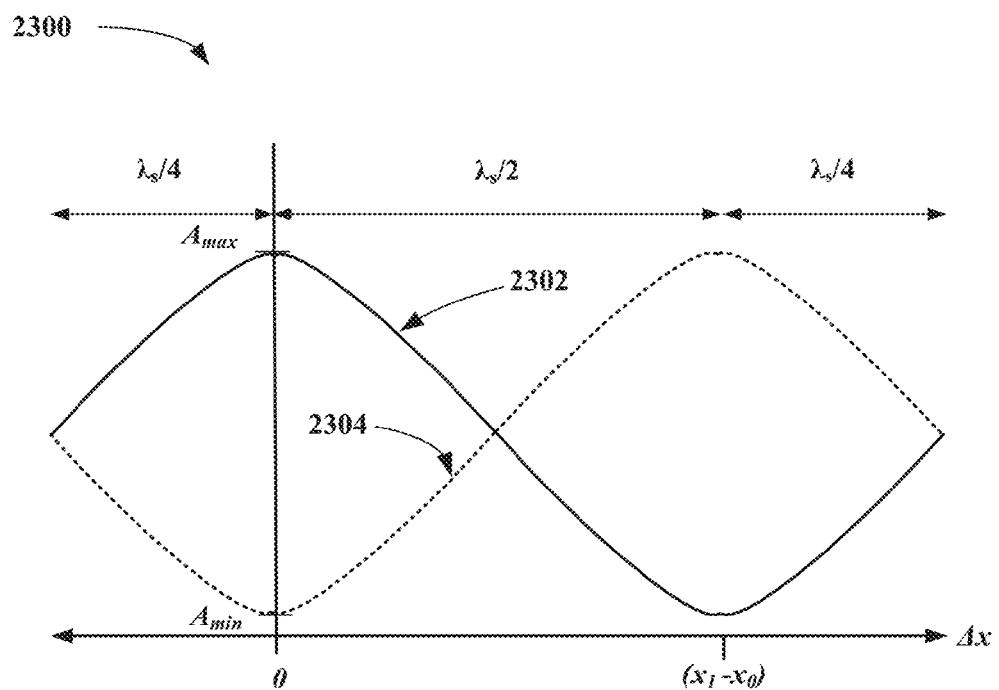
FIG. 23 is a diagram illustrating an example, non-limiting embodiment of a functions in accordance with various aspects described herein.

FIG. 23 is a diagram illustrating an example, non-limiting embodiment of a function in accordance with various aspects described herein. In particular, the graph 2300 presents approximations of the envelope A for two different fixed angular deviations $\Delta\theta$. As shown, the envelope A is a periodic function that varies between a maximum value $A_{max}$ and a minimum value $A_{min}$.

The function 2302 presents an approximation of the envelope A for a fixed angular deviation $\Delta\theta=0$. In this case, $$A(0,\Delta x)=((A_{max}-A_{min})D(\Delta x)\cos(2\pi\Delta x/\lambda_s))+A_{min}$$

Where $D(\Delta x)$ is a monotonically decreasing function that has a value of $$D(0)=1$$

that represents the gradual decay in amplitude of the electromagnetic wave W as it propagates along the length of the transmission medium and where $\lambda_s$ represents the wavelength of the envelope. In the example shown:

$$\lambda_s=2(x_1-x_0)$$

In this example, for $\Delta\theta=0$ the envelope has local maxima at:

$$\Delta x=0,\lambda_s,2\lambda_s\ldots$$

Or more generally at, $$\Delta x=N\lambda_s$$

where N is an integer. Further, for $\Delta\theta=0$ the envelope has local minima at:

$$\Delta x=\lambda_s/2,3\lambda_s/2\ldots$$

Or more generally at, $$\Delta x=(2N+1)\lambda_s/2$$

The function 2304 presents an approximation of the envelope A for a fixed angular deviation $\Delta\theta=\pi$. In this case, $$A(\pi,\Delta x)=((A_{max}-A_{min})D(\Delta x)\cos(2\pi/\Delta x/\lambda_s+\pi)+A_{min}$$

In this example, for $\Delta\theta=\pi$ the envelope has local minima at:

$$\Delta x=0,\lambda_s,2\lambda_s,\ldots$$

Or more generally at, $$\Delta x=N\lambda_s$$

where N is an integer. Further, for $\Delta\theta=0$ the envelope has local maxima at:

$$\Delta x=\lambda_s/2,3\lambda_s/2\ldots$$

Or more generally at, $$\Delta x=(2N+1)\lambda_s/2$$

While the functions 2302 and 2304 present approximations of the envelope A at the top and bottom of the transmission medium, in an embodiment, at least one guided-wave mode of the electromagnetic wave W rotates angularly as the wave propagates along the length of the transmission medium. In this case, the envelope A can be approximated as follows:

$$A(\Delta\theta,\Delta x)=((A_{max}-A_{min})D(\Delta x)\cos(2\pi\Delta x/\lambda_s+\Delta\theta))+A_{min}$$

or $$A(\Delta\theta,\Delta x)=((A_{max}-A_{min})D(\Delta x)\cos(-2\pi\Delta x/\lambda_s+\Delta\theta))+A_{min}$$

depending on whether the axial rotation is clockwise or counterclockwise.

Note that, in concert with the example presented above, for $\Delta\theta=\pi$ the envelope has local minima at:

$$\Delta x=N\lambda_s$$

And for $\Delta\theta=0$ the envelope has local maxima at:

$$\Delta x=(2N+1)\lambda_s/2$$

Considering fixed values of $\Delta x$, for $\Delta x=0$, the envelope has a local minimum at:

$$\Delta\theta=\pi$$

And a local maximum at:

$$\Delta\theta=0$$

For $\Delta x=\lambda_s/2$, the envelope has a local maximum at:

$$\Delta\theta=\pi$$

And a local minimum at:

$$\Delta\theta=0$$

Using the approximations above, the local minima and maxima can be calculated for other axial deviations as well. Considering the case where $\Delta\theta=\pi/2$, and clockwise rotation, the envelope has local maxima at:

$$\Delta x=\lambda_s/4,5\lambda_s/4\ldots$$

And local minima at:

$$\Delta x=3\lambda_s/4,7\lambda_s/4\ldots$$

Considering the case where $\Delta\theta=-\pi/2$, and counterclockwise rotation, the envelope has local maxima at:

$$\Delta x=\lambda_s/4,5\lambda_s/4\ldots$$

And local minima at:

$$\Delta x=3\lambda_s/4,7\lambda_s/4\ldots$$

Approximations of the envelope A can be useful in designing the placement of multiple couplers in the transmission medium to support simultaneous communications via multiple electromagnetic waves W via axial or spatial diversity. For example, placing one coupler at an axial deviation and/or longitudinal displacement from another coupler that corresponds to a local minimum of the envelope increases the isolation between the electromagnetic waves and reduces the amount of interference between these couplers. Further, placing a receiving coupler at an axial deviation and/or longitudinal displacement from a transmitting coupler at a corresponding local maximum can increase the signal gain and data throughput for an electromagnetic wave that is transmitted from the transmitting coupler to the receiving coupler. Further examples of such configurations including various optional functions and features will be explored in conjunction with FIGS. 24-34 that follow.

Figure 24:
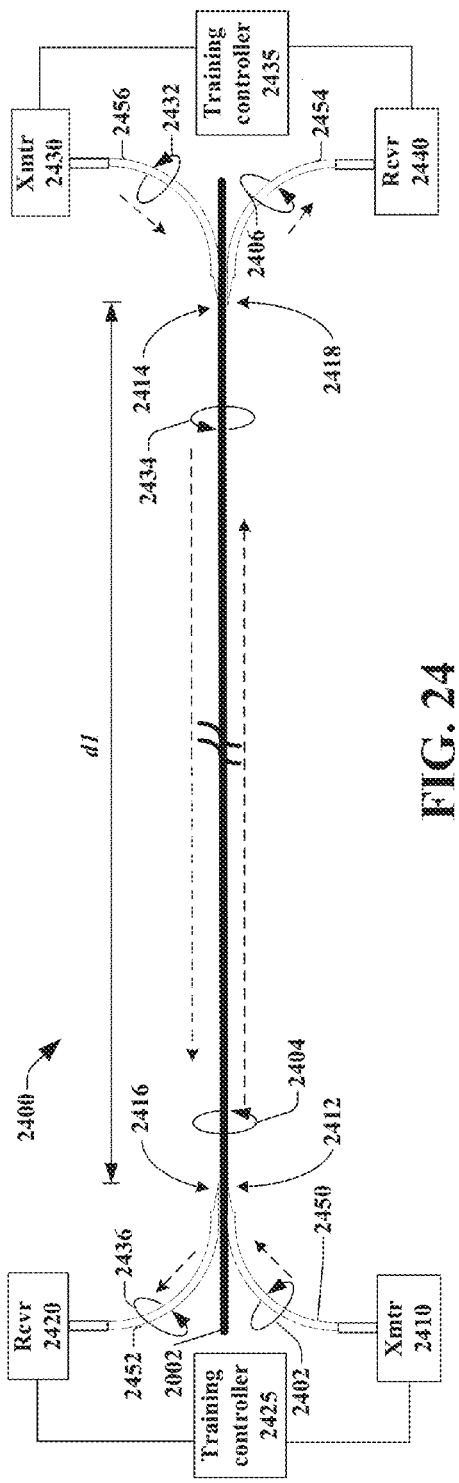
FIG. 24 is a block diagram of an example, non-limiting embodiment of a transmission system in accordance with various aspects described herein.

FIG. 24 is a block diagram of an example, non-limiting embodiment of a transmission system in accordance with various aspects described herein. The transmission system 2400 is presented that includes two transmission devices that are spaced a distance apart along the transmission medium 2002. In this system the transmitter 2410 generates an electromagnetic wave 2402 conveying first data. A coupler 2450 guides the electromagnetic wave 2402 to a junction 2412 that couples the electromagnetic wave 2402 to the transmission medium 2002 at a first azimuthal angle to form an electromagnetic wave 2404 that is guided to propagate along the outer surface of the transmission medium 2002 via one or more guided-wave modes. The electromagnetic wave 2404 has an envelope that varies as a function of angular deviation Δθ from the first azimuthal angle and the longitudinal displacement Δx from the junction 2412. The function has a local minimum at an angular deviation Δθ=θ$_1$ from the first azimuthal angle and an angular displacement Δx=x$_1$ from the junction 2412. The coupler 2454 at junction 2418 forms an electromagnetic wave 2406 from the electromagnetic wave 2404 and guides the electromagnetic wave 2454 to receiver 2440 to receive the first data.

A remote transmitter 2430 generates an electromagnetic wave 2432 conveying second data that is coupled onto the transmission medium 2002 via coupler 2456 at a junction at 2414 as an electromagnetic wave 2434. The electromagnetic wave 2434 propagates along the outer surface of the transmission medium 2002 in a direction opposite to the electromagnetic wave 2404. The coupler 2452 couples the electromagnetic wave 2434 from the transmission medium 2002 at junction 2416 to form an electromagnetic wave 2436 that is guided to the receiver 2420 that receives the second data. The coupler 2452 at the junction 2416 corresponds to an angular deviation Δθ=θ$_1$ from the first azimuthal angle and a longitudinal displacement Δx=x$_1$ from the junction 2412. As shown, θ$_1$=π and Δx=0, placing the coupler 2452 at a local minimum of the envelope of the electromagnetic wave 2404. This placement of coupler 2452 at the junction 2416 helps reduce bleed through of the electromagnetic wave 2404 to the receiver 2420. A similar effect occurs between transmitter 2430 and receiver 2440.

In various embodiments, the couplers of the receiver/transmitter pair 2410/2440 are oriented at the same axial orientation and the longitudinal displacement d1 between the junctions 2412 and 2418 is selected so that the receiving coupler 2454 is placed at a local maximum of the envelope. Considering further the examples presented in conjunction with FIG. 23, $$d1 = N\lambda_s$$

If the electromagnetic wave 2432 is transmitted at the same carrier frequency as the electromagnetic wave 2402, each electromagnetic wave has the same wavelength and a similar effect occurs between junctions 2414 and 2416.

Each of the two transmission devices of system 2400 includes a training controller 2425 that operates similar to training controller 1900. In this embodiment, however, the training controller 2425 selects at least one carrier frequency of the electromagnetic wave 2402 generated by transmitter 2410 based on feedback data received by the receiver 2420 via the electromagnetic wave 2436. The training controller 2435 generates this feedback data based on the reception of the electromagnetic wave 2406 by receiver 2440 and transmits the feedback data via the electromagnetic wave 2432 generated by transmitter 2430. The training controllers can operate reciprocally to establish the carrier frequency of the electromagnetic wave 2434. In the alternative, the training controllers 2425 and 2435 can operate in a cooperative fashion to select a single carrier frequency that not only promotes propagation of the electromagnetic waves 2404 and 2434 along the transmission medium 2002, but that further increases the envelope of the desired electromagnetic wave at the receiving coupler while reducing transmitter bleed through for each transmission device.

While each coupler (2450, 2452, 2454 or 2456) is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

Further, while the operation of the transmission system 2400 has been described in terms of aligning minima or maxima of the envelope to enhance transmission and reduce interference between devices, the same principles can be applied to reducing interference between different waves that share the same transmission medium. In pertinent part, the envelope of the wave can be adjusted, and/or the angular or longitudinal position of the specific transmitters and receivers can be adjusted to align one or more contemporaneous waves that share the transmission medium for beneficial effect.

In various embodiments, a waveguide system, such as one or more components of the transmission system 2400 determines a first transmission envelope of a first asymmetric electromagnetic wave, wherein the first transmission envelope has a first wavelength that reduces signal interference between the first asymmetric electromagnetic wave and a second asymmetric electromagnetic wave having a second transmission envelope at a second wavelength. This determination can be made by training controller 2425, via other components of the waveguide system or via initial design and set-up of the system. The determination can include determining an angular displacement between a first portion of a signal of the first asymmetric electromagnetic wave and a second portion of a signal of the second asymmetric electromagnetic wave—e.g. between points of interest (minima or maxima) of the envelopes of the two signals.

The waveguide system transmits the first asymmetric electromagnetic wave on an outer surface of a transmission medium according to the first transmission envelope at a same time the second asymmetric electromagnetic wave is propagating on the outer surface of the transmission medium. This waveguide system can adjust the transmitting of the first asymmetric electromagnetic wave according to the angular displacement. By, for example adjusting an operating frequency of asymmetric electromagnetic waves transmitted by the waveguide system or a location of a coupler of the waveguide system with respect to the transmission medium.

Figure 25:
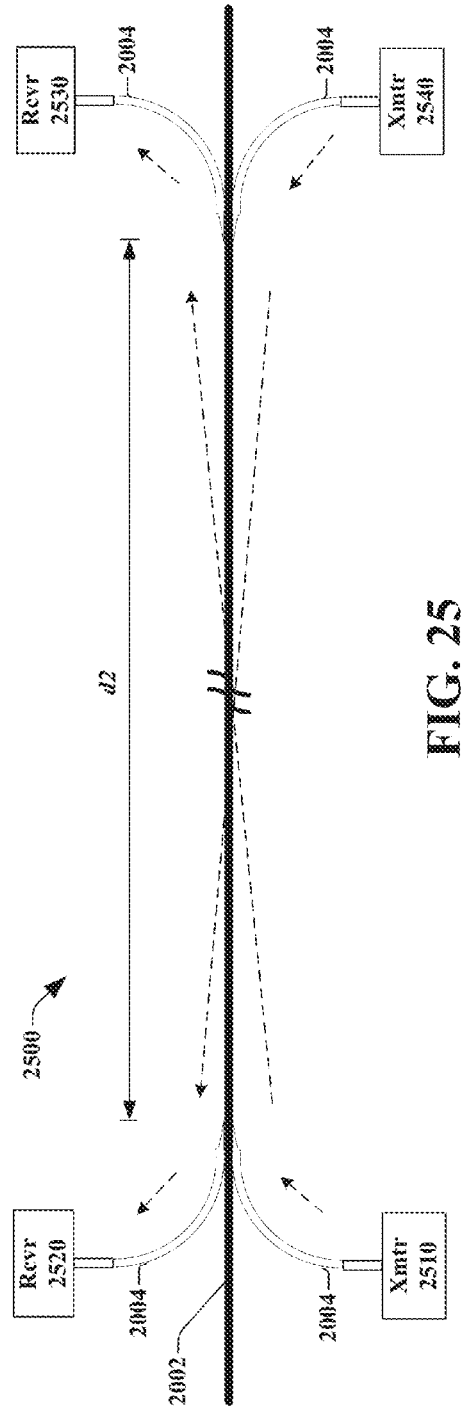
FIG. 25 is a block diagram of an example, non-limiting embodiment of a transmission system in accordance with various aspects described herein.

FIG. 25 is a block diagram of an example, non-limiting embodiment of a transmission system in accordance with various aspects described herein. This system 2500 operates in a similar fashion to the transmission system 2400. Transmitter 2510 and receiver 2520 are part of one transmission device that communicates with a remote transmission device that includes transmitter 2540 and receiver 2530. In operation, transmitter 2520 sends an electromagnetic wave that conveys data to receiver 2530 and transmitter 2540 sends another electromagnetic wave that conveys data to receiver 2520. These two electromagnetic waves traverse the transmission medium 2002 in opposite directions.

The transmitter and receiver pair of each transmission device are coupled at opposite axial orientations but at the same spatial displacement. As such, the transmitter 2510 and receiver 2520 are coupled at the same location (e.g., substantially the same longitudinal position), but on opposite sides of the transmission medium 2002. Likewise, the transmitter 2540 and receiver 2530 are coupled at the same location (e.g., substantially the same longitudinal position), but on opposite sides of the transmission medium 2002—a distance d2 from the coupling point of the other transmission device.

In this embodiment however, the transmitter/receiver pairs that communicate with one another are oriented at different axial deviations. In particular, the couplers of the receiver/transmitter pair 2510/2530 are oriented at different (opposite) axial orientations and the longitudinal displacement d2 between the junctions is selected so that the receiving coupler is still placed at a local maximum of the envelope. Considering further the examples presented in conjunction with FIG. 23, $$d2=N\lambda_s+\lambda_s/2$$

If the transmitter/receiver pair 2540/2520 employs the same carrier frequency, a similar effect occurs for transmission in the opposite direction along transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 26 is a block diagram of an example, non-limiting embodiment of a transmission system in accordance with various aspects described herein. This system 2600 operates in a similar fashion to the transmission system 2400. Transmitter 2410 and receiver 2420 are part of one transmission device that communicates with a remote transmission device that includes transmitter 2430 and receiver 2440. In operation, transmitter 2410 sends an electromagnetic wave that conveys data to receiver 2440 and transmitter 2430 sends another electromagnetic wave that conveys data to receiver 2420. These two electromagnetic waves traverse the transmission medium 2002 in opposite directions.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta=\pi$. Considering further the examples presented in conjunction with FIG. 23, $$d3=N\lambda_s$$

In this case, the transmitter/receiver pairs that communicate with one another are oriented at the same axial orientations at either the top or bottom of the transmission medium. In particular, the couplers of the receiver/transmitter pair 2420/2430 are oriented at the same axial orientation at the top of the transmission medium 2002 and the longitudinal displacement d1 between the junctions is selected so that the receiving coupler is still placed at a local maximum of the envelope. In this case, $$d1=N\lambda_s$$

If the transmitter/receiver pair 2410/2440 employs the same carrier frequency, a similar effect occurs for transmission in the opposite direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 27 is a block diagram of an example, non-limiting embodiment of a transmission system in accordance with various aspects described herein. This system 2700 operates in a similar fashion to the transmission system 2400. Transmitter 2510 and receiver 2520 are part of one transmission device that communicates with a remote transmission device that includes transmitter 2540 and receiver 2530. In operation, transmitter 2510 sends an electromagnetic wave that conveys data to receiver 2530 and transmitter 2540 sends another electromagnetic wave that conveys data to receiver 2520. These two electromagnetic waves traverse the transmission medium 2002 in opposite directions.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta=\pi$. Considering further the examples presented in conjunction with FIG. 23, $$d3=N\lambda_s$$

In this embodiment, the transmitter/receiver pairs that communicate with one another are also oriented at different axial deviations. In particular, the couplers of the receiver/transmitter pair 2510/2530 are oriented at different (opposite) axial orientations and the longitudinal displacement d2 between the junctions is selected so that the receiving coupler is still placed at a local maximum of the envelope. Considering further the examples presented in conjunction with FIG. 23, $$d2=N\lambda_s+\lambda_s/2$$

If the transmitter/receiver pair 2540/2520 employs the same carrier frequency, a similar effect occurs for transmission in the opposite direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

While FIGS. 24-27 have presented examples where two electromagnetic waves in opposite directions share the same transmission medium, FIGS. 28-31 present similar configurations that support simultaneous transport of electromagnetic waves in the same direction.

FIG. 28 is a block diagram of an example, non-limiting embodiment of a transmission system in accordance with various aspects described herein. This system 2800 operates in a similar fashion to the transmission system 2400. Transmitters 2810 and 2830 are part of one transmission device that communicates with a remote transmission device that includes receivers 2820 and 2840. In operation, transmitter 2810 sends an electromagnetic wave that conveys data to receiver 2840 and transmitter 2830 sends another electromagnetic wave that conveys data to receiver 2820. These two electromagnetic waves traverse the transmission medium 2002 in the same direction.

The transmitter and receiver pair of each transmission device are coupled at opposite axial orientations but at the same spatial displacement. As such, the transmitters 2810 and 2830 are coupled at the same location (e.g., substantially the same longitudinal position), but on opposite sides of the transmission medium 2002. Likewise, the receivers 2820 and 2840 are coupled at the same location (e.g., substantially the same longitudinal position), but on opposite sides of the transmission medium 2002—a distance d1 from the coupling point of the other transmission device.

In this case, the transmitter/receiver pairs that communicate with one another are oriented at the same axial orientations at either the top or bottom of the transmission medium. In particular, the couplers of the receiver/transmitter pair 2830/2820 are oriented at the same axial orientation at the top of the transmission medium 2002 and the longitudinal displacement d1 between the junctions is selected so that the receiving coupler is still placed at a local maximum of the envelope. In this case, $$d1 = N\lambda_s$$

If the transmitter/receiver pair 2810/2840 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 29 is a block diagram of an example, non-limiting embodiment of a transmission system in accordance with various aspects described herein. This system 2900 operates in a similar fashion to the transmission system 2400. Transmitters 2910 and 2940 are part of one transmission device that communicates with a remote transmission device that includes receivers 2920 and 2930. In operation, transmitter 2910 sends an electromagnetic wave that conveys data to receiver 2930 and transmitter 2940 sends another electromagnetic wave that conveys data to receiver 2920. These two electromagnetic waves traverse the transmission medium 2002 in the same direction.

The transmitter and receiver pair of each transmission device are coupled at opposite axial orientations but at the same spatial displacement. As such, the transmitters 2910 and 2940 are coupled at the same location, but on opposite sides of the transmission medium 2002. Likewise, the receivers 2920 and 2930 are coupled at the same location, but on opposite sides of the transmission medium 2002—a distance d2 from the coupling point of the other transmission device.

In this embodiment however, the transmitter/receiver pairs that communicate with one another are oriented at different axial deviations. In particular, the couplers of the receiver/transmitter pair 2910/2930 are oriented at different (opposite) axial orientations and the longitudinal displacement d2 between the junctions is selected so that the receiving coupler is still placed at a local maximum of the envelope. Considering further the examples presented in conjunction with FIG. 23, $$d2 = N\lambda_s + \lambda_s/2$$

If the transmitter/receiver pair 2940/2920 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 30 is a block diagram of an example, non-limiting embodiment of a transmission system in accordance with various aspects described herein. This system 3000 operates in a similar fashion to the transmission system 2400. Transmitters 2810 and 2830 are part of one transmission device that communicates with a remote transmission device that includes receivers 2820 and 2840. In operation, transmitter 2810 sends an electromagnetic wave that conveys data to receiver 2840 and transmitter 2830 sends another electromagnetic wave that conveys data to receiver 2820. These two electromagnetic waves traverse the transmission medium 2002 in the same direction.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta = \pi$. Considering further the examples presented in conjunction with FIG. 23, $$d3 = N\lambda_s$$

In this case, the transmitter/receiver pairs that communicate with one another are oriented at the same axial orientations at either the top or bottom of the transmission medium. In particular, the couplers of the receiver/transmitter pair 2820/2830 are oriented at the same axial orientation at the top of the transmission medium 2002 and the longitudinal displacement d1 between the junctions is selected so that the receiving coupler is still placed at a local maximum of the envelope. In this case, $$d1 = N\lambda_s$$

If the transmitter/receiver pair 2810/2840 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 31 is a block diagram of an example, non-limiting embodiment of a transmission system in accordance with various aspects described herein. This system 3100 operates in a similar fashion to the transmission system 2400. Transmitters 2910 and 2940 are part of one transmission device that communicates with a remote transmission device that includes receivers 2920 and 2930. In operation, transmitter 2910 sends an electromagnetic wave that conveys data to receiver 2930 and transmitter 2940 sends another electromagnetic wave that conveys data to receiver 2920. These two electromagnetic waves traverse the transmission medium 2002 in the same direction.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta=\pi$. Considering further the examples presented in conjunction with FIG. 23, $$d3 = N\lambda_s$$

In this embodiment, the transmitter/receiver pairs that communicate with one another are also oriented at different axial deviations. In particular, the couplers of the receiver/transmitter pair 2910/2930 are oriented at different (opposite) axial orientations and the longitudinal displacement d2 between the junctions is selected so that the receiving coupler is still placed at a local maximum of the envelope. Considering further the examples presented in conjunction with FIG. 23, $$d2 = N\lambda_s + \lambda_s/2$$

If the transmitter/receiver pair 2940/2920 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

Figure 33:
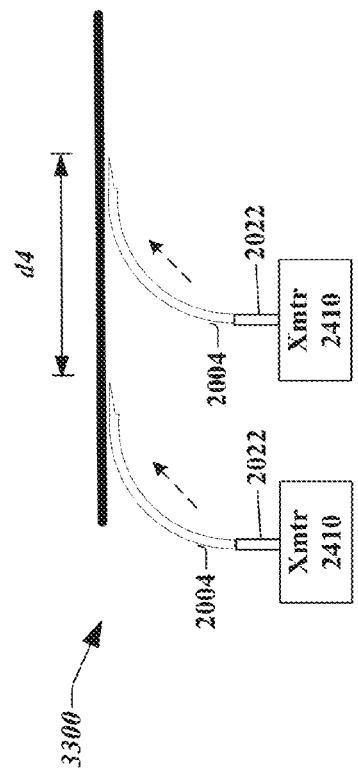
FIG. 33 is a block diagram of an example, non-limiting embodiment of a transmission system in accordance with various aspects described herein.
Figure 32:
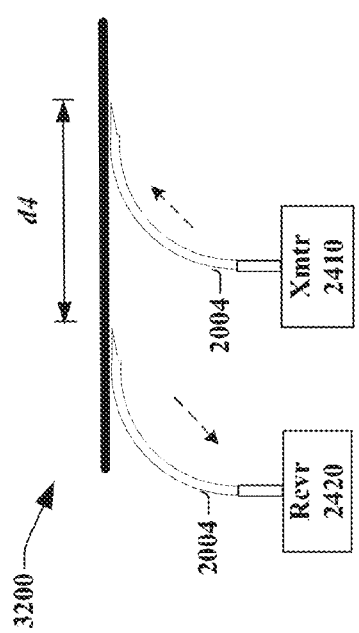
FIG. 32 is a block diagram of an example, non-limiting embodiment of a transmission system in accordance with various aspects described herein.
Figure 34:
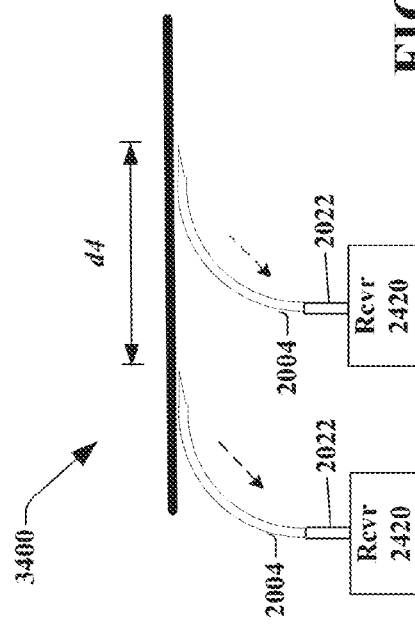
FIG. 34 is a block diagram of an example, non-limiting embodiment of a transmission system in accordance with various aspects described herein.

While FIGS. 24-31 have presented examples where transmitters and receivers, or more generally, transceivers of a transmission device are coupled to a transmission device at different axial orientations to support simultaneous transmission and reception of electromagnetic waves, FIGS. 32-34 present similar configurations that support simultaneous transport of electromagnetic waves via transmission devices where transmitters, receivers or transceivers are coupled in axial alignment.

FIG. 32 is a block diagram of an example, non-limiting embodiment of a transmission system in accordance with various aspects described herein. This system 3200 operates in a similar fashion to the transmission system 2400. The transmitter 2410 and receiver 2420 within the transmission device are coupled to the transmission medium 2002 at the same axial orientations but at different a spatial deviation d4. In this case, the value of d4 is selected to correspond to a local minimum in the envelope for 4θ=0. Considering further the examples presented in conjunction with FIG. 23, $$d4 = N\lambda_s + \lambda_s/2$$

For the case N=0, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 33 is a block diagram of an example, non-limiting embodiment of a transmission system in accordance with various aspects described herein. This system 3300 operates in a similar fashion to the transmission system 2400. The transmitters 2410 within the transmission device are coupled to the transmission medium 2002 at the same axial orientations but at different a spatial deviation d4. In this case, the value of d4 is selected to correspond to a local minimum in the envelope for $\Delta\theta=0$. Considering further the examples presented in conjunction with FIG. 23, $$d4 = N\lambda_s + \lambda_s/2$$

For the case N=0, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via a transmitter, more generally, each coupler can be coupled to a transceiver that includes both a transmitter and receiver for engaging in bidirectional communications in a manner similar to the transmission device described in conjunction with FIG. 20.

FIG. 34 is a block diagram of an example, non-limiting embodiment of a transmission system in accordance with various aspects described herein. This system 3400 operates in a similar fashion to the transmission system 2400. The receivers 2420 within the transmission device are coupled to the transmission medium 2002 at the same axial orientations but at different a spatial deviation d4. In this case, the value of d4 is selected to correspond to a local minimum in the envelope for $\Delta\theta=0$. Considering further the examples presented in conjunction with FIG. 23, $$d4 = N\lambda_s + \lambda_s/2$$

For the case N=0, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via either a receiver, more generally, each coupler can be coupled to a transceiver that includes both a transmitter and receiver for engaging in bidirectional communications in a manner similar to the transmission device described in conjunction with FIG. 20.

While the examples presented in conjunction with FIGS. 24-34 have focused on transmission devices and communication systems with axial deviations of $\Delta\theta=0$ or $\Delta\theta=\pi$, other deviations $\Delta\theta$ are possible. As discussed in conjunction with FIG. 23, electromagnetic waves may propagate with envelopes having local maxima and minima that support other axial deviations $\Delta\theta$ at corresponding longitudinal displacements $\Delta x$. Considering the example where the envelope can be approximated by:

$$A(\Delta\theta,\Delta x)=((A_{max}-A_{min})D(\Delta x)\cos(2\pi\Delta x/\lambda_s+\Delta\theta))+A_{min}$$

and $\Delta\theta=\pi/2$, the envelope has local maxima at:

$$\Delta x=\lambda_s/4, 5\lambda_s/4 \ldots$$

And local minima at:

$$\Delta x=3\lambda_s/4, 7\lambda_s/4 \ldots$$

Two transceivers of the same transmission device can be placed with $\Delta\theta=\pi/2$ and $\Delta x=3\lambda_s/4$ and a similar remote transmission device can be placed at a distance of $$d=(4N+1)\lambda_s/4$$

Other examples with other axial deviations and/or a greater number of transceivers are likewise possible.

Figure 35:
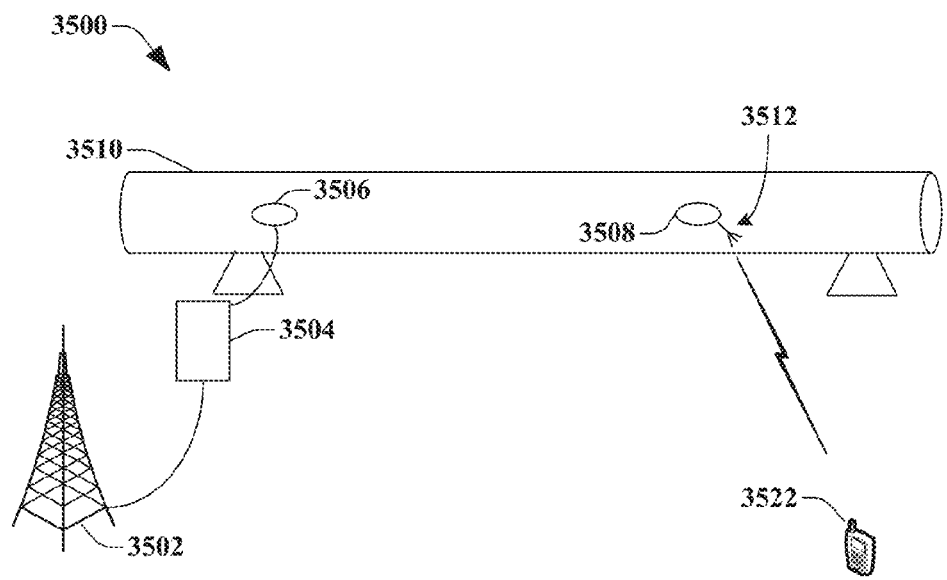
FIG. 35 is a block diagram illustrating an example, non-limiting embodiment of a guided-wave communications system in accordance with various aspects described herein.

FIG. 35 is a block diagram illustrating an example, non-limiting embodiment of a guided-wave communications system in accordance with various aspects described herein. Guided-wave communication system 3500 can be a distributed antenna system that includes one or more base station devices (e.g., base station device 3504) that are communicably coupled to a macrocell site 3502 or other network connection. Base station device 3504 can be connected by a wired (e.g., fiber and/or cable) connection as shown, or by a wireless (e.g., microwave wireless) connection to macrocell site 3502. Macrocells such as macrocell site 3502 can have dedicated connections to the mobile network and base station device 3504 can share and/or otherwise use macrocell site 3502's connection. Base station device 3504 can be mounted on, or attached to, a pipeline 3510. The pipeline 3510 can be a national infrastructure pipeline such as a natural gas pipeline or oil pipeline used for energy distribution, a carbon dioxide pipeline used for carbon capture, reuse or storage, or other pipe or pipeline system. In pertinent part, the pipeline 3510 serves as the transmission medium—taking the place of a wire or single wire transmission medium. As such, electromagnetic waves propagate along the outer surface as surface waves or other guided-waves, as previously described in conjunction with FIGS. 1-34.

Base station device 3504 can facilitate connectivity to a mobile network for mobile device 3522. Antennas 3512 mounted on a transmission device 3508 or pipeline 3510, can receive signals from base station device 3504 and transmit those signals to mobile device 3522 over a much wider area than if the antenna 3512 was located at or near base station device 3504.

In this example, the transmission device 3506 transmits data from base station device 3504 to antenna 3512 used to communicate with a mobile device 3522. To transmit the signal, transmit device 3506 upconverts the signal (e.g., via frequency mixing) from base station device 3504 or otherwise converts the signal from the base station device 3504 to a millimeter-wave band signal having at least one carrier frequency in the millimeter wave frequency band. The transmission device 3506 launches a millimeter-wave band electromagnetic wave that propagates as a guided-wave (e.g., surface wave or other electromagnetic wave) that travels along the outer surface of the pipeline 3510.

Another transmission device 3508 receives the guided-wave (and optionally can amplify it as needed or desired or operate as a digital repeater to receive it and regenerate it) and can send it forward as a guided-wave transmission (e.g., surface wave or other electromagnetic wave) on the pipeline 3510 to another transmission device that is further along the pipeline 3510. The transmission device 3508 can also extract a signal from the millimeter-wave band guided-wave and shift it down in frequency or otherwise convert it to its original cellular band frequency (e.g., 1.9 GHz or other defined cellular frequency) or another cellular (or non-cellular) band frequency. The antenna 3512 can transmit (e.g., wirelessly transmit) the downshifted signal to mobile device 3522.

Transmissions from mobile device 3522 can also be received by antenna 3512. The transmission device 3508 can upshift or otherwise convert the cellular band signals to millimeter-wave band and transmit the signals as guided-wave transmissions (e.g., surface wave or other electromagnetic wave) over the pipeline 3510 via transmission device 3506 to base station device 3504.

In an example embodiment, system 3500 can employ diversity paths based on different axial orientations, different frequencies or different guided-wave modes of propagation. The selection between different diverse paths can be based on measurements of the signal-to-noise ratio, or based on determined weather/environmental conditions (e.g., moisture detectors, weather forecasts, etc.). The use of diverse paths within system 3500 can enable alternate routing capabilities, load balancing, increased load handling, concurrent bi-directional or synchronous communications, spread spectrum communications, etc.

It is noted that the use of the transmission devices 3506 and 3508 in FIG. 35 are by way of example only, and that in other embodiments, other uses are possible. For instance, transmission devices 3506 and 3508 can be used in a backhaul communication system, providing network connectivity between base station device 3504 and other base station devices. Transmission devices 3506 and 3508 can be used in many circumstances where it is desirable to transmit guided-wave communications over a transmission medium.

It is further noted, that while base station device 3504 and macrocell site 3502 are illustrated in an example embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth protocol, Zigbee protocol or other wireless protocol.

Figure 36:
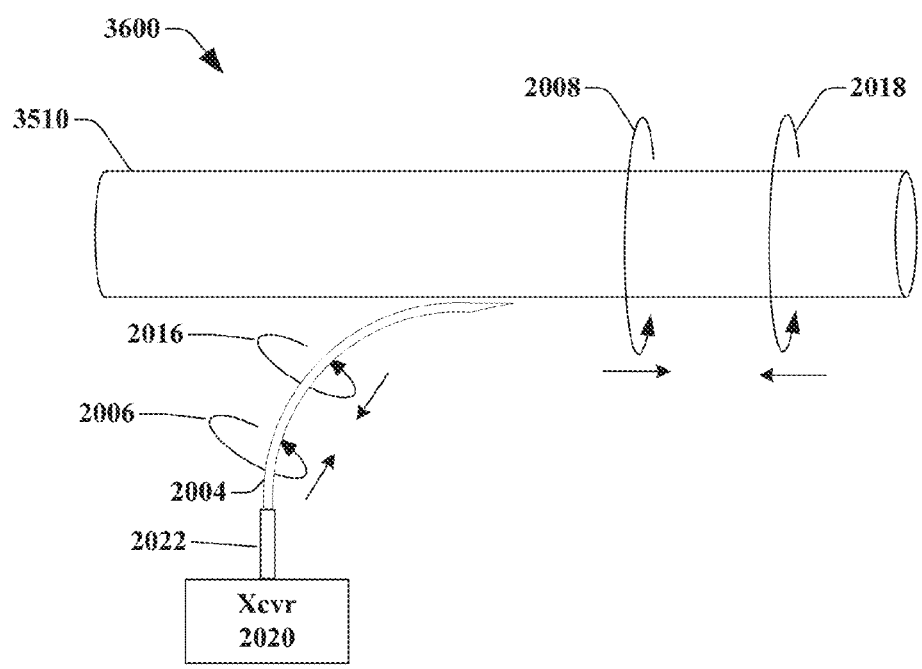
FIG. 36 is a block diagram of an example, non-limiting embodiment of a transmission device in accordance with various aspects described herein.

FIG. 36 is a block diagram of an example, non-limiting embodiment of a transmission device in accordance with various aspects described herein. In particular, a transmission device 3600 is shown that includes a transceiver 2020, having a transmitting device (or transmitter) and/or a receiving device (receiver) that is coupled to a corresponding waveguide 2022 and coupler 2004 as previously described in conjunction with FIG. 20. More generally however, this coupler 2004 can be implemented by any of the other couplers presented herein with the wire or single wire transmission medium being replaced in the system by the pipeline 3510. The coupler 2004 of such a coupling module includes a receiving portion 2010 that receives an electromagnetic wave 2006 conveying first data from a transmitting device of transceiver 2020.

In operation, the electromagnetic wave 2006 propagates via at least one first guided-wave mode. The coupling of the electromagnetic wave 2006 to the pipeline 3510 forms an electromagnetic wave 2008 that is guided to propagate along the outer surface of the pipeline 3510 via at least one second guided-wave mode that may differ from the at least one first guided-wave mode. The pipeline 3510 supports the propagation of the second electromagnetic waves 2008 along the outer surface of the pipeline 3510 to convey the first data.

In various embodiments, the electromagnetic wave 2006 propagates along the coupler 2004, via one or more first guided-wave modes that can include either exclusively or substantially exclusively a symmetrical (fundamental) mode, however other modes can optionally be included in addition or in the alternative. In accordance with these embodiments, the at least one second guided-wave mode includes at least one asymmetric mode that is not included in the guided-wave modes of the electromagnetic wave 2006 that propagate along the coupler 2004.

In addition to operating as a transmitter, the transmission device 3600 can operate as a receiver as well. In this mode of operation, an electromagnetic wave 2018 conveys second data that also propagates along the outer surface of the pipeline 3510, but in the opposite direction of the electromagnetic wave 2008. The coupler 2004 couples the electromagnetic wave 2018 from the pipeline 3510 to form an electromagnetic wave 2016 that is guided to a receiver of the corresponding transceiver 2020 by waveguide 2022.

In one or more embodiments, the transceiver 2020 generates the electromagnetic wave 2006 based on a communication signal to convey data. The electromagnetic wave 2006 was at least one carrier frequency and at least one corresponding wavelength. The coupler 2004 couples the electromagnetic wave 2006 to the outer surface of the pipeline 3510. The coupling of the electromagnetic wave 2006 to the pipeline 3510 forms a second electromagnetic wave that is guided to propagate along the outer surface of the pipeline 3510 via at least one guided-wave mode that includes an asymmetric mode, wherein the at least one carrier frequency is within a millimeter wave frequency band and wherein the at least one corresponding wavelength is less than the circumference of pipeline 3510.

In one or more embodiments, the transceiver 2020 generates the electromagnetic wave 2006 based on a communication signal to convey first data. The coupler 2004 couples the electromagnetic wave 2006 to the outer surface of the pipeline 3510, wherein the pipeline is surrounded by a dielectric coating, substance or other material. The coupling of the electromagnetic wave 2006 to the outer surface of the pipeline 3510 forms an electromagnetic wave 2008 that is guided to propagate along the outer surface of the dielectric material via at least one guided-wave mode that includes an asymmetric mode having a lower cutoff frequency, and wherein the at least one carrier frequency of the electromagnetic wave 2006 is selected to be within a limited range of the lower cutoff frequency.

In one or more embodiments, the transceiver 2020 generates the electromagnetic wave 2006 based on a communication signal to convey first data. The coupler 2004 couples the electromagnetic wave 2006 to the outer surface of the pipeline 3510. The coupling of the electromagnetic wave 2006 to the outer surface of the pipeline 3510 forms an electromagnetic wave 2008 that is guided to propagate along the outer surface of the pipeline 3510 via at least one guided-wave mode that includes an asymmetric mode having a lower cutoff frequency, and wherein the at least one carrier frequency of the electromagnetic wave 2006 is selected to be within a limited range of the lower cutoff frequency.

In one or more embodiments, the coupler includes a receiving portion that receives the electromagnetic wave 2006 conveying first data from the transceiver 2020. A guiding portion guides the electromagnetic wave 2006 to a junction for coupling the electromagnetic wave 2006 to the pipeline 3510. The electromagnetic wave 2006 propagates via at least one first guided-wave mode. The coupling of the electromagnetic wave 2006 to the pipeline 3510 causes the electromagnetic wave 2008 that is guided to propagate along the outer surface of the pipeline 3510 via at least one second guided-wave mode that differs from the at least one first guided-wave mode.

While not expressly shown, in one or more embodiments, the coupler 2004 is part of a coupling module includes a plurality of receiving portions that receive a corresponding plurality of electromagnetic waves 2006 conveying first data. A plurality of guiding portions guide the plurality of electromagnetic waves 2006 to a corresponding plurality of junctions for coupling the plurality of electromagnetic waves 2006 to the pipeline 3510. The plurality of electromagnetic waves 2006 propagate via at least one first guided-wave mode and the coupling of the plurality of electromagnetic waves 2006 to the pipeline 3510 forms a plurality of electromagnetic waves 2008 that are guided to propagate along the outer surface of the pipeline via at least one second guided-wave mode that differs from the at least one first guided-wave mode.

While not specifically shown, in one or more embodiments, the coupler 2004 is part of a coupling module with at least one other coupler. The coupler 2004 guides the electromagnetic wave 2006 to a first junction to form the electromagnetic wave 2008 that is guided to propagate along the outer surface of the pipeline 3510 via one or more guided-wave modes. This mode or modes have an envelope that varies as a function of angular deviation from the orientation of the transmitting coupler and/or longitudinal displacement from the function of the transmitting coupler. A second coupler, not expressly shown, guides another electromagnetic wave from a second junction coupling this other electromagnetic wave from the pipeline 3510. The second junction is arranged in angular deviation and/or longitudinal displacement to correspond to a local minimum of the envelope.

Figure 37:
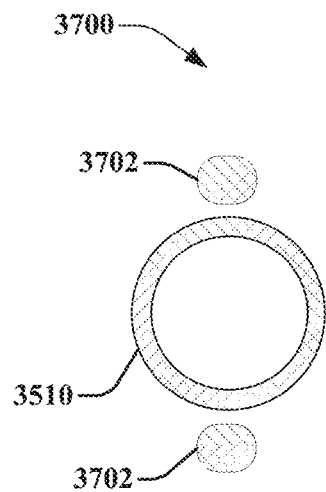
FIG. 37 is a block diagram illustrating an example, non-limiting embodiment of a waveguide coupling system in accordance with various aspects described herein.

FIG. 37 is a block diagram illustrating an example, non-limiting embodiment of a waveguide coupling system in accordance with various aspects described herein. In particular, a cross sectional representation 3700 of the pipeline 3510 is depicted near the junction where two couplers 3702 launch and/or receive electromagnetic waves from the surface of the pipeline 3510. Each coupler 3702 can be implemented via a coupler 2004 presented in FIG. 36 or via other coupler design presented herein. As is shown, the couplers 3702 are angularly aligned with an angular deviation of r radians and are positioned directly next to, but leaving an air gap from the surface of the pipeline 3510. In other embodiments, the couplers 3702 may be touching the surface of the pipeline 3510.

It is to be appreciated that while FIG. 37 shows pipeline 3510 having a circular shape and couplers 3702 having rounded rectangular shapes, this is not meant to be limiting. In other embodiments, wires and waveguides can have a variety of shapes, sizes, and configurations. The shapes can include, but should not be limited to: ovals or other ellipsoid shapes, octagons, quadrilaterals or other polygons with either sharp or rounded edges, or other shapes. Further, while two couplers are shown, a transmission device can include a single coupler or two or more couplers arranged at different axial orientations and/or spatial displacements as previously discussed in conjunction with other transmission media.

Figure 38:
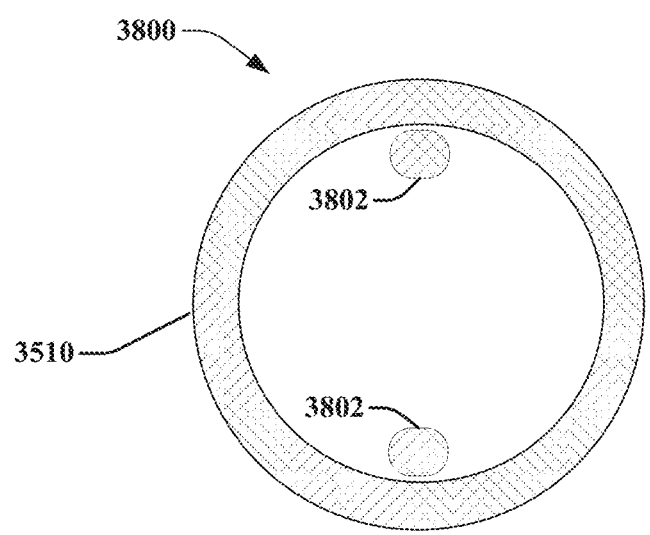
FIG. 38 is a block diagram illustrating an example, non-limiting embodiment of a waveguide coupling system in accordance with various aspects described herein.

FIG. 38 is a block diagram illustrating an example, non-limiting embodiment of a waveguide coupling system in accordance with various aspects described herein. In particular, a cross sectional representation 3800 of the pipeline 3510, such as a natural gas or carbon dioxide pipeline or other pipeline is depicted that operates similarly to the embodiments of FIGS. 35-37, but with the transmission devices 3506 and 3508 operating inside the pipeline 3510 instead of on the outer surface. In this case, two couplers 3802 launch and/or receive electromagnetic waves from the inner surface of the pipeline 3510. It should be noted that waves launched inside the pipeline may start out appearing to be surface waves, but they can evolve into conventional symmetrical, fundamental waveguide modes that fill the interior space (e.g., the entire space or simply a portion thereof) of the pipe. Each coupler 3802 can be implemented via a coupler 2004 presented in FIG. 36 or via other coupler designs presented herein. It should be noted that the design of the couplers 3802 can be streamlined to minimize disruptions in the flow of the product through the pipeline. As is shown, the couplers 3802 and can be positioned directly next to, but leaving an air gap from the surface of the pipeline 3510. In other embodiments, the couplers 3802 may be touching the inner surface of the pipeline 3510.

It is to be appreciated that while FIG. 38 shows pipeline 3510 having a circular shape and couplers 3802 having rounded rectangular shapes, this is not meant to be limiting. In other embodiments, wires and waveguides can have a variety of shapes, sizes, and configurations. The shapes can include, but should not be limited to: ovals or other ellipsoid shapes, octagons, quadrilaterals or other polygons with either sharp or rounded edges, or other shapes. Further, while two couplers are shown, a transmission device can include a single coupler or two or more couplers arranged at different axial orientations and/or spatial displacements as previously discussed in conjunction with other transmission media.

Figure 39:
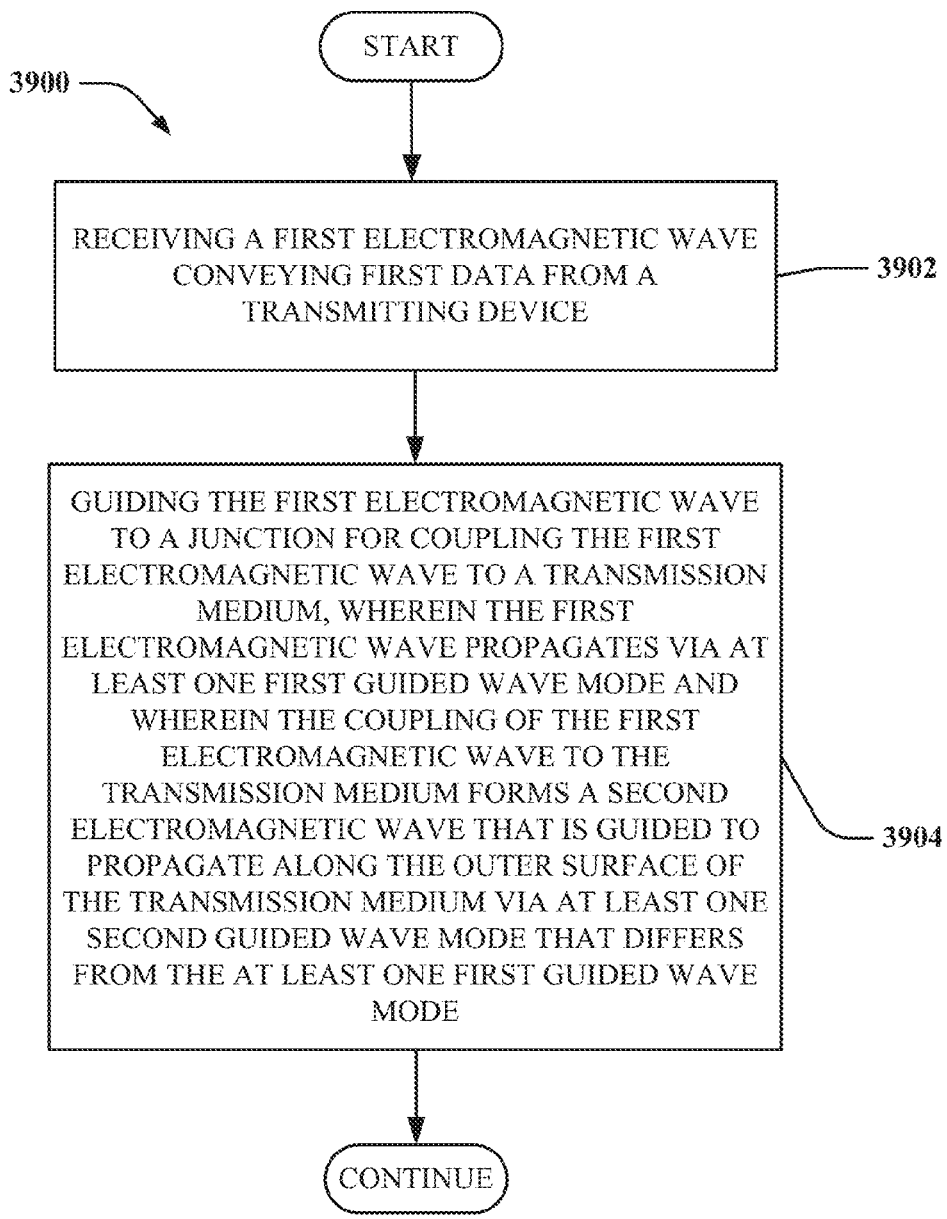
FIG. 39 illustrates a flow diagram of an example, non-limiting embodiment of a method of transmission as described herein.

Turning now to FIG. 39, a flow diagram is shown illustrating an example, non-limiting embodiment of a method of transmission 3900. The method can be used in conjunction with one or more functions and features described in conjunction with FIGS. 1-38. Step 3902 includes receiving a first electromagnetic wave conveying first data from a transmitting device. Step 3904 includes guiding the first electromagnetic wave to a junction for coupling the first electromagnetic wave to a transmission medium, wherein the first electromagnetic wave propagates via at least one first guided-wave mode and wherein the coupling of the first electromagnetic wave to the transmission medium forms a second electromagnetic wave that is guided to propagate along the outer surface of the transmission medium via at least one second guided-wave mode that differs from the at least one first guided-wave mode.

In various embodiments, the at least one second guided-wave mode includes an asymmetric mode not included in the at least one first guided-wave mode. The at least one first guided-wave mode can include a symmetric mode and the junction can induce the second electromagnetic wave such that the at least one second guided-wave mode includes an asymmetric mode. The at least one first guided-wave mode can include a symmetric mode and the junction can induce the second electromagnetic wave such that the at least one second guided-wave mode includes both an asymmetric mode and a symmetric mode.

In various embodiments, a third electromagnetic wave conveying second data can also propagate along the outer surface of the transmission medium. The junction can include an air gap. The junction can couple the third electromagnetic wave from the transmission medium to form a fourth electromagnetic wave that is guided to a receiver.

Figure 40:
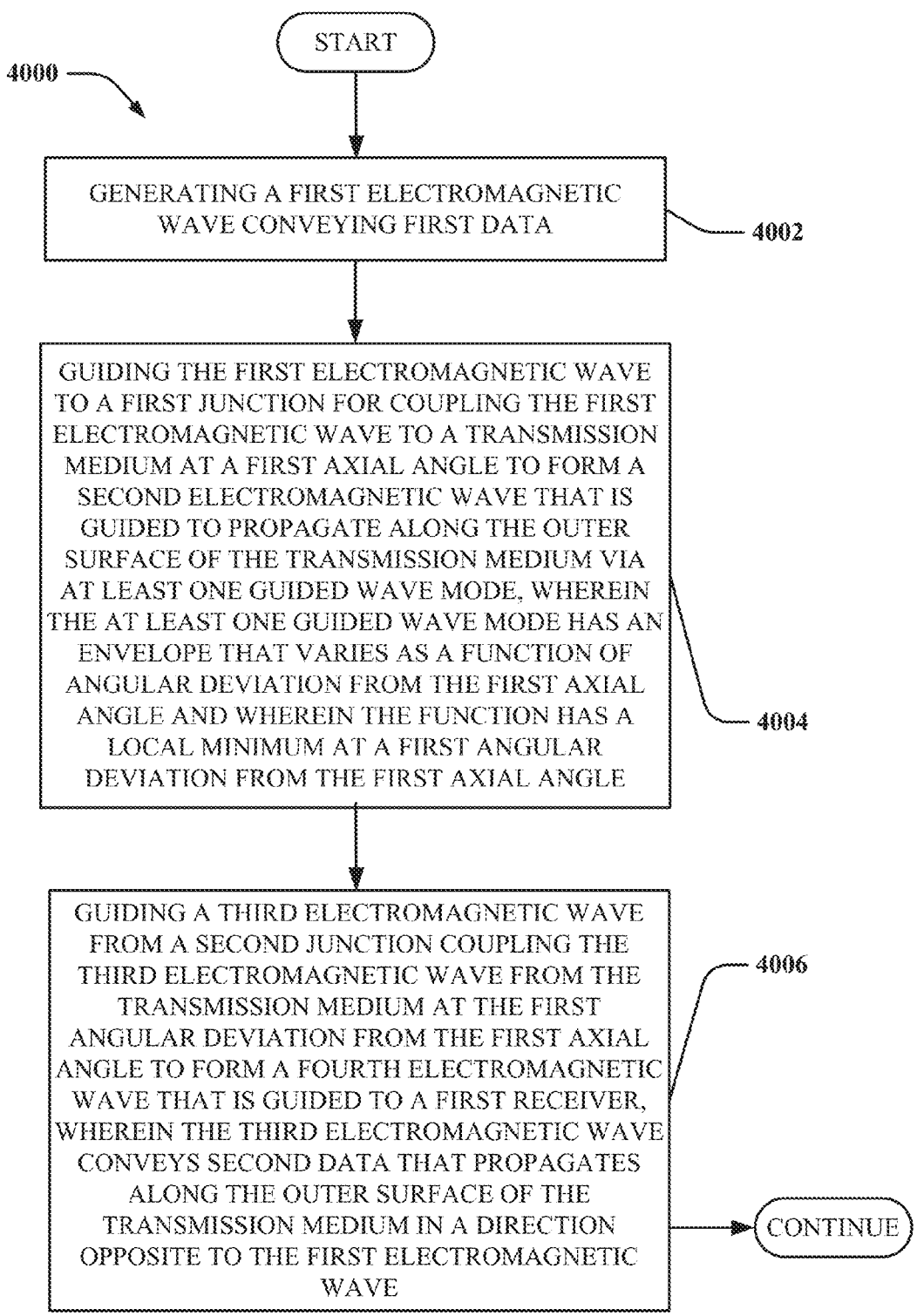
FIG. 40 illustrates a flow diagram of an example, non-limiting embodiment of a method of transmission as described herein.

Turning now to FIG. 40, a flow diagram is shown illustrating an example, non-limiting embodiment of a method of transmission 4000. The method can be used in conjunction with one or more functions and features described in conjunction with FIGS. 1-39. Step 4002 includes generating a first electromagnetic wave conveying first data from a transmitting device. Step 4004 includes guiding the first electromagnetic wave to a first junction for coupling the first electromagnetic wave to a transmission medium at a first azimuthal angle to form a second electromagnetic wave that is guided to propagate along the outer surface of the transmission medium via at least one guided-wave mode, wherein the second electromagnetic wave has an envelope that varies as a function of angular deviation from the first azimuthal angle and wherein the function has a local minimum at a first angular deviation from the first azimuthal angle. Step 4006 includes guiding a third electromagnetic wave from a second junction coupling the third electromagnetic wave from the transmission medium at the first angular deviation from the first azimuthal angle to form a fourth electromagnetic wave that is guided to a first receiver, wherein the third electromagnetic wave conveys second data that propagates along the outer surface of the transmission medium in a direction opposite to the first electromagnetic wave.

In various embodiments, the envelope of the second electromagnetic wave, for the first angular deviation from the first azimuthal angle, varies as a function of longitudinal deviation from the first junction and the local minimum at the first angular deviation occurs at a first longitudinal displacement from the first junction. The envelope of the second electromagnetic wave, for the first angular deviation from the first azimuthal angle, can vary as a sinusoidal function of longitudinal deviation from the first junction.

The sinusoidal function has a corresponding envelope wavelength, and the transmitter can transmit the first data to at least one remote transmission device having a third coupler that receives the second electromagnetic wave via a third junction that is remotely displaced at a second longitudinal displacement from the first junction. The second longitudinal displacement can be substantially an integer number of envelope wavelengths. The first receiver can receive the second data from at least one remote transmission device having a third coupler that forms the third electromagnetic wave via a third junction that is remotely displaced at a second longitudinal displacement from the second junction.

The method can also include the step of selecting at least one carrier frequency of the first electromagnetic wave based on feedback data received by the receiver from at least one remote transmission device coupled to receive the second electromagnetic wave.

As used herein, the term "millimeter-wave" refers to electromagnetic waves that fall within the "millimeter-wave frequency band" of 30 GHz to 300 GHz. The term "microwave" refers to electromagnetic waves that fall within the "microwave frequency band" of 300 MHz to 300 GHz.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A coupler comprising:
a receiving portion that receives a plurality of first electromagnetic waves conveying first data from a transmitting device, wherein the first data includes a plurality of data streams that differ from one another and wherein each of the plurality of first electromagnetic waves conveys one of the plurality of data streams;
a plurality of guiding portions, that guides the plurality of first electromagnetic waves to at least one junction for coupling the plurality of first electromagnetic waves to a transmission medium, wherein the plurality of first electromagnetic waves propagates via at least one first guided wave mode and wherein the coupling of the plurality of first electromagnetic waves to the transmission medium forms a plurality of second electromagnetic waves that are each guided to propagate along an outer surface of the transmission medium via at least one second guided wave mode that differs from the at least one first guided wave mode, wherein the at least one second guided wave mode includes a non-fundamental mode not included in the at least one first guided wave mode.

2. The coupler of claim 1 wherein the at least one first guided wave mode includes only a fundamental mode and wherein the at least one junction induces the plurality of second electromagnetic waves such that the at least one second guided wave mode includes the non-fundamental mode.

3. The coupler of claim 1 wherein the at least one first guided wave mode includes a first symmetric mode having a circular field pattern and wherein the at least one junction induces the plurality of second electromagnetic waves such that the at least one second guided wave mode includes an asymmetric mode having a non-circular field pattern and a second symmetric mode having the circular field pattern.

4. The coupler of claim 1 wherein the at least one junction includes an air gap.

5. The coupler of claim 1, wherein a plurality of third electromagnetic waves conveys second data that also propagates along the outer surface of the transmission medium; and
wherein the at least one junction couples the plurality of third electromagnetic waves from the transmission medium to form a plurality of fourth electromagnetic waves that is guided to a receiver by the plurality of guiding portions.

6. The coupler of claim 1 wherein the plurality of guiding portions each includes a tapered, rounded or beveled end that terminates at the at least one junction.

7. A coupling module comprising:
a plurality of receiving portions that receives a corresponding plurality of first electromagnetic waves conveying first data;
a plurality of guiding portions, that guides the plurality of first electromagnetic waves to a corresponding plurality of junctions for coupling the plurality of first electromagnetic waves to a transmission medium, wherein the plurality of first electromagnetic waves propagates via at least one first guided wave mode and wherein the coupling of the plurality of first electromagnetic waves to the transmission medium forms a plurality of second electromagnetic waves that is guided to propagate along an outer surface of the transmission medium via at least one second guided wave mode that differs from the at least one first guided wave mode, and wherein the at least one second guided wave mode includes a non-fundamental mode not included in the at least one first guided wave mode; and
wherein the first data includes a plurality of data streams that differ from one another and wherein each of the plurality of first electromagnetic waves conveys one of the plurality of data streams.

8. The coupling module of claim 7 wherein the at least one first guided wave mode includes a symmetric mode having a circular field pattern and wherein the plurality of junctions induces the plurality of second electromagnetic waves such that the at least one second guided wave mode includes the non-fundamental wave mode comprising an asymmetric mode having a non-circular field pattern.

9. The coupling module of claim 7 wherein the at least one first guided wave mode includes a first symmetric mode having a circular field pattern and wherein the plurality of junctions induces the plurality of second electromagnetic waves such that the at least one second guided wave mode includes an asymmetric mode having a non-circular field pattern and a second symmetric mode having the circular field pattern.

10. The coupling module of claim 7 wherein the plurality of junctions includes an air gap.

11. The coupling module of claim 7, wherein a plurality of third electromagnetic waves conveys second data that also propagates along the outer surface of the transmission medium; and wherein the plurality of junctions couples the plurality of third electromagnetic waves from the transmission medium to form a plurality of fourth electromagnetic waves that is guided by the plurality of guiding portions.

12. The coupling module of claim 7 wherein the plurality of guiding portions each include an end that terminates at a corresponding one of the plurality of junctions to reduce signal reflections.

13. A method comprising:

receiving a plurality of first electromagnetic waves conveying first data from a transmitting device, wherein the first data includes a plurality of data streams that differ from one another and wherein each of the plurality of first electromagnetic waves conveys one of the plurality of data streams;

guiding the plurality of first electromagnetic waves to a plurality of junctions for coupling the plurality of first electromagnetic waves to a transmission medium, wherein the plurality of first electromagnetic waves propagates via at least one first guided wave mode and wherein the coupling of the plurality of first electromagnetic waves to the transmission medium forms a plurality of second electromagnetic waves that are each guided to propagate along an outer surface of the transmission medium via at least one second guided wave mode that differs from the at least one first guided wave mode, and wherein the at least one second guided wave mode includes a non-fundamental mode not included in the at least one first guided wave mode.

14. The method of claim 13 wherein the non-fundamental mode comprises an asymmetric mode having a non-circular field pattern not included in the at least one first guided wave mode.

15. The method of claim 13 wherein the at least one first guided wave mode includes a symmetric mode having a circular field pattern and wherein the plurality of junctions induces the plurality of second electromagnetic waves such that the at least one second guided wave mode includes the non-fundamental wave mode comprising an asymmetric mode having a non-circular field pattern.

16. The method of claim 13 wherein the at least one first guided wave mode includes a first symmetric mode having a circular field pattern and wherein the plurality of junctions induces the plurality of second electromagnetic waves such that the at least one second guided wave mode includes the non-fundamental wave mode comprising an asymmetric mode having a non-circular field pattern.

17. The method of claim 13 wherein the plurality of junctions includes an air gap.

18. The method of claim 13, wherein a plurality of third electromagnetic waves conveys second data that also propagates along the outer surface of the transmission medium; and wherein the plurality of junctions couples the plurality of third electromagnetic waves from the transmission medium to form a plurality of fourth electromagnetic waves that is guided to a receiver.

19. A method comprising:

guiding a plurality of first electromagnetic waves to at least one junction, wherein the plurality of first electromagnetic waves propagates via at least one first guided wave mode to communicate first data, wherein the first data includes a plurality of data streams that differ from one another and wherein each of the plurality of first electromagnetic waves conveys one of the plurality of data streams; and coupling of the plurality of first electromagnetic waves to a transmission medium to form a plurality of second electromagnetic waves that are each guided to propagate along an outer surface of the transmission medium via at least one second guided wave mode that differs from the at least one first guided wave mode, and wherein the at least one second guided wave mode includes a non-fundamental mode not included in the at least one first guided wave mode.

20. The method of claim 19 wherein the at least one first guided wave mode includes a fundamental mode and wherein the at least one junction induces the plurality of second electromagnetic waves such that the at least one second guided wave mode includes the non-fundamental mode.

21. The method of claim 19 wherein the at least one first guided wave mode includes a fundamental mode and wherein the at least one junction induces the plurality of second electromagnetic waves such that the at least one second guided wave mode includes a non-fundamental mode.

* * * * *